US010859969B2

(12) United States Patent
Hirayama et al.

(10) Patent No.: US 10,859,969 B2
(45) Date of Patent: Dec. 8, 2020

(54) CARTRIDGE

(71) Applicant: CANON KABUSHIKI KAISHA, Tokyo (JP)

(72) Inventors: Akinobu Hirayama, Susono (JP); Takahito Ueno, Mishima (JP); Toshiaki Takeuchi, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/804,693

(22) Filed: Feb. 28, 2020

(65) Prior Publication Data

US 2020/0201247 A1 Jun. 25, 2020

Related U.S. Application Data

(60) Division of application No. 15/665,835, filed on Aug. 1, 2017, which is a continuation of application No. PCT/JP2016/056688, filed on Feb. 26, 2016.

(30) Foreign Application Priority Data

Feb. 27, 2015 (JP) .................................. 2015-039431
Nov. 27, 2015 (JP) .................................. 2015-232095

(51) Int. Cl.
*G03G 21/18* (2006.01)
*G03G 21/10* (2006.01)

(52) U.S. Cl.
CPC ......... *G03G 21/1842* (2013.01); *G03G 21/10* (2013.01); *G03G 21/105* (2013.01); *G03G 21/1857* (2013.01)

(58) Field of Classification Search
None
See application file for complete search history.

(56) References Cited

U.S. PATENT DOCUMENTS 6,174,752 B1 1/2001 Schrock
6,385,416 B1 5/2002 Horikawa et al.
(Continued)

FOREIGN PATENT DOCUMENTS

EP  1 265 115 A2  6/2002
EP  1 265 116 A   11/2002
(Continued)

OTHER PUBLICATIONS

Nov. 5, 2019 Decision to Grant in Russian Patent Application No. 2017133245 (with English translation).
(Continued)

*Primary Examiner* — Sevan A Aydin
(74) *Attorney, Agent, or Firm* — Venable LLP

(57) ABSTRACT

A rotational force is transmitted to a main assembly side feeding member for feeding the toner into a main assembly side toner accommodating portion from a coupling member provided on a cartridge.
The cartridge includes a photosensitive drum, a discharge opening configured to discharge the toner removed from the photosensitive drum toward the main assembly side feeding member, and a coupling member configured to transmit the rotational force to the main assembly side feeding member. The coupling member is movable between a first position for transmitting the rotational force to the main assembly side feeding member and a second position retracted from the first position.

30 Claims, 52 Drawing Sheets

(56) References Cited

U.S. PATENT DOCUMENTS

| | | |
|---|---|---|
| 6,608,980 B2 | 8/2003 | Murayama et al. |
| 6,771,924 B2 | 8/2004 | Matsuguma |
| 6,823,153 B2 | 11/2004 | Ueno et al. |
| 6,829,455 B2 | 12/2004 | Yasumoto et al. |
| 6,834,175 B2 | 12/2004 | Murayama et al. |
| 6,898,391 B2 | 5/2005 | Numagami et al. |
| 6,912,365 B2 | 6/2005 | Ueno et al. |
| 6,954,600 B2 | 10/2005 | Fujita et al. |
| 6,954,601 B2 | 10/2005 | Numagami et al. |
| 6,968,146 B1 | 11/2005 | Fujita et al. |
| 6,970,688 B2 | 11/2005 | Ueno et al. |
| 6,978,099 B2 | 12/2005 | Ueno et al. |
| 7,003,247 B2 | 2/2006 | Koishi et al. |
| 7,062,200 B2 | 6/2006 | Ueno et al. |
| 7,092,658 B2 | 8/2006 | Yasumoto et al. |
| 7,139,502 B2 | 11/2006 | Koishi et al. |
| 7,158,749 B2 | 1/2007 | Ueno et al. |
| 7,164,875 B2 | 1/2007 | Miyabe et al. |
| 7,174,122 B2 | 2/2007 | Fujita et al. |
| 7,184,690 B2 | 2/2007 | Ueno et al. |
| 7,209,682 B2 | 4/2007 | Numagami et al. |
| 7,248,810 B2 | 7/2007 | Miyabe et al. |
| 7,315,710 B2 | 1/2008 | Ueno et al. |
| 7,366,452 B2 | 4/2008 | Fujita et al. |
| 7,440,715 B2 | 10/2008 | Numagami et al. |
| 7,450,877 B2 | 11/2008 | Miyabe et al. |
| 7,457,566 B2 | 11/2008 | Koishi et al. |
| 7,483,646 B2 | 1/2009 | Ueno et al. |
| 7,630,665 B2 | 12/2009 | Ueno et al. |
| 7,702,251 B2 | 4/2010 | Miyabe et al. |
| 7,720,408 B2 | 5/2010 | Ueno et al. |
| 7,720,412 B2 | 5/2010 | Anan et al. |
| 7,813,668 B2 | 10/2010 | Ueno et al. |
| 7,945,185 B2 | 5/2011 | Miyabe et al. |
| 8,155,554 B2 | 4/2012 | Miyabe et al. |
| 8,229,320 B2 | 7/2012 | Kimizuka et al. |
| 8,244,145 B2 | 8/2012 | Yamaguchi et al. |
| 8,270,879 B2 | 9/2012 | Numata et al. |
| 8,275,283 B2 | 9/2012 | Uneme et al. |
| 8,275,286 B2 | 9/2012 | Ueno et al. |
| 8,280,278 B2 | 10/2012 | Ueno et al. |
| 8,295,734 B2 | 10/2012 | Ueno et al. |
| 8,369,748 B2 | 2/2013 | Ueno et al. |
| 8,391,748 B2 | 3/2013 | Miyabe et al. |
| 8,401,441 B2 | 3/2013 | Uneme et al. |
| 8,422,914 B2 | 4/2013 | Hayashi et al. |
| 8,433,219 B2 | 4/2013 | Miyabe et al. |
| 8,452,210 B2 | 5/2013 | Ueno et al. |
| 8,494,399 B2 | 7/2013 | Miyabe et al. |
| 8,494,411 B2 | 7/2013 | Miyabe et al. |
| 8,521,060 B2 | 8/2013 | Numata et al. |
| 8,532,533 B2 | 9/2013 | Ueno et al. |
| 8,630,564 B2 | 1/2014 | Ueno et al. |
| 8,670,688 B2 | 3/2014 | Ueno et al. |
| 8,676,090 B1 | 3/2014 | Ueno et al. |
| 8,682,208 B2 | 3/2014 | Asaoka et al. |
| 8,682,215 B1 | 3/2014 | Ueno et al. |
| 8,687,994 B2 | 4/2014 | Makamura et al. |
| 8,874,004 B2 | 10/2014 | Takasaka et al. |
| 9,052,638 B2 | 6/2015 | Matsumaru et al. |
| 9,069,289 B2 | 6/2015 | Batori et al. |
| 9,116,466 B2 | 8/2015 | Makiguchi et al. |
| 9,164,424 B2 | 10/2015 | Nakamura et al. |
| 9,164,430 B2 | 10/2015 | Murakami et al. |
| 9,176,468 B2 | 11/2015 | Ueno et al. |
| 9,182,733 B2 | 11/2015 | Horikawa et al. |
| 9,188,906 B2 | 11/2015 | Batori et al. |
| 9,229,371 B2 | 1/2016 | Murakami et al. |
| 9,354,552 B2 | 5/2016 | Takeuchi |
| 9,465,318 B2 | 10/2016 | Takeuchi et al. |
| 9,477,201 B2 | 10/2016 | Miyabe et al. |
| 9,494,890 B2 | 11/2016 | Komatsu et al. |
| 9,523,942 B2 | 12/2016 | Takeuchi et al. |
| 9,594,343 B2 | 3/2017 | Miyabe et al. |
| 9,599,932 B2 | 3/2017 | Takeuchi et al. |
| 9,678,471 B2 | 6/2017 | Ueno et al. |
| 9,684,261 B2 | 6/2017 | Miyabe et al. |
| 9,733,614 B2 | 8/2017 | Ueno et al. |
| 9,746,826 B2 | 8/2017 | Ueno et al. |
| 10,191,413 B1* | 1/2019 | Chuang ............ G03G 15/0872 |
| 2006/0127128 A1 | 6/2006 | Horikawa |
| 2006/0228132 A1 | 10/2006 | Chadani et al. |
| 2007/0122205 A1 | 5/2007 | Taguchi et al. |
| 2009/0142103 A1 | 6/2009 | Chaudhuri et al. |
| 2009/0290903 A1 | 11/2009 | Horikawa et al. |
| 2010/0166452 A1 | 7/2010 | Leemhuis et al. |
| 2011/0038649 A1 | 2/2011 | Miyabe et al. |
| 2011/0123207 A1 | 5/2011 | Sato et al. |
| 2011/0255883 A1 | 11/2011 | Fukuda |
| 2012/0020683 A1 | 1/2012 | Miura et al. |
| 2013/0017001 A1* | 1/2013 | Yamanaka ......... G03G 15/0879 399/258 |
| 2014/0044465 A1 | 2/2014 | Mekada |
| 2014/0076691 A1* | 3/2014 | Yamada ............. G03G 15/0189 198/548 |
| 2014/0270821 A1 | 9/2014 | Takahashi |
| 2015/0346670 A1 | 12/2015 | Ueno et al. |
| 2016/0274536 A1 | 9/2016 | Ueno et al. |
| 2016/0299456 A1* | 10/2016 | Anderson, Jr. .... G03G 15/0886 |
| 2017/0060033 A1 | 3/2017 | Takwuchi et al. |
| 2017/0090403 A1 | 3/2017 | Morioka et al. |
| 2017/0090406 A1 | 3/2017 | Ueno et al. |
| 2017/0090407 A1 | 3/2017 | Ueno et al. |
| 2017/0090408 A1 | 3/2017 | Ueno et al. |
| 2017/0090410 A1 | 3/2017 | Ueno et al. |
| 2017/0090411 A1 | 3/2017 | Ueno et al. |
| 2017/0090412 A1 | 3/2017 | Morioka et al. |
| 2017/0090413 A1 | 3/2017 | Morioka et al. |
| 2017/0090414 A1 | 3/2017 | Ueno et al. |
| 2017/0102634 A1 | 4/2017 | Morioka et al. |
| 2017/0139349 A1 | 5/2017 | Miyabe et al. |
| 2017/0168422 A1 | 6/2017 | Takeuchi et al. |
| 2017/0185027 A1 | 6/2017 | Ueno et al. |
| 2017/0185030 A1 | 6/2017 | Morioka et al. |
| 2017/0185031 A1 | 6/2017 | Morioka et al. |
| 2017/0185033 A1 | 6/2017 | Ueno et al. |
| 2017/0192384 A1 | 7/2017 | Ueno et al. |
| 2017/0192386 A1 | 7/2017 | Ueno et al. |
| 2017/0227919 A1 | 8/2017 | Morioka et al. |
| 2017/0227920 A1 | 8/2017 | Morioka et al. |
| 2017/0227925 A1 | 8/2017 | Ueno et al. |
| 2017/0227927 A1 | 8/2017 | Ueno et al. |
| 2017/0248911 A1 | 8/2017 | Miyabe et al. |
| 2019/0113884 A1* | 4/2019 | Fuse ................. G03G 21/1842 |

FOREIGN PATENT DOCUMENTS

| | | |
|---|---|---|
| JP | UH4-116867 | 10/1992 |
| JP | H06-214496 A | 8/1994 |
| JP | H08-123275 | 5/1996 |
| JP | H11-30936 | 2/1999 |
| JP | H11-30936 A | 2/1999 |
| JP | 3132215 B2 | 2/2001 |
| JP | 2003-107828 A | 4/2003 |
| JP | 2006-293048 A | 10/2006 |
| JP | 2007-232821 A | 9/2007 |
| JP | 2009-122362 A | 6/2009 |
| JP | 2009-168859 A | 7/2009 |
| JP | 2014-027239 A | 2/2012 |
| JP | 2012-198323 A | 10/2012 |
| JP | 2014-026231 A | 2/2014 |
| JP | 2014-098749 A | 5/2014 |
| JP | 2015-022048 A | 2/2015 |
| KR | 10-2009-0049980 A | 5/2009 |
| RU | 2 484 513 C2 | 6/2012 |
| TW | 201502727 A | 1/2015 |

OTHER PUBLICATIONS

Nov. 4, 2019 Office Action in Chinese Patent Application No. 201680012082.9 (with English translation).

Office Action in Australian Patent Application No. 2018264083, dated Jul. 8, 2019.

(56) References Cited

OTHER PUBLICATIONS

Office Action in Russian Patent Application No. 2017133245, dated Feb. 13, 2019 (with English Translation).
Extended Search Report in European Patent Application No. 16 755 0755.2 dated Aug. 14, 2018.
Machine translation of JP 2014-098749 (2014).
Examination Report in Canadian Patent Application No. 2,977,921, dated Jul. 3, 2018.
Office Action in Colombia Patent Application No. NC2017/0008834, dated Jul. 2, 2018 (with English translation).
Jan. 6, 2018 Office Action in Australian Patent Application No. 2016224397.
Jun. 30, 2020 Notice of Acceptance in Australian Patent Application No. 2018264083.
Apr. 24, 2020 Decision to Grant in Russian Patent Application No. 2020101173 (with English translation).
Jul. 7, 2020 Office Action in Brazilian Patent Application No. BR 112017015600-8 (with English translation).
Jul. 7, 2020 Office Action in Brazilian Patent Application No. BR 122019002419-7 (with English translation).

* cited by examiner (a)

(b)

(a)

(b)

(a)

(b)

(a)

(b)

(c)

(a)

(b)

(c)

(a)

(b)

(a)

(b)

(a)

(b)

(a)

(b)

(a)

(b)

(a)

(b)

(a)

(b)

CARTRIDGE

This application is a divisional of application Ser. No. 15/665,835, filed Aug. 1, 2017, which is a continuation of International Patent Application No. PCT/JP2016/056688, filed Feb. 26, 2016.

FIELD OF THE INVENTION

The present invention relates to a cartridge usable with an image forming apparatus of an electrophotographic type.

BACKGROUND ART

In an electrophotographic type image forming apparatus, a structure is known in which the rotatable elements such as a photosensitive drum or developing roller relating to image formation are contained in a cartridge which is detachably mountable to a main assembly of the image forming apparatus.

Such an image forming apparatus requires maintenance operations for some elements. In order to facilitate the maintenance operation for various process means, the above-described photosensitive drum, charging means, developing means, cleaning means and so on are contained in a frame to form the cartridge. By making the cartridge detachable and mountable relative to the image forming apparatus, the maintenance operations are easy.

In such a cartridge type device, a structure is known in which untransferred toner (residual toner) resulting from a cleaning process during the image forming operation is retained in the cartridge.

In addition, Japanese Laid-open Patent Application 2014-52475 discloses a structure in which residual toner resulting in the cleaning process during the image forming operation is fed into a residual toner accommodating portion provided in the main assembly.

SUMMARY OF THE INVENTION

Problem to be Solved

Accordingly, it is an object of the present invention to provide a further development of the prior-art.

Means for Solving Problem

Representative the structure is a cartridge detachably mountable to a main assembly of an electrophotographic image forming apparatus, the main assembly including a main assembly side feeding member for feeding toner toward a main assembly side toner accommodating portion, the cartridge comprising:

a photosensitive drum;

a discharge opening configured to discharge toner removed from said photosensitive drum toward the main assembly side feeding member; and a coupling member configured to transmit a rotational force to the main assembly side feeding member, wherein the coupling member is movable between a first position for transmitting the rotational force to the main assembly side feeding member and a second position retracted from the first position.

Effects of Invention

A further development of the prior-art is provided.

DESCRIPTION OF THE EMBODIMENTS

Embodiment 1

In the following an image forming apparatus and a process cartridge of the embodiment of the present invention will be described in conjunction with the accompanying drawings. Here, for example the image forming apparatus forms an image on a recording material using the electrophotographic image forming process. The image forming apparatus includes, for example, an electrophotographic copying machine, an electrophotographic printer (LED printer laser beam printer or the like), an electrophotographic printer type facsimile machine or the like. The process cartridge contains a photosensitive member, developing means for developing a latent image formed on the photosensitive member, or the like, and is detachably mountable to a main assembly of the electrophotographic image forming apparatus (main assembly). In addition, a unit including a photosensitive drum, a coupling member, or the like, for the process cartridge is called drum unit.

In this embodiment, four process cartridges are detachably mountable to an exemplary full-color image forming apparatus. However, the number of the process cartridges mounted to the image forming apparatus is not limited to this example. Similarly, the dimensions, the sizes, the materials, the configurations, the relative positional relationships of the elements in the following embodiments and examples are not restrictive to the present invention unless otherwise stated. In the description "upper" is based on the state in which the image forming apparatus it is installed.

1. [Image Forming Apparatus]

In the following, operations relating to image formation of the image forming apparatus according to this embodiment, and feeding of residual toner will be described briefly.

(Main Assembly of the Image Forming Apparatus)

Figure 2:
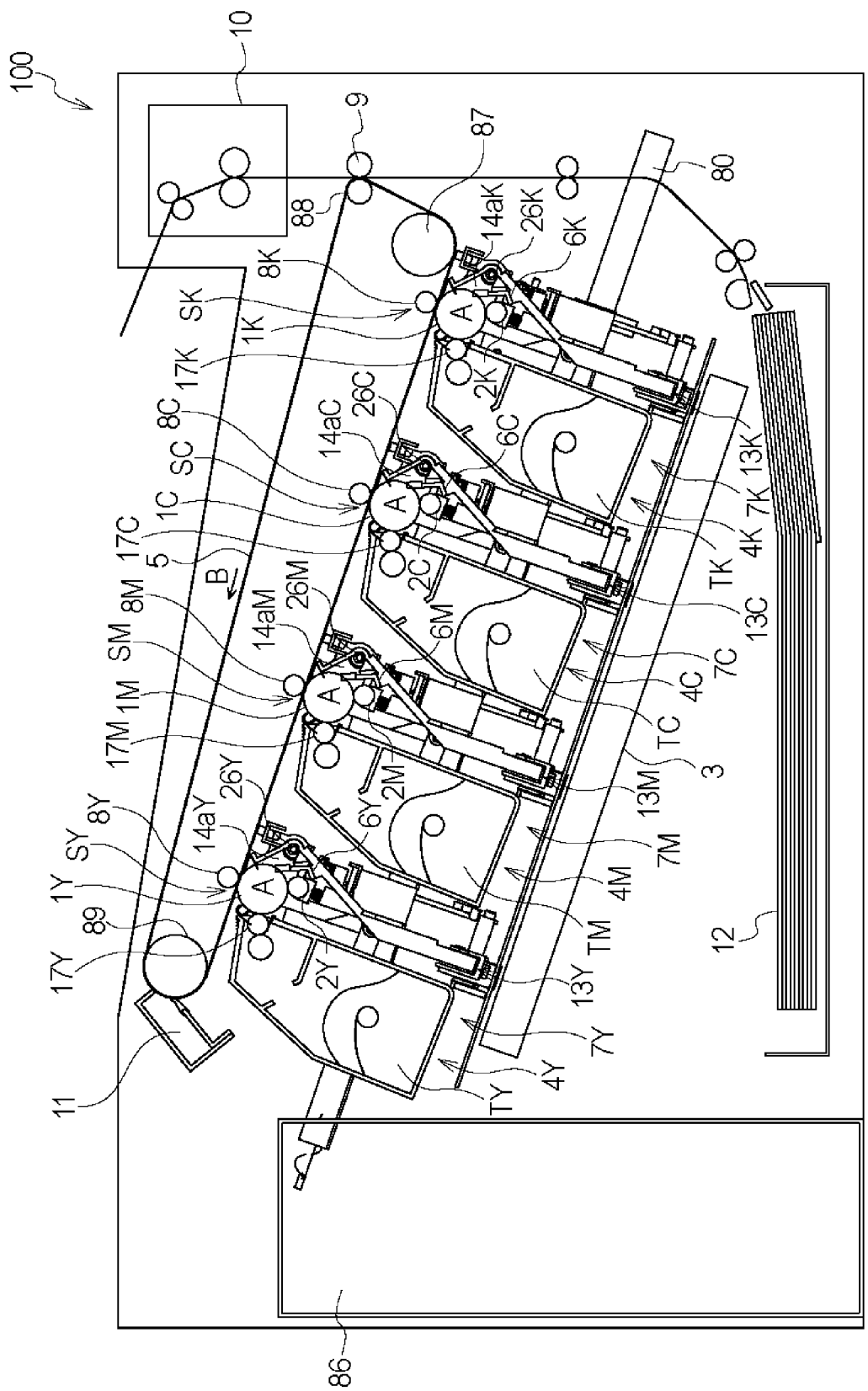
FIG. 2 illustrates schematically an electrophotographic image forming apparatus according to the embodiment of the present invention.
Figure 3:
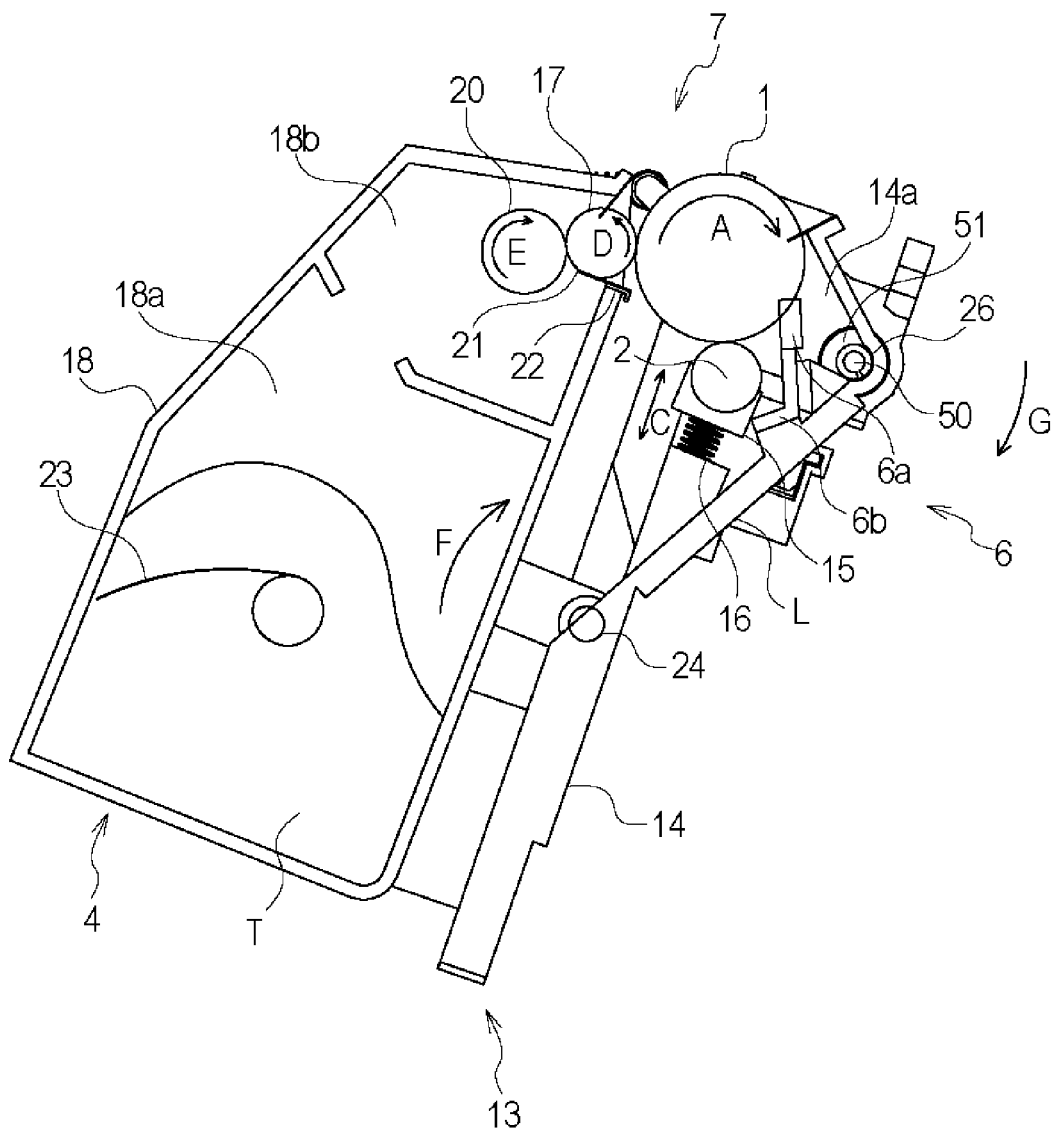
FIG. 3 is a schematic sectional view of a process cartridge according to the embodiment of the present invention.
Figure 4:
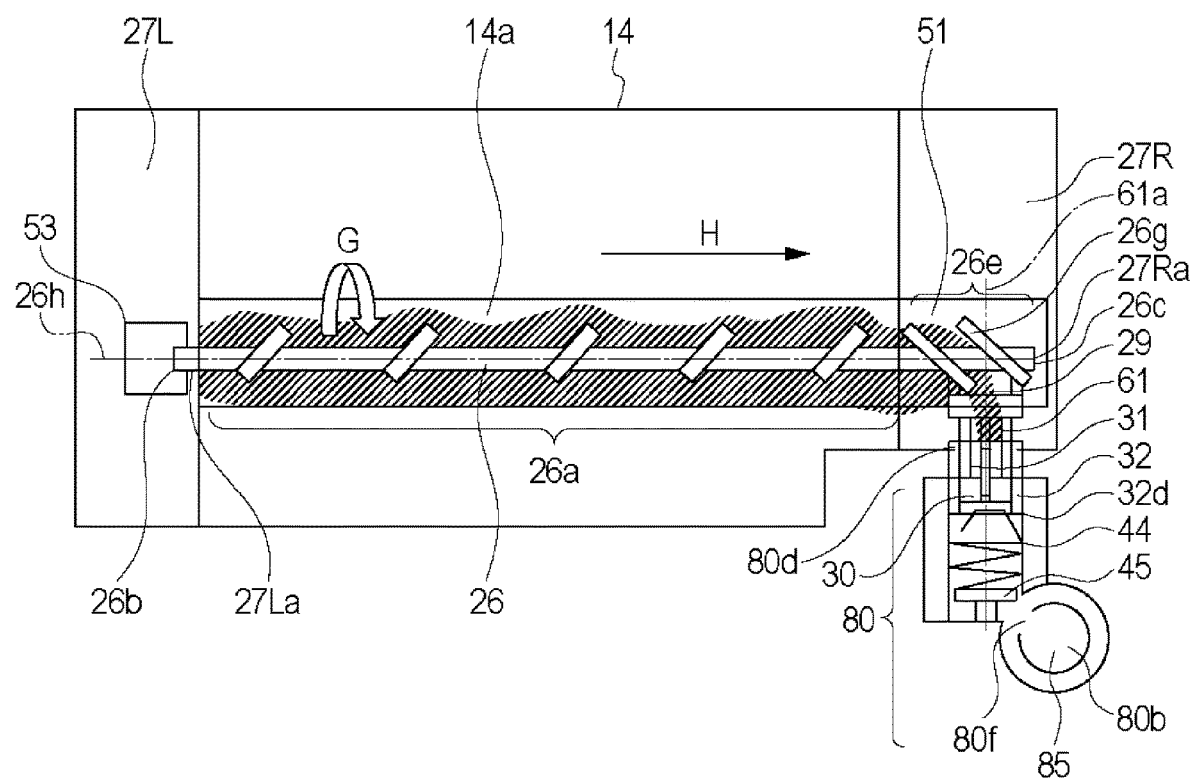
FIG. 4 is a sectional view illustrating a flow of the residual toner in the process cartridge in the embodiment of the present invention.
Figure 5:
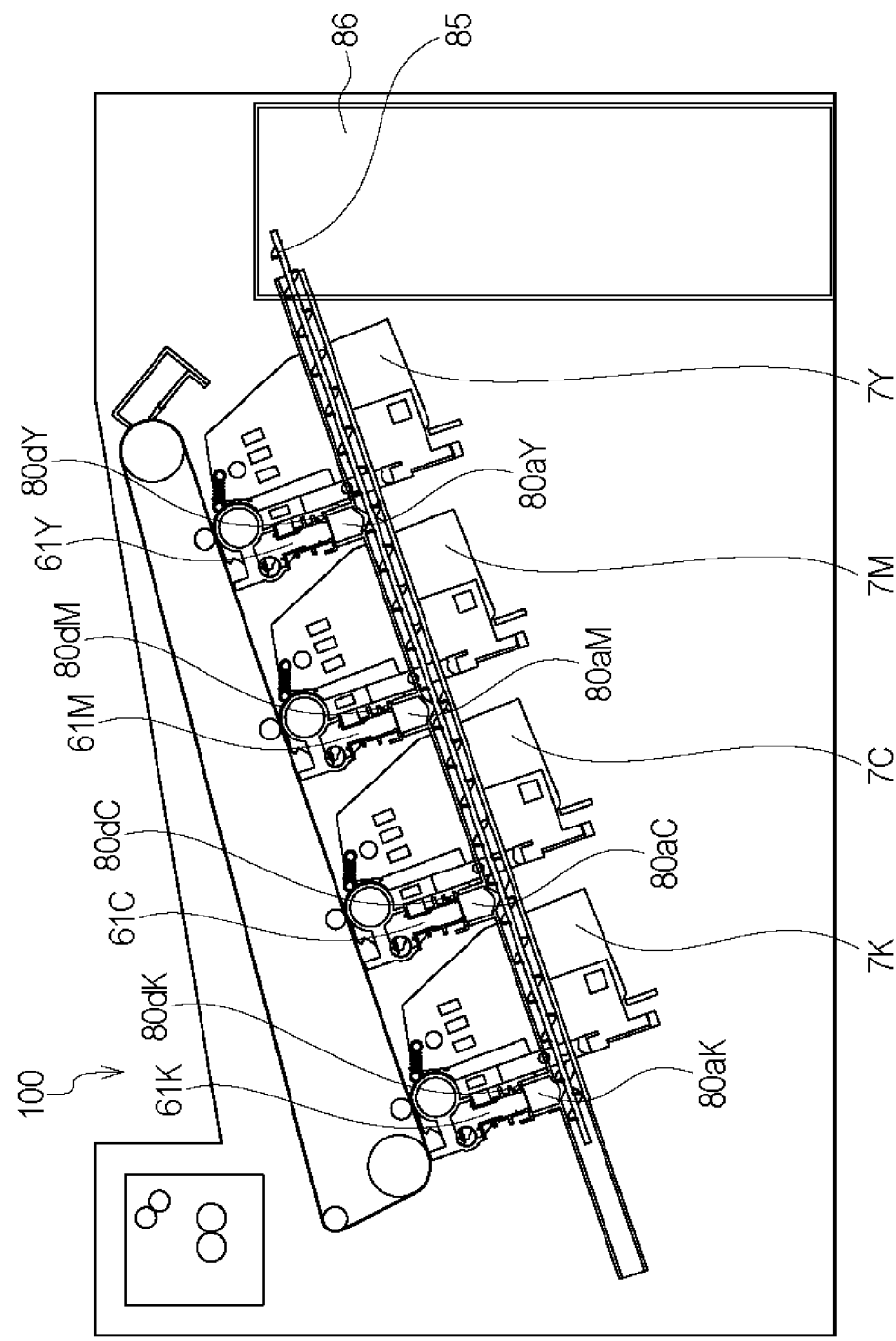
FIG. 5 is a schematic sectional view illustrating a feeding passageway of the removed toner in the embodiment.

Referring to FIGS. 2, 3, 4, and 5, a general arrangement of the electrophotographic image forming apparatus (image forming apparatus) according to an embodiment of the present invention will be described. FIG. 2 is a schematic sectional view of an image forming apparatus 100, and FIG. 3 is a main sectional view of the process cartridge, according to an embodiment of the present invention. FIG. 4 is a schematic sectional view illustrating a structure for residual toner discharging from a process cartridge 7. FIG. 5 is a substantial rear view illustrating a feeding passageway of the residual toner in the main assembly 100.

As shown in FIG. 2, the image forming apparatus 100 comprises a plurality of image forming stations. More particularly, it comprises first, second, third and fourth image forming stations SY, SM, SC, SK for forming yellow, magenta, cyan and the black images, respectively. In this embodiment, the first-fourth image forming stations SY, SM, SC, SK are arranged along a line crossing with the vertical direction.

In this embodiment, the structures and operations of the first-fourth image forming stations are substantially the same except that the colors of the formed images are different. Therefore, in the following, Y, M, C, K of the reference characters are omitted, and the descriptions are common, unless otherwise stated.

In this embodiment, the image forming apparatus 100 includes four photosensitive drums 1 (1Y, 1M, 1C, 1K). The photosensitive drum 1 rotates in the direction indicated by an arrow A as shown in FIG. 3. Around the photosensitive drum 1, a charging roller 2, and a scanner unit (exposure device) 3 are provided.

The charging roller 2 is charging means for uniformly charging the surface of the photosensitive drum 1. A scanner unit 3 is exposure means for illuminating the surface of the photosensitive drum 1 with a laser beam in accordance with image information to form an electrostatic image (electrostatic latent image) on the photosensitive drum 1. Around the photosensitive drum 1, there are provided a developing device (developing unit) 4 (4Y, 4M, 4C, 4K) and a cleaning blade 6 (6Y, 6M, 6C, 6K) as cleaning means (cleaning member).

Opposed to four photosensitive drums 1, there is provided an intermediary transfer belt 5 as an intermediary transfer member for transferring toner images from the photosensitive drum 1 onto the recording material 12.

In this embodiment, the developing unit 4 uses a non-magnetic one component developer, that is, toner T as a developer. In this embodiment, the developing unit 4 effects contact development in which a developing roller 17 as a developer carrying member is contacted with the photosensitive drum 1.

In this embodiment, a cleaning unit 13 comprises the photosensitive drum 1, the charging roller 2 and the cleaning blade 6 as the cleaning member. It also comprises a residual toner accommodating portion 14a (14aY, 14aM, 14aC, 14aK) as an accommodating portion for accommodating untransferred toner (residual toner) that remained on the photosensitive drum 1 and is removed by the cleaning blade 6.

Further, in this embodiment, the developing unit 4 and the cleaning unit 13 are unified into a cartridge to provide a process cartridge 7. The process cartridge 7 is detachably mountable to the image forming apparatus 100, using a mounting guide (unshown) provided in the main assembly of the image forming apparatus and mounting means (guide, guiding mechanism) such as a positioning member.

In this embodiment, the process cartridges 7 for the respective colors all have the same configurations. The process cartridges 7 contain yellow, magenta, cyan and black toner T (TY, TM, TC, TK), respectively.

The intermediary transfer belt 5 contacts all of the photosensitive drums 1 and rotates in the direction indicated by an arrow B as shown in FIG. 3. The intermediary transfer belt 5 is extended around a plurality of supporting members (driving roller 87, secondary transfer opposing roller 88, follower roller 89).

Inside the intermediary transfer belt 5, there are provided four primary transfer rollers 8 (8Y, 8M, 8C, 8K) as primary transferring means opposed to the respective photosensitive drums 1. At a position opposing the secondary transfer opposing roller 88 outside the intermediary transfer belt 5, a secondary transfer roller 9 as secondary transferring means is provided.

In the image forming operation, the surface of the photosensitive drum 1 is first uniformly charged by the charging roller 2. Then, the laser beam emitted by the scanner unit 3 in accordance with the image information is scanned on the surface of the charged photosensitive drum 1. By this, an electrostatic latent image is formed on the photosensitive drum 1 in accordance with the image information. Then, the electrostatic latent image formed on the photosensitive drum 1 is developed into the toner image by the developing unit 4. That is, the photosensitive drum 1 is a rotatable member (image bearing member) for carrying an image (toner image) formed with the toner on the photosensitive drum 1.

The toner image is transferred from the photosensitive drum 1 onto the intermediary transfer belt 5 (primary-transfer) by the function of the primary transfer roller 8.

For example, in the case of a full-color image, the above-described process is carried out by the first to fourth image forming stations SY, SM, SC, SK, sequentially. The toner images superimposed by the respective image forming stations are primary-transferred sequentially onto the intermediary transfer belt 5. Thereafter, the recording material 12 it is fed to the secondary transfer portion in sync with movement of the intermediary transfer belt 5. By the function of the secondary transfer roller 9 opposed to the intermediary transfer belt 5 with the recording material 12 therebetween, the four chromatic toner image is secondary-transferred from the intermediary transfer belt 5 onto the recording material 12.

The recording material 12 having the transferred toner image is fed into a fixing device 10 as the fixing means. In the fixing device 10, the recording material 12 is subjected to the heat and the pressure, by which the toner image is fixed on the recording material 12. The primary-untransferred toner remaining on the photosensitive drum 1 after the primary transfer step is removed by the cleaning blade 6 as the cleaning member, and is collected.

The portion of the image forming apparatus except for the unit (such as the cartridge) which is detachably mountable to the main assembly, is called a main assembly of the image forming apparatus (main assembly herein to refer to the parts except for the unit (cartridge).

(Residual Toner Transportation During Printing)

In the following, a description will be made as to the feeding of the collected residual toner. The residual toner collected from the image bearing member (photosensitive drum 1) by the cleaning blade is accommodated in the residual toner accommodating portion 14a (14aY, 14aM, 14aC, 14aK) as the accommodating portion. The residual toner accommodating portion 14a functions as an accommodating portion for temporarily accommodating the residual toner in the cartridge side.

In a first feeding passageway 51 (51Y, 51M, 51C, 51K) of the residual toner accommodating portion 14a, there is provided a feeding screw 26 (FIG. 3) as a feeding member (cartridge side feeding member). By this, the residual toner collected in the residual toner accommodating portion 14a is fed toward a one longitudinal end portion of the process cartridge 7 by the feeding screw 26 as the cartridge side feeding member. A longitudinal direction of the process cartridge 7 is substantially parallel with rotational axes of the photosensitive drum 1 and the feeding screw 26. Therefore, the longitudinal direction of the process cartridge, a rotational axis direction of the photosensitive drum 1 and the rotational axis direction of the feeding screw 26 are the same, unless otherwise stated particularly. The rotational axis direction (axial direction) is a direction of the rotational axis of the rotatable member (e.g., photosensitive drum) and a line parallel with the rotatable member.

The residual toner thus fed is further fed to a residual toner receiving opening (toner receiving port) 80d of the main assembly through a second feeding passageway 61 (FIG. 4). The second feeding passageway 61 is a discharging passageway for moving the toner toward the discharge opening (residual toner discharging portion) 32d. The toner discharged from the discharge opening 32d enters the residual toner receiving opening 80d.

The second feeding passageway 61 is disposed at one end portion side of the cartridge with respect to the rotational axis direction of the photosensitive drum 1. The second feeding passageway 61 moves the toner in a direction crossing with (substantially perpendicular to) the axial direction in this embodiment.

The second feeding passageway 61 is provided with a first coupling member 29, a coupling spring 31, a second coupling member 30 and a residual toner connecting member 32. Here, the residual toner connecting member 32 is supported so as to be movable relative to the process cartridge 7 along the center line 61a. The residual toner connecting member 32 constitutes a terminal end of the second feeding passageway 61 and is provided with a discharge opening 32d for discharging the toner to an outside of the cartridge. As will be described in detail hereinafter, the residual toner fluid-communication member 32 is a connecting portion movable to connect the discharge opening 32 to a toner receiving opening 80d provided in the main assembly of the image forming apparatus.

The second coupling member 30 is a coupling member for transmitting a driving force (rotational force) from inside of the cartridge to outside thereof.

As will be described in detail hereinafter, the residual toner connecting member 32 moves in accordance with the mounting operation of the process cartridge 7 to the image forming apparatus. At least during the image forming operation, the residual toner connecting member 32 is connected to the main assembly residual toner receiving opening 80d. In the state that the process cartridge 7 is mounted to the image forming apparatus, the center line 61a is substantially parallel with the direction of gravity.

The residual toner is fed into the second feeding passageway 80b from the residual toner receiving opening 80d by way of a spring coupling 44 and a feeding fin 45. As will be described in detail hereinafter, the spring coupling 44 and the feeding fin 45 are feeding members provided in the main assembly side of the apparatus (main assembly side feeding member) and function to feed the toner into a residual toner box 86.

The toner fed by the spring coupling 44 and the feeding fin is then discharged into and collected in the residual toner box 86 (FIG. 5) as an image formation main assembly side of the apparatus toner accommodating portion by main assembly feeding screw 85 provided in the second feeding portion 80b. By the feeding fin 45 (and spring coupling 44) as a first main assembly side feeding member, the residual toner is fed toward a main assembly side feeding screw 85 as a second main assembly side feeding member. The main assembly side feeding screw 85 is rotatable by receiving a driving force from the motor as a driving source provided in the main assembly. In addition, the feeding fin 45 is engaged with a rotatable portion on the cartridge for transmitting the driving force to rotate for feeding the residual toner.

The feeding portion for the residual toner will be described in detail hereinafter.

Secondary-untransferred toner remaining on the intermediary transfer belt 5 after the secondary transfer step is removed by an intermediary transfer belt cleaning device 11 (FIG. 2). The image forming apparatus 100 is capable of forming a monochromatic or multi-color image using only one or more (not all) image forming stations as desired.

2. [Process Cartridge]

Figure 6:
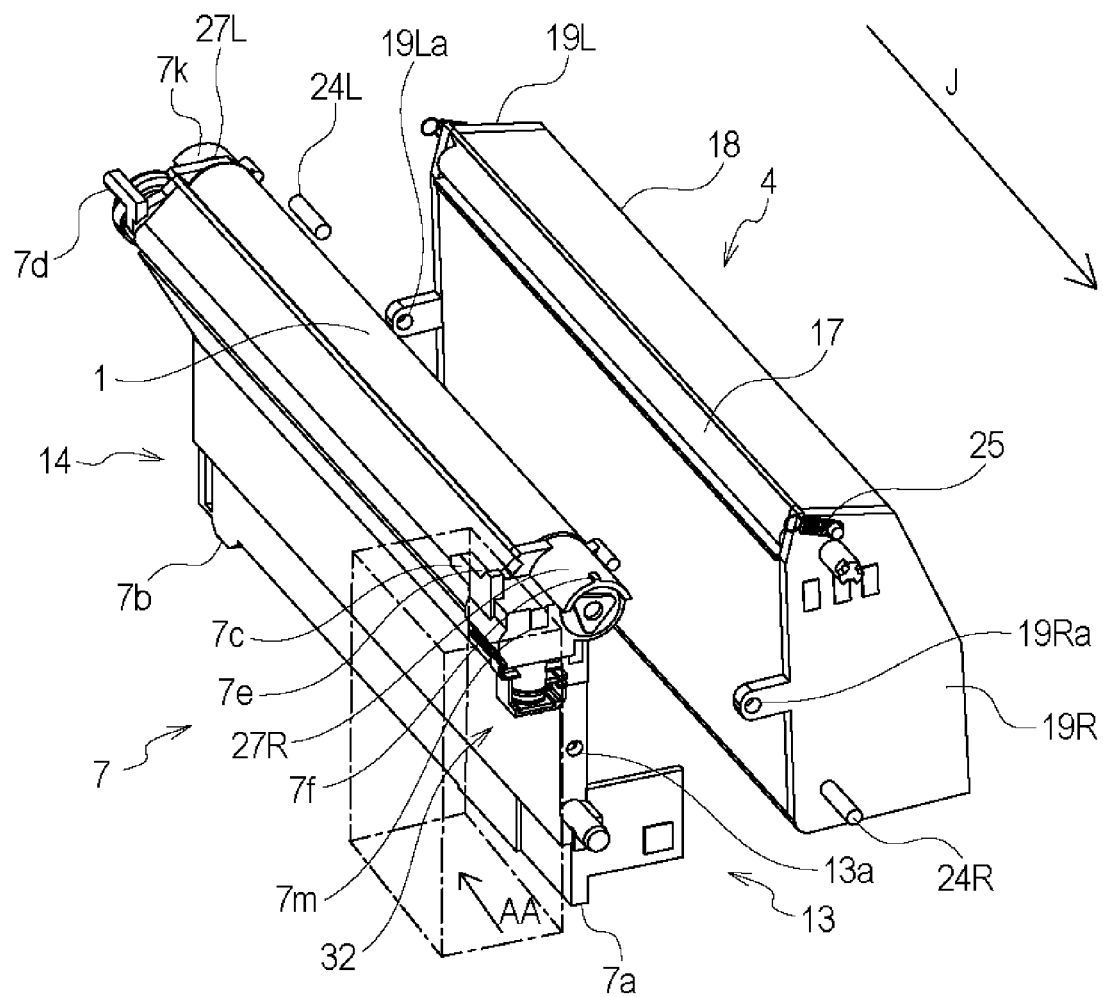
FIG. 6 is a perspective view of the process cartridge according to the embodiment.

Referring to FIGS. 3 and 6, a general arrangement of the process cartridge 7 according to this embodiment (which is mountable to the image forming apparatus 100 will be described. FIG. 6 is an exploded perspective view illustrating the developing unit 4 and the cleaning unit 13. The process cartridge 7 is constituted by the developing device 4 and the cleaning unit 13 as a unit. As shown in FIG. 6, the developing unit 4 is provided with holes 19Ra, 19La formed in bearing members 19R, 19L. The cleaning unit 13 is provided with a hole 13a (13aR, 13aL, FIG. 6) provided in the frame of the cleaning unit 13. The developing unit 4 and the cleaning unit 13 are connected with each other so as to be rotatable relative to each other about an axis 24 (24R, 24L) engaging with the holes 19Ra, 19La and the holes 13aR, 13aL. The developing unit 4 is urged by an urging spring 25. Therefore, during the image forming operation, the developing unit 4 rotates in the direction indicated by an arrow F shown in FIG. 3 about the shaft 24, so that the developing roller 17 is in contact with the photosensitive drum 1. The developing roller 17 is a rotatable member (developer carrying member, developing member) carrying the toner (developer). The developing roller 17 develops the latent image on the photosensitive drum 1 by supplying the toner onto the photosensitive drum 1.

(Developing Unit)

Referring to FIGS. 3 and 6, the developing unit 4 of the process cartridge 7 in this embodiment will be described.

As shown in FIGS. 3 and 6, the developing unit 4 includes a developing device frame 18 supporting various elements provided in the developing unit 4. The developing unit 4 includes a developing roller 17 as the developer carrying member rotatable in a direction indicated by arrow D (counterclockwise direction) in contact with the photosensitive drum 1. The developing roller 17 is supported rotatably by the developing device frame 18 through the developing device bearings 19 (19R, 19L) at the opposite ends with respect to the longitudinal direction (rotational axis direction) of the developing roller 17. The developing device bearings 19 (19R, 19L) are mounted at the sides of the developing device frame 18.

As shown in FIG. 3, the developing unit 4 includes the developer accommodating chamber (toner accommodating chamber) 18a and a developing chamber 18b in which the developing roller 17 is provided.

In the developing chamber 18b, there are provided a toner supplying roller 20 as a developer feeding member rotatable in a direction indicated by an arrow E in contact with the developing roller 17, and a developing blade 21 as the developer regulating member for regulating a toner layer on the developing roller 17. The toner supplying roller 20 functions to supply the toner onto the developing roller 17. The toner supplying roller 20 is a rotatable member carrying the toner, and therefore, is a toner supplying member.

The developing blade 21 is mounted on the supporting member 22 for integration therewith, by welding, for example. In a toner accommodating chamber 18a of the developing device frame 18, there is provided a stirring member 23 for stirring the contained toner and for feeding the toner to the toner supplying roller 20.

(Cleaning Unit)

Referring to FIGS. 3 and 6, the cleaning unit 13 of the process cartridge 7 will be described.

The cleaning unit 13 comprises a cleaning frame 14 as a frame for supporting various elements in the cleaning unit 13. The cleaning frame 14 includes the photosensitive drum 1 that is supported by bearing members 27 (27R and 27L, FIG. 6) so as to be rotatable in a direction indicated by an arrow A as shown in FIG. 3. As shown in FIG. 3, the cleaning blade 6 integrally includes an elastic member 6a for removing the untransferred toner (residual toner) remaining on the surface of the photosensitive drum 1 after the primary-image transfer, and a supporting member 6b for supporting the elastic member. The cleaning blade 6 is fixed to the cleaning frame 14 by screws or the like at the longitudinal opposite ends.

The residual toner removed from the surface of the photosensitive drum 1 by the cleaning blade 6 falls due to the gravity through a space defined by the cleaning blade 6 and the cleaning frame 14 into the residual toner accommodating portion 14a where the residual toner is temporarily stored. The cleaning frame 14 is provided with charging roller bearings 15 along the rotation axis of the charging roller 2 and the rotation axis of the photosensitive drum 1.

Here, the charging roller bearing 15 is movable in a direction indicated by an arrow C as shown in FIG. 3. A rotation shaft 2a of the charging roller 2 is rotatably supported by the charging roller bearings 15. The charging roller bearings 15 are urged toward the photosensitive drum 1 by the charging roller urging spring 16 as urging means.

3. [Residual Toner Transportation Portion]

The feeding portion for feeding the residual toner will be described in detail. With the structure in which the residual toner transportation device for feeding the residual toner is disposed in a rear side of the image forming apparatus, it is preferable that the toner discharge opening of the cartridge is inserted to the rear side of the main assembly side rear side plate. To accomplish such a structure, a part of the cartridge is required to be provided with a projection for insertion to the rear side of the rear side plate. In other words, with the above-described structure, it is difficult to reduce the width of the cartridge measured in the longitudinal direction thereof.

For this reason, in this embodiment, the residual toner transportation device is provided in a space for mounting the process cartridge 7. By this, expansion of the width measured in the longitudinal direction of the process cartridge can be suppressed.

(General of Residual Toner Transportation Portion)

Referring to FIGS. 4 and 6, the position of a residual toner discharging portion 40 of the cleaning unit 13 will be described. As shown in FIG. 6, the residual toner discharging portion 40 is disposed inside (area AA) of the mounting abutment position 7m with respect to the photosensitive drum axial direction. By doing so, the residual toner is discharged in the process cartridge 7 side of the rear side plate 98 of the main assembly 100. In other words, in the space in the image forming apparatus provided for mounting the process cartridge, the residual toner is transferred to the main assembly side from the process cartridge 7 in the neighborhood of the rear side plate.

Referring to FIGS. 3 and 4, the structure of the residual toner discharging portion 40 will be described.

The photosensitive drum 1 is rotated by the driving force received from the main assembly 100 in the direction of the arrow A. The rotation of the photosensitive drum 1 is transmitted to the residual toner feeding screw 26 as a cartridge side feeding member by the way of a gear train which will be described hereinafter. The residual toner feeding screw 26 is provided in the residual toner accommodating portion 14a of the cleaning frame 14 and is rotatable in the direction indicated by an arrow G. The feeding screw 26 feeds the residual toner in the first feeding passageway 51 extending in the axial direction of the drum 1 toward one longitudinal end of the process cartridge 7 (arrow H direction in FIG. 4).

The fed residual toner is discharged from the residual toner discharging portion (discharge opening) 32d which is an opening provided in the residual toner connecting member 32 to the residual toner receiving opening 80d (unshown) of main assembly 100 through the second feeding passageway 61 extending in the direction substantially perpendicular to the first feeding passageway 51. The residual toner feeding screw 26 has a screw configuration in this embodiment, but it may have a coil spring configuration having feeding power, or a non-continuous blade configuration.

(Position and cross-sectional Area of Feeding Passageway)

Figure 7:
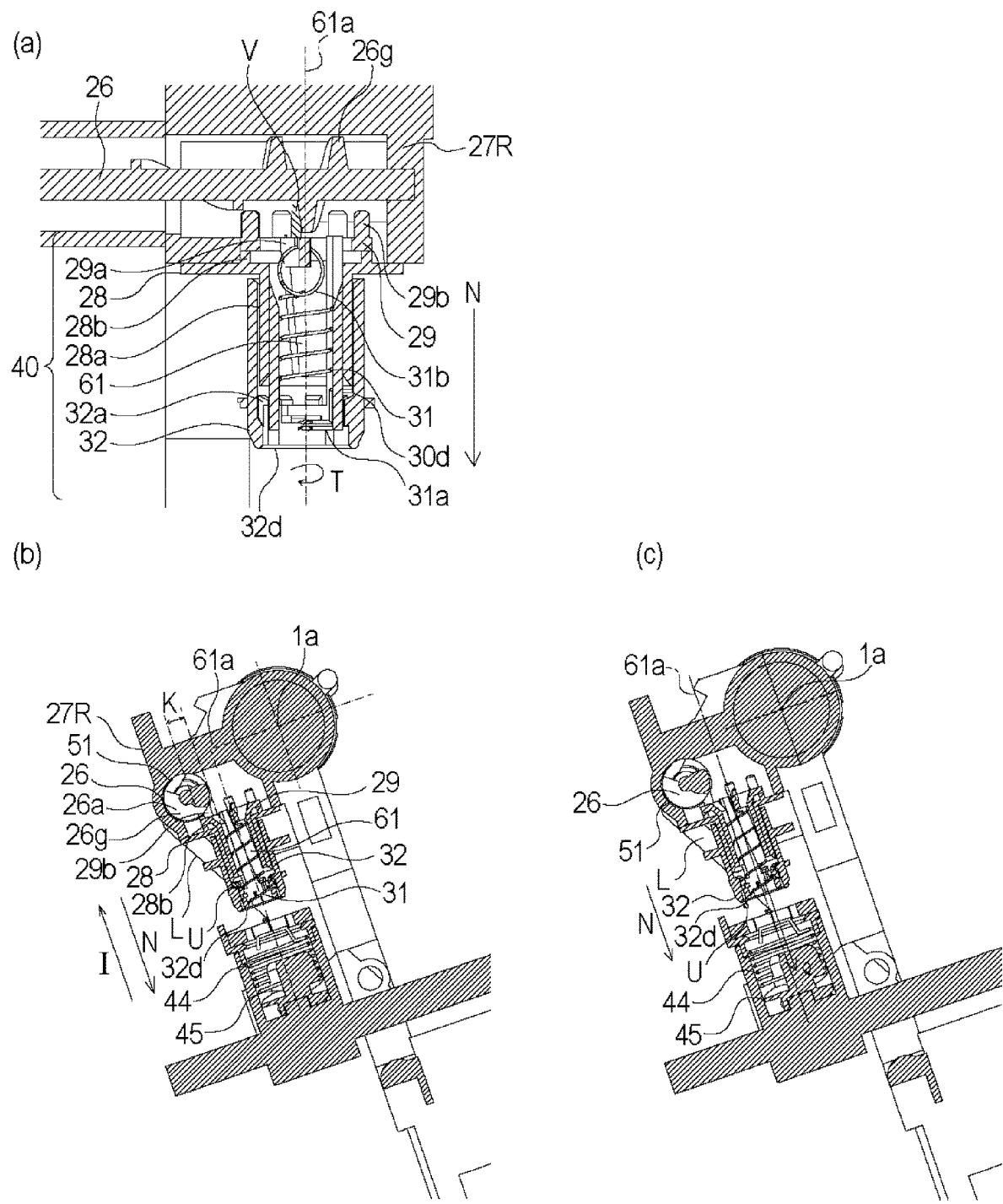
FIG. 7 is a sectional view illustrating a position, in a cross-sectional plane, of a feeding screw in the process cartridge of the embodiment.
Figure 8:
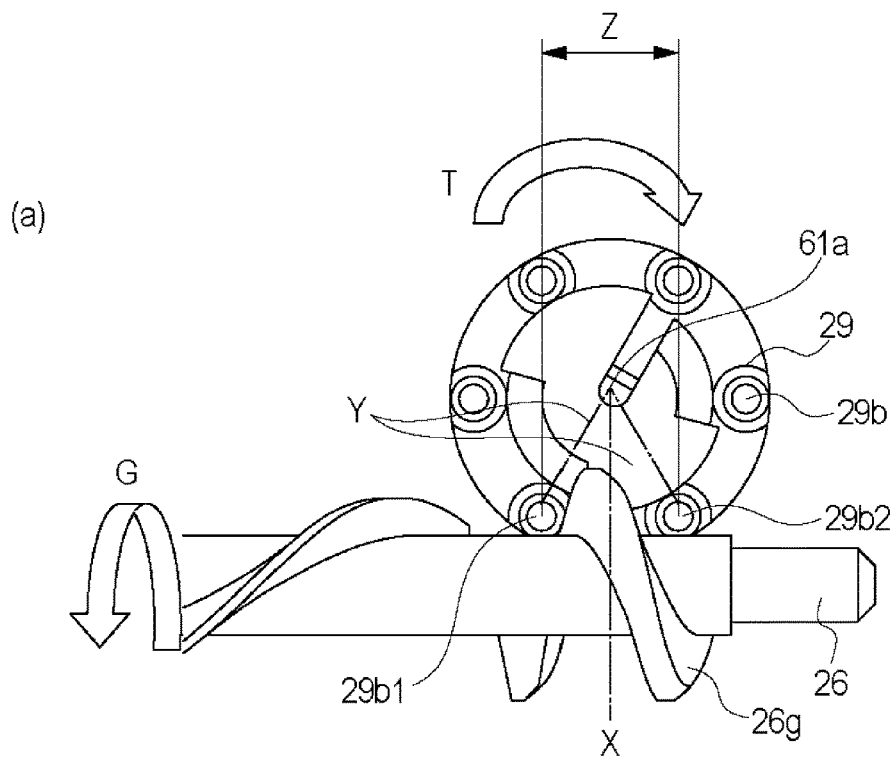
FIG. 8 is an illustration of engagement between the feeding screw of the process cartridge and a coupling in the embodiment.
Figure 8:
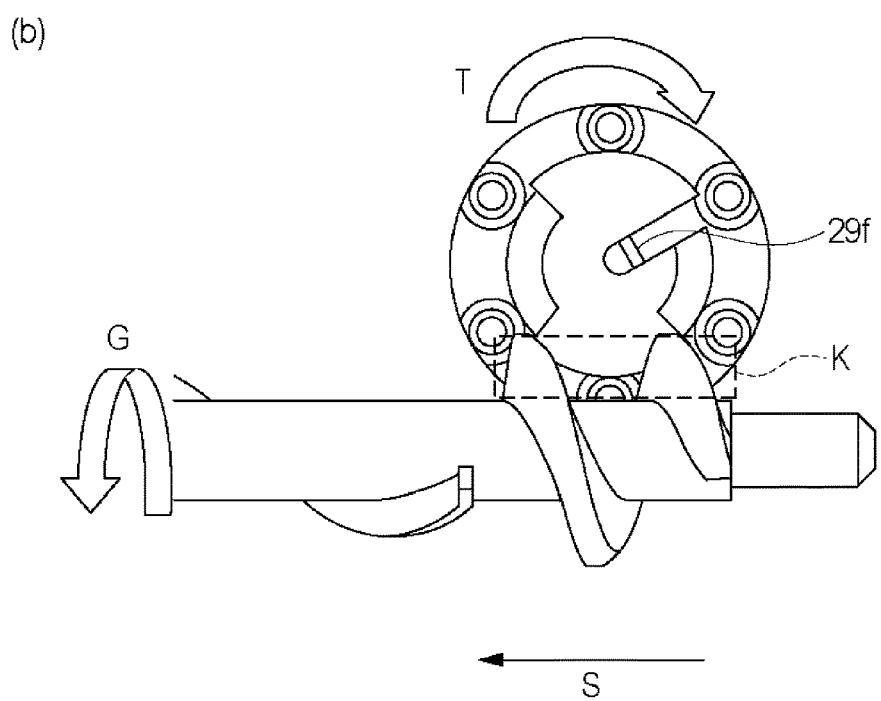

Referring to FIGS. 3, 4, 7, 8 and 12, the structure in the position of the residual toner transportation will be described. FIG. 7 illustrates a positional relation between the feeding screw 26 and the discharge opening 32d. FIG. 8 shows a view of the feeding screw 26 and the first coupling member 29 in the process cartridge 7, as seen in the direction of the center line 61a.

As shown in part (b) of FIG. 7, as seen in the direction of the rotational axis of the photosensitive drum 1, the second feeding passageway 61 is positioned such that the center line 61a of the second feeding passageway 61 passes between the center of the shaft of the residual toner feeding screw 26 and the axis center 1a of the photosensitive drum 1. That is, the rotation axis of the photosensitive drum 1 and the rotation axis of the first feeding member 26 are positioned in the opposite sides with respect to the center line 61a.

The center line 61a is substantially the same as the rotational axis of the second coupling member 30. That is, rotation axis 1a of the photosensitive drum 1 and rotation axis of the residual toner feeding screw 26 are in the opposite sides with respect to the rotational axis (axis) of the second coupling member 30.

By satisfying such a positional relationship, the photosensitive drum 1, the residual toner feeding screw 26 and the second feeding passageway (discharging passageway) 61 can be accommodated in a small space. Thus, an amount of the projection from an outer configuration line L (FIG. 3) of the cleaning frame 14 can be reduced or eliminated. Therefore, as seen in the axial direction of the photosensitive drum 1, the cleaning unit or the process cartridge can be downsized.

As shown in part (b) of FIG. 8, as seen along the center line 61a of the second feeding passageway 61, the opening 61b of the second feeding passageway 61 is positioned so that it overlaps with an area which can be taken by a reverse screw portion 26e during rotation of the feeding screw 26, in a range K.

The opening 61b is a communicating portion between the first feeding passageway 51 and the second feeding passageway 61. The direction of the center line 61a is substantially perpendicular to the axis of the feeding screw 26. In other words, as the feeding screw 26 is seen in the perpendicular direction, the reverse screw 26e overlaps with the opening 61b.

By this, the feeding force of the feeding screw 26 can smoothly feed the residual toner from the first feeding passageway 51 to the second feeding passageway 61. As shown in part (a) of FIG. 7, in the longitudinal direction of the cartridge (left-right direction in part (a) of FIG. 7), the first feeding passageway 51 and the second feeding passageway 61 overlap with each other. By doing so, the width of the cleaning unit 13 measured in the longitudinal direction thereof can be reduced, while assuring the diameter of the feeding passageway required for the residual toner feeding. As a result, the process cartridge 7 can be downsized.

The reverse screw portion 26e can be deemed as a second feeding portion of the feeding screw 26. That is, the feeding screw 26 comprises a first feeding portion (feeding screw portion 26a) which is a major part for feeding the toner, and the second feeding portion (reverse screw portion 26e) for feeding the toner in the direction opposite from that of the first feeding portion (FIG. 4).

The feeding screw portion 26a of the feeding screw 26 functions to feed the toner toward the opening 61b. On the other hand, the second feeding portion (reverse screw portion 26e) is disposed downstream of the feeding screw portion 26a in the toner feeding direction of the feeding screw portion 26a. The reverse screw portion 26e as the second feeding portion is provided adjacent to the opening 61b, and a length of the reverse screw portion 26e is smaller than that of the first feeding portion.

As shown in FIGS. 4 and 7, the bearing member 27 is provided with the second feeding passageway 61, as the residual toner discharging portion 40, in fluid communication with the first feeding passageway 51 and extending in the direction perpendicular to the axis of the photosensitive drum 1. The second feeding passageway 61 is provided with the discharge opening 32d.

The first coupling member 29 is disposed in the second feeding passageway 61. The first coupling member 29 is supported by the supporting portion 28b of a coupling receptor 28 so as to be rotatable about the center line 61a. As shown in FIG. 8, the first coupling member 29 is provided with a plurality of drive pins 29b which are sequentially engaged with the drive transmission blade 26g provided on the feeding screw 26. Therefore, the driving force is transmitted from the feeding screw 26 to the first coupling member 29. In this manner, the driving rotation for the photosensitive drum 1 is converted into the rotation about an axis perpendicular to the axis of the photosensitive drum 1 (center line 61a of the second feeding passageway 61) and is transmitted to the first coupling member 29. The drive transmission blade 26g is a blade (helical portion) constituting the above-described reverse screw portion 26e, and the first coupling member 29 receives the driving force (rotational force) from the reverse screw portion 26e.

(Detailed Structure in the Neighborhood of the Residual Toner Discharge Opening)

Figure 9:
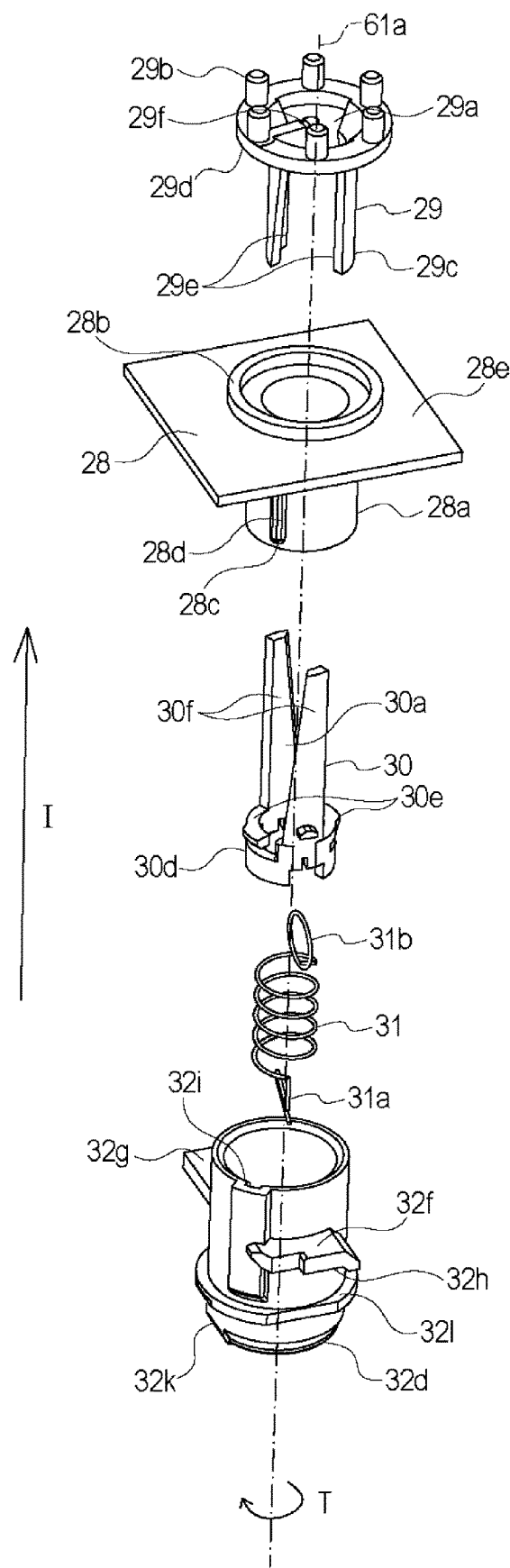
FIG. 9 is an illustration of the residual toner discharging portion of the process cartridge in the embodiment.
Figure 10:
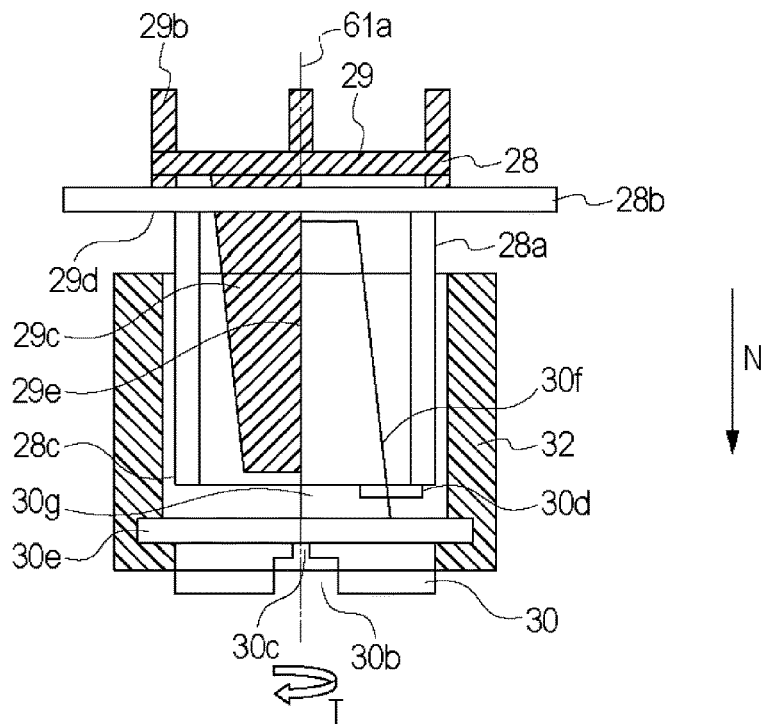
FIG. 10 is a sectional view of the residual toner discharging portion of the process cartridge in the embodiment.
Figure 10:
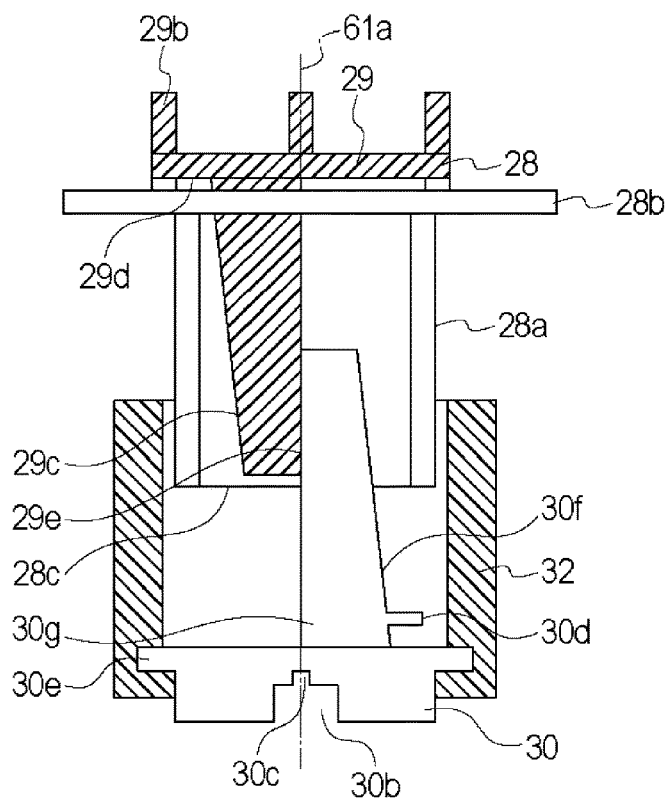

Referring to FIGS. 9 and 10, the structure of the residual toner transportation portion 40 from the first coupling member 29 of the process cartridge 7 to the discharge opening 32d will be described.

FIG. 9 is an exploded view illustrating the structure of the residual toner discharging portion. FIG. 10 is a sectional view illustrating mounting of the first coupling member 29 and the second coupling member 30 to the coupling receptor 28. The residual toner that is the untransferred toner removed from the photosensitive drum 1 is fed to the main assembly receiving opening 80d by way of the first coupling member 29, the coupling spring 31, the second coupling member 30 and the residual toner connecting member 32. As will be described hereinafter, the residual toner connecting member 32 can be engaged with and disengaged from the main assembly receiving opening 80d.

As shown in FIG. 9, the first coupling member 29, the second coupling member 30, the coupling spring 31, the coupling receptor 28, and the residual toner connecting member 32 are arranged substantially on a common axis along the center line 61a. The first coupling member 29 and the second coupling member 30 are connected with each other by the coupling spring 31. The residual toner connecting member 32 is mounted so as to be movable in a direction of an arrow N (FIG. 10) relative to the coupling receptor 28 together with the second coupling member 30 against an urging force of the coupling spring 31. For the connection of the process cartridge 7 with the main assembly 100, the residual toner connecting member 32 is movable in the direction indicated by the arrow N in FIG. 10.

Referring to FIGS. 7, 9, 10, and 11, the mounting of the residual toner transportation portion 40 will be described.

Figure 11:
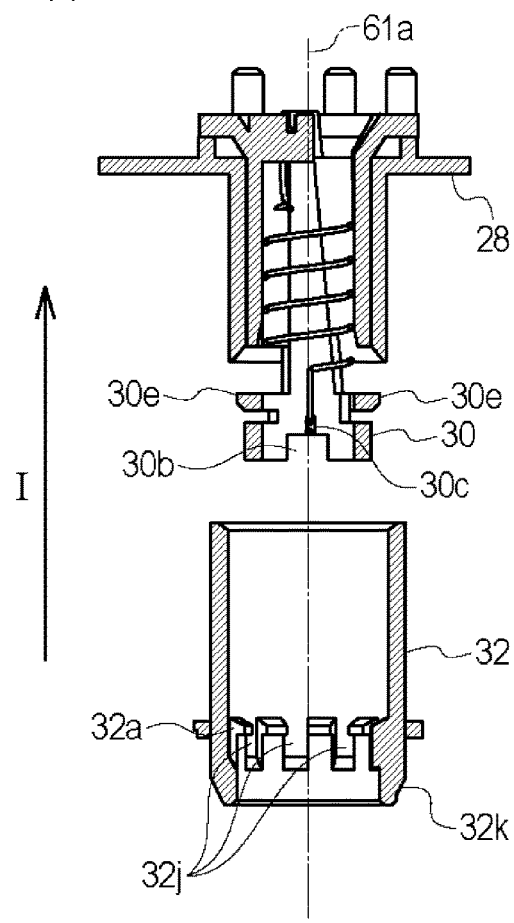
FIG. 11 illustrates assembling of a residual toner connecting member in the embodiment.
Figure 11:
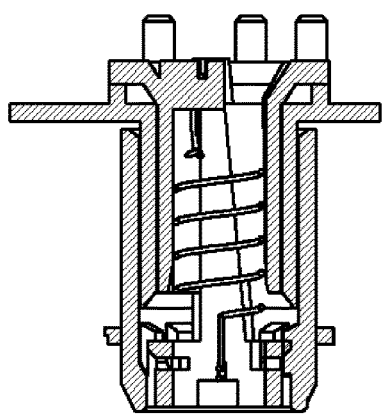

FIG. 11 shows the assembled residual toner connecting member. As shown in FIG. 7, the second feeding passageway 61 is a toner feeding passageway formed in the residual toner discharging portion 40. As shown in FIG. 9, the residual toner discharging portion 40 comprises the coupling receptor 28, the first coupling member 29, the second coupling member 30, the coupling spring 31 and the residual toner connecting member 32.

As shown in FIG. 9, the first coupling member 29 is provided with a plurality of drive pins (engaging portions projections) 29b in the form of projections engageable with the feeding screw 26 for rotation. The drive pins 29b are arranged substantially equidistant about the rotational axis of the first coupling member 29 substantially on a concentric circle. The drive pins 29b project in the axial direction of the first coupling member 29. The first coupling member 29 is provided with two drive claws 29c in the form of projections for transmitting the driving force to the second coupling member 30.

That is, the first coupling member 29 is a drive transmitting portion for transmitting the driving force (rotational force) of the feeding screw 26 to the second coupling member 30. The rotational axis of the first coupling member 29 crosses with the rotational axis of the feeding screw 26 (substantially perpendicular to each other). Thus, when the rotational force is transmitted, the first coupling member 29 changes the direction of rotation. The first coupling member 29 is provided in the toner feeding passageway.

The driving claw 29c of the first coupling member 29 is fitted into the inside circumference of the cylindrical portion 28a of the coupling receptor 28 so that the first coupling member 29 is rotatably supported. The driving claw 29c has a partly cut-away cylindrical configuration. The second coupling member 30 is provided with a driving claw 30f at each of two positions to receive the rotation drive from the driving claw 29c of the first coupling member 29. The second coupling member 30 is provided with a groove portion 30b and a spring hook groove portion 30c opposite to the driving claw 30f.

The driving claw 30f also has a partly cut-away cylindrical configuration. The driving claw 30f has an outer diameter that is substantially the same as the driving claw 29c. As shown in FIG. 10, the second coupling member 30 is inserted into the cylindrical portion 28a of the coupling receptor 28 so that the driving claw 30f is opposed to the driving claw 29c of the first coupling member 29.

The driving claws 29c, 30f can be said to be projections by the part cutting away of the cylindrical configuration, or bent plates having drive transmission surfaces. In this embodiment, the outer configuration thereof is trapezoidal such that one side is inclined, and the opposite side is parallel with the rotational axis. These configurations are not limited to the example, but it will suffice if phase deviation is permitted while transmitting the driving force.

On the other hand, the coupling spring 31 at the urging member is a twisted coil spring having a bent free-end 31a and a ring configuration 31b in the opposite direction. The coupling spring 31 is inserted into the second coupling member 30 in a direction of an arrow I so that the end portion 31a is fitted in the spring hook groove 30c.

The circular portion 31b of the coupling spring 31 is engaged with a groove portion 29f of the first coupling member 29. Here, the coupling spring 31 is expanded from the free length. In other words, the coupling spring 31 applies the urging force in the contracting direction. By this, the first coupling member 29 and the second coupling member 30 are urged toward each other. By the urging force, a supporting portion 29d of the first coupling member 29 abuts to the supporting portion 28b of the coupling receiving portion 28.

To the second coupling member 30, a supporting portion 28c provided at the free end portion of the cylindrical portion 28a of the coupling receptor 28 and a projection 30d provided on the driving claw 30f abut to each other. In this state of receiving the urging force of the coupling spring 31, the second coupling member 30 is positioned with respect to the rotational moving direction T of the center line 61a.

In the state of being urged by the coupling spring 31, the first coupling member 29 and the second coupling member 30 are rotatably supported on the inner surface of the cylindrical portion 28a of the coupling receptor 28 through the driving claws 29c and 30f. The first coupling member 29 and the second coupling member 30 are integrally rotatable by the engagement between the engaging portion 29e and the engaging portion 30g in the direction of the arrow T of the center line 61a.

(Mounting of Coupling Receptor)

The coupling receptor 28 is mounted to the bearing member 27R by welding or bonding or the like at the welded portion 28e in the state that the first coupling member 29, the second coupling member 30 and the coupling spring 31 are mounted thereto. By this, the leakage of the residual toner to the outside is reduced.

As shown in FIG. 11, the residual toner connecting member 32 is provided with a supporting portion 32a to be supported by the second coupling member 30 in the axial direction. As shown in FIG. 9, the coupling receptor 28 is provided with a rotation stopper rib 28d for positioning the residual toner connecting member 32 in the rotational direction. Furthermore, the residual toner connecting member 32 is provided with a recessed groove 32i for positioning in the rotational direction at a part of its circumference. Second coupling member 30 is provided with a compression claw 30e at diametrically opposite positions.

As shown in FIG. 11, the coupling receptor 28 is provided with the first coupling member 29, the second coupling member 30 and the coupling spring 31. The residual toner connecting member 32 is coaxially fitted around the coupling receptor 28 in the direction indicated by the arrow I. By moving the residual toner connecting member 32 in the direction of the arrow I, the rotation stopper rib 28d of the coupling receptor 28 is engaged with the groove 32i of the residual toner connecting member 32. In this manner, the relative position between the coupling receptor 28 and the residual toner connecting member 32 with respect to the rotational moving direction about an axis 61a is limited.

When the residual toner connecting member 32 is further telescoped around the coupling receptor 28, the supporting portion 32a enters by deforming radially inward of the compression claw 30e of the second coupling member 30 supported by the coupling receptor 28.

By further telescoping the residual toner connecting member 32, the supporting portion 32a rides over the compression claw 30e of the second coupling member 30, and the residual toner connecting member 32 is supported by the compression claw 30e of the second coupling member 30 by the supporting portion 32a in the vertical direction (part (b) of FIG. 11).

(Structure of Residual Toner Transportation Portion with Respect to the Longitudinal Direction)

Figure 12:
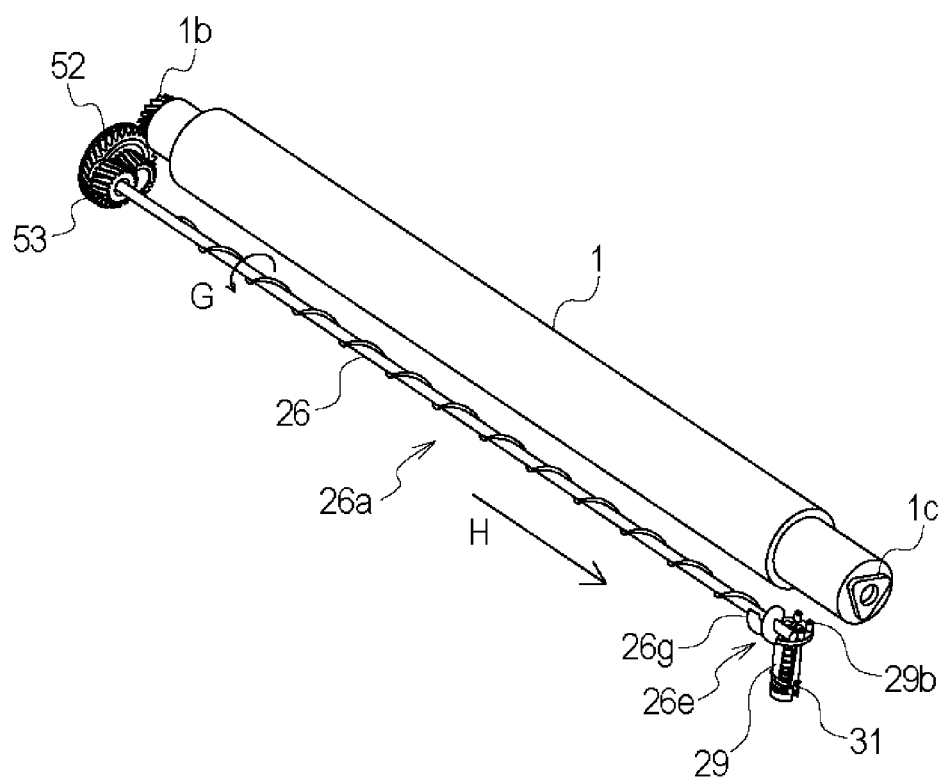
FIG. 12 illustrates parts constituting a driving connection structure of the residual toner discharging portion in the embodiment.
Figure 23:
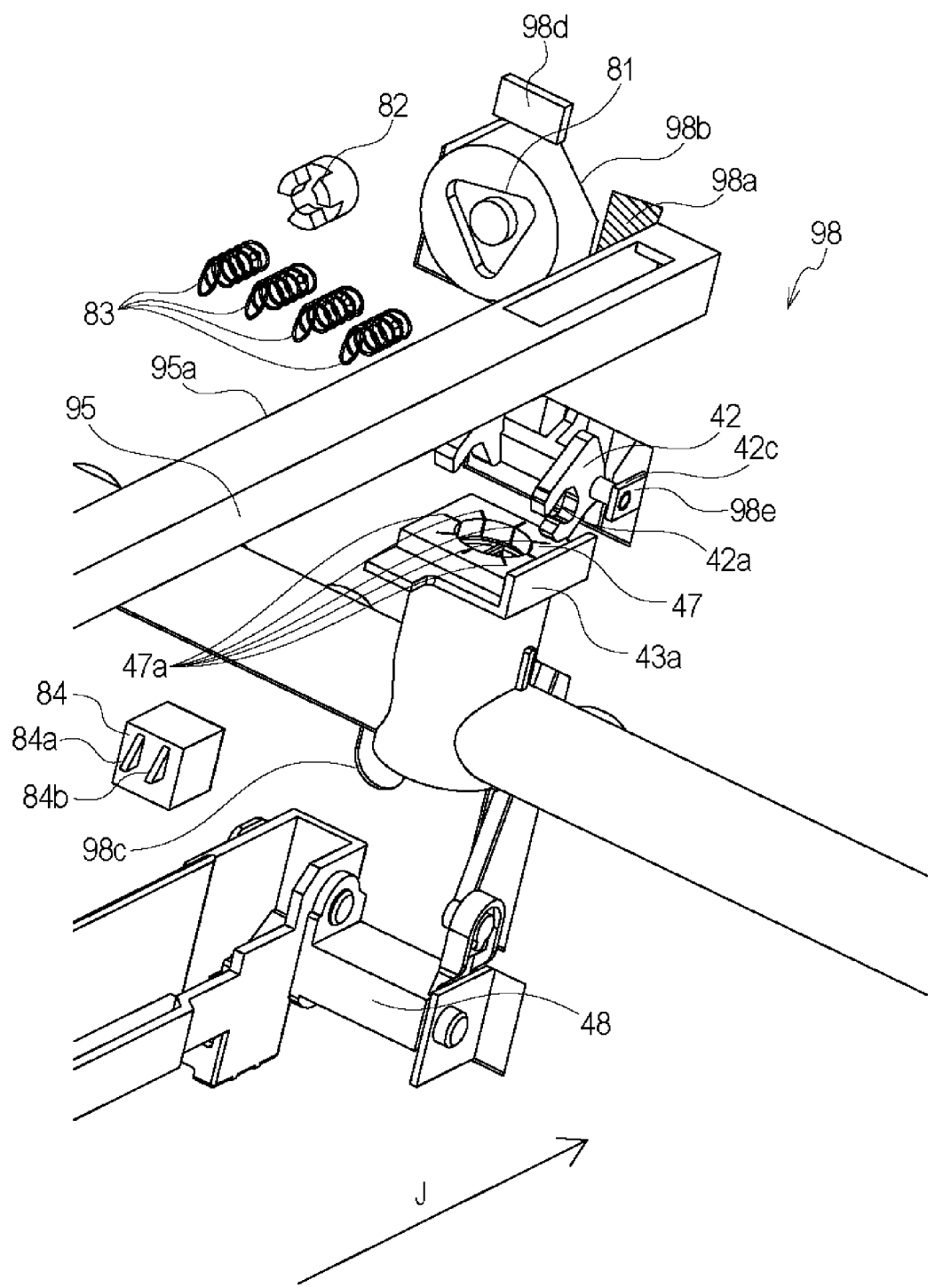
FIG. 23 is a perspective view illustrating a structure of the rear side of the main assembly with respect to the mounting direction of the process cartridge.

Referring to FIGS. 4, 12 and 23, the structure of the residual toner transportation portion 40 with respect to the longitudinal direction will be described. FIG. 12 is a schematic view illustrating the driving connection structure for the residual toner discharging portion 40.

As shown in FIG. 4, the feeding screw 26 is provided in the first feeding passageway 51. The supporting portions 26b, 26c provided at the opposite ends of the feeding screw 26 are rotatably engaged with holes 27La, 27Ra provided in bearing members 27L, 27R, respectively.

The photosensitive drum 1 is also rotatably supported by the bearing member 27. As shown in FIG. 12, one end portion of the photosensitive drum 1 is provided with a coupling portion 1c for receiving a driving force from the main assembly 100. The other end thereof is provided with a photosensitive drum gear 1b for transmitting the driving force to the residual toner feeding screw 26, as will be described hereinafter.

As shown in FIG. 12, the cleaning unit 13 is provided at one axial end of the photosensitive drum 1 with the photosensitive drum gear 1b, an idler gear 52 rotatably supported by the bearing member 27 and a feeding screw gear 53.

For driving force transmission feeding screw gear 53 is engaged with the feeding screw 26. The rotational force is transmitted from a main assembly drum input coupling 81 (FIG. 23) of the image forming apparatus 100 to the coupling portion 1c at one end of the cleaning unit 13. The transmitted rotational driving force is in turn transmitted from the photosensitive drum 1 to the feeding screw 26 by the sequential engagement of the photosensitive drum gear 1b, the idler gear 52 and the feeding screw gear 53. The residual toner accommodated in the residual toner accommodation chamber 14a is fed in the direction of the arrow H (axial direction of the feeding screw 26) by the feeding screw portion 26a by the rotation of the feeding screw 26 in the direction of the arrow G.

At the downstream side end portion of the feeding screw 26 with respect to the residual toner feeding direction, the reverse screw portion 26e is provided. The reverse screw portion 26e is provided with a drive transmission blade 26g in the form of a screw. In this embodiment, the feeding screw 26 receives the driving force by the rotation of the photosensitive drum 1. However, the feeding screw 26 may be driven in interrelation with the rotation of the developing roller 17.

Figure 29:
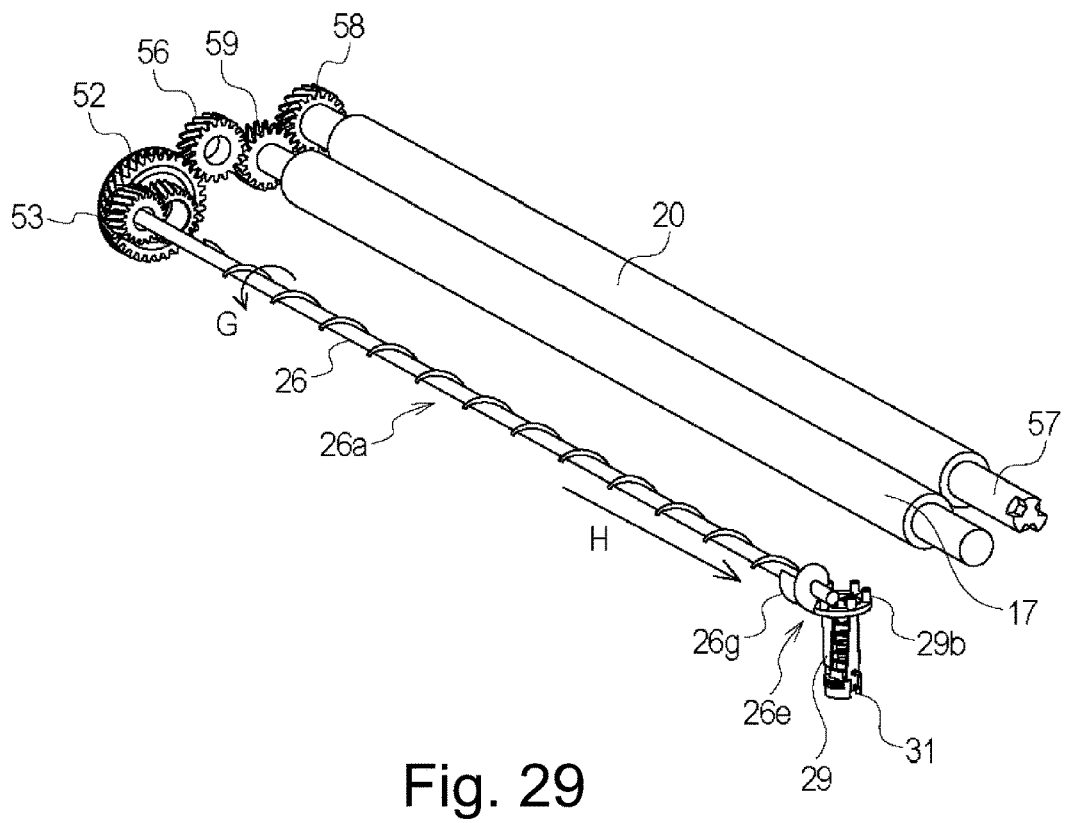
FIG. 29 is a part view illustrating a driving connection from a developing roller to a residual toner discharging portion in another structure in this embodiment.

FIG. 29 shows such a modified example. FIG. 29 illustrates an example of a structure with which the feeding screw 26 receives the driving force from the developing roller 17. With the structure shown in FIG. 29, one end of the toner supplying roller 20 is provided with a coupling portion 57 for receiving the driving force from the main assembly 100. The other end thereof is provided with a toner supplying roller gear 58 for transmitting the driving force to the residual toner feeding screw 26, as will be described hereinafter. As shown in FIG. 29, the developing device 4 includes the toner supplying roller gear 58 and a developing roller gear 59. A drum bearing 27 supports the idler gear 52 and the feeding screw gear 53.

For driving force transmission, the feeding screw gear 53 is engaged with the feeding screw 26. The rotational force is transmitted from a main assembly development input coupling 82 of the image forming apparatus 100 to the coupling portion 57 provided at the end of the developing device 4. The transmitted rotational force is transmitted from the toner supplying roller 20 to the feeding screw 26 through the developing roller 17 by the sequential engagement of the toner supplying roller gear 58, the developing roller gear 59, the idler gear 52, and the feeding screw gear 53. The residual toner accommodated in the residual toner accommodation chamber 14a is fed in the direction of the arrow H by the feeding screw portion 26a by the rotation of the feeding screw 26 in the direction of the arrow G.

In this manner, the second coupling member 30 is rotated in interrelation with the toner supplying roller 20 and the developing roller 17. The developing roller gear 59, the idler gear 52, the feeding screw gear 53, the feeding screw 26 and the first coupling 29 constitute the drive transmitting portion for transmitting the driving force from the toner supplying roller 20 to the second coupling member 30.

(Position of the Feeding Passageway in the Longitudinal Direction)

Figure 13:
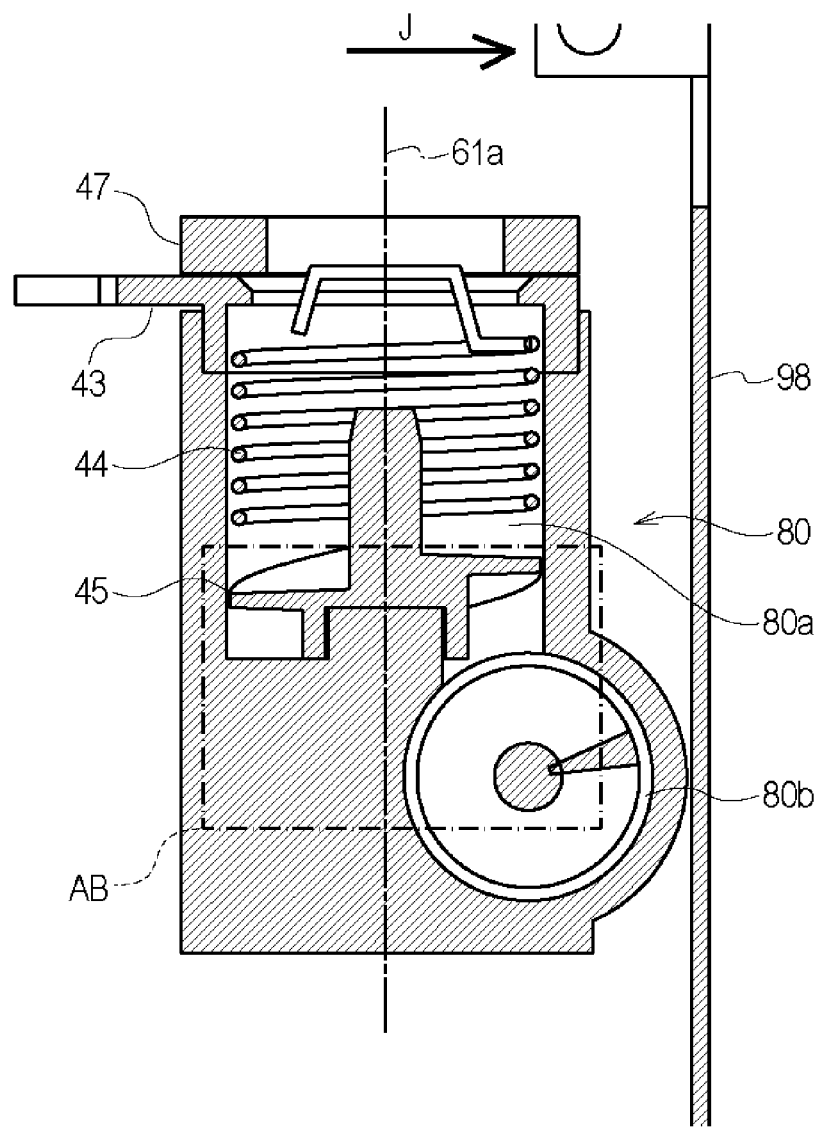
FIG. 13 illustrates an inserting direction of the process cartridge into the image forming apparatus in the embodiment.

FIG. 13 is a sectional view illustrating the position of the residual toner feeding in the main assembly 100.

As shown in FIG. 13, a main assembly feeding portion 80 is provided in the front side (with respect to the mounting direction of the process cartridge 7) of the rear side plate 98 that is provided with the mounting direction abutting portion, with respect to the mounting direction of the process cartridge 7.

Therefore, a cut-away portion is not required for the residual toner discharging portion or the like of the process cartridge 7, as compared with the case in which the main assembly feeding portion 80 is provided in the rear side of the rear side plate 98 with respect to the mounting direction (arrow J). Therefore, as compared with the case in which the cut-away portion is provided, strength of the rear side plate 98 is assured. Here, particularly noting only the structure for feeding the residual toner, it is desirable that the second feeding passageway 80b is disposed right below the first feeding passageway 80a. However, as shown in FIG. 5, the main assembly second feeding passageway 80b extends over the process cartridges 7Y, 7M, 7C and 7K. Therefore, in the case that the main assembly feeding passageway 2 is disposed right below the main assembly feeding passageway 1, the result is that it enters toward the process cartridge 7 in the front side with respect to the mounting direction.

Therefore, from the standpoint of the toner filling volume of the process cartridge 7, it is difficult to place the second feeding passageway 80b right below the first feeding passageway 80a, as shown in FIG. 13. In other words, if the second feeding passageway 80b is disposed right below the first feeding passageway 80a, it the toner filling capacity of the process cartridge 7 is decreased. In addition, in order to place the second main assembly feeding passageway 80b in the rear side with respect to the mounting direction, it is necessary to greatly cut away the rear side plate 98 thereby lowering the strength of the rear side plate 98. The rear side plate 98 functions to position the process cartridge 7, and therefore, a a strong rear side plate 98 is desirable.

As described hereinbefore, the main assembly second feeding passageway 80b is desirably placed at a position as close as possible to the rear side plate as shown in FIG. 13. For this reason, the center lines of the first main assembly feeding passageway 80a and the second main assembly feeding passageway 80b are offset in the longitudinal direction, as depicted by AB in FIG. 13.

4. [Expansion and Contraction Mechanism]

The description will be made as to an expansion and contraction mechanism and an expanding-and-contracting operation for expansion and contraction of the toner feeding passageway.

Figure 1:
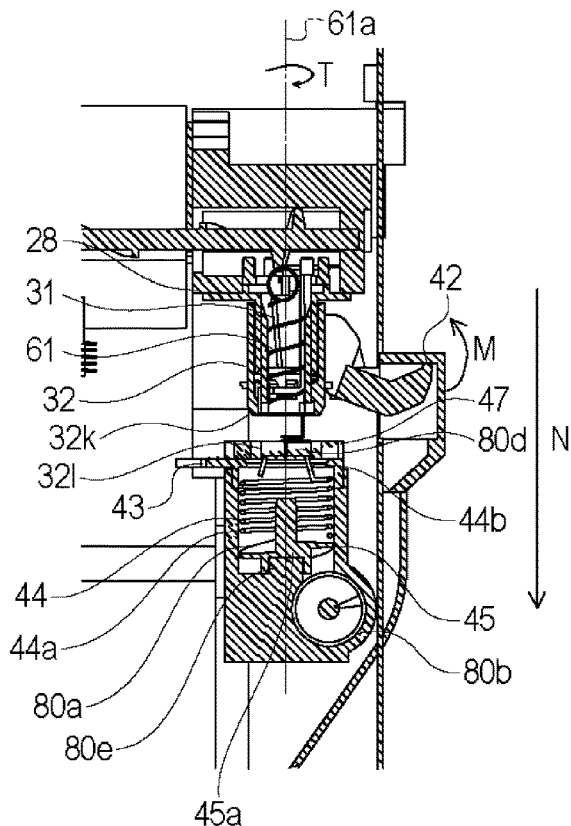
FIG. 1 is a partially sectional view illustrating engagement between a residual toner discharging portion and a main assembly portion according to an embodiment.
Figure 1:
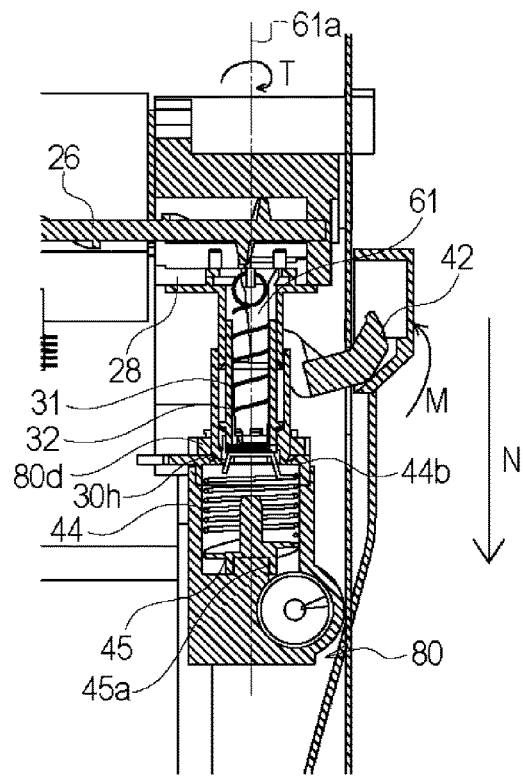

Referring to FIGS. 1, 7 and 10, the expanding-and-contracting operation of the residual toner connecting member 32 will be described. As shown in FIG. 7, the residual toner connecting member 32 is supported by the drum bearing 27 and the process cartridge 7 through the first coupling member 29, the second coupling member 30 and the coupling receptor 28.

The first coupling member 29 and the second coupling member 30 are connected with each other by the urging force provided by the coupling spring 31 in the direction of the arrow I. Therefore, the residual toner connecting member 32 supported by the second coupling member 30 is movable against the urging force of the coupling spring 31 in the direction of the arrow I within the range in which it is engageable with the cylindrical portion 28a of the coupling receptor 28.

Therefore, the residual toner connecting member 32 is movable together with the second coupling member 30 relative to the process cartridge 7 in the direction of the arrow N (part (b) of FIG. 1 and part (b) of FIG. 10).

In addition, the driving claw 29c of the first coupling member 29 and the driving claw 30f of the second coupling member 30 are supported so as to be engageable in the rotational direction T in the inside circumference of the cylindrical portion 28 of the coupling receptor 28. Here, engaging portions 29e, 30g have projecting configurations extending in the axial direction. Therefore, even in the state that the second coupling member 30 has moved in the direction of the arrow N relative to the first coupling member 29 (part (b) of FIG. 1 and part (b) of FIG. 10), the engaging portions 29e, 30g are capable of transmitting the driving force in the rotational direction T. As shown in part (b) of FIG. 1 and part (b) of FIG. 10, when the cartridge is set in the main assembly and is functioning for the printing operation, the residual toner connecting member 32 is in the state that the second coupling member 30 has moved relative to the first coupling member 29 in the direction of the arrow N (drive transmission position). By this, the residual toner discharging portion 32d at the free end of the residual toner connecting member 32 suppresses the leakage of the toner by entering the receiving opening 80d of the main assembly 100 by a predetermined amount. The details of the driving connection and the feeding of the residual toner will be described hereinafter.

On the other hand, in the free state of the process cartridge 7 (retracted position, part (a) of FIG. 1 and part (a) of FIG. 10), the first coupling member 29 and the second coupling member 30 are attracted to each other by the coupling spring 31. By this, the state is that the residual toner connecting member 32 has moved in the direction of the arrow I and the free end of the residual toner connecting member 32 is within the outer configuration (outer configuration line L of FIG. 7) of the process cartridge 7.

The first coupling member 29 and the second coupling member 30 of the residual toner discharging portion of the process cartridge 7 are engaged with each other to rotate, in a main assembly connection state (drive connecting position) and main assembly retraction state (retracted position). Therefore, even in the free state of the process cartridge 7, the engagement between the first coupling member and the second coupling member can be checked by rotating the photosensitive drum 1.

5. [Driving Structure in Cartridge]

The description will be made as to a driving path within the cartridge of the driving force received by the cartridge from the motor provided in the main assembly.

(Driving Connection Mechanism)

Referring to FIG. 8, the drive transmission method from the feeding screw 26 to the first coupling member 29 in this embodiment will be described in detail.

FIG. 8 illustrates the engagement between the drive transmission blade 26g and the first coupling member 29.

As shown in FIG. 8, when the residual toner screw 26 rotates in the direction of the arrow G, the drive transmission blade 26g moves in the direction of an arrow S. The drive transmission blade 26g moving in the direction of the arrow S and one (29b1) of the drive pins 29b of the first coupling member 29 are engaged with each other to move the drive pin 29b in the direction of the arrow S. By this force, the first coupling member 29 is rotated in the direction of the arrow T about the center line 61a.

The drive pins 29b are in the form of cylindrical projecting configurations arranged at equidistant angular positions about the axis of the coupling 29. In this embodiment, six drive pins 29b are arranged at 60° intervals, and each have 1.8 mm of diameter.

When the first coupling member 29 is rotated in the direction of the arrow T, two (29b1, 29b2) of the drive pins 29b come in the range capable of contacting with the drive transmission blade 26g.

A line (X) perpendicular to the axial direction of the feeding screw 26 passes through the center of the first coupling member 29. At this time, the two drive pins 29b are at the same angular positions Y on the opposite sides with respect to the line X. At this time, the drive pin 29b1 and the drive pin 29b2 are most distant from each other in the axial direction of the feeding screw 26 (part (a) of FIG. 8).

The drive transmission blade 26 rotates the drive pin 29b1 in the direction T in the downstream side of the drive pin 29b with respect to the rotational moving direction T. When the drive pin 29b1 is away from the drive transmission range of the drive transmission blade 26g, the first coupling member 29 temporarily stops until the drive transmission pin 29b2 which is upstream of the drive transmission pin 29b1 in the rotational moving direction is brought into contact to the drive transmission blade 26g. When the feeding screw 26 further rotates, the drive transmission blade 26g moving in the direction of the arrow S contacts to the drive transmission pin 29b. By a further movement of the drive transmission blade 26g (part (b) of FIG. 8) in the direction of the arrow S, the drive transmission pin 29b2 of the first coupling member 29 is moved in the direction of the arrow S. In this manner, the first coupling member 29 again starts to rotate in the direction of the arrow T.

By repeating the above-described operation, the first coupling member 29 continues to be rotated by the rotation of the feeding screw 26.

Here, the drive transmission blade 26g is larger than a distance Z between the drive pins 29g as seen in the axial direction. Thus, the drive pins 29b can be continuously pushed by the engagement between the drive transmission blade 26g and the drive pins 29b.

The closer the pitch of the drive pins 29b and the intervals of the feeding screw 26 in the axial direction of the feeding screw 26 to each other, the more continuously (more smoothly) the first coupling member 29 rotates.

(Drive Pin Configuration)

Figure 14:
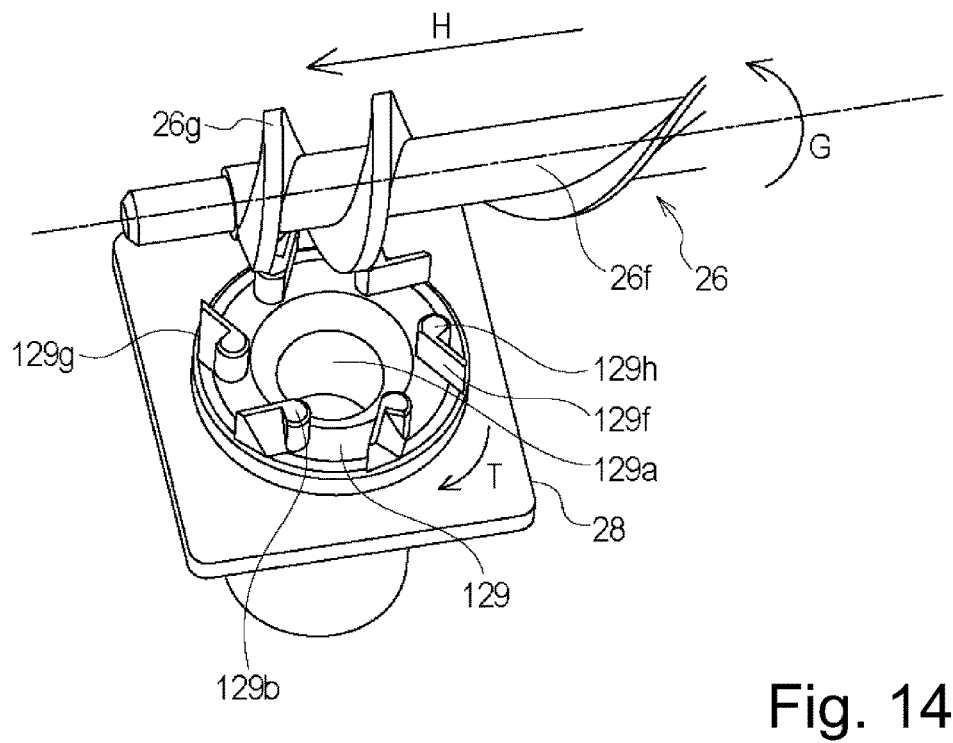
FIG. 14 is a perspective view illustrating a coupling of another example in the embodiment.

In this embodiment, the drive pin 29b has a cylindrical configuration, but another configuration of the drive transmission is possible. For example, a blade configuration corresponding to the feeding screw 26 and a projecting configuration such as a gear or the like can provide the same effects. FIG. 14 schematically shows a modified example of the drive pin 29b.

As shown in FIG. 14, a drive pin 129b of the first coupling member 129 is integrally provided with a toner guide surface 129f. The toner guiding surface 129f provided on the drive pin 129 is disposed outside the hole portion 129a.

The toner guiding surface 129f provides a surface connecting an outer circumference side 129g of the guiding surface and an inner circumference side 129h of the guiding surface. The outer circumference side 129g extends toward the downstream side with respect to the rotational moving direction T (clockwise direction) of the first coupling member 129, and the inner circumference side 129h is in the upstream side with respect to the rotational moving direction T. That is, with the rotation of the first coupling member 129, the toner guiding surface 129f produces a force for moving the toner inwardly. Thus, the toner guiding surface 129f functions as a toner feeding portion for feeding the toner. With Such a Structure, by Rotating the First Coupling Member 129 in the direction of the arrow T, the residual toner is guided into the hole portion 129a. By this, the residual toner is fed into the hole portion 129a. The hole portion 129a is an opening for permitting the toner movement toward the second feeding passageway 61.

(Residual toner driving connection)

Figure 16:
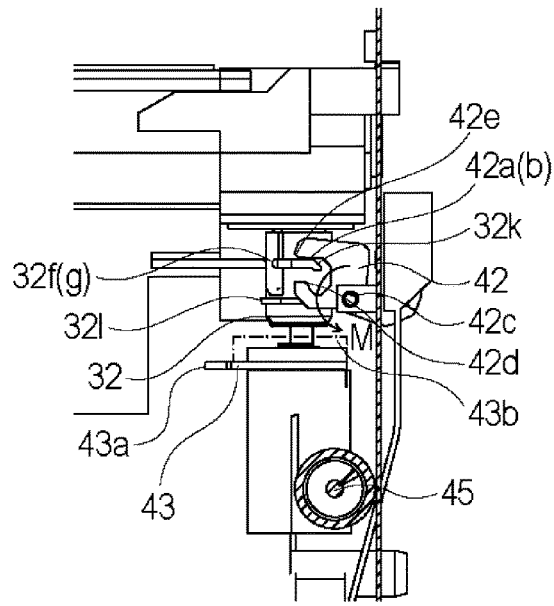
FIG. 16 is a perspective view illustrating a connecting method of the residual toner discharging portion in the embodiment.
Figure 16:
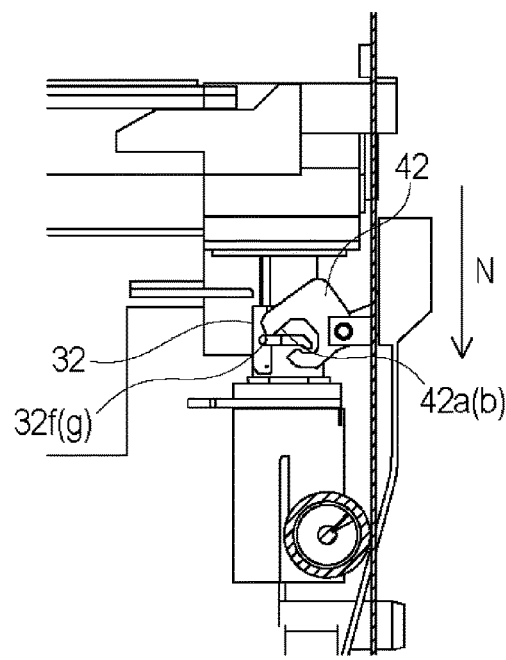
Figure 16:
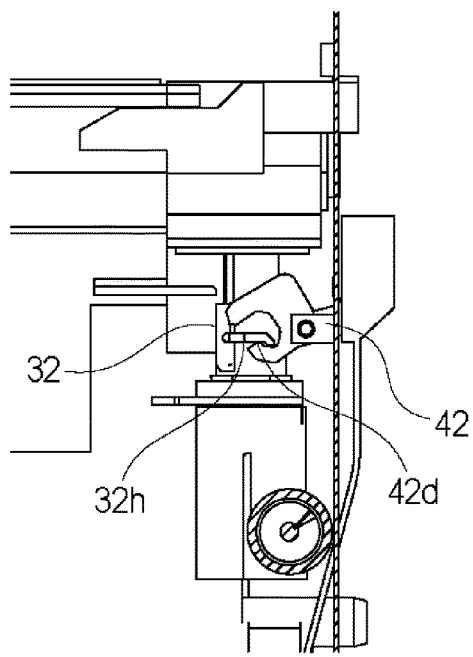

Referring to FIGS. 1 and 16, the driving connection of the residual toner discharging portion to the main assembly 100 will be described.

FIG. 1 is a sectional view illustrating a connecting method between a residual toner discharging portion 23d and the main assembly residual toner receiving opening 80d. FIG. 16 is a schematic view illustrating a connecting method of a residual toner connecting portion 32. As shown in FIG. 1, the main assembly 100 comprises the residual toner receiving opening 80d for receiving the discharging toner from the process cartridge 7.

The residual toner receiving opening 80d is provided with an elastic sealing member 47 such as rubber sponge. When the residual toner connecting member 32 of the process cartridge 7 is pressed down, it enters a main assembly receiving opening sealing member 47 provided in the discharging toner receiving opening 80d, in a press-fitted state. Therefore, a gap between the residual toner connecting member 32 and the discharging toner receiving opening 80d is sealed by the main assembly receiving opening sealing member 47, by which leakage of the residual toner is suppressed.

In this embodiment, the main assembly receiving opening sealing member 47 has an inner diameter of Φ10.4 mm, and the residual toner connecting member 32 has a diameter of Φ11.4 mm. As shown in FIG. 23, the main assembly receiving opening sealing member 47 is provided with a plurality of slits 47a to easily accept the residual toner connecting member 32. The residual toner connecting member 32 is provided with a tapered configuration 32k to accommodate a positional deviation between the residual toner connecting member 32 and the residual toner receiving opening 80d in the axial direction.

The residual toner connecting member 32 is provided with a rib configuration 32l, by which when it is mounted to the residual toner receiving opening 80d, the gaps are closed. As shown in FIG. 1, the main assembly residual toner transportation portion 80 is provided with the first main assembly feeding passageway 80a having the residual toner receiving opening 80d and the second feeding passageway 80b for feeding the residual toner into the residual toner container 14 of the main assembly 100.

The first main assembly feeding passageway 80a is provided with a spring stopper 43 adjacent to the receiving port. The spring couplings 44 having an elastic force provided in the first main assembly feeding passageway 80a is supported by the spring stopper 43 by abutment thereto at the spring portion 44a. The spring coupling 44 is rotatable integrally with the feeding fin 45 as the main assembly side feeding member. The feeding fin 45 is provided with a rotation shaft or rotational axis 45a which is rotatably supported by a fin bearing portion 80e of the main assembly feeding member. Thus, the spring coupling 44 is rotatable about the center line 61a.

As shown in part (b) of FIG. 1, with a closing operation of a front door 91 (FIG. 19) of the main assembly 100, the residual toner connecting member 32 enters the residual toner receiving opening 80d. By this entering, the residual toner connecting member compresses the spring coupling 44 down (residual toner connection opening entering direction) against the reaction force of the spring coupling 44.

In addition, the spring coupling 44 abuts to the second coupling member 30 in the residual toner connecting member 32 with an urging force. The second coupling member 30 is rotatable in interrelation with the rotation of the photosensitive drum 1. By this, the groove portion 30b of the second coupling member 30 engages with the coupling portion 44b of the spring coupling 44 in the rotational moving direction.

Here, when the residual toner connecting member 32 connects with the main assembly feeding portion 80, the coupling portion 44b of the spring coupling 44 may not engage with the groove portion 30b of the second coupling member 30 but may be pressed down to the projection 30h. In such a case, the second coupling member 30 rotates in the direction of the arrow T while the coupling spring 44 is pressed against the projection 30h. When the second coupling member rotates to the phase that the coupling portion 44b of the spring coupling 44 is engageable with the groove portion 30b, the spring couplings 44 and the second coupling member 30 engage with each other in rotational moving direction so as to be rotatable integrally with the feeding fin 45.

In this manner, the engagement is possible irrespective of a phase relation between the main assembly coupling 44 and the second coupling member 30.

Here, the spring coupling 44 is a compression spring having a wire diameter of approximately Φ0.6 mm and an inner diameter of approximately Φ12.3 mm. The spring coupling 44 provides the urging forces of approximately 33 gf in the state of abutting to the spring stopper 43 (uncoupled state) and approximately 50 gf in the connection state of the second coupling member 30.

That is, in the state shown in part (b) of FIG. 16, the arms 42 rotate in the direction of an arrow M by the force exceeding a total of approximately 120 gf of the coupling spring reaction force and the residual toner connection opening urging force.

Here, the spring portion 44a of the spring coupling 44 is wound in such a direction that a downward feeding force is produced to the residual toner by the rotation in the direction of the arrow T.

With this structure described in the foregoing, a drive transmission passageway of the residual toner transportation portion is as follows.

When the photosensitive drum 1 of the process cartridge 7 rotates in the direction of the arrow A in the printing operation, the driving force is transmitted to the drum gear 1b, the idler gear 52, the feeding screw gear 53, and the feeding screw 26. In addition, from the feeding screw 26, the driving force is transmitted to the first coupling member 29, the second coupling member 30, the coupling spring 31, and the spring coupling 44 of the main assembly 100 in the order named. In this manner, the residual toner is discharged to the main assembly 100 from the process cartridge 7. The residual toner supplied to the spring coupling 44 is fed to the main assembly feeding screw 80c by the feeding fin 45 in the main assembly feeding portion 80, and it is fed into the residual toner box 86 by the feeding force of the main assembly feeding screw 80c.

6. [Flow of the Residual Toner with Image Forming Operation]

A description will be made as to how the residual toner produced as a result of the image forming operation is supplied into the residual toner box of the main assembly of the image forming apparatus.

(Flow of the residual toner into the residual toner box)

Referring to FIGS. 1, 4 and 7, the entire flow of the residual toner from the production of the residual toner to the main assembly 100 will be described. As shown in FIG. 4, when the photosensitive drum 1 rotates with the printing operation, the residual toner is removed by the cleaning blade 6. The removed residual toner it is fed to the first coupling member 29 by the feeding screw 26. In the feeding passageway 51 of the residual toner accommodating portion 14a, the residual toner is fed in the direction of the arrow H.

The residual toner receives a feeding force in the direction opposite to the direction of the arrow H by the reverse screw portion 26e. Therefore, the residual toner is fed in the direction of the arrow H and the residual toner fed in the opposite direction by the reverse screw portion 26e collide with each other at the position between the feeding screw portion 26a and the reverse screw portion 26e and stagnates there.

As shown in FIGS. 3 and 7, there is a space constituting a residual toner accommodating portion 14a between the feeding screw 26 and the photosensitive drum 1. The first coupling member 29 is provided in such a space. The stagnating toner is pushed toward the space and flows toward the axis center of the first coupling member 29. Then, the toner is fed into the hole portion 29a (part (a) of FIG. 7, FIG. 9) provided coaxially with the first coupling member 29. The hole portion 29a is an opening for permitting movement of the toner. The hole portion 29a flows into the second feeding passageway 61. Furthermore, the residual toner is discharged by the discharging portion 32d provided below the first coupling member 29, which will be described hereinafter.

At this time, the residual toner flowing in the direction of the arrow H receives the feeding force in the opposite direction by the reverse screw portion 26e. By this, the residual toner is prevented from entering a contacting position V between the drive transmission blade 26g and the drive pin 29b. By this, the contact portion V between drive transmission blade 26g and the drive pin 29b is not easily influenced by the residual toner. Therefore, the stability of the drive transmission is improved.

(Toner Flow in the Residual Toner Discharging Portion)

As described in the foregoing, in the residual toner discharging portion 40 the residual toner is fed by the residual toner screw 26 along the axial direction of the photosensitive drum 1 toward one end portion side of the cartridge (arrow H in FIG. 4). The fed residual toner particles collide at the position between the feeding screw portion 26a and the reverse screw portion 26e to be fed into the hole portion 29a of the first coupling member 29.

As shown in FIG. 8, with the rotation of the feeding screw 26, the first coupling member 29 is rotated in the direction of the arrow T. As shown in FIGS. 7 and 9, the first coupling member 29 is provided with the hole portion (opening) 29a. The residual toner having passed through the hole portion 29a flows into the inner diameter portion of the coupling spring 31 of the first coupling member 29. In addition, the residual toner flows into the hole portion 30a of the second coupling member 30 engaged with the first coupling member 29. Simultaneously, with the rotation of the first coupling member 29, the driving force is transmitted from the engaging portion 29e to the engaging portion 30g of the second coupling member 30. By this, the second coupling member 30 and the coupling spring 31 rotate integrally with each other.

Here, the coupling spring 31 (FIG. 9) is wound in such a direction that the residual toner is fed in the direction of the arrow N in FIGS. 1 and 7 when it rotates together with the first coupling member 29 and the second coupling member 30. For this reason, the residual toner is positively fed in the direction of the arrow N in addition to the free falling in the direction of the arrow N. In addition, the coupling spring 31 is effective to loosen the residual toner by the rotation in the second feeding passageway 61. Therefore, the feeding (movement) of the residual toner is made smoother. That is, the urging member (coupling spring 31) urging the second coupling member 30 is provided with a feeding portion for feeding the toner and a stirring portion effective to stir the toner as well.

The residual toner having passed through the coupling spring 31 and the hole portion 30a of the second coupling member 30 is discharged to the residual toner discharging portion 32d of the residual toner connecting member 32 supported in the direction of the arrow N by the second coupling member 30. The foregoing is the discharging of the residual toner in the process cartridge 7.

(Residual Toner Flow in Downstream Side of the Residual Toner Discharging Portion)

As shown in FIGS. 1, 4 and 7, the residual toner discharged from the residual toner discharging portion 32d enters the feeding passageway 80b from the residual toner receiving opening 80d provided in the main assembly of the image forming apparatus 100 below the residual toner discharging portion 32d. Then, the residual toner in the feeding passageway 80b is discharged into the residual toner box (main assembly side toner accommodating portion) 86 by the main assembly feeding screw 85 as the feeding member in the main feeding passageway 80c. The residual toner fed into the first feeding passageway 80a from the residual toner discharge opening 32d of the process cartridge 7 flows down into the first main assembly feeding passageway 80d by the free falling and the downward feeding force provided by the winding direction of the spring coupling 44. By this, the toner is fed to the feeding fin 45 as the main assembly side feeding member.

The main assembly side feeding member (first feeding member) includes the feeding fin 45 and the spring coupling 44, unless otherwise stated. It is desirable that both of the feeding fin 45 and the spring coupling 44 included in the main assembly side feeding member have the toner feeding power as in this embodiment, but the present invention is not limited to such a structure. It will suffice if at least one of the main assembly side feeding member functions as a feeding portion having a toner feeding power.

For example, the main assembly side feeding member including the feeding fin 45 (feeding portion) and the spring coupling 44 (coupling portion) may provide sufficient feeding force only by the feeding fin 45. In such a case, the spring coupling 44 may not have the toner feeding power or may have only a small toner feeding power.

Figure 15:
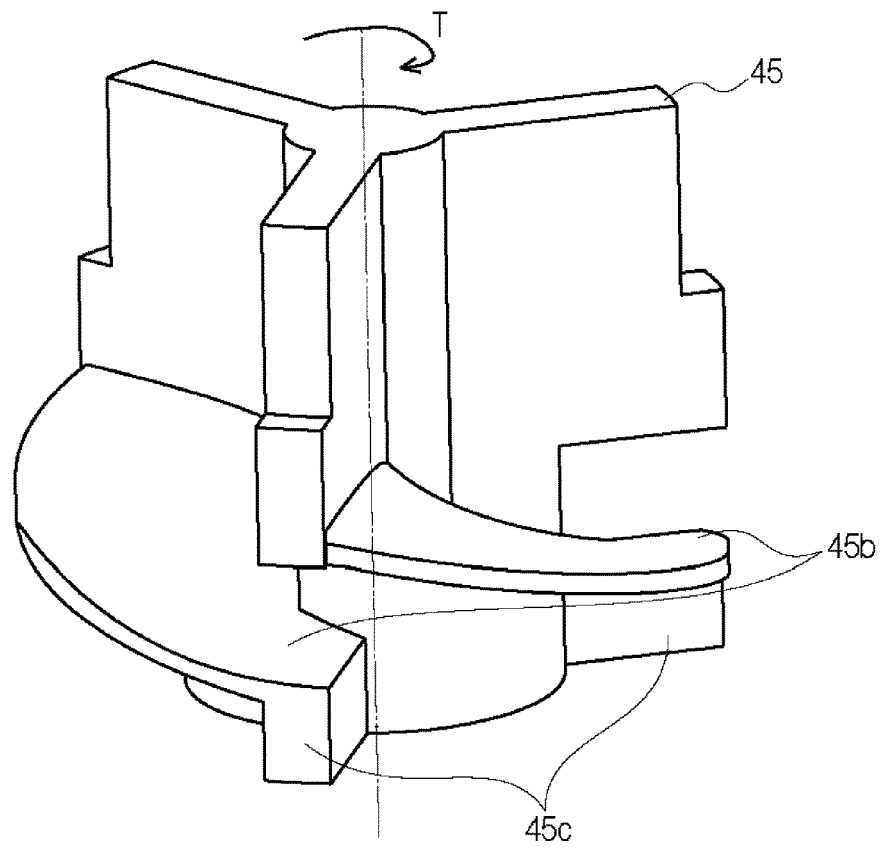
FIG. 15 is a perspective view of a residual toner transportation fin in the embodiment.

Referring to FIGS. 1 and 15, the configuration of the feeding fin 45 will be described.

FIG. 15 is a perspective view illustrating an example of the feeding fin. As shown in FIG. 1, the residual toner having entered the feeding fin 45 is fed downward by the feeding portion 45b having the screw blade configuration by the rotation of the feeding fin 45 in the direction of the arrow T. As shown in FIG. 15, the feeding portion 45b is provided with a blade configuration at each of three positions at screw pitch of 3 mm. As compared with the single helical lead of this embodiment, the following advantageous effects are provided. The structure of this embodiment can easily catch the residual toner while keeping the feeding force provided by the rotation.

As shown in FIG. 4, to the lower end of the first main assembly feeding passageway 80d, the substantially perpendicular second main assembly feeding passageway 80b is connected by the connecting portion 80f. The residual toner fed downward is further fed into the second main assembly feeding portion 80b by a scraping portion 45c provided below the feeding fin 45.

The first feeding passageway 80a and the second feeding passageway 80b are substantially perpendicular, and the residual toner may thereby clog in the connecting portion 80f. Therefore, the feeding fin 45 is disposed adjacent to the connecting portion 80f to prevent the toner packing in the connecting portion 80f, thus stably feeding the residual toner. The residual toner fed to the second main assembly feeding portion 80d is further fed in the direction of an arrow R by the feeding force of the main assembly feeding screw 85 as the feeding member shown in FIG. 5, and then is collected in the residual toner box 86.

The feeding fin 45 is disposed in the main assembly feeding passageway 80 of the main assembly 100 so as to prevent the toner flowing to the residual toner receiving opening 80d from the main assembly feeding passageway 80, wherein the residual toner receiving opening 80d faces upward. Therefore, the feeding fin 45 has a function during its rotation of feeding the residual toner into the second main assembly feeding passageway 80b from the first main assembly feeding passageway 80a of the main assembly feeding passageway 80. In addition, the feeding fin 54 functions when not rotating to prevent the flow of the toner from the second main assembly feeding passageway 80b into the first main assembly feeding passageway 80a.

Furthermore, in this embodiment, the feeding fin 45 has a helical configuration including three feeding portions 45b, but this example is not limiting to the present invention. The feeding portion 45b may be a single lead helical configuration or multiple lead helical configuration, such that it provides the feeding force which will be described hereinafter.

Figure 41:
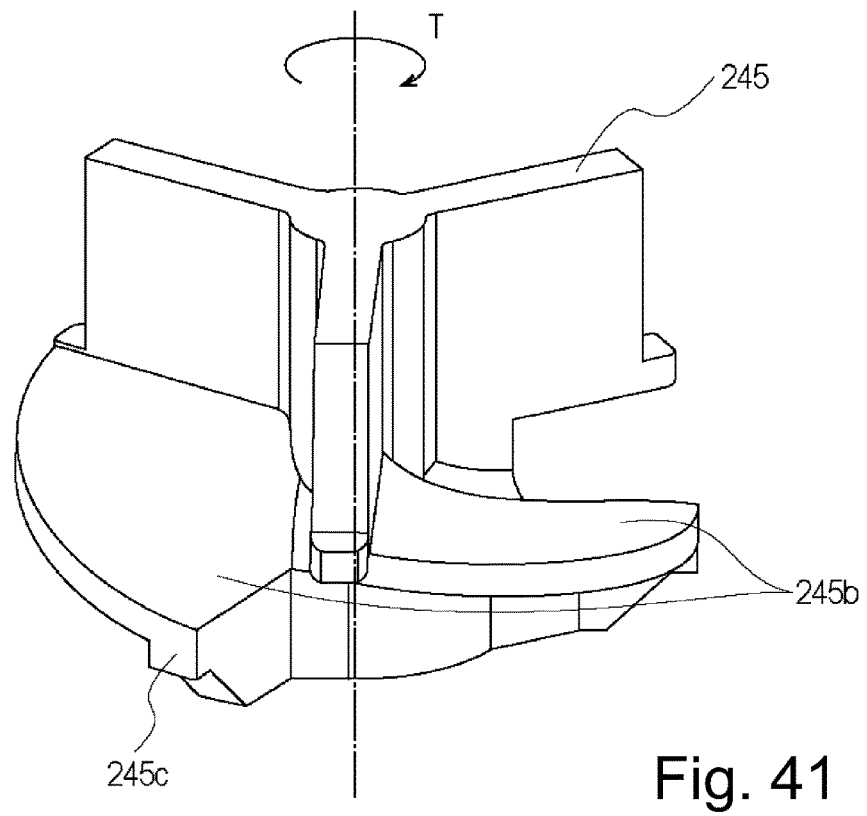
FIG. 41 is an outer appearance of another structure of a main assembly feeding fin.

In this embodiment, the helical configurations are overlapped with each other as seen in the axial direction, but the present invention is not limited to such an example. For example, as shown in FIG. 41, similar effects are provided even with the configuration in which the helical configurations are spaced from each other or a slit-like gap is provided therebetween, although the toner leakage preventing effects are lower.

Here, as shown in FIG. 5, the second main assembly feeding passageway 80b extends over the respective color process cartridges. The residual toner box 86 is in the form of an exchangeable box.

(Configuration and Disposition of Coupling)

The inner diameter of the hole portions of the first coupling member 29, the second coupling member 30, and the coupling spring 31 are selected such that the residual toner is stably discharged.

More particularly, in this embodiment, the inner diameter of the coupling hole portion is approximately Φ5.4 mm, and the inner diameter of the coupling spring 31 is approximately Φ4.5 mm.

The residual toner connecting member 32 is mounted to the outside of the coupling receptor 28 provided with the first coupling member 29 and the second coupling member 30 therein. Therefore, the outer diameter of the cylindrical shape 28a of the coupling receptor 28 is approximately Φ9.2 mm, and the outer diameter of the residual toner connecting member 32 is approximately Φ11.4 mm. As described hereinbefore, the residual toner connecting member 32 enters the residual toner receiving opening 80d of the main assembly 100. In this embodiment, the inner diameter of the residual toner receiving opening 80d is Φ10.4 mm, and the residual toner connecting member 32 enters while compressing the main assembly receiving opening sealing member 47 to close the gap.

Here, the hole portion 29a of the first coupling member 29 and the hole portion 30a of the second coupling member 30 have the inner diameters of Φ5.4 mm through which the residual toner passes. In addition, the residual toner discharging portion 32 is approximately Φ8.4 mm, and the main assembly receiving opening 80d is approximately Φ10.4 mm Thus, the diameter of the feeding passageway increases toward the downstream side of the residual toner transportation. By doing so, the toner clogging in the residual toner transportation passageway from the process cartridge 7 to the main assembly feeding portion 80 is prevented, thus stabilizing the toner discharging.

(Residual Toner Clogging).

As shown in FIG. 7, in the main assembly 100, the arrow N direction which is the residual toner feeding direction is inclined relative to the free falling direction of the residual toner by an inclination of approximately 19°.

Additionally, in the main assembly 100, the residual toner connecting member 32 and the second coupling member 30 are in the positions moved in the direction of the arrow N against the urging force of the coupling spring 31, that is, they are in the drive transmission position.

In addition, the first coupling member 29 and the second coupling member 30 are engageable with each other in the rotational moving direction in the engaging portion 29e, 30g even in the state that they have moved in the direction of the arrow N which is the axial direction.

As shown in part (c) of FIG. 7, the residual toner fed into the hole portion 29a of the first coupling member 29 is further fed along the arrow N direction through the second coupling member 30, the coupling spring 31, and the residual toner connecting member 32.

At this time, by the free falling of the residual toner, the toner is accumulated at the end portion (U) of the residual toner connecting member 32 with respect to the direction of gravity. The residual toner connecting member 32 is provided with the projecting configuration supporting portion 32a supported by the above-described second coupling member.

Therefore, the residual toner is fed to the residual toner discharge opening 32 while accumulating on the projecting configuration supporting portion 32a. At this time, the residual toner connecting member 32 and the second coupling member 30 move toward the first coupling member 29 with the residual toner accumulated in the U-shaped portion of the residual toner discharging portion 32. The accumulated residual toner in the U-shaped portion is pushed out in the direction of the arrow N to a tapered portion 28f of a cylindrical free end portion 28c of the coupling receptor 28. Thereafter, the residual toner flows through a plurality of slit portions 32j provided in the supporting portion 32a of the residual toner discharging portion 32 shown in FIG. 11 to be fed into the residual toner discharging portion 32d.

With the above-described the structures, the residual toner clogging can be prevented when the residual toner connecting member 32 and the second coupling member 30 return from the position away from the first coupling member 29.

7. [Structure of Shutter]

Figure 17:
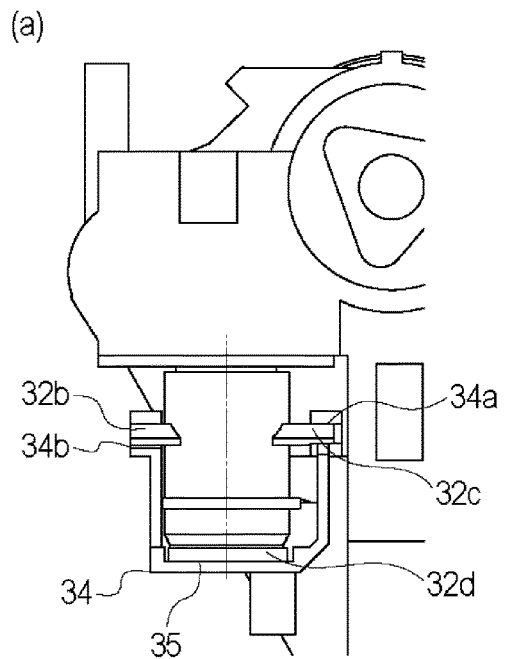
FIG. 17 is a perspective view illustrating a structure of a shutter for a residual toner discharge opening in the embodiment.
Figure 17:
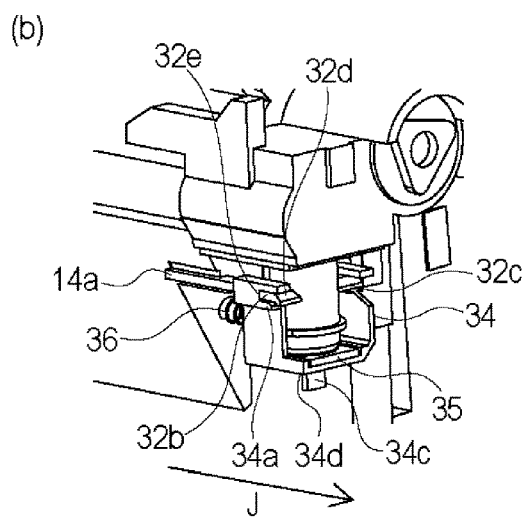
Figure 17:
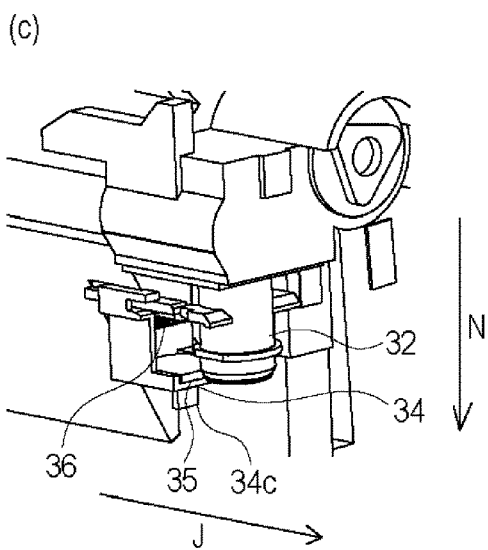

Referring to FIG. 17, a description will be made as to the motion of the shutter (openable member) 34 provided on the residual toner connecting member 32 at the time of mounting. FIG. 17 is a perspective view illustrating a supporting structure for the shutter. In the rear side of the process cartridge 7 with respect to the mounting direction (arrow J), the residual toner connecting member 32 which is the above-described residual toner discharge opening is provided.

As shown in FIG. 17, the residual toner connecting member 32 is provided with guide portions 32b, 32c in the form of projections projecting in the axial direction. The shutter 34 is provided with groove portions 34a, 34b at the opposite end portions with respect to the direction along the cross-section plane.

Shutter 34 is guided by the projecting configuration guide portions 32b, 32c at the groove portions 34a, 34b so as to be movable in the mounting direction (arrow J direction), and seals the residual toner discharging portion 32d.

The shutter 34 is provided with an elastic sealing member 35 for sealing the residual toner discharging portion 32d. The shutter 34 is supported such that the elastic sealing member 35 is compressed by the discharge opening 32d. Therefore, as shown in part (a) of FIG. 17, the discharge opening 32d of the residual toner connecting member 32 is closed by the elastic sealing member 35 without gap, thus sealing against leakage of the residual toner.

As shown in part (b) of FIG. 17, the shutter 34 is urged toward the rear side in the mounting direction (arrow J direction) by the urging member 36 provided on the cleaning frame 14. A discharge opening abutting portion 34d of the shutter 34 is abutted to an abutting portion 32e of the residual toner connecting portion 32 by the urging member 36. In this manner, the shutter 34 is positioned and supported by the residual toner connecting member 32 on the process cartridge 7.

Furthermore, the cleaning frame 14 is provided with a shutter guide portion 14a supporting the shutter 34 movably in the mounting direction and extending in the mounting direction (arrow J direction) at the same position as the guide portion 32b of the residual toner connecting member 32 with respect to a cross-sectional plane.

As shown in FIG. 17, the shutter engaging portions 34a, 34b of the shutter 34 are partly supported by the shutter guide portion 14a of the cleaning frame 14 in abutment to the abutting portion 32e of the residual toner connecting member 32. In other words, the shutter 34 is supported by the residual toner connecting member 32 and the cleaning frame 14.

As shown in part (c) of FIG. 17, the shutter 34 moves in the direction opposite to the inserting direction (opposite to the arrow J direction) in the process cartridge 7 in the mounting to the main assembly 100. Thus, the shutter 34 is capable of opening and closing the opening (discharge opening 32d) for discharging the residual toner.

The shutter 34 is completely disengaged from the shutter guide portions 32b, 32c of the residual toner connecting member 32 by the movement in the direction opposite to the arrow J. Then, the shutter 34 is engaged with and is supported by only the guide portion 14a of the cleaning frame 14. Therefore, in the state that the cartridge is mounted in the main assembly 100, the shutter 34 does not obstruct the movement of the residual toner connecting member 32 in the direction along a cross-sectional plane of cross-section.

To the contrary, when the shutter 34 closes the discharge opening 32d, the residual toner connecting member 32 is locked and not movable. The shutter 34 is a locking member for locking the residual toner connecting member 32 against the movement thereof, as well.

8. [Mounting Operation of the Cartridge to the Main Assembly]

Referring to FIGS. 4, 19, 20, 21 and 22, the description will be made as to the mounting of the process cartridge 7 to the main assembly 100.

(General Description of Mounting Operation)

Figure 19:
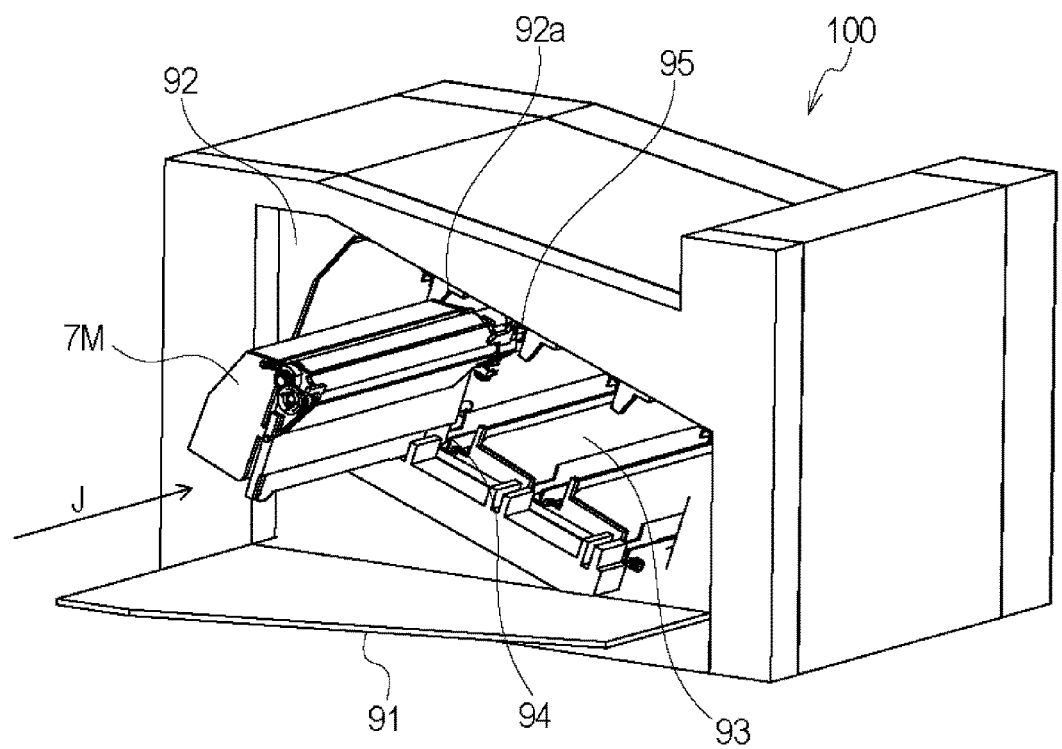
FIG. 19 is a perspective view illustrating an open state of a front door of the main assembly in the embodiment.
Figure 20:
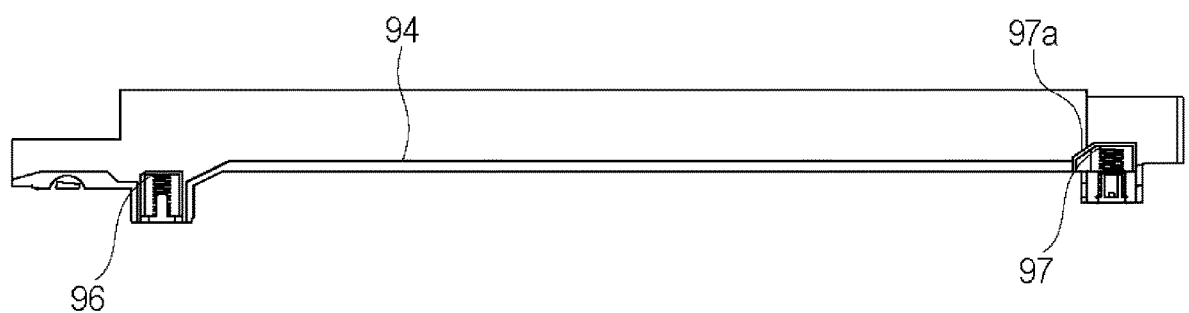
FIG. 20 is a sectional view illustrating a configuration of a lower guide of the main assembly for the cartridge in the embodiment.
Figure 21:
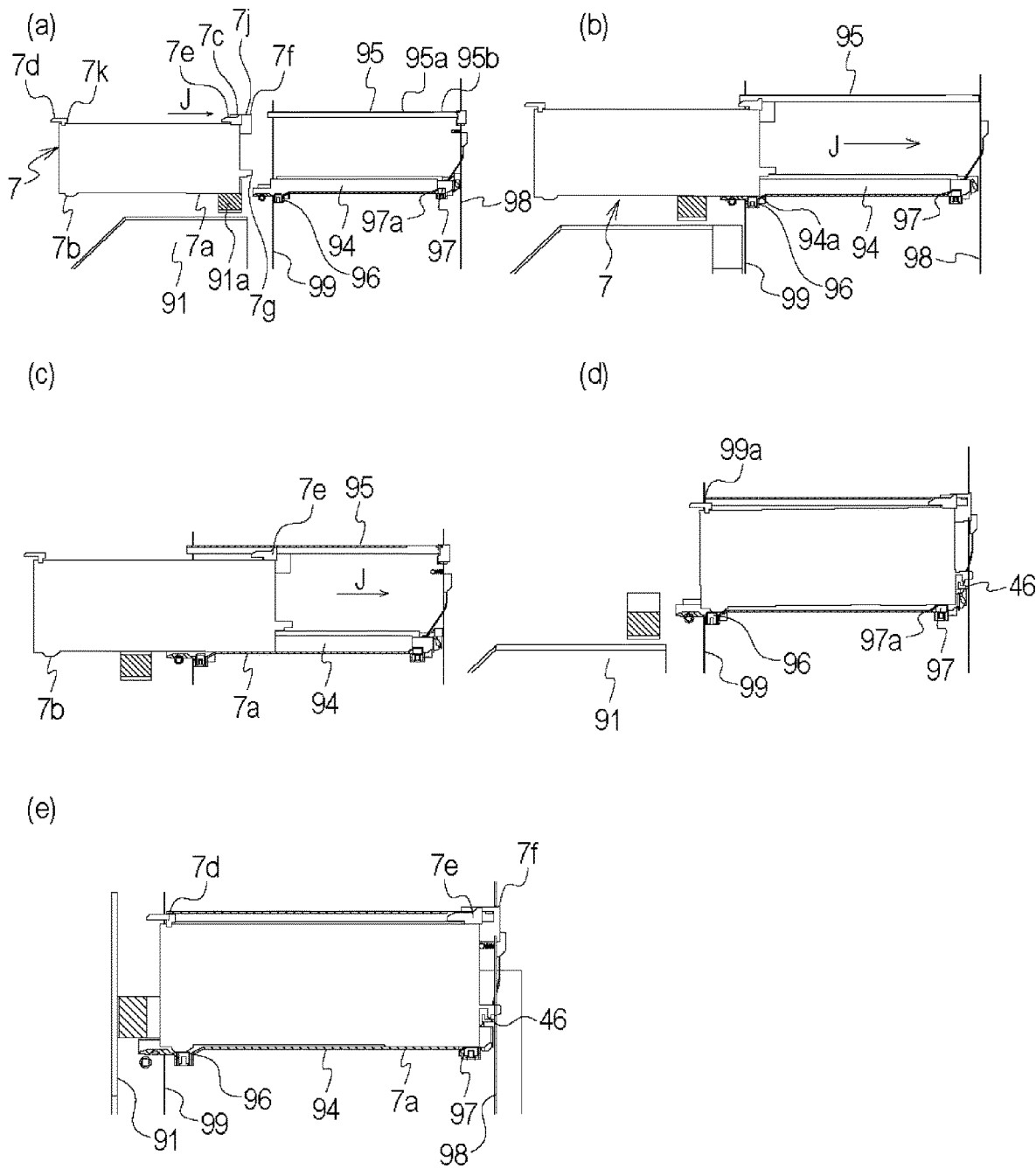
FIG. 21 is a sectional view illustrating a track of the process cartridge mounting into the main assembly of the apparatus in the embodiment.

FIG. 19 is a front view in the state that the front door 91 of the main assembly 100 is open. FIG. 20 is a sectional view illustrating a structure of a lower guide 94 of the cartridge. FIG. 21 is a schematic view illustrating a mounting process of the process cartridge 7 to the main assembly 100.

Referring to FIG. 19, the mounting operation of the process cartridge 7 to the main assembly of the image forming apparatus 100 will first be described.

As shown in FIG. 19, the process cartridge 7 is mountable to and dismountable from the main assembly 100 in the direction of the arrow J.

Figure 22:
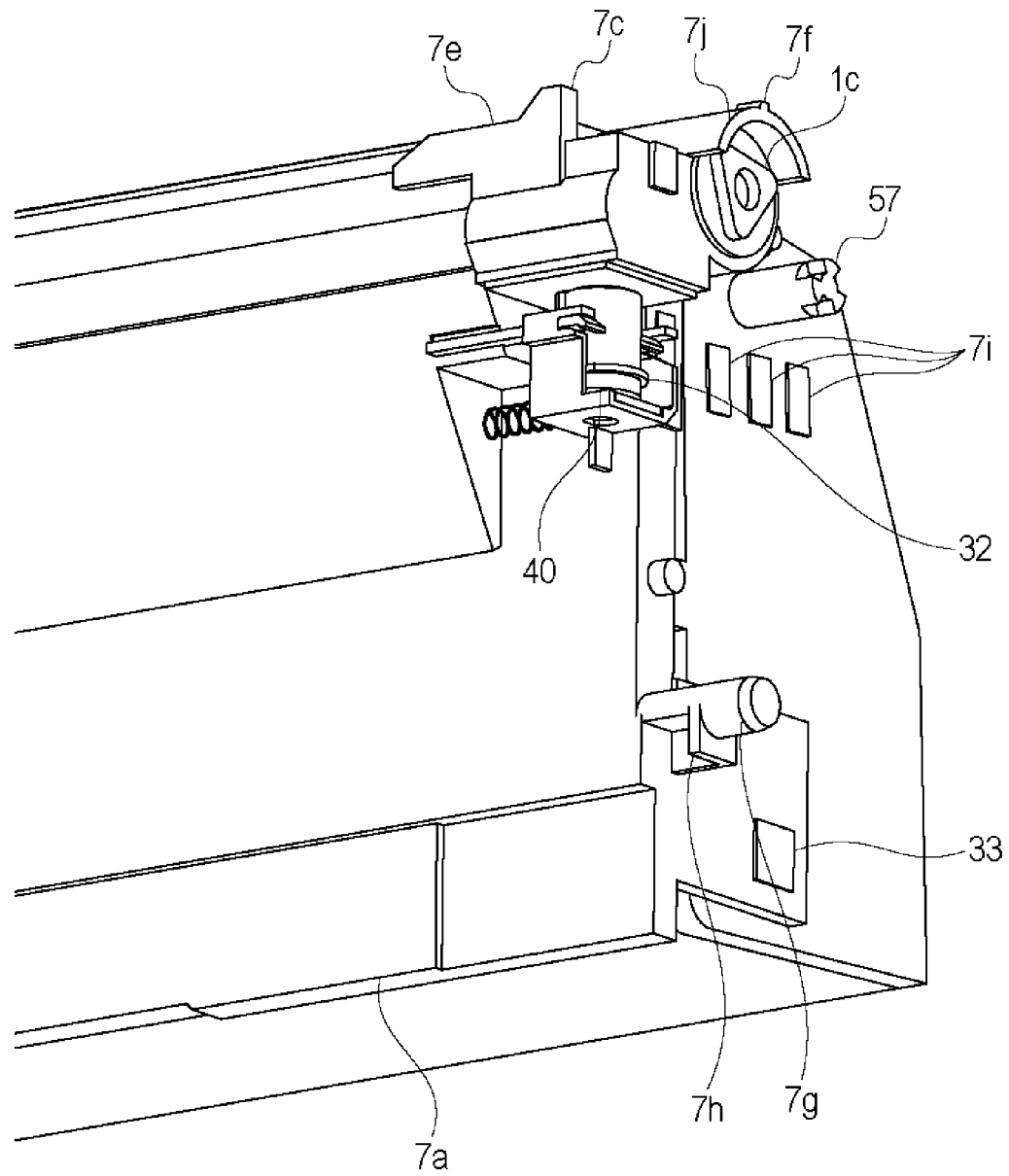
FIG. 22 is a perspective view illustrating a structure of a rear side with respect to a mounting direction of the process cartridge in the embodiment.

As shown in FIG. 22, the residual toner transportation portion 40 is provided in the rear side with respect to the mounting direction of the process cartridge 7. The residual toner produced during the image forming operation is fed from the process cartridge 7 to the receiving opening (unshown) of the main assembly 100.

The process cartridge 7 is inserted in the direction of the arrow J after the front door 91 of the main assembly of the image forming apparatus 100 is opened. Thereafter, the process cartridge 7 is inserted in the direction of the arrow J to the extent that it abuts to the rear side plate (unshown) in the rear side of the main assembly, thus completing the inserting operation. Thereafter, the front door 91 of the main assembly 100 is closed, by which the process cartridge 7 is positioned in place in the main assembly. And, the residual toner connecting portion (unshown) is connected with the main assembly 100, by which the mounting operation is completed. The details of the mounting operation will be described step-by-step.

(Operation of Insertion in the Longitudinal Direction)

As shown in FIG. 22, the process cartridge 7 is provided with lower guides 7a, 7b to be guided by the main assembly 100 during the mounting operation at the opposite end portions with respect to the longitudinal direction of the cartridge. In addition, the process cartridge 7 is provided with upper guides 7c, 7d to be guided by the main assembly 100 during the mounting operation at the opposite end portions with respect to the longitudinal direction.

The main assembly 100 is provided with a front cover 92 for restricting the sectional area of the process cartridge 7 at the entrance. In a cartridge mounting portion 93 of the main assembly 100, there are provided a lower guide 94 for guiding the lower portion of the process cartridge 7 and an upper guide 95 for guiding the upper portion of the process cartridge 7.

Additionally, as shown in FIG. 20, the lower guide 94 is provided with pressing blocks 96 and 97 to press the process cartridge 7 substantially in the upward direction that is substantially perpendicular to the mounting direction. The pressing blocks 96, 97 are provided at each of the front side and the rear side with the respect to the mounting direction of the cartridge.

As shown in FIG. 20, the cartridge rides on the lower guide 94 in accordance with the movement of the cartridge toward the rear side in the mounting direction J. By this, the process cartridge 7 can be inserted without contact to the intermediary transfer belt 5 disposed in the upper side.

As shown in part (a) of FIG. 21, the process cartridge 7 is inserted into the cartridge mounting portion 93 while being guided by a lower guide 91a of the front door. The process cartridge 7 having moved to the mounting portion 93 is restricted in the position thereof by a rough mounting guide portion 92a of the front cover 92 shown in FIG. 19 in the plane perpendicular to the mounting direction.

By this, the process cartridge 7 is mounted to the cartridge mounting portion 93 with the regulated attitude in the direction along a plane perpendicular to the mounting direction. In addition, at the position where the process cartridge 7 passes by the front cover 92, the process cartridge 7 is sufficiently away from the intermediary transfer belt 5. Furthermore, when the process cartridge 7 enters the main assembly 100, the projecting configuration of the lower guide 7a is engaged with the recessed configuration of the lower guide 94 so that the cartridge is thereby guided.

(Riding Operation)

Then, the process cartridge 7 is guided so that the projecting configuration of the guide portion 7c is engaged with the recessed configuration of the upper guide 95 while being guided by the lower guide 7a. As shown in part (b) of FIG. 21, the process cartridge 7 moves in the direction of the arrow J on the lower guide 94 while being restricted by the lower guide 7a and the upper guide 7c in the directions perpendicular to the mounting direction.

The lower guide 94 rises upwardly in accordance with the insertion toward the rear side by the configuration of the lower guide 94. Therefore, the process cartridge 7 is inserted into the main assembly 100 while being raised by the engagement with the lower guide 94.

Then, the lower guide 7a rises on the inclined portion 94a of the lower guide 94 in the direction perpendicular to the mounting direction. Therefore, with the insertion of the process cartridge 7 in the mounting direction (arrow J direction), the lower guide 7b rides on the lower guide 91a of the front door. Thereafter, with the continuing insertion of the cartridge, the lower guide 7b rises on the lower guide 94 and the pressing block 96 in the order named, similar to the lower guide 7a.

Referring to FIG. 22, the structure of the portion of the main assembly 100 abutted by the process cartridge 7 will be described.

FIG. 22 is a perspective view illustrating the structure of the rear side of the process cartridge 7 with respect to the mounting direction. As shown in FIG. 22, the process cartridge 7 is provided with a shaft 7g for positioning the process cartridge 7 relative to the main assembly 100 in the direction perpendicular to the mounting direction, the shaft 7g extending toward the rear side in the mounting direction. The process cartridge 7 is provided in the rear side with respect to the mounting direction with an upper guide abutting portion 7e and a vertical abutting portion 7f for substantially limiting the position of the process cartridge 7 in the vertical direction during the inserting operation. The process cartridge 7 is provided with a retention groove 7h for preventing disengagement of the process cartridge 7 from the main assembly 100. As shown in FIG. 22, the retention groove 7h is in the form of a recessed configuration provided in the rear side of the process cartridge with respect to the mounting direction.

The photosensitive drum 1 of the process cartridge 7 is provided with a coupling portion 1c as a drive inputting portion for receiving a driving force from the main assembly 100 in the rear side with respect to the mounting direction. Furthermore, the toner supplying roller 20 is provided with the coupling portion 57 as the input portion for receiving a driving force from the main assembly 100.

(Structure in the Neighborhood of the Abutting Portion)

Referring to FIG. 23, the structure in the neighborhood of the abutting portion of the main assembly 100 relative to the process cartridge 7 will be described. FIG. 23 is a perspective view illustrating the rear side structure of the main assembly 100, with respect to the mounting direction of the process cartridge 7. As shown in FIG. 23, the main assembly 100 is provided on the rear side plate 98 with an abutting portion 98a as a longitudinal abutting portion at the time of mounting the process cartridge 7.

The rear side plate 98 is provided with V-shaped groove portion 98b and a positioning elongate hole portion 98c for positioning the process cartridge 7 in the direction perpendicular to the mounting direction, and they are provided at upper and lower parts, respectively. A drum drive input coupling 81 for inputting the driving force to the photosensitive drum 1 is provided in a rear side of the rear side plate 98 with respect to the mounting direction. The drum drive input coupling 81 is supported so as to be movable in the direction of the arrow J by the urging member (unshown). In addition, in the rear side of the main assembly 100 with respect to the mounting direction, there is provided a development drive input coupling 82 for inputting a driving force to the coupling portion 57. The development drive input coupling 82 receives the driving force from the driving source (unshown) of the main assembly 100 and rotates.

In addition, in the rear side of the main assembly 100 with respect to the mounting direction, there is provided a voltage application member 83 for applying a voltage to the process cartridge 7. Here, the voltage application member 83 includes an elastic member such as a compression coil spring extending in the direction opposite to the direction of the arrow J.

Furthermore, in the rear side of the main assembly 100, there is provided a recording contact 84 for recording in a chip 33 as the storing element of the process cartridge 7. The recording contact 84 includes elastic projected portions 84a and 84b projecting in the direction opposite to the mounting direction, and the recording contact 84 is supported by the rear side plate 98 so as to be substantially movable in the vertical direction.

In addition, the upper guide 95 of the main assembly 100 is provided with an upper guiding rail abutting portion 95a for abutting and supporting the upper guide abutting portion 7e of the process cartridge 7. Moreover, the rear side plate 98 is provided with a limiting portion 98d for contacting and supporting the vertical abutting portion 7f of the process cartridge 7.

The rear side plate 98 supports an arm 42 for engagement with the residual toner connecting member by supporting portions 98e and 98f with an arm rotation shaft 42c so as to be rotatable within a predetermined range. The arm 42 is supported and positioned in the rotational moving direction by the lower guide 94 using a link mechanism (unshown).

(Operation from Riding to Contacting to the Main Assembly)

With the mounting operation, the process cartridge 7 is inserted toward the rear side of the main assembly in the state that the upper guide 7c and the lower guides 7a, 7b are supported by the upper guide 95 and the lower guide 94, as shown in part (c) of FIG. 21.

The lower guide 7a of the process cartridge 7 rides on the tapered portion 97a of the pressing block 97 provided on the lower guide 94. At this time, the positioning shaft 7j of the process cartridge 7 has passed by the intermediary transfer belt 5 in the mounting direction. Therefore, the process cartridge 7 can be mounted to the main assembly 100 without the positioning shaft 7j extending upwardly contacting the intermediary transfer belt 5. In addition, at this time, the process cartridge 7 is supported at two positions, namely a front side portion by the lower guide 94 and a rear side portion where it is ridden. Therefore, as shown in part (d) of FIG. 21, the process cartridge 7 is mounted with the rear side thereof lifted by slanting (approximately 0.6°) in the main assembly 100.

The process cartridge 7 riding on the pressing block 97 receives an upward urging force from the pressing block 97. By the process cartridge 7 being urged outwardly by the pressing block 97, the upper guide abutting portion 7e abuts to an abutting portion 95a of the upper guide 95.

Figure 24:
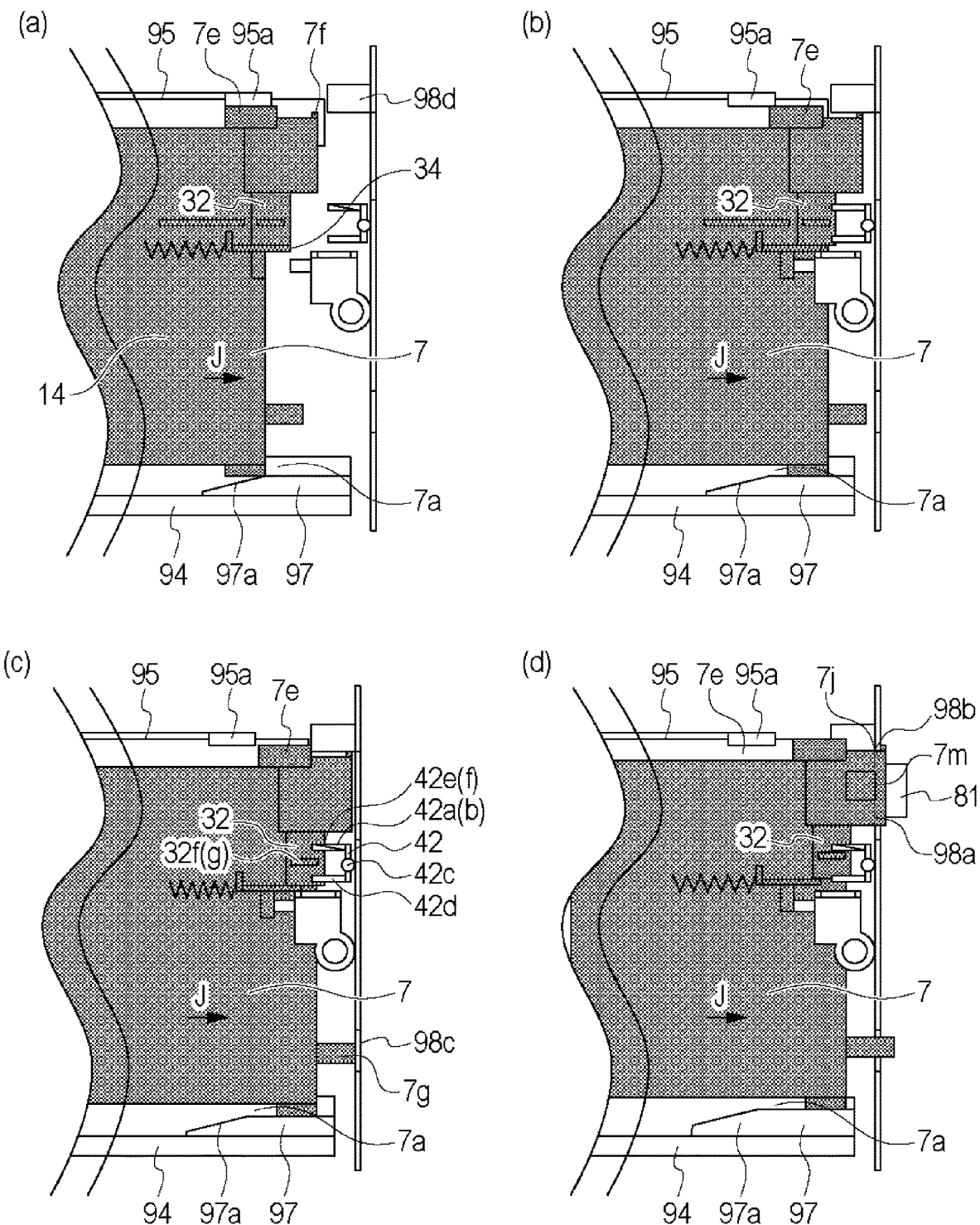
FIG. 24 is a schematic view illustrating movement of the process cartridge to the completion of insertion to the rear side of the main assembly in the embodiment.

Referring to FIGS. 21 and 24, the mounting state of the process cartridge 7 after riding on the pressing block 97 will be described.

FIG. 24 is a schematic view illustrating the movement of the process cartridge 7 up to the completion of the insertion to the rear side of the main assembly. As shown in part (a) of FIG. 24, the process cartridge 7 is inserted in the state that the upper guide abutting portion 7e thereof is in abutment to the contact surface 95a of the upper guide 95. As shown in part (b) of FIG. 24, the process cartridge 7 moves until the vertical abutting portion 7f abuts to the upper part limiting portion 98d of the main assembly rear side plate 98.

Supposing that in the abutment state between the upper guide abutting portion 7e and the vertical abutting portion 7f, the process cartridge 7 is further moved to the rear side. In such a state, the vertical abutting portion 7e is disengaged from the abutting portion 95a of the upper guide 95. As shown in part (c) of FIG. 24, only the vertical abutting portion 7f moves in contact with the upper part limiting portion 98d.

At this time, the upper guide abutting portion 7e enters a hole portion 95b provided in the rear side of the upper guide 95 with respect to the mounting direction so that it is supported only in the direction perpendicular to the mounting direction (left-right direction). At this time, the shaft 7g of the process cartridge 7 is inserted into the elongate hole portion 98c of the rear side plate 98 of the main assembly 100.

Then, arm contact portions 32f and 32g, which is a projected wall portion of the residual toner connecting member 32, are inserted below the contact portions 42a, 42b of the arm 42 supported by the rear side plate 98 (part (c) of FIG. 24).

The free ends of the contact portions 42a, 42b of the arm 42 provided with tapers 42e, 42f, respectively, so that the arm contact portions 32f, 32g of the residual toner connecting member 32 are assuredly introduced. In the process of mounting of the process cartridge 7 and at the time of completion of the mounting thereof, the arm 42 and the residual toner connecting member 32 are spaced from each other.

When the process cartridge 7 is further inserted into the main assembly 100, the development coupling 37 starts to engage with the main assembly development input coupling 82. With further insertion, the vertical abutting portion 7f is disengaged from the abutting portion 98d and is raised upwardly by the urging force of the pressing block 97. Simultaneously, by the pressure of the pressing block 97, the shaft 7j of the positioning is brought into the abutment to V-shaped groove portion 98b in the upward direction.

Thereafter, the contact portion 7i of the process cartridge 7 abuts to the voltage application member 83, which is an elastic electroconductive material. In addition, the recording contact 84 of the main assembly 100 is brought into contact to the chip 33 as the storing element of the process cartridge 7.

Then, the drum coupling 1c of the process cartridge 7 contacts the drum input coupling 81 of the main assembly 100 to push it out in the direction of the arrow J against the force of the urging member (unshown) of the drum input coupling 81.

Thereafter, the longitudinal abutting portion 7m of the process cartridge 7 abuts to the abutting portion 98a of the rear side plate 98 of the main assembly, by which the movement in the mounting direction is completed. In this state, the process cartridge 7 is urged by the pressing block 97 in the rear side with respect to the mounting direction, and the pressing portion 7b is on the pressing block 96 in the front side with respect to the mounting direction (part (d) of FIG. 21, and part (d) of FIG. 24).

As described in the foregoing, the lower guide 94 has a configuration such that it rises with the insertion of the cartridge. Therefore, as shown in part (d) of FIG. 21, in the state of complete insertion of the process cartridge 7 (abutted state), the process cartridge 7 is inclined with the rear side with respect to the mounting direction being higher (approximately 0.6°).

(Shutter Operation when Mounted)

Figure 18:
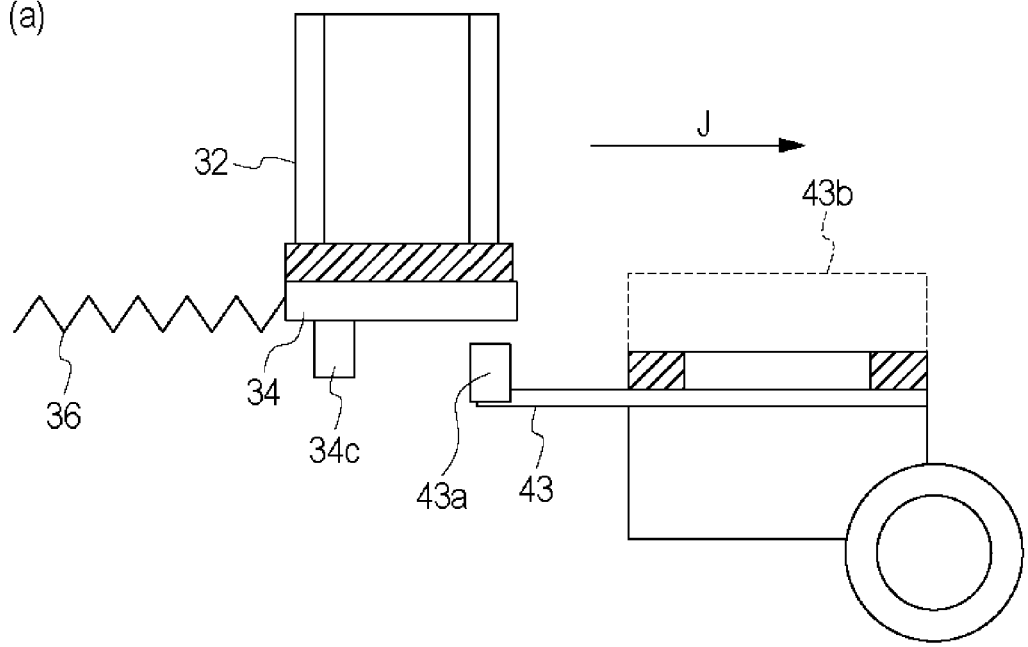
FIG. 18 is a sectional view illustrating motion of the shutter for the residual toner discharging portion at the time of mounting into the main assembly of the apparatus, in the embodiment.
Figure 18:
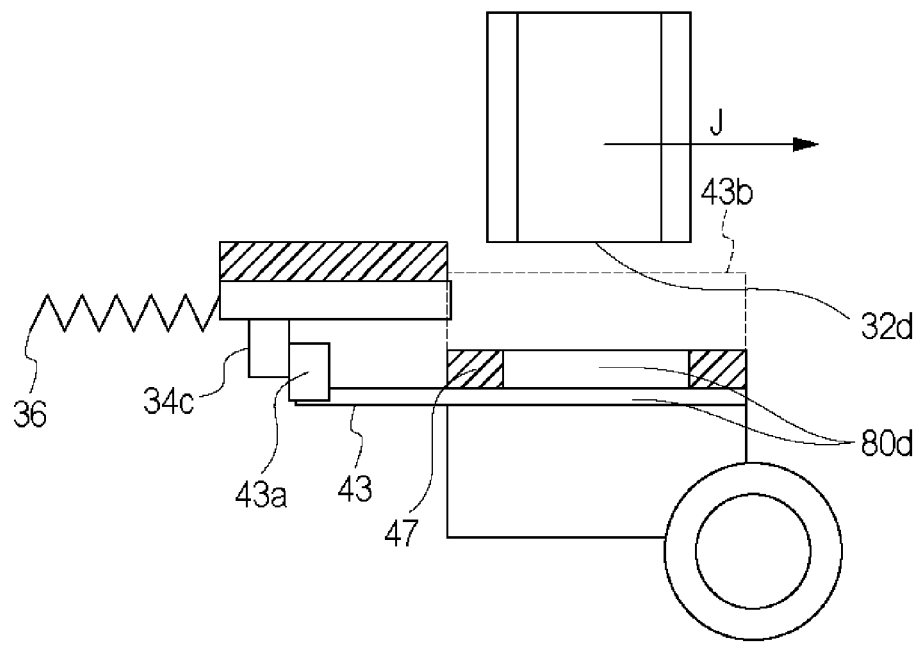

Referring to FIGS. 18 and 24, the movement of the shutter 34 until the abutment of the process cartridge 7 will be described.

FIG. 18 is a schematic view illustrating the movement of the shutter 34 at the time of mounting to the main assembly. As shown in part (a) of FIG. 24, when the cartridge further moves in the state that the upper guide abutting portion 7e abuts to the abutting portion 95a of the upper guide 95, the shutter 34 passes above the shutter contact portion 43a of the main assembly 100 as shown in FIG. 18.

As shown in part (a) of FIG. 18, the lower portion of the shutter 34 is provided with a projected main assembly contact portion 34c. After the shutter 34 rides over the shutter contact portion 43a, the main assembly contact portion 34c is abutted by the shutter contact portion 43a. Then, with the further insertion of the process cartridge into the main assembly, the shutter 34 moves relatively in the direction opposite to the mounting direction in the process cartridge 7 against the urging force of the shutter urging member 36 provided in the cleaning frame. Furthermore, when the process cartridge 7 is inserted into the main assembly abutment position which will be described hereinafter, the residual toner discharging portion 32d is completely opened as shown) in FIG. 18, by which the relative movement in the process cartridge 7 is completed.

Here, by the main assembly contact portion 34c contacting the shutter contact portion 43a, the shutter 34 is moved toward the front side (arrow J) in the process cartridge 7 in accordance with the mounting operation to the main assembly 100. The main assembly contact portion 34c is disposed upstream of the residual toner discharge opening 32d with respect to the mounting direction. Therefore, when the shutter 34 starts to be moved by the shutter contact portion 43a in the process cartridge, the spring stopper 43 having the shutter contact portion 34 is present in a part of the region below the residual toner shutter 34.

Therefore, when the process cartridge 7 is mounted in the state that the residual toner is in the second feeding passageway 61, the removed toner flows through the residual toner discharge opening 32d, at the time of the shutter 34 starting to be apart from the discharge opening 32d. At this time, the residual toner falls downward to the spring stopper 43. The spring stopper 43 is provided with falling prevention wall 43b for preventing the residual toner from entering the main assembly 100. By this, the scattering of the residual toner in the main assembly 100 is reduced.

(Front Door Opening and Closing and Cartridge Up and Down Movement)

Referring to FIG. 21, a mechanism of the positioning the cartridge in interrelation with the opening and closing of the front door 91 of the image forming apparatus will be described. The image forming apparatus is provided with a space for accommodating the cartridge. The user can access the space (accommodating portion) for accommodating the cartridge by opening the front door 91 which is a part of the outer casing of the image forming apparatus.

When the front door 91 of the main assembly 100 is closed, the cartridge lower guide 94 is moved upwardly by a link mechanism (unshown) with the movement of the front door lower guide 91a (part (e) of FIG. 21)

Then, with the movement of the cartridge lower guide 94, the process cartridge 7 receives the upward urging force from the pressing blocks 96 and 97. In this manner, the urging force which abuts the rear side shaft 7j of the process cartridge 7 to the V-shaped groove portion 98b provides the abutment of the process cartridge 7 with respect to the direction perpendicular to the mounting direction. Furthermore, by the urging force provided by the pressing block 96 in the front side with respect to the mounting direction, the front side abutment shaft 7k is abutted to the V-shaped groove portion 99a which is the abutment of the front side plate 99 with respect to the direction perpendicular to the mounting direction (part (e) of FIG. 21).

In the above-described the manner, the process cartridge 7 is positioned relative to the main assembly 100 by the V-shaped groove portion 98b, the elongate hole portion 98c and the V-shaped groove portion 99a with respect to the direction perpendicular to the mounting direction. By further closing the main assembly front door 91, the link mechanism (unshown) moves the drum drive input coupling 81 to the engageable position in the process cartridge 7 side.

When the drum drive input coupling 81 is rotated by the motor (unshown), a groove portion 81a of the drum drive input coupling 81 is connected with the coupling portion 1c of the photosensitive drum 1 in the rotational moving direction. By closing the main assembly front door 91, a cartridge retaining portion 46 provided in the rear side of the main assembly is raised by the link mechanism (unshown) (part (e) of FIG. 21).

The raising retaining portion 46 enters the groove configuration of the retaining portion 7h of the process cartridge 7. By this, the movement of the process cartridge 7 toward the front side with respect to the mounting direction is limited.

(Operation of Residual Toner Connecting Member)

Referring to FIG. 16, the movement of the residual toner connecting member at the time when the front door 91 of the main assembly 100 is closed will be described. FIG. 16 is a sectional view illustrating the operation of the residual toner connecting member with the opening and closing of the front door.

In the rear side of the image forming apparatus 100 with respect to the mounting direction, the arm 42 is provided rotatable by the link mechanism (unshown) in interrelation with the main assembly front door 91. The residual toner connecting member 32 of the process cartridge 7 is provided with the arm contact portions 32f, 32g contactable to the arm of the main assembly 100, the arm contact portions 32f, 32g projecting in the direction perpendicular to the mounting direction. The contact portions 42a, 42b of the arm 42 are disposed such that the contact portions 42a, 42b are below the arm contact portions 32f, 32g in the state that the process cartridge 7 is in abutment to the rear side plate 98 of the main assembly 100.

When the process cartridge 7 abuts in the mounting direction, the contact portions 42a, 42b of the arm 42 are overlapped with the arm contact portions 32f, 32g of the residual toner connecting member 32 by approximately 4 mm in the mounting direction. The arm 42 is rotatable about an axis of the arm rotation shaft 42c that is rotatably supported by the supporting holes 98e, 98f of the rear side plate 98. With the closing operation of the front door of the main assembly 100, the arm 42 is rotated in the direction of the arrow M by approximately 42° about the axis of the arm rotation shaft 42c by a link mechanism (unshown) connected with the cartridge lower guide 94.

With the rotating operation of the arm 42, the arm 42 abuts to the arm contact surfaces 32f, 32g of the residual toner connecting member 32. The residual toner connecting member 32 is moved to a connecting position (first position) in the main assembly toner receiving opening 80d side (arrow N direction). In this embodiment, the residual toner connecting member 32 moves in the direction of the arrow N by approx. 7.7 mm by the rotating operation of the arm 42. In this manner, the residual toner connecting member 32 pushed down by the arm 42 enters the residual toner receiving opening 80d of the main assembly 100 by approximately 4 mm.

As described hereinbefore, the residual toner connecting member 32 is urged substantially upwardly by the coupling spring 31. In this embodiment, the spring portion 31 as the urging member is a tension spring having a wire diameter of approximately Φ0.3 mm and an outer diameter of approximately Φ5.1 mm. In the state of non-connection with the main assembly 100, the urging force is approximately 30 gf, and in the connected state with the main assembly residual toner receiving opening 80d, the urging force is approximately 70 gf. Therefore, the arm 42 receives the upward force of approximately 70 gf in the closed state of the main assembly front door 91.

9. [Driving Connection of the Residual Toner Discharging Portion]

Referring to FIGS. 1, 5, 7, 15 and 16, the driving connection of the residual toner discharging portion will be described. FIG. 1 is a perspective view illustrating a connecting method between the residual toner discharging portion 23d and the main assembly residual toner receiving opening 80d.

(Drive Connecting Operation)

As described hereinbefore, the main assembly 100 is provided with the residual toner receiving opening 80d for receiving the discharged toner from the process cartridge 7. The residual toner connecting member 32 entering the residual toner receiving opening 80d in accordance with the closing operation of the front door of the main assembly 100 compresses the spring coupling 44 downwardly (entering direction into the residual toner connection opening.

In addition, the spring coupling 44 abuts to the second coupling member 30 in the residual toner connecting member 32 with an urging force. The abutting second coupling member 30 rotates in interrelation with the rotation of the photosensitive drum 1, so that the groove portion 30b of the second coupling member 30 is brought into engagement with the coupling portion 44b of the spring coupling 44 in the rotational moving direction.

The residual toner fed from the residual toner discharge opening 32d of the process cartridge 7 into the first feeding passageway 80a falls into the first main assembly feeding passageway 80d or is fed by the feeding force of the spring coupling 44 to the feeding fin 45.

The feeding fin 45 is provided with the feeding portion 45b having a screw blade configuration (FIG. 15). By the rotation of the feeding fin 45 in the direction of the arrow T, the residual toner brought to the feeding fin 45 is fed into the second main assembly feeding passageway 80b. Thereafter, the residual toner is fed in the direction of the arrow R by the feeding force of the main assembly feeding screw 85. Then, the residual toner is fed and collected into the residual toner box 86.

With the above-described structure, the residual toner is fed while the driving connection is being established.

As shown in FIG. 7, the moving direction of the residual toner connecting portion 32 toward the main assembly residual toner receiving opening 80d is indicated by the arrow N which is opposite to the riding direction at the time of mounting of the process cartridge 7 to the main assembly. With such a structure, the process cartridge 7 is prevented from shifting in the direction perpendicular to the mounting direction.

FIG. 7 is a schematic view as seen from the rear side of the main assembly 100, illustrating a movement range of the process cartridge 7 in the direction perpendicular to the mounting direction and in the moving direction of the residual toner connecting member 32. As shown in FIG. 7, the riding direction of the process cartridge 7 is perpendicular to the mounting direction, and therefore, a passage in the main assembly 100 is large enough to avoid the interference.

Therefore, the space for permitting the movement of the residual toner connecting member 32 in the riding direction can be easily assured. On the hand, with respect to the direction perpendicular to the riding direction in the plane perpendicular to the mounting direction, there are adjacent process cartridges 7, and it is therefore difficult to move the residual toner connecting member 32. For this reason, it is desirable to move the residual toner connecting portion 32 in the riding direction of the process cartridge 7 from the standpoint of downsizing of the entirety of the main assembly 100.

In this embodiment, the residual toner connecting portion 32 is moved in the riding direction of the process cartridge 7 (the direction perpendicular to the mounting direction of the cartridge).

Figure 25:
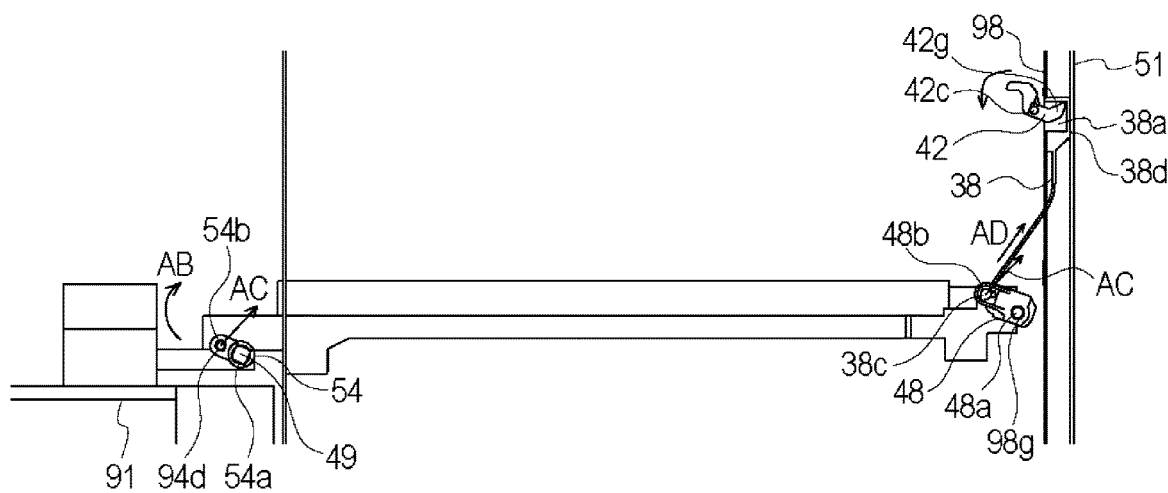
FIG. 25 is a schematic sectional view of an arm and a link structure of a front door.
Figure 25:
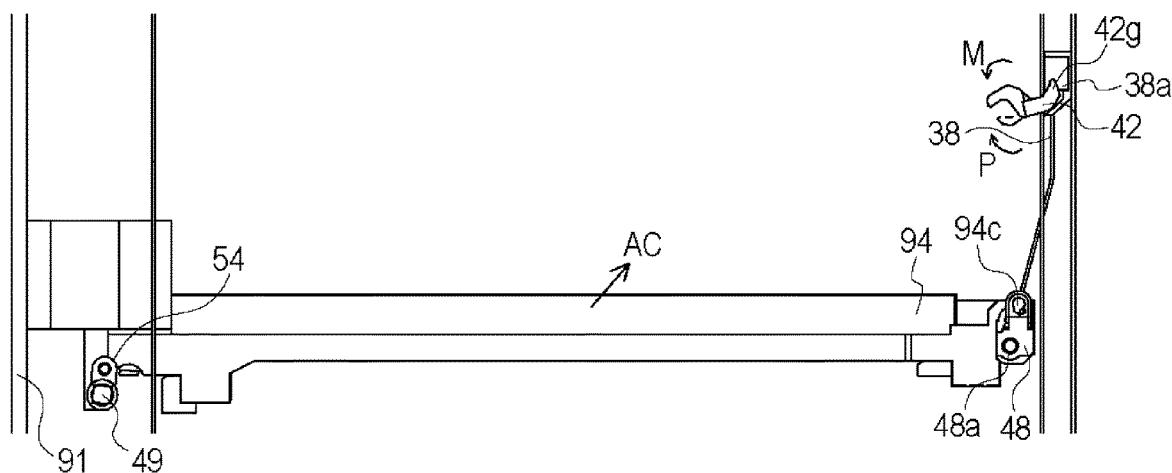

Referring to FIGS. 25, 26, 27, and 28, a description will be made as to the opening and closing operation interrelating mechanism of the arm 42 with the front door 91. FIG. 25 is a schematic view illustrating the interrelated movement between the arm 42 and the front door 91. Part (a) of FIG. 25 shows the state when the front door is open, and part (b) of FIG. 25 shows the state when the front door is closed.

Figure 26:
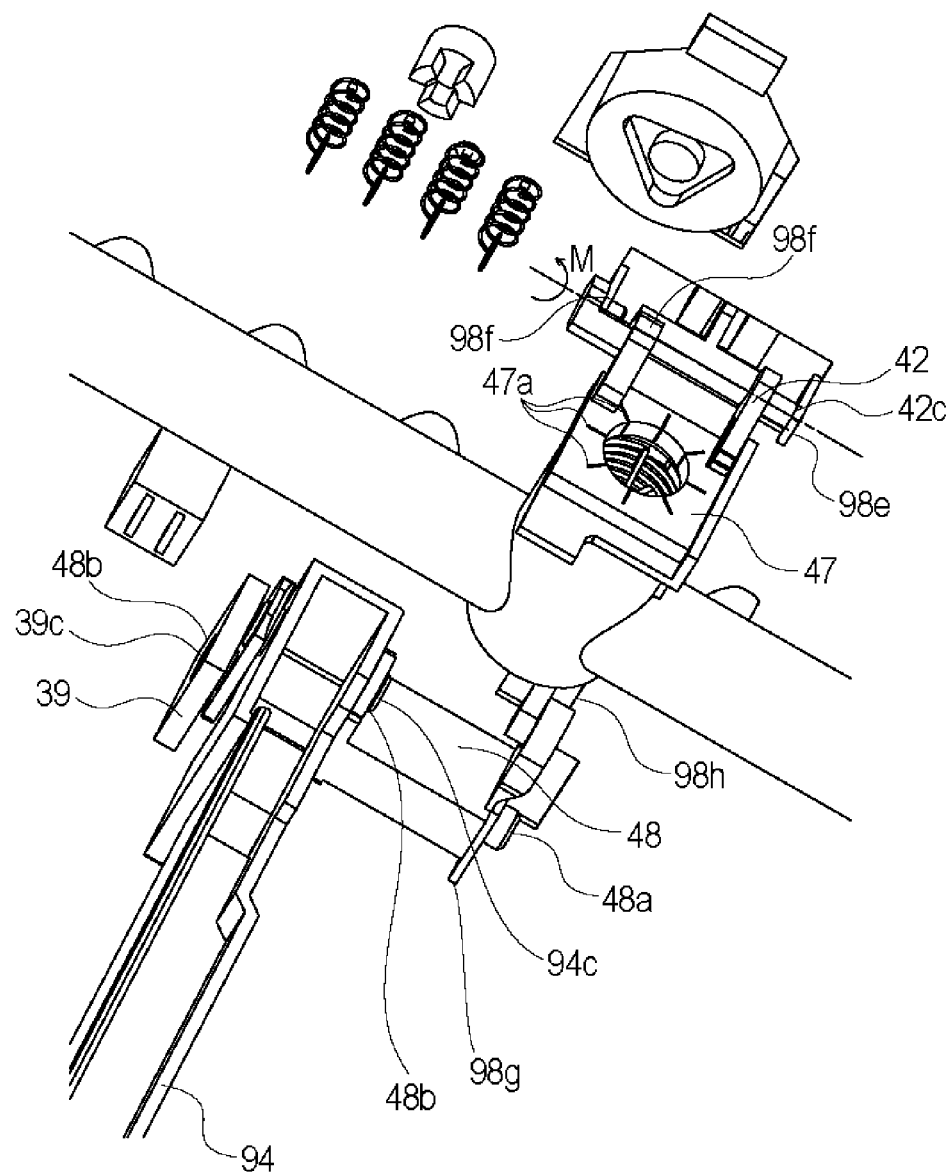
FIG. 26 is a perspective view illustrating a support structure for the front door link part in the rear side with respect to the mounting direction in the embodiment.
Figure 27:
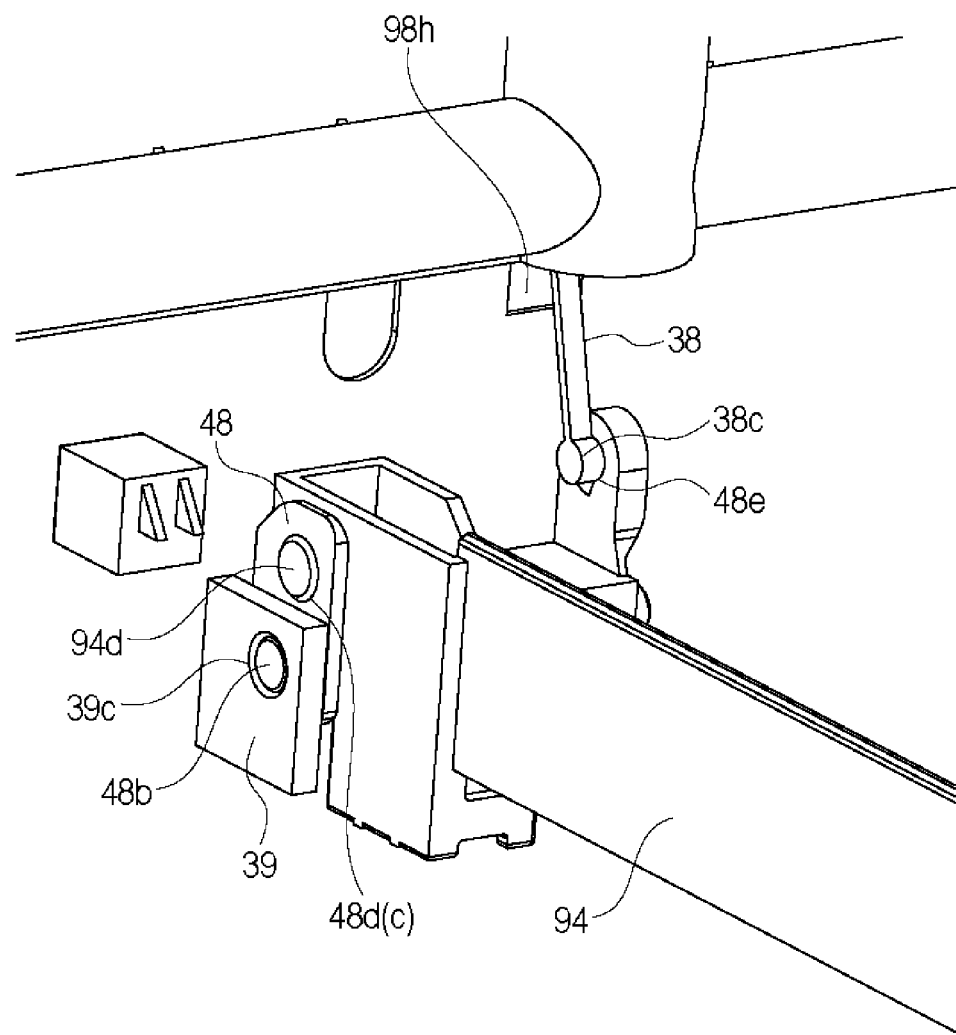
FIG. 27 is a perspective view of a support structure for the front door link part of the rear side with respect to the mounting direction, as seen in another direction, in the embodiment.
Figure 28:
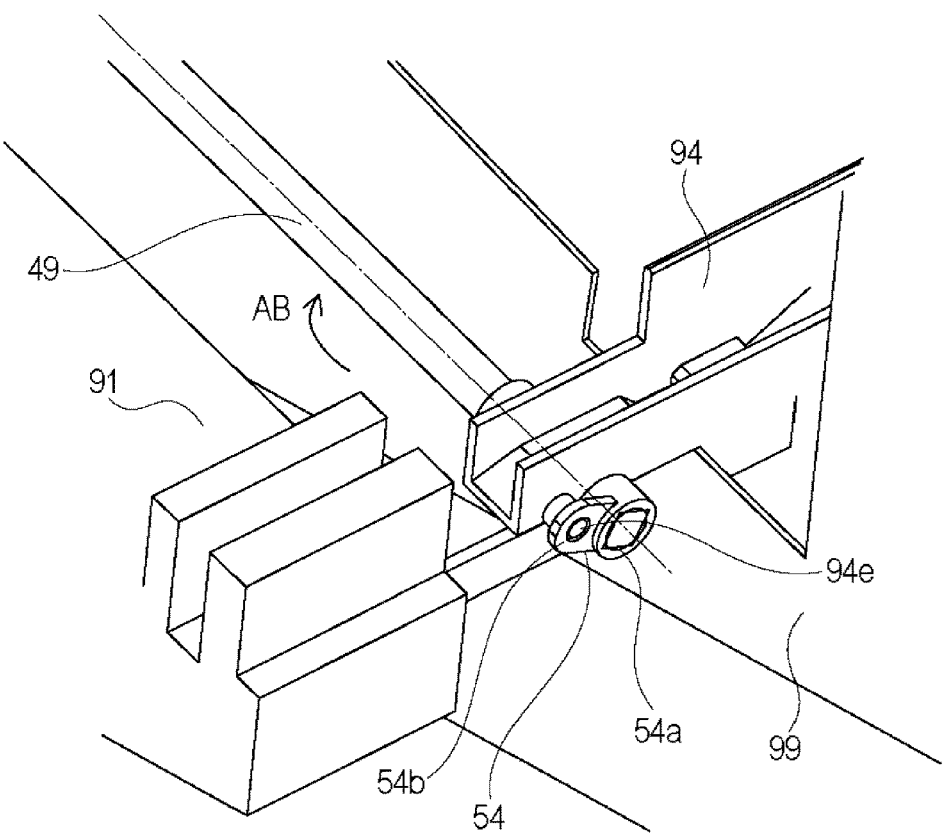
FIG. 28 is a perspective view illustrating the support structure of a front door link part of a front side with respect to the mounting direction at the time when the front door is open, in the embodiment.

FIG. 26 is a perspective view illustrating a supporting structure for the front door link part provided in the rear side of the main assembly with respect to the mounting direction. FIG. 27 is a perspective view illustrating the supporting structure for the front door link part provided in the rear side of the main assembly with respect to the mounting direction, and seen in another direction. FIG. 28 is a perspective view illustrating the supporting structure for the front door link part provided in the rear side of the main assembly with respect to the mounting direction, when the front door is open.

As shown in FIG. 26, the rotation shaft 42c of the arm 42 is rotatably supported by the arm supporting holes 98e, 98f of the rear side plate 98 at a constant angle.

The rear side plate 98 is provided with an engaging hole 98g for supporting an engagement shaft 48a of the link rotating member 48. The rear side plate 98 is provided with a supporting member 39 for supporting the engagement shaft 48a of the rink rotating member 48, and the supporting member 39 is mounted to the rear side plate 98 using a screw or the like. The supporting member 39 is provided with an engaging hole 39c for supporting an engagement shaft 48b of the rink rotating member 48.

The engagement shafts 48a and 48b of the rink rotating member 48 are rotatably supported by the engaging hole 98g and the engaging hole 39c. As shown in FIG. 28, in the front side of the main assembly 100 with respect to the mounting direction, there is provided a rotation shaft 49 rotatable in interrelation with the front door 91 and a supporting member 54 engaged with and movable with the rotation shaft 49. The supporting member 54 is engaged with the rotation shaft 49 in the engaging portion 54a, and is supported so as to be rotatable in the same direction. The engagement shafts 94c, 94d of the cartridge lower guide 94 are rotatably supported by the engaging holes 48c, 48d of the rotatable member 48 in the rear side with respect to the mounting direction. In the front side with respect to the mounting direction, the engagement shaft 94e is supported by an engaging hole 54b of the supporting member 54.

In addition, the rotatable member 48 is provided with a lever engaging hole 48e that engages with and supports the supporting portion engagement shaft 38c of the arm link lever 38. The arm link lever 38 has an elasticity in the bending direction. In addition, the deformation of the arm link lever 38 in the extending direction is small, although the deformation in the bending direction is possible. As shown in FIG. 25, the arm link lever 38 penetrates a through-hole portion 98h of the rear side plate 98 while an end thereof is supported by the rotatable member 48, and is mounted to the second rear side plate 51 while the movement in the mounting direction by the limiting portion 38d is limited.

As shown in part (a) of FIG. 25, an arm engagement shaft 42g of the arm 42 is engaged with a hole portion 38a of the arm link lever 38 and is positioned in the rotational moving direction (arrow M direction) of the rotation shaft or rotational axis 42c.

(Link Mechanism in Interrelation with Front Door)

Referring to part (b) of FIG. 25, the closed state to the front door 91 will be described.

By rotating the front door 91 in a direction indicated by an arrow AB by approximately 90°, the rotation shaft 49 interrelated with the front door 91 is rotated by 90° in the direction of the arrow AB. By the rotation of the rotation shaft 49, the supporting member 54 engaged with the rotation shaft 49 is rotated integrally about the axis of the rotation shaft 49 in the direction of the arrow AB. By the rotation of the supporting portion 54, the engagement shaft 94e of the cartridge lower guide 94 engaged with the supporting portion 54 is moved in a direction indicated by an arrow AC (toward the upper right side in the Figure. With this movement, a rear side engagement shaft 94c of the cartridge lower guide 94 supported by the link rotating member 48 is also moved in the direction of the arrow AC about the engaging portion 48a of the link rotating member 48. Therefore, the entirety of the lower guide moves in the direction of the arrow AC. The link rotating member 48 having rotated with the movement of the cartridge lower guide 94 in the direction of the arrow AC pushes the arm link lever 38 supported by the engaging holes 48b, 48c in the direction of an arrow AD. The arm link lever 38 pushed in the direction of the arrow AD is moved in the direction of the arrow AD by the engaging hole portion 38a engaged with the arm engagement shaft 42g of the arm 42. By the arm engaging portion 42g being pushed up, the arm 42 is rotated in the direction of the arrow M by approximately 42°. In this manner, the engaging portion 42g rotates the arm 42 in interrelation with the opening and closing of the front door 91.

With the above-described structure, the moving direction of the hole portion 38a of the arm link lever 38 is perpendicular to the axis of the arm rotation shaft or rotational axis 42c of the arm 42. Therefore, the hole portion 38a can stably receive the rotational motion of the arm caused by the movement of the arm link lever 38. Furthermore, the movement of the arm link lever 38 is perpendicular to the rotation shaft 48a of the link rotating member 48. Therefore, it can receive the movement of the rotation shaft 48a of the link rotating member 48 in the rotational moving direction.

In addition, the link rotating member 48 is provided by the movement of the cartridge lower guide 94 in the direction of the arrow AC. With the above-described structure, it is desirable that the rotational axis direction of the arm 42 is perpendicular to the moving direction of the cartridge lower guide 94 indicated by the arrow AC. To accomplish this, the moving direction of the cartridge lower guide 94 and the moving direction of the residual toner connecting member 32 of the process cartridge 7 are substantially the same.

Furthermore, the cartridge lower guide 94 urges the process cartridge 7 in the direction indicated by the arrow AD by a pressing block (unshown). Here, the urging direction to the process cartridge 7 from the main assembly 100 is substantially the same as the moving direction of the residual toner connecting member 32. Therefore, the residual toner connecting member 32 can be stably moved. When the toner is used up, the process cartridge 7 is removed from the main assembly 100 so as to be exchanged.

The residual toner connecting member 32 is rotated in interrelation with the closing operation of the front door 91 by the arm 42, so that it is pushed down. The position to which it is pushed down by the arm is called the connecting position (first position). When the main assembly front door 91 is opened for the purpose of removing the process cartridge 7, the arm portion 42 is rotated in the direction indicated by an arrow P in interrelation with the movement of the front door. As shown in FIG. 16, the arm 42 rotated in the direction of the arrow P is contacted by a second contact portion 32h of the residual toner connecting member 32 and the push-up portion 42d, so that the residual toner connecting member 32 is pushed up to an upper non-connecting position (retracted position, second position).

Thereafter, the residual toner connecting member 32 and the push-up portion 42d of the arm 42 are disengaged, and the residual toner connecting member 32 receives the urging force of the coupling spring 31 through the second coupling member 30 to move upward. Thereafter, the residual toner connecting member 32 is raised to the retracted position (non-connecting position, second position). The line connecting the connecting position and the retracted position crosses with the cartridge mounting direction.

The cartridge lower guide 94 in moves down in interrelation with the main assembly front door 91. At this time, as described hereinbefore, the process cartridge 7 is inclined by approximately 0.6 degree with the rear side with respect to the inserting direction taking an upper position.

Thereafter, process cartridge 7 is supported in the opposite order to that in the case of the mounting, and is taken out of the main assembly 100. With the above-described structure of the residual toner discharging portion 40 with respect to the longitudinal direction and in the direction perpendicular thereto, the discharge opening connecting portion does not project out of the process cartridge, thus accomplishing downsizing the process cartridge. In addition, also when the residual toner discharge opening and the main assembly discharging container are separated from each other, the residual toner can be discharged without toner clogging.

Furthermore, by the main assembly feeding fin 45 rotating by the driving force from the process cartridge 7, no drive transmission in portion for the toner feeding passageway in the main assembly is required. For this reason, a drive transmission in the toner particles in the main assembly 100 which has a longer service life than the consumable process cartridge 7 is eliminated, and therefore, scraping or the like of the drive transmitting portion caused by the toner particles can be reduced, thus accomplishing stable residual toner feeding.

Figure 30:
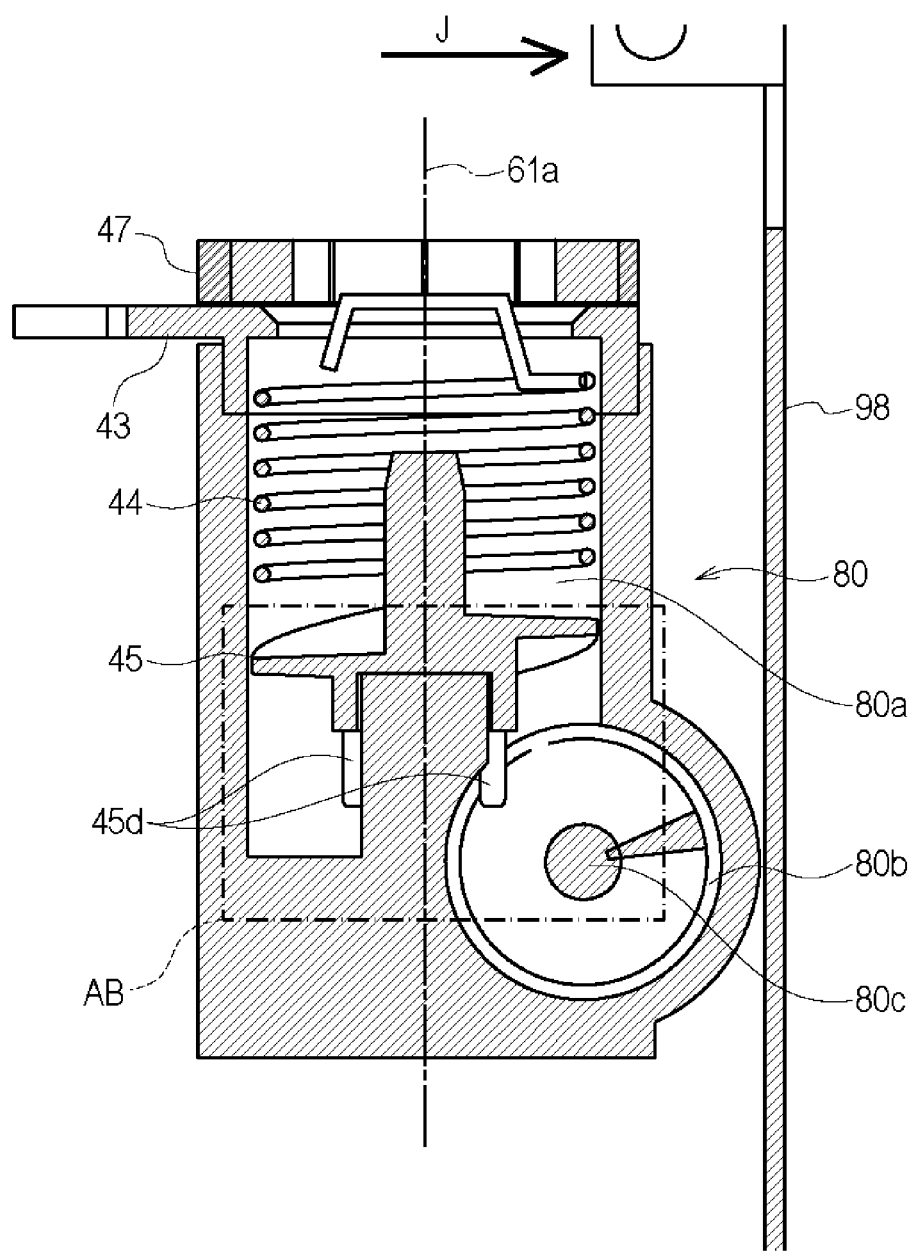
FIG. 30 is a sectional view illustrating drive transmission to a feeding fin in another example in the embodiment.

By the provision of the main assembly drive transmission pin 45d, the drive transmission to the feeding fin 45 in the main assembly 100 can be effected from the toner feeding screw 26, as shown in FIG. 30, for example. However, the main assembly feeding screw 80c is disposed in the back side of the main assembly, as shown in FIG. 5, and is positioned at the opposite end portions (unshown) of the feeding passageway 80b. Therefore, it is thought that the main assembly feeding screw 80c is greatly influenced by the flexure relative to the feeding fin 45, and the drive transmission is not stabilized. On the contrary, with the above-described structure of this embodiment, the driving force can be transmitted stably from the process cartridge 7 to the main assembly 100.

The structure of this embodiment is summarized in the following.

As shown in FIG. 3, the cartridge 7 of the embodiment includes the photosensitive drum 1 and the cleaning member (cleaning blade 6) for removing the toner from the photosensitive drum 1.

As shown in FIG. 4, the toner removed by the cleaning blade 6 is fed in the first feeding passageway 51 by the feeding screw 26 which is the cartridge side feeding member into the second feeding passageway 61.

As shown in FIG. 1 and FIG. 11, the cartridge 7 is provided with the connecting member 32. The connecting member 32 is provided with the residual toner discharging portion (discharge opening) 32d. The connecting member 32 is a movable connecting portion for connecting the discharge opening 32d to the toner receiving opening 80d provided in the main assembly.

That is, as shown in part (a) of FIG. 1, in the free state of the cartridge 7 (no external force is applied to the cartridge 7), the connecting member 32 is in the non-connecting position not connecting with the toner receiving opening 80d. On the other hand, when the moving force receiving portion (arm contact portions 32f, 32g)) of the connecting member 32 receives the force from the arm 42 of the main assembly, the connecting member 32 is moved to the connecting position shown in part (b) of FIG. 1. As a result, the discharge opening 32d is connected with the toner receiving opening 80d.

As will be evident from parts (a) and (b) of FIG. 1, the connecting member 32 deforms the toner discharging passageway (second feeding passageway 61) by moving. That is, by the movement of the connecting member 32, the toner discharging passageway is expanded and contracted. By the connecting member 32 moving to the connecting position, the discharging passageway is expanded (part (b) of FIG. 1), and by the connecting member 32 moving to the non-connecting position, the discharging passageway is contracted (part (a) of FIG. 1).

In addition, as shown in as shown in FIG. 1, the second coupling member 30 is provided in the terminal end side of the toner discharging passageway (second feeding passageway 61).

The second coupling member 30 is a member for transmitting the driving force (rotational force) from the inside of the cartridge 7 to the outside. That is, the second coupling member 30 transmits the rotational force to the feeding fin 45 and the spring coupling 44 (FIG. 13) which are the main assembly side feeding member provided in the image forming apparatus. Here, the second coupling member 30 moves with the movement of the connecting member 32.

That is, when the connecting member 32 is in the connecting position (part (b) of FIG. 1), the second coupling member 30 moves to the first position (transmitting position, connecting position) by the force received by the arm contact portions 32f, 32g from the arm 42 of the main assembly, as shown in part (b) of FIG. 7. The second coupling member 30 placed in the first position is capable of transmitting the driving force to the feeding fin 45 and the spring coupling 44.

On the other hand, when the arm contact portions 32f, 32g do not receive the force, the second coupling member 30 (in the free state) is retracted to the second position (non-transmitting position, non-connecting position, retracted position, part (a) of FIG. 1). At this time, the second coupling member is no longer connected with the spring coupling 44.

The second coupling member 30 is disposed adjacent to the toner discharge opening 32d (FIG. 1). The words "adjacent to the discharge opening 32d" means the range in which the second coupling 30 is capable of connecting with the spring coupling 44 when it is moved from the second position to the first position. It will suffice if the second coupling member 30 is disposed at a position engageable with the spring coupling 44.

In this embodiment, at least a part of the second coupling member is disposed when it is in the second position in the toner discharging passageway defined by the second feeding passageway 61 and the connecting member 32.

The second coupling member 30 is urged toward the second position by the urging member (coupling spring 31, FIG. 9). Therefore, the second coupling member 30 is moved to the first position against the force of the coupling spring 31 only when the arm contact portions 32f, 32g receive the force from the arm 42 of the main assembly.

The second coupling member 30 is movable relative to the photosensitive drum 1 or the feeding screw 26. In other words, the second coupling member 30 is moved away from the axis of the photosensitive drum 1 (the distance from the axis increases) by moving from the second position to the first position. Similarly, the second coupling member 30 moves away from the axis of the feeding screw 26 (the distance from the axis increases) by moving from the second position to the first position.

The direction of the movement of the second coupling member 30 between the first position and the second position crosses with the axial directions of the photosensitive drum 1 and the feeding screw 26 (arrows I, N directions in FIG. 7).

More particularly, in this embodiment, the second coupling member 30 moves in the direction substantially perpendicular to the axial direction.

In other words, the second coupling member 30 moves along the axial direction of the second coupling member 30 per se (center line 61a, FIG. 7). That is, the second coupling member 30 moves so as to displace in the axial direction of the second coupling member 30.

In addition, the moving direction of the coupling member 30 crosses with the mounting direction of the cartridge 7 to the main assembly (inserting direction, arrow J direction in FIG. 6). In this embodiment, the coupling member 30 moves in the direction substantially perpendicular to the mounting direction. Therefore, in the process of mounting the cartridge 7 to the main assembly, the second coupling member 30 is capable of retracting to the position (second position) where it does not interfere with the main assembly. On the other hand, after the completion of mounting of the cartridge 7, the second coupling member 30 can move to the first position where it is capable of connecting with the main assembly side feeding member of the main assembly.

In other words, as shown in FIG. 1, the second coupling member 30 moves in the direction along the second feeding passageway 61 (along the toner moving direction through the second feeding passageway 61).

As shown in FIG. 12, the driving force (rotational force) received by the coupling portion 1c from the main assembly of the image forming apparatus is transmitted to the second coupling member 30 by way of the photosensitive drum 1 and the feeding screw 26. Therefore, the second coupling member 30 is rotated in interrelation with the photosensitive drum 1 and the feeding screw 26.

Embodiment 2

A second embodiment will be described about a structure of a shutter.

Figure 31:
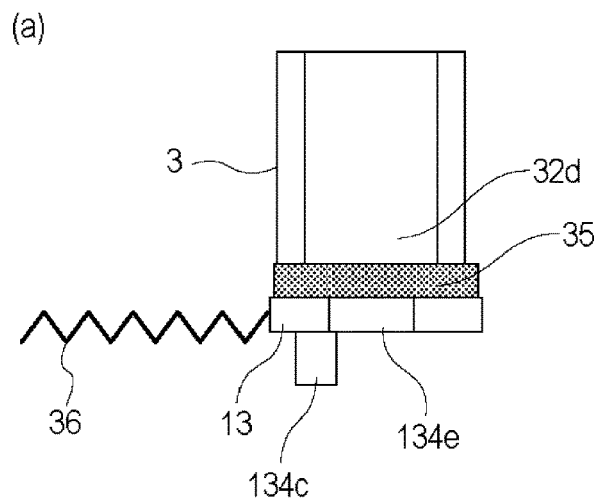
FIG. 31 is a sectional view illustrating the state in which the residual toner discharging portion is closed by the shutter, according to Embodiment 2 of the present invention.
Figure 31:
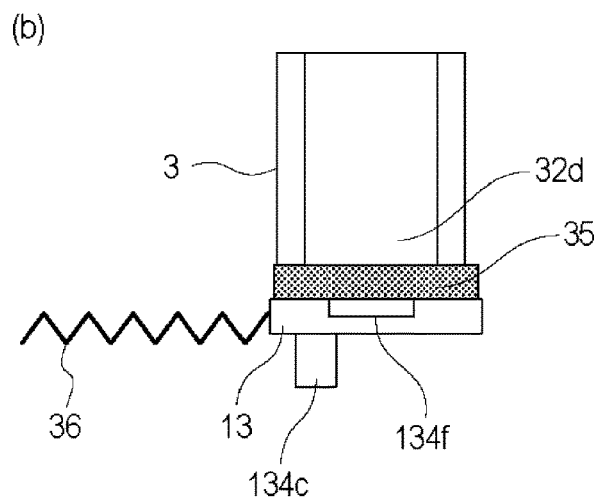
Figure 32:
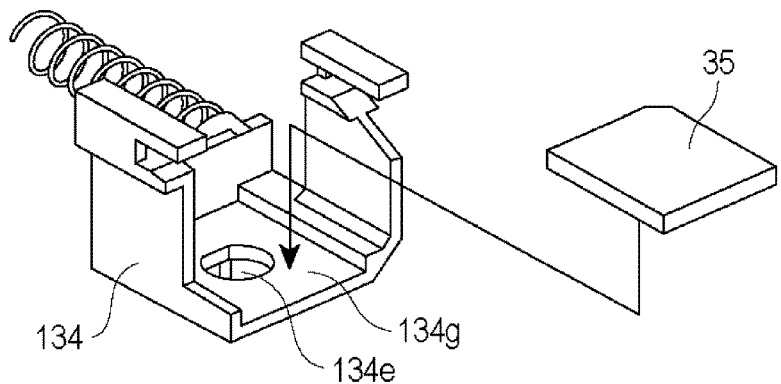
FIG. 32 is an exploded perspective views of a shutter and an elastic sealing member in Embodiment 2.
Figure 33:
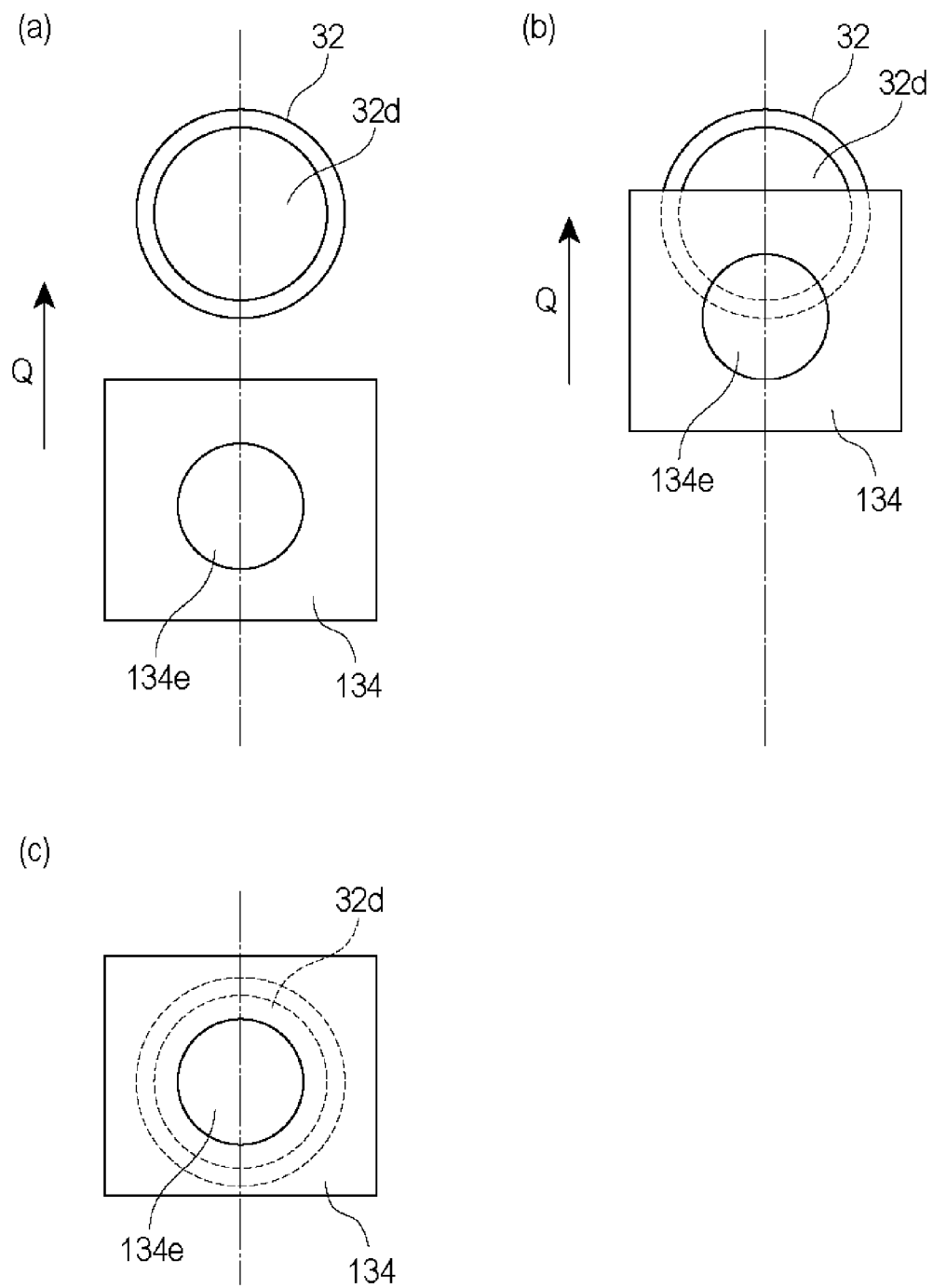
FIG. 33 is a schematic view of a relationship at the time when the shutter closes the residual toner discharging portion, as seen from the shutter, in Embodiment 2.

The structure of the shutter and the opening and closing operation of the shutter are similar to those of Embodiment 1. Referring to FIGS. 31, 32, and 33, a description will be made as to the structure of a seal of the shutter.

As shown in part (a) of FIG. 31 and FIG. 32, the shutter 134 is provided with a hole 134e at the position opposed to the residual toner discharging portion (discharge opening) 32d in the state in which the shutter 134 closes the residual toner discharging portion 32d of the residual toner connecting member 32.

The shutter 134 is provided with an elastic sealing member (sealing member) 35 similar to Embodiment 1. The elastic sealing member 35 is the seal portion for sealing the discharge opening 32d by contacting to the discharge opening 32d when the shutter 134 is closed.

A combination of the elastic sealing member 35 and the shutter 134 may be called a shutter member (openable member) as the case may be. In such a case, the shutter 134 is called seal supporting portion for supporting the elastic sealing member 35.

The hole 134e is an opening or a cut-away portion formed in the shutter 134. The hole 134e is a non-contact portion by which the shutter 134 does not contact the elastic sealing member 35.

The elastic sealing member 35 has elasticity, and therefore, is deformable. When the shutter 134 is closed, the elastic sealing member 35 is sandwiched between the edge of the discharge opening 32d and the shutter 134, by which it is deformed. Thus, the elastic sealing member 35 is closely contacted to the edge of the discharge opening 32d while being compressed by the shutter 134, and therefore, the leakage of the toner from the discharge opening 32d can be assuredly suppressed.

On the other hand, because the elastic sealing member 35 contacts the edge of the discharge opening 32d while being compressed, a certain frictional force is produced between the elastic sealing member 35 and the discharge opening 32d. Corresponding to the frictional force, the force required for opening and closing the shutter 134 becomes large.

Under the circumstances, the shutter 134 is provided with the hole 134e, by which when the shutter 134 is opened and closed, the frictional force produced between the elastic sealing member 35 and the edge of the discharge opening 32d can be reduced by the amount corresponding to the area of the hole 134e.

The elastic sealing member 35 is not pressed by the shutter 134 in the area opposed to the hole 134e. Therefore, even when the elastic sealing member 35 is compressed by a certain amount by being sandwiched between the edge of the discharge opening 32d and the shutter 134, a repelling force of the elastic sealing member 35 is reduced in the area where the hole 134e is provided.

As a result, in the area where the hole 134e is provided, the frictional force is small even when the elastic sealing member 35 contacts the edge of the discharge opening 32d.

Thus, the force (load) required for opening and closing the shutter 134 is reduced, and therefore, the shutter 134 can be opened and closed by a relatively light force. For this reason, the load on the user to mounting the cartridge is reduced, and the force of the urging member (spring or the like) required for closing the shutter 134 can be reduced.

Referring to FIG. 33, the state in which the shutter 134 closes the residual toner discharging portion (discharge opening) 32*d* (moves in the direction of an arrow Q) will be described.

Part (a) of FIG. 33 illustrates the state in which the shutter 134 closes the residual toner discharging portion 32*d*. Part (b) of FIG. 33 illustrates a state in which the shutter 134 passes the residual toner discharging portion 32*d*. Part (c) of FIG. 33 shows the state in which the shutter 134 closes the residual toner discharging portion 32*d*.

As described hereinbefore, the shutter 134 is provided with the hole 134*e*, which is covered with the elastic sealing member 35.

As shown in part (b) of FIG. 33, in the process of the shutter 134 moving in the direction of the arrow Q, the hole 134*e* passes by the residual toner discharging portion 32*d*. At this time, the edge (broken line portion) of the residual toner discharging portion (discharge opening) 32*d* is the area comprising the elastic sealing member 35.

On the other hand, in the area of the hole 134*e* of the shutter 134, the repelling force of the elastic sealing member 35 is relatively small. When the hole 134*e* of the shutter 34 passes by the residual toner discharging portion 32*d*, the frictional force between the elastic sealing member 35 and the edge of the residual toner discharging portion 32*d* reduces. As a result, the load for closing the shutter 134 can be reduced. In addition, also when the shutter 134 is moved from the closed position to the open position, the same effects can be provided. By the structure, the opening and closing of the shutter 134 is smooth, thus assuring the stability of the opening and closing operation.

The hole 134*e* is smaller than the size of the residual toner discharging portion 32*d*, and the hole 134*e* is placed inside the residual toner discharging portion 32*d*.

That is, as the residual toner discharge opening 32*d* is projected onto the shutter 134 in the state that the shutter 134 is closed, the entirety of the hole 134*e* is within the projection area of the discharge opening 32. In the state that the shutter 134 is closed, the hole 134*e* does not overlap the projection area of the residual toner discharging portion 32*d*.

Therefore, in the state that the shutter 134 is closed, the close contact between the elastic sealing member 35 and the residual toner discharging portion (discharge opening) 32*d* can be assured, and therefore, the sealing property of the elastic sealing member 35 can be assured. That is, when the shutter 134 is closed, the hole 134*e* is not disposed in the area of the edge of the residual toner discharging portion 32*d*. In the area of the residual toner discharging portion 32*d* provided, the elastic sealing member 35 is pressed by the shutter 134. In other words, the elastic sealing member 35 is pressed against the edge of the residual toner discharging portion 32*d* by the shutter 134 closely contacting the edge of the residual toner discharging portion 32*d*.

As described hereinbefore, the frictional force between the elastic sealing member 35 and the edge of the residual toner discharging portion 32*d* is decreased during the movement of the shutter 134, and the close contact between the elastic sealing member 35 and the edge of the residual toner discharging portion 32*d* is assured when the shutter 134 is closed. In this embodiment, the opening and closing operation property of the shutter can be improved, while assuring the sealing property.

In addition, in the case of the positional relation of the same size as the hole 134*e*, the similar effects can be provided by replacing the hole 134*e* with a recess 134*f* (as shown in part (b) of FIG. 31) on the shutter 134. The recess 134*f* is recessed in the direction away from the sealing member 35. In part (b) of FIG. 31, a gap (space, clearance) is provided between the recess 134*f* and the elastic sealing member 35. However, the present invention is not limited to the structure of the recess 134*f*, a certain degree of the effects can be provided even if the elastic sealing member 35 contacts to the bottom of the recess 134*f*. That is, a certain degree of the effects of the smoothness in the opening and closing of the shutter 134 is achieved if the contact pressure between the shutter 134 and the elastic sealing member 35 is reduced in the portion where the recess 134*f* is provided.

In summary, when the hole 134*e* or the recess 134*f* is provided in the shutter 134, the force received by the sealing member 35 from the shutter 134 is reduced in the area where they are provided. When the shutter 134 is opened and closed, the frictional force between the sealing member 35 and the edge of the residual toner discharging portion 32*d* is reduced in the area of the hole 134*e* or the recess 134*f*. As a result, the shutter 134 can be smoothly opened and closed. The hole 134*e* and the recess 134*f* are low pressure portions where the contact pressure between the sealing member 35 and the shutter 134 is lower than the other area.

Embodiment 3

Figure 34:
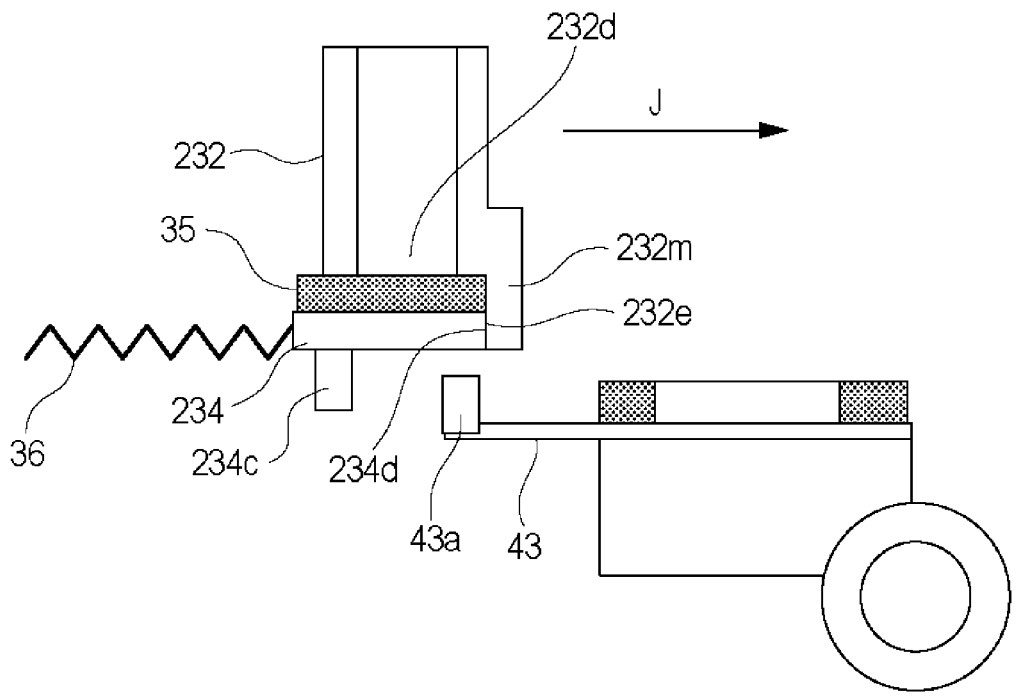
FIG. 34 is a sectional view illustrating motion of the shutter for the residual toner discharging portion at the time of mounting into the main assembly of the apparatus, according to Embodiment 3.
Figure 34:
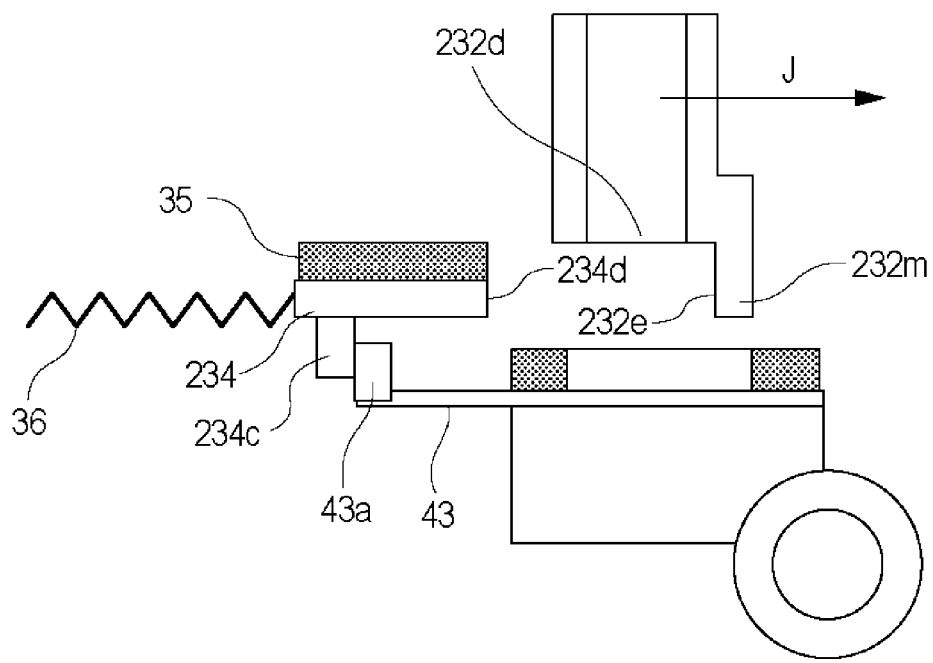
Figure 35:
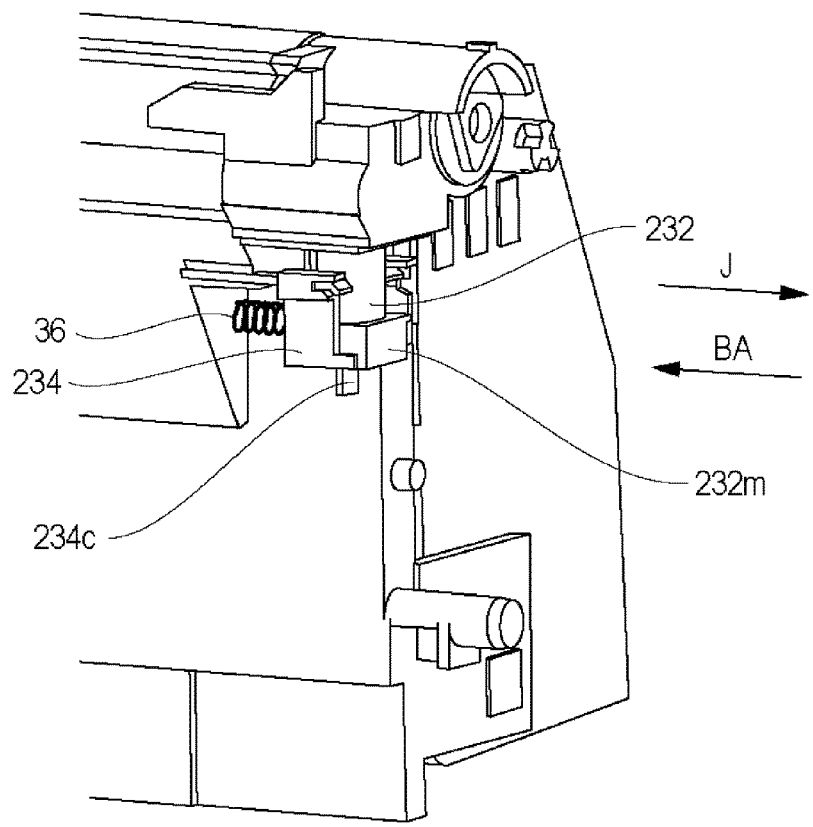
FIG. 35 is a perspective view illustrating a positional relation between the residual toner connecting member and the shutter in Embodiment 3.
Figure 36:
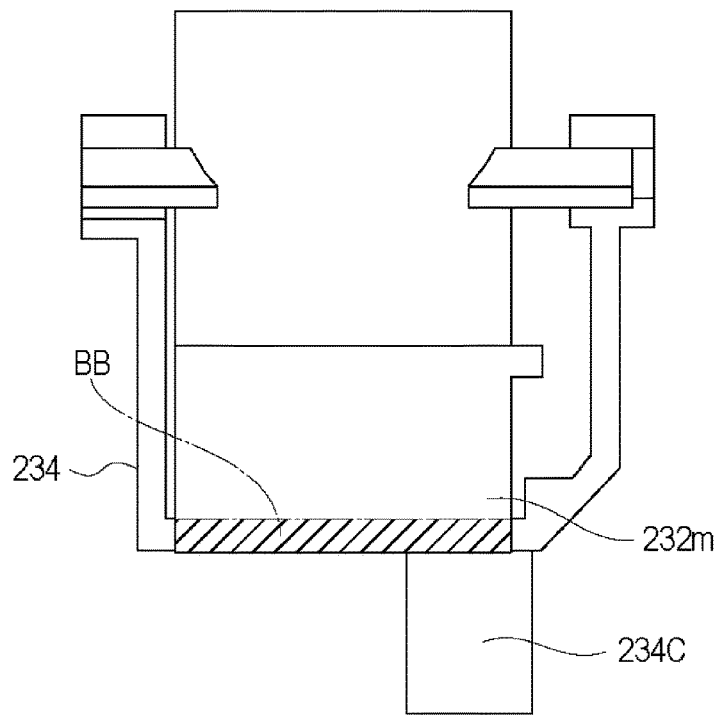
FIG. 36 is a side view illustrating a positional relation between a wall portion of the residual toner connecting member and the shutter in Embodiment 3.

In this embodiment, the structures are similar to the structures of the foregoing embodiments, and therefore, the description will be made as to the portions different from foregoing embodiments. The materials, shapes and so on are similar to those of the foregoing embodiments unless otherwise stated particularly. The description will be omitted about such portions. Referring to FIGS. 34, 35 and 36, Embodiment 3 of the present invention will be described. FIG. 34 is a schematic view illustrating motion of the shutter 234 in the mounting to the main assembly, and FIG. 35 is a perspective view illustrating a positional relationship between the shutter and the residual toner connecting member. FIG. 36 is a schematic view illustrating a positional relationship between the residual toner connecting member 232 and the shutter 234.

As shown in FIG. 34, the residual toner connecting member 232 is provided with a wall portion 232*m* in the form of a projection at the position downstream of the discharge opening 232*d* with respect to the process cartridge mounting direction (arrow J direction). In other words, the wall portion 232*m* is provided at the position downstream of the discharge opening 232*d* with respect to the closing direction of the shutter 234. When the shutter 234 is closed, the free end (abutting portion 234*d*) of the shutter 234 contacts the wall portion 232*m*.

The wall portion 232*m* is a projection (projected portion, cover portion) projecting in a direction crossing with the shutter 234 closing direction. More particularly, the wall portion 232*m* projects toward the downstream side with respect to the toner discharging direction through the discharge opening 232*d*.

In addition, the wall portion 232*m* is provided downstream of the main assembly contact portion (urged portion)

234c with respect to the direction of the arrow J (process cartridge mounting direction, shutter (234) closing direction).

The residual toner connecting member 232 is provided with an abutting portion 232e on a side surface of the wall portion 232m adjacent to the discharge opening 232d. The downstream side surface of the shutter 234 with respect to the direction of the arrow J (process cartridge mounting direction, shutter closing direction) is provided with a discharge opening abutting portion 234d. As shown in FIG. 35, the shutter 234 is urged in the mounting direction (arrow J direction) of the process cartridge by an urging member 36 provided on the cleaning frame 14. By this, in the state before the process cartridge is mounted to the main assembly, the discharge opening abutting portion 234d of the shutter 234 is abutted to the abutting portion 232e of the residual toner connecting member 232, as shown in part (a) of FIG. 34. By this, in the state in which the discharge opening 232d is closed, the position of the shutter 234 is determined.

FIG. 36 is a side view of the residual toner connecting member 232 as seen from the downstream side with respect to the opening direction of the shutter 234 (direction of arrow BA in FIG. 35). As shown in FIG. 36, the wall portion 232m of the residual toner connecting member 232 is disposed so as to overlap with a part of the shutter 234 in an area BB. More particularly, as the shutter 234 is projected onto the wall portion 232m in the closing direction of the shutter 234, at least a part (BB) of the projection area of the shutter 234 overlaps with at least a part of the wall portion 232m.

In other words, as wall portion 232m is seen in the opening direction of the shutter 234, the wall portion 232m is overlapped with at least a part of the shutter 234 in the opening direction; as the wall portion 232m is seen in the opening direction of the shutter 234, the wall portion 232m covers at least a part of the shutter 234. By placing the wall portion 232m relative to the shutter 234, the shutter 234 is prevented from being touched by the user handling the process cartridge. That is, when the user pushes the shutter 234 in the opening direction, the users hand contacts the wall portion 232m before contacting the shutter 234. Therefore, inadvertent opening of the shutter 234 is prevented, thus reducing the residual toner discharging through the discharge opening 232d.

Namely, the wall portion (projection, projection, cover portion) 232m is a malfunction limiting portion suppressing the malfunction of the shutter 234. The configuration of the malfunction limiting portion is not limited to the wall configuration. For example, in place of the wall portion, a plurality of rod-like projections (projections) are usable. That is, the configuration of the malfunction limiting portion may be selected from various configurations if the unintended movement of the shutter 234 by the user can be suppressed.

However, the malfunction limiting portion in the form of a projection (wall portion) having a wall configuration as in this embodiment is advantageous as follows. More particularly, if the malfunction limiting portion includes the wall portion 232m, the movement of the toner which may scatter due to the closing of the shutter 234 (wind pressure, vibration or the like) may be blocked by the wall portion 232m. That is, the wall portion 232m is effective to suppress scattering of the toner around the discharge opening when the shutter 234 is closed.

In order to suppress the scattering of the toner, the area BB (area of the shutter 234 covered by the malfunction limiting portion, FIG. 36) desirably has a certain width (a dimension in the longitudinal direction). For example, it is desirable that the width of the area BB is larger than the width of the discharge opening 232d.

Figure 37:
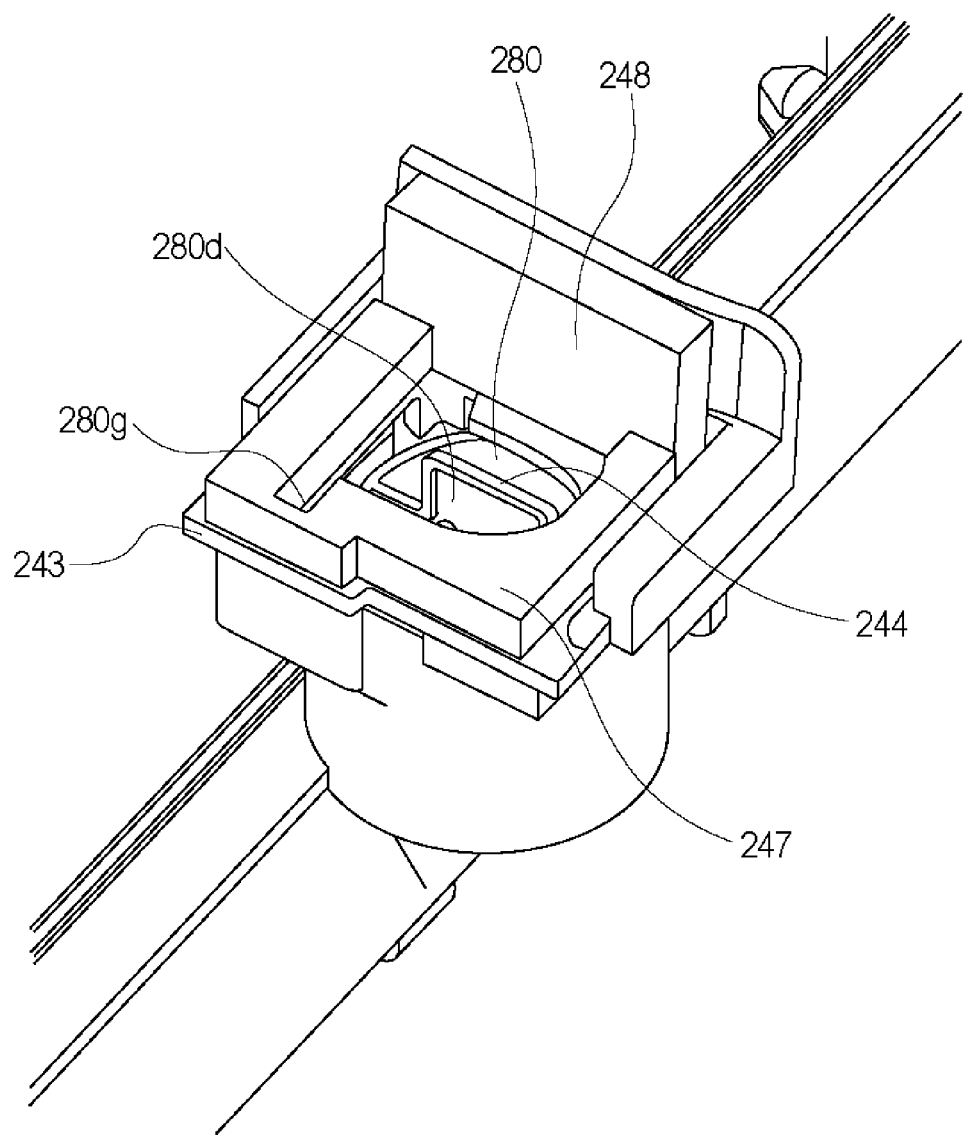
FIG. 37 is an outer appearance illustrating a main assembly structure according to Embodiment 3.
Figure 38:
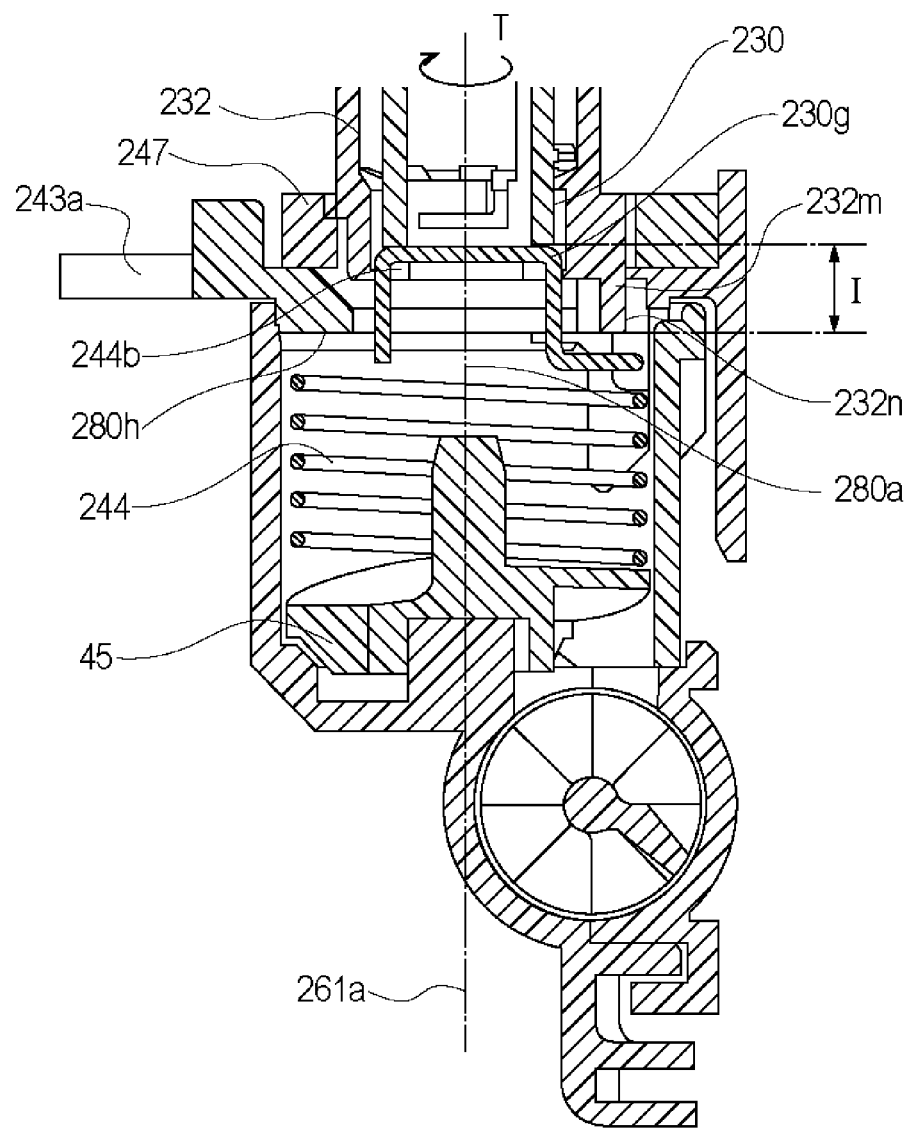
FIG. 38 is a sectional view illustrating engagement between the main assembly and the cartridge in Embodiment 3.
Figure 39:
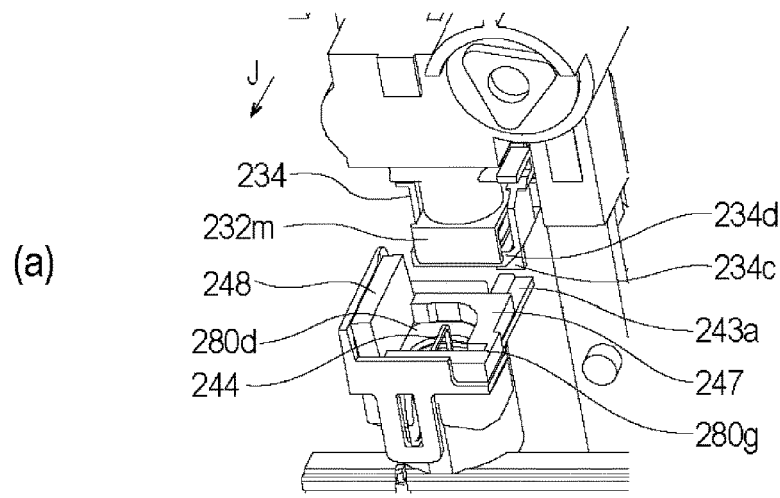
FIG. 39 illustrates an inserting operation of the process cartridge in Embodiment 3.
Figure 39:
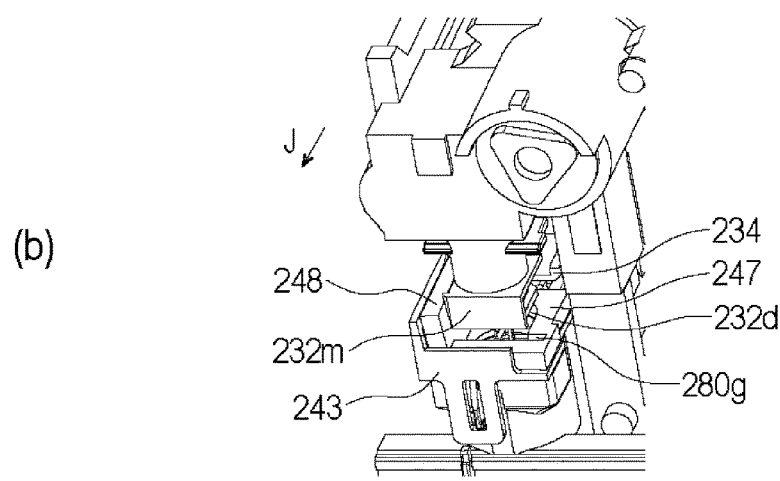
Figure 39:
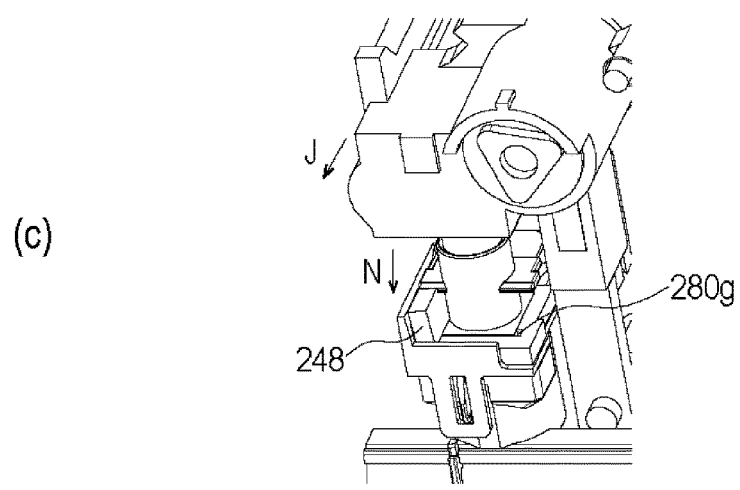

Referring to FIGS. 37, 38, and 39, the configuration of a connecting portion between the process cartridge 7 and the main assembly 100 will be described.

FIG. 37 ilustrates an outer appearance of a structure of the main assembly in this embodiment.

FIG. 38 is a sectional view illustrating the engagement between the cartridge and the main assembly in this embodiment.

FIG. 39 is an illustration of insertion mounting of the process cartridge.

As shown in FIG. 38, the residual toner connecting portion 232 of this embodiment is provided with the wall portion 232m as described above. As shown in FIG. 37, the receiving opening 280d of the main assembly is provided with a slit portion 280g for accepting the wall portion 232m in the mounting operation of the cartridge. In addition, the main assembly residual toner receiving opening 280d is provided with main assembly receiving opening sealing member 247 to cover the main assembly residual toner receiving opening 280d.

As shown in FIG. 37, adjacent to the main assembly receiving opening sealing member 247, there is provided a vertical sealing member 248 extending substantially perpendicular to the main assembly receiving opening sealing member 247.

The main assembly receiving opening sealing member 247 and the vertical sealing member 248 are flexible sealing members mounted on a spring stopper 243 by double coated tape or the like.

As shown in FIGS. 37 and 38, the first feeding passageway 280a of the main assembly 100 is provided with the spring coupling 244 and the feeding fin 45, similar to Embodiment 1.

Referring to FIG. 39, the mounting of the process cartridge 7 to the main assembly 100 and the connection of the connecting portion will be described.

As shown in FIG. 39, the process cartridge 7 is inserted into the main assembly 100 in the direction indicated by an arrow J. Similar to Embodiment 1, below the shutter 234, there is provided a main assembly contact portion 234c in the form of a projection. In addition, the spring stopper 243 is provided with a shutter contact portion 243a in the form of a projection engaged with the main assembly contact portion 234c, the shutter contact portion 243a projecting in the direction opposite to the direction of the arrow J.

When the process cartridge 7 is mounted in the direction of the arrow J, the abutting portion 234d of the shutter 234 rides over the shutter contact portion 243a. Thereafter, when the process cartridge 7 is further inserted into the main assembly 100, the main assembly contact portion 234c contacts to the shutter contact portion 243a. Thereafter, the shutter 234 is moved relative to the process cartridge 7 in the direction opposite to the mounting direction (arrow J direction) against the urging force of the shutter urging member 36 (unshown) (similar to Embodiment 1) provided in the cleaning frame, with the advancement of the process cartridge. In addition, when the process cartridge 7 is moved to the main assembly abutment position (part (b) of FIG. 39), the residual toner discharging portion 232d is completely released, thus completing the relative movement in the process cartridge 7.

Here, in the mounting to the main assembly 100, the shutter 234 is moved in the direction opposite to the mounting direction (arrow J direction) in the process cartridge 7, by the contact of the main assembly contact portion 234c to the shutter contact portion 243a. The main assembly contact portion 234c is disposed upstream of the residual toner discharge opening 232d with respect to the mounting direction. Therefore, when the shutter 234 starts to be moved by the shutter contact portion 243a in the process cartridge, the spring stopper 243 having the shutter contact portion 234 is present in part of the region below the residual toner shutter 234.

Therefore, if the process cartridge 7 is mounted in the state that the residual toner exists in the residual toner connecting portion 232, the shutter 234 starts to disengage from the residual toner discharge opening 232d, and therefore, the removed toner flows out through the discharge opening 232d. At this time, the residual toner falls downward to the spring stopper 243. The spring stopper 243 is provided with vertical sealing member 248 extending in the falling direction to prevent the residual toner from falling into the main assembly 100.

In the insertion of the process cartridge 7, the residual toner connecting portion 232 is in contact with the vertical sealing member 248 of the main assembly 100. As described hereinbefore, the vertical sealing member 248 is elastic, so that the residual toner connecting portion 232 is being inserted while deforming the vertical sealing member 248. Therefore, the wall (vertical sealing member 248) for limiting the falling direction of the residual toner can be placed close to the residual toner discharge opening 232d, and therefore, the falling of the residual toner into the main assembly 100 outside of the spring stopper 243 in the main assembly is suppressed. By this, the scattering of the residual toner in the main assembly 100 is reduced.

Thereafter, similar to Embodiment 1, by closing the front door (unshown) of the main assembly 100, the residual toner connecting portion 232 of the process cartridge 7 is inserted into the main assembly residual toner receiving opening 280d in the direction indicated by an arrow N by an arm 42 (unshown) (part (c) of FIG. 39).

As described hereinbefore, the main assembly residual toner receiving opening 280d is provided with the slit portion 280g.

The slit portion 280g is provided at the position where the wall 232m of the residual toner connecting portion 232 is inserted at the time when the residual toner connecting portion 232 is connected with the receiving opening 280d of the main assembly.

Therefore, the wall portion 232m of the residual toner connecting portion 232 can be connected with the interference with the main assembly residual toner receiving opening 280d.

Figure 40:
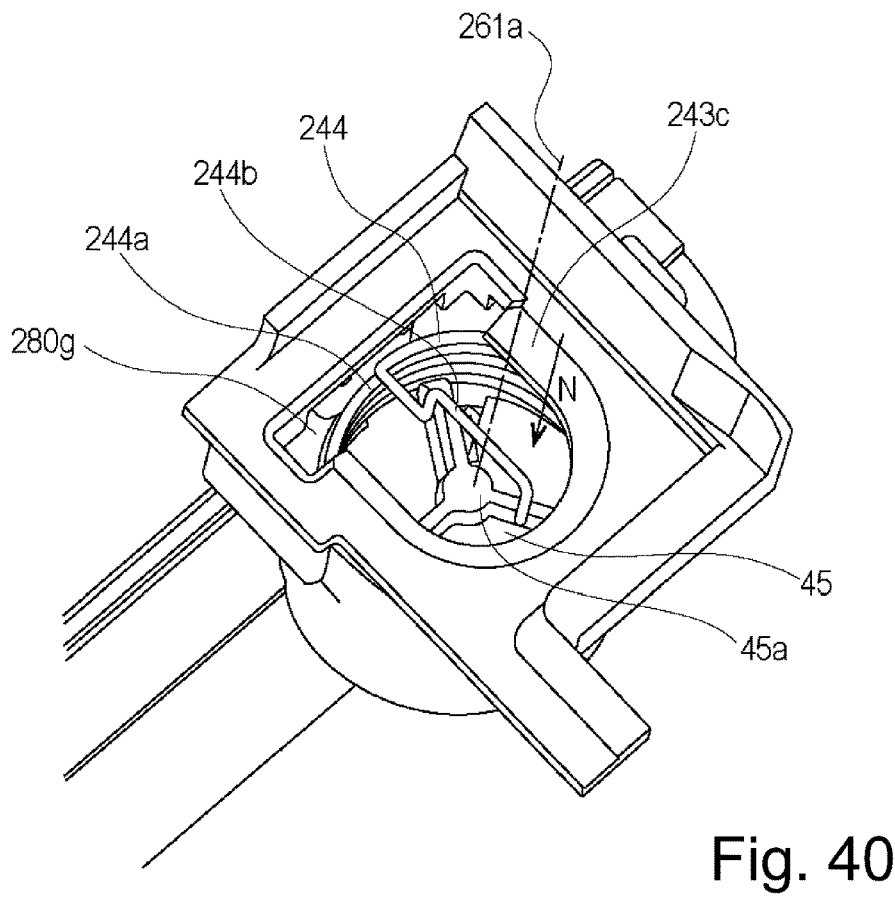
FIG. 40 is an outer appearance of a main assembly residual toner receiving opening in which a main assembly reception sealing member and a longitudinal seal are removed from a spring stopper in Embodiment 3.

Referring to FIG. 40, a description will be made as to a supporting structure for the spring coupling 244, and a configuration of the slit portion 280g of the main assembly residual toner receiving opening 280d. FIG. 40 shows an outer appearance of the main assembly residual toner receiving opening 280d with which the main assembly receiving sealing member 247 and the longitudinal seal 248 have been removed from the spring stopper 243.

Similar to Embodiment 1, the elastic spring coupling 244 in the first main assembly feeding passageway 280a is supported by abutting to the limiting surface 243c of the spring stopper 243 at the spring portion 244a, in the direction of the arrow N.

As shown in FIG. 40 the spring contact portion 243c is provided in a part of the circumference of the spring portion 244a with the slit portion 280g for accepting the wall portion 232m.

Therefore, the slit portion 280g is formed by cutting a part of the limiting surface 243c away to uncover a part of the spring coupling 244 in a diametrical direction. Therefore, the limiting surface 243c cannot cover the entire inner circumference of the spring portion 244a of the spring coupling 244.

However, the limiting surface 243c is large enough to cover the spring portion 244a in the radial direction. In this embodiment, the outer diameter of the spring is Φ15.3 mm, and the limiting surface 480h has a diameter of Φ10 mm.

Therefore, tilting of the spring coupling 244 in the engaging operation, and the disengagement from the limiting surface 243a are prevented. The size of the limiting surface 243c is dependent on the wire diameter, the outer diameter, the number of windings, and the spring pressure of the spring, but it will suffice if the range of the movement of the spring coupling 244 is limited.

Furthermore, similar to Embodiment 1, the spring coupling 244 is integral with the feeding fin 45 in the rotational moving direction. The feeding fin 45 is provided with a rotation shaft 45a that is fitted in a fin bearing portion 80e of a main assembly feeding member (unshown) (similar to Embodiment 1) to be rotatably supported. Thus, the spring coupling 44 is rotatable about an axis of the rotation shaft 261a. A combination of the spring coupling 244 and the feeding fin 45 is called main assembly side feeding member unless particularly stated to the contrary.

Referring to FIG. 38, a driving connection structure between the process cartridge 7 and the main assembly 100 at the residual toner connecting portion will be described.

As described hereinbefore, the residual toner connecting portion 232 is moved in the direction of the arrow N to be inserted into the receiving opening 280d of the main assembly 100. The wall portion 232m of the residual toner connecting portion 232 is inserted into the main assembly residual toner receiving opening 280d.

At this time, the spring coupling 44 of the main assembly 100 is abutted by the first coupling member 230 of the residual toner connecting member 232 with an urging force. The abutted first coupling member 229 is rotated in interrelation with the rotation of the photosensitive drum 1, similar to Embodiment 1. By this, a groove portion 229b of the first coupling member 229 is engaged with a coupling portion 244b of the spring coupling 244 in the rotational moving direction.

Here, when the residual toner connecting member 232 connects with the main assembly feeding portion 80, the coupling portion 244b of the spring coupling 244 may not engage with the groove portion 230b of the second coupling member 230 but may be pressed down to the projection 230h. In such a case, the first coupling member 230 rotates in the direction indicated by the arrow T while the coupling spring 244 is pressed against the projection 230h. When the second coupling member 230 rotates to the phase that the coupling portion 244b of the spring coupling 244 is engageable with the groove portion 230b, the spring couplings 244 and the second coupling member 230 engage with each other in rotational moving direction so as to be rotatable integrally with the feeding fin 45.

In this manner, the engagement is possible irrespective of the phase relation between the spring coupling 244 and the second coupling member 230.

Here, the spring couplings 244 is a compression spring having a wire diameter of approximately Φ0.6 mm and an inner diameter of approximately Φ12.3 mm. The spring coupling 244 provides the urging forces of approximately 33 gf in the state of abutting to the spring stopper 243 (uncoupled state) and approximately 50 gf in the connection state of the second coupling member 230.

Here, the spring portion 44a of the spring coupling 244 is wound in such a direction that a downward feeding force is produced to the residual toner by the rotation in the direction of the arrow T.

In the manner described in the foregoing, the driving force is transmitted from the process cartridge 7 to the main assembly 100.

The length of the coupling portion 244b measured in the axial direction (261a) is at least larger than a distance from a free end portion 232n of the wall portion 232m to the engaging portion 230g.

Therefore, in the state that the spring portion 244a of the spring coupling 244 is in engagement with the engaging portion 230g of the residual toner connecting portion 232, no interference with the wall portion 232m occurs.

In this embodiment, the distance 1 is 3.25 mm, and a height of the engaging portion of the second coupling member 230 is approximately 4.7 mm.

By this, the interference between the residual toner connecting portion 232 and the wall portion 232m can be avoided while assuring the engagement amount relative to the second coupling member 230.

With this structure as described in the foregoing, a stabilized drive connection with the main assembly can be provided by the structure including the residual toner connecting portion 232 according to Embodiment 3.

Embodiment 4

In this embodiment, the structures are similar to the structures of the foregoing Embodiment 1, and therefore, the description will be made as to the portions different from Embodiment 1. The materials, shapes and so on are similar to those of the foregoing Embodiment 1 unless otherwise stated particularly. The description of such portions will be omitted.

Figure 42:
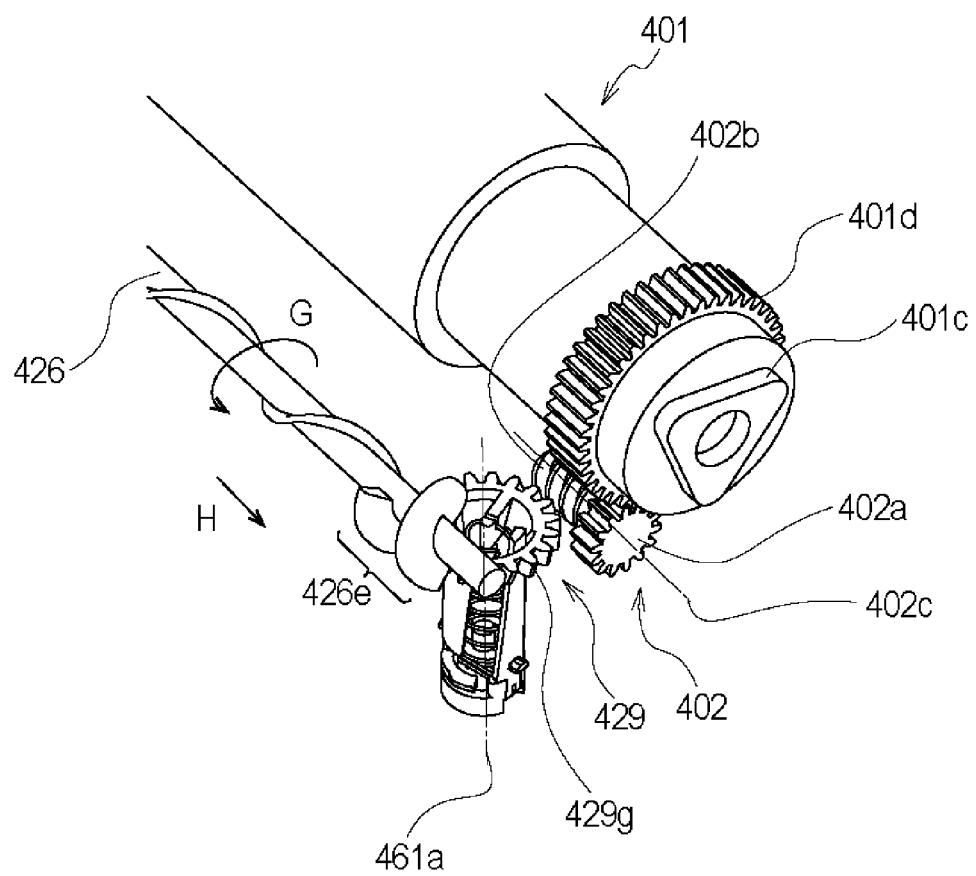
FIG. 42 is a schematic view illustrating a drive transmission structure for transmission from the feeding screw to a first coupling in Embodiment 4.

Referring to FIGS. 12, 23 and 42, the structure of the drive transmission of this embodiment will be described.

FIG. 42 is a schematic view illustrating the drive transmission from the feeding screw to the first coupling in this embodiment.

As shown in FIG. 42, the photosensitive drum 401 is provided at one end portion thereof with a coupling portion 401c for receiving a driving force from the main assembly 100. The other end thereof is provided with a photosensitive drum gear 401b for transmitting the driving force to the residual toner feeding screw 426, as will be described hereinafter.

Similar to Embodiment 1, the drum bearing 27L rotatably supports the idler gear 52 and the feeding screw gear 53 at one axial end of the photosensitive drum 401 (FIG. 12).

For driving transmission feeding screw gear 53 is engaged with the feeding screw 26. The rotational force is transmitted from a main assembly drum input coupling 81 (FIG. 23) of the image forming apparatus 100 to the coupling portion 401c at one end of the cleaning unit 13. The rotational driving force is transmitted from the photosensitive drum 401 to the feeding screw 426 by the sequential engagement of the photosensitive drum gear 401b, the idler gear 52 and the feeding screw gear 53. The residual toner accommodated in the residual toner accommodation chamber 14a is fed in the direction of the arrow H by the feeding screw portion 426a by the rotation of the feeding screw 426 in the direction of the arrow G.

At the downstream side end portion of the feeding screw 426 with respect to the residual toner feeding direction, the reverse screw portion 426e is provided. In addition, the reverse screw portion 426e is provided with a blade 426g (drive transmission is not effected). In this embodiment, the feeding screw 426 receives the driving force by the rotation of the photosensitive drum 401. However, the same effects can be provided by the structure in which the feeding screw 426 is driven in interrelation with the rotation of the developing roller 17, for example as in Embodiment 1.

Furthermore, as shown in FIG. 42, adjacent to the coupling portion 401c of the photosensitive drum 401, there is provided a second photosensitive drum gear 401d. A drum bearing 27R (unshown) supports a coupling idler gear 402 so as to be rotatable about an axis 402c. The coupling idler gear 402 is provided with a drum idler gear 402a at a position capable of driving force transmission with the second photosensitive drum gear 401d, and a worm gear 402b coaxial with the axis 402c of the drum idler gear 402a.

The coupling idler gear 402 is supported so as to be rotatable about axis 402c, by the drum bearing 27R (unshown).

Similar to Embodiment 1, adjacent to the reverse screw portion 426e of the feeding screw 426, a first coupling member 429 is provided so as to be rotatable about an axis 461a.

A supporting method for the first coupling member 429 is similar to that in Embodiment 1, and therefore, the description thereof is omitted.

The first coupling member 429 is provided with a gear portion 429g at the outer periphery of the supporting portion 429d. For drivinf connection, gear portion 429g is provided at the position suitable to be engaged with the worm gear 402b of the coupling idler gear 402.

The first coupling member 429 is a drive transmitting portion for transmitting the driving force from the photosensitive drum 401 to the second coupling member. Similarly, the coupling idler gear 402 is a drive transmitting portion for transmitting the driving force (rotational force) from the photosensitive drum 401 to the second coupling member.

In this embodiment, the drive transmitting portion is constituted by two members, namely the first coupling member 429 and the coupling idler gear 402. However, it may be constituted by three or more members, or by one member. At least one of the drive transmitting portions is provided outside the toner discharging passageway. For example, the structure may be such that a part of the drive transmitting portion (first coupling member 429) is provided in the toner feeding passageway, and the other portion (coupling idler gear 402) is outside the toner feeding passageway.

When the rotational force is transmitted from the main assembly drum input coupling 81 (FIG. 23) of the image forming apparatus 100 to the coupling 401c at one end of the cleaning unit 13, the second photosensitive drum gear 401d rotates with the rotation of the photosensitive drum 401. The driving force is transmitted from the second photosensitive drum gear 401d to the drum idler gear 402a of the coupling idler gear 402, so that the coaxial worm gear 402b rotates. The rotation of the worm gear 402b is transmitted to the gear portion 429g of the first coupling member 429, so that the first coupling member 429 rotates about the axis 461a.

With the above-described structure, the first coupling member 429 can transmit the driving force to the main assembly without receiving the driving force from the feeding screw 426.

By the structure, a feeding amount of the feeding screw 426 can be finely adjusted because it is unnecessary to engage the feeding screw 426 with the first coupling member 429.

That is, the reverse screw portion 426e can be freely adjusted for the desired residual toner feeding performance.

In this embodiment, the worm gear 402 is used for the drive transmission from the photosensitive drum 401 to the first coupling member 429, but the structure is not limiting to the present invention.

For example, a drive transmission method using a bevel gear, a drive transmission method using a drive transmission belt or the like can be employed with the similar effects.

Embodiment 5

In this embodiment, the structures are similar to the structures of the above-described Embodiment 1, and therefore, the description will be made as to the portions different from Embodiment 1. The materials, shapes and so on are similar to those of Embodiment 1 unless otherwise stated particularly. The description will be omitted about such portions.

Figure 43:
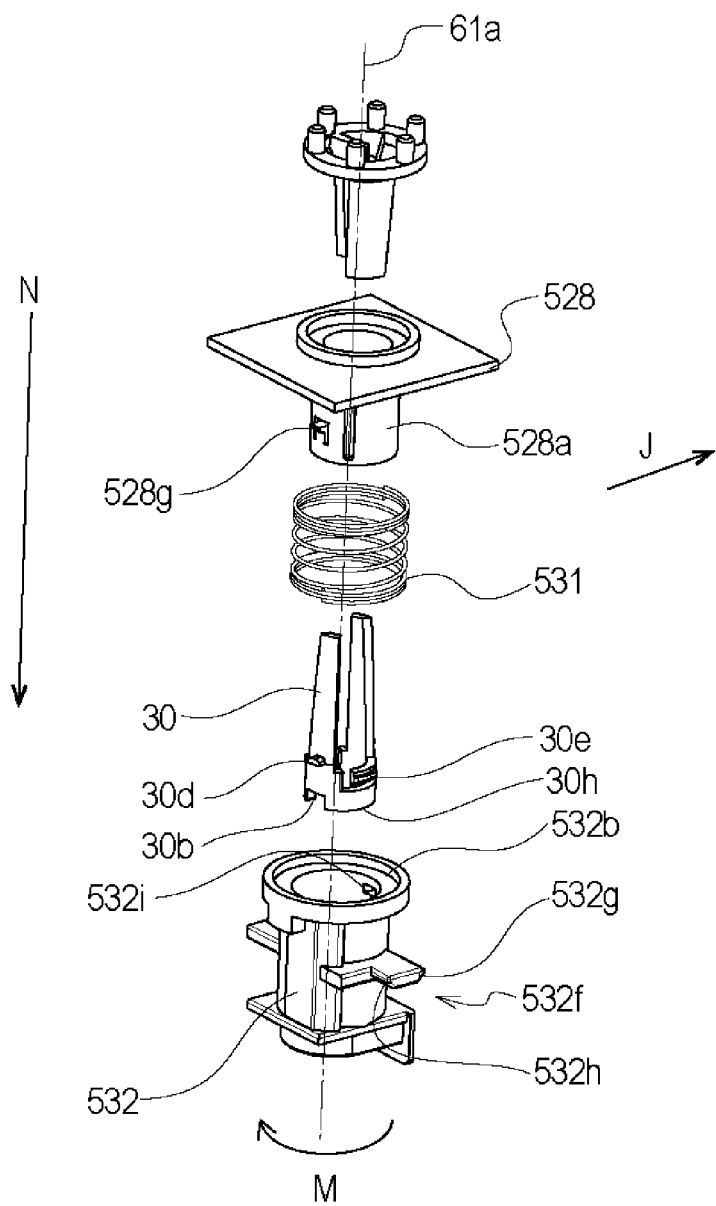
FIG. 43 is an exploded view illustrating a structure of a residual toner connecting portion in Embodiment 5.
Figure 44:
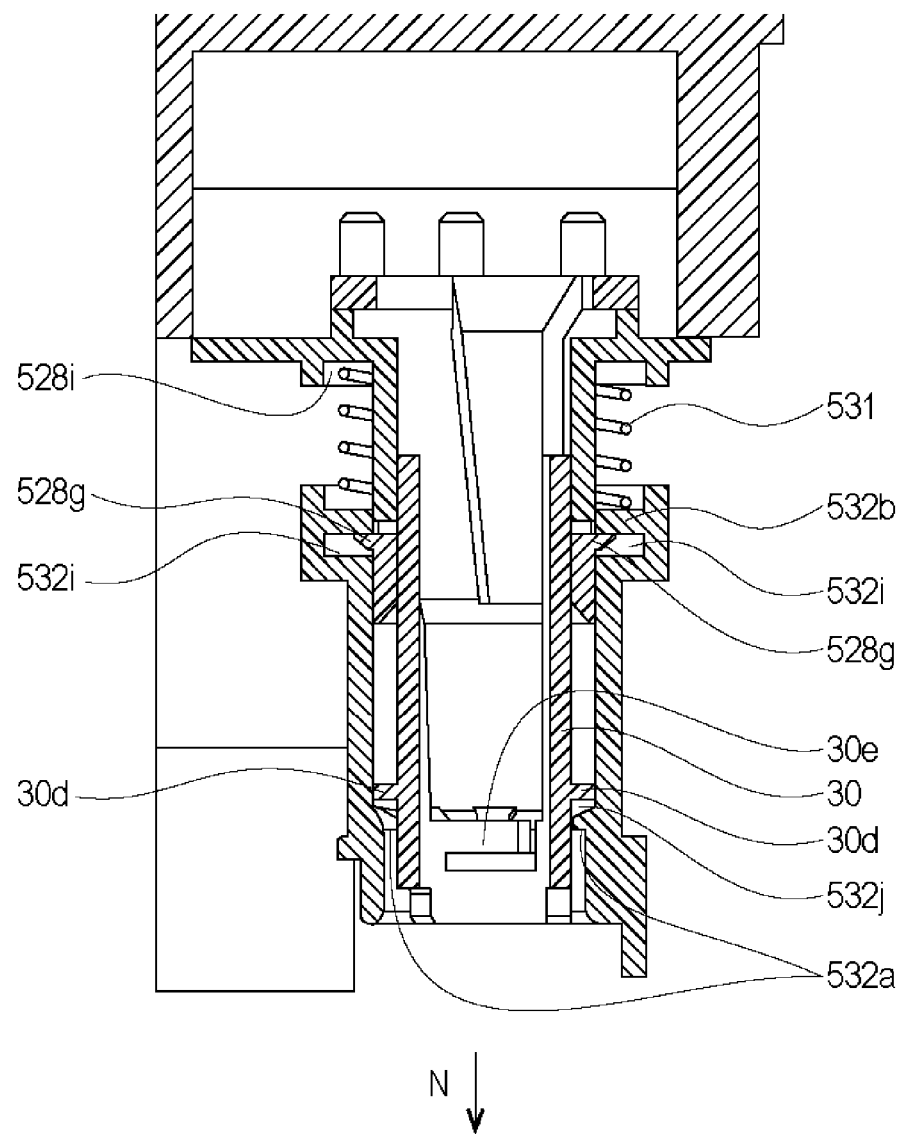
FIG. 44 is a sectional view illustrating of a structure of a residual toner connecting portion in Embodiment 5.

Referring to FIGS. 43 and 44, the structure of this embodiment will be described.

FIG. 43 is an exploded view illustrating of parts of a residual toner connecting portion in this embodiment, and FIG. 44 is a sectional view illustrating of parts of the residual toner connecting portion in this embodiment.

As shown in FIG. 43, the residual toner connecting portion 532 used in this embodiment supports, similar to Embodiment 1, the second coupling member 30 by the supporting portion 532a of the residual toner connecting portion 532 so as to be rotatable about an axis 61a. Similar to Embodiment 1, the second coupling member 30 is mounted beyond the supporting portion 532a of the residual toner connecting portion 532 by deforming the compression claw 30e. At this time, in this embodiment, the second coupling member 30 is supported by a projection receiving portion 532j of the residual toner connecting portion 532 at the projection 30d in the direction of the weight (substantially arrow N direction) so as not to fall.

That is, as shown in FIG. 44, the second coupling member 30 is supported by the projection receiving portion 532j by the projection 30d in the direction of the weight direction (arrow N direction), and in the opposite direction (opposite to the direction of the arrow N), the compression claw 30e is supported by the supporting portion 532a. The second coupling member 30 is movable between the supporting portion 532a of the residual toner connecting portion 532 and the projection receiving portion 532j within a range of play.

The compression spring 531 is fitted in the cylindrical portion 528a of the coupling receptor 528 and is supported while being compressed in the direction of the arrow N between the spring receiving portion 528i and the spring receiving portion 532b of the residual toner connecting portion 532.

Adjacent to the free end of the cylindrical portion 528a of the coupling receptor 528 (free end with respect to the direction of the arrow N), a claw portion 528g for engagement with the residual toner connecting portion 532 is provided. In addition, the residual toner connecting portion 532 is provided with a recessed groove portion 532i in a part of the neighborhood of the spring receiving portion 532b.

The residual toner connecting portion 532 is supported by the coupling receptor 528 in the direction of the arrow N by engagement with the claw portion 528g of the coupling receptor 528 and the groove portion 532i in the state that it receives an urging force of the compression spring 531 in the direction of the arrow N.

Figure 45:
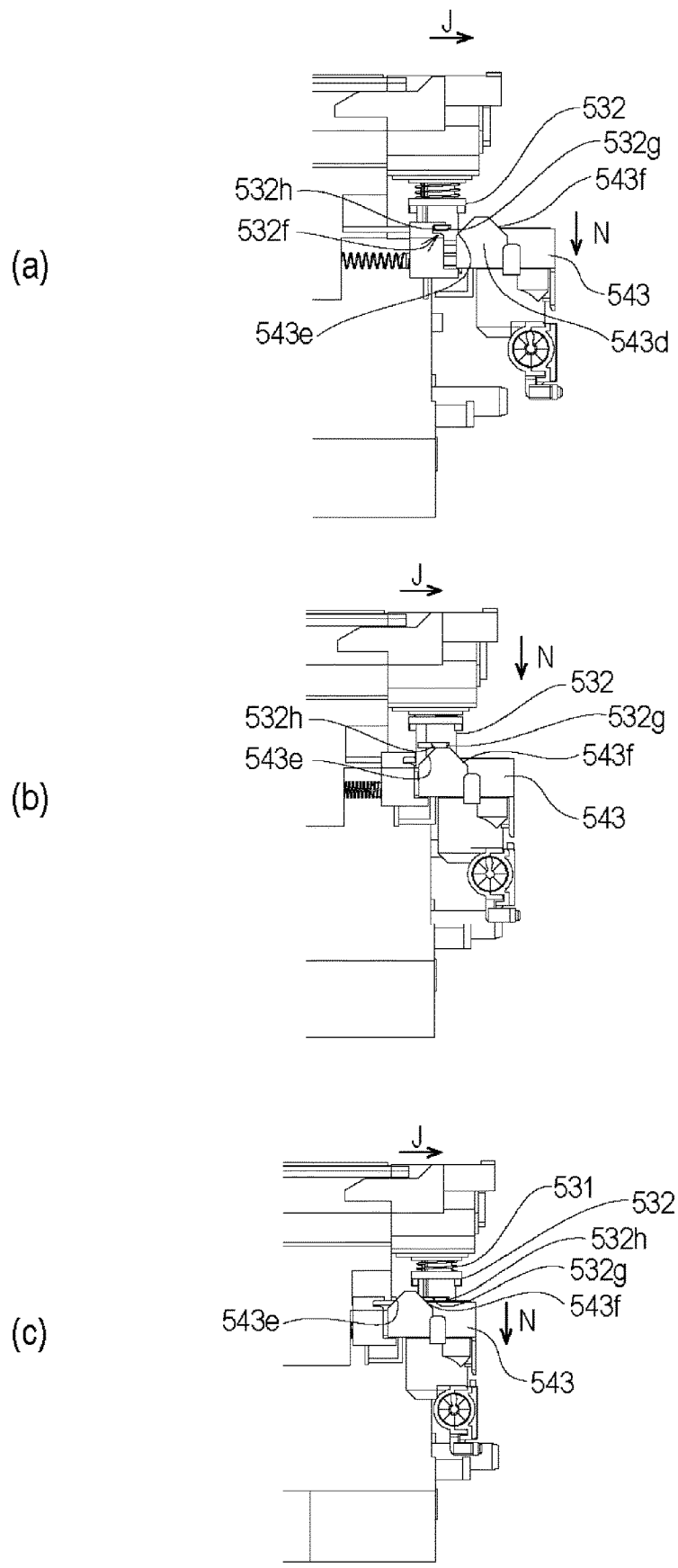
FIG. 45 is a cartridge mounting view illustrating a connecting method between the residual toner connecting portion and the main assembly in Embodiment 5.

Referring to FIGS. 43, 44 and 45, the movement of the residual toner connecting portion 532 at the time of mounting the process cartridge 7 to the main assembly 100 will be described. FIG. 45 illustrates a cartridge mounting to show the connecting method between the residual toner connecting portion 532 and the main assembly 100.

As shown in FIG. 43, the residual toner connecting portion 532 is provided with a movement rib 532f for engagement with the main assembly 100 to move the residual toner connecting portion in the direction opposite to the arrow N. The movement rib 532f is provided at the opposite end portions with respect to a direction of an arrow J with a taper 532g for mounting and a taper 532h for dismounting.

As shown in FIG. 45, a spring stopper 543 of the main assembly 100 is provided with an engagement wall 543d for engagement with the movement rib 532f to move the residual toner connecting portion 532 in the direction opposite to the arrow N in the mounting of the process cartridge 7. In addition, the engagement wall 543d is provided at opposite end portions with respect to the cartridge mounting direction (arrow J direction) with an engagement taper 543e for the mounting and an engagement taper 543f for the dismounting.

As shown in part (a) of FIG. 45, when the process cartridge 7 is mounted in the direction of the arrow J, the mounting taper 532g of the residual toner connecting portion 523 abuts to the mounting engagement taper 543e of the spring stopper 543.

When the process cartridge 7 is further inserted into the main assembly J, the mounting taper 532g rides on the mounting engagement taper 543e of the spring stopper 543 to move in the direction opposite to the arrow N against the urging force of the compression spring 531 (part (b) of FIG. 45).

When the process cartridge is further inserted in the direction of the arrow J, the dismounting taper of the residual toner connecting portion 532 starts to engage with the dismounting engagement taper 543f, by which it moves in the direction of the arrow N by the urging force of the compression spring 531.

When the process cartridge is further inserted in the direction of the arrow J, the residual toner connecting portion 532 lowers to the original position (the same position as shown in part (a) of FIG. 45 in the arrow N direction), by which the mounting is completed (part (c) of FIG. 45).

At this time, as will be described hereinafter, the second coupling member 30 is placed at a position capable of engaging with a coupling spring 344 of the main assembly 100.

When the process cartridge 7 is dismounted from the main assembly 100 (moved in the direction opposite to the arrow J), the residual toner connecting portion 532 is moved in the order opposite to that described above.

A description will be made as to a drive transmission method from the process cartridge 7 to the main assembly 100.

As described in the foregoing, by mounting the process cartridge 7 in the direction of the arrow J, the residual toner connecting member 532 enters the residual toner receiving opening 80d. Similar to Embodiment 3, by this entering, the residual toner connecting member 532 compresses the spring coupling 344 in the direction of the arrow N against the reaction force of the spring coupling 344.

In addition, the spring coupling 344 abuts to the second coupling member 30 in the residual toner connecting member 532 with an urging force. Similar to Embodiment 1, the second coupling member 30 rotates in interrelation with the rotation of the photosensitive drum 1. By this, the groove portion 30b of the second coupling member 30 engages with the coupling portion 44b of the spring coupling 44 in the rotational moving direction.

Here, when the residual toner connecting member 532 connects with the main assembly feeding portion 80, the coupling portion 344b of the spring coupling 344 may not engage with the groove portion 30b of the second coupling member 30 but may be pressed down to the projection 30h. In such a case, the second coupling member 30 rotates in the direction of the arrow T while the coupling spring 44 is pressed against the projection 30h. When the second coupling member rotates to the phase that the coupling portion 44b of the spring coupling 344 is engageable with the groove portion 30b, the spring couplings 344 and the second coupling member 30 engage with each other in rotational moving direction so as to be rotatable integrally with the feeding fin 45.

In this manner, the engagement is possible irrespective of the phase relation between the spring coupling 344 and the second coupling member 30.

Here, the spring coupling 344 is a compression spring having a wire diameter of approximately Φ0.6 mm and an inner diameter of approximately Φ12.3 mm. The spring coupling 44 provides the urging forces of approximately 33 gf in the state of abutting to the spring stopper 343 (uncoupled state) and approx. 50 gf in the connection state of the second coupling member 30.

Here, the spring portion 344a of the spring coupling 344 is wound in such a direction that a downward feeding force is produced to the residual toner by the rotation in the direction of the arrow T. In the above-described manner, the driving force is transmitted from the process cartridge 7 to the main assembly 100.

With the above-described structure, the engagement and the driving connection between the residual toner connecting portion 532 and the main assembly can be accomplished without being operated by the arm 42 of the main assembly 100 as in Embodiment 1.

That is, according to this embodiment, the second coupling member 30 is urged toward the first position by the urging member (compression spring 531) (FIG. 44). In other words, in the free state, as shown in part (a) of FIG. 45, the second coupling member 30 is in the first position capable of connecting the spring coupling 344. However, in the process of inserting the cartridge 7 into the main assembly, the second coupling member 30 is moved to the second position by the force received by the moving force receiving portion (movement rib 532f) from the engagement wall 543d (part (b) of FIG. 45). When a further advancement of the inserting operation of the cartridge 7, the movement rib 532f disengages from the engagement wall 543d, so that the second coupling member 30 moves to the first position by the force of the urging member (compression spring 531). That is, the second coupling member 30 reciprocates between the first position and the second position.

Embodiment 6

Figure 46:
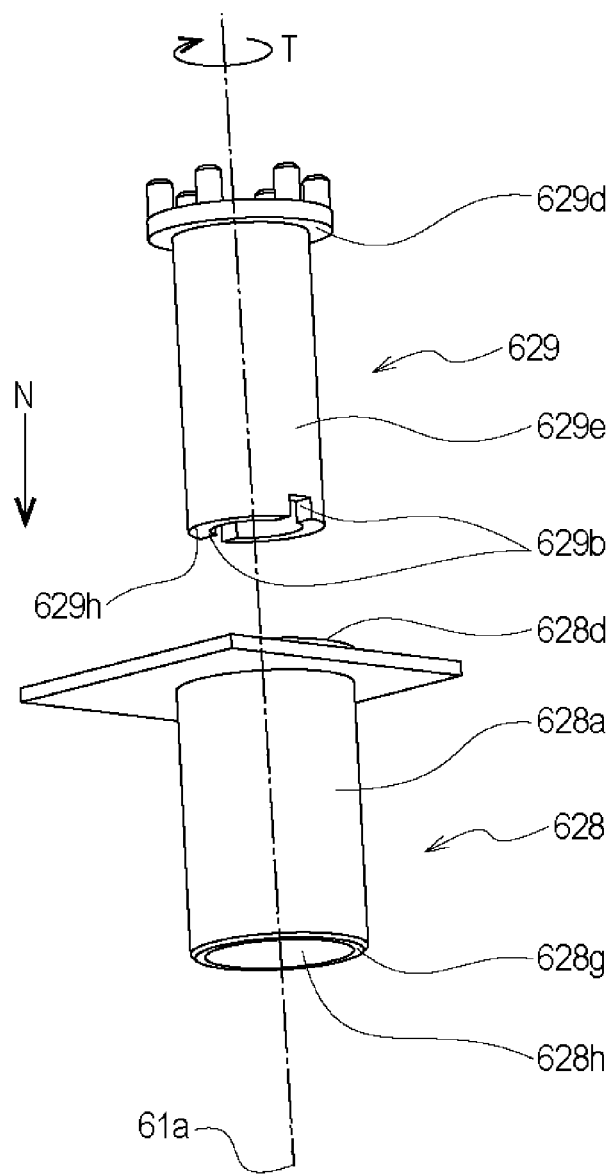
FIG. 46 is an exploded view of parts in Embodiment 6.
Figure 47:
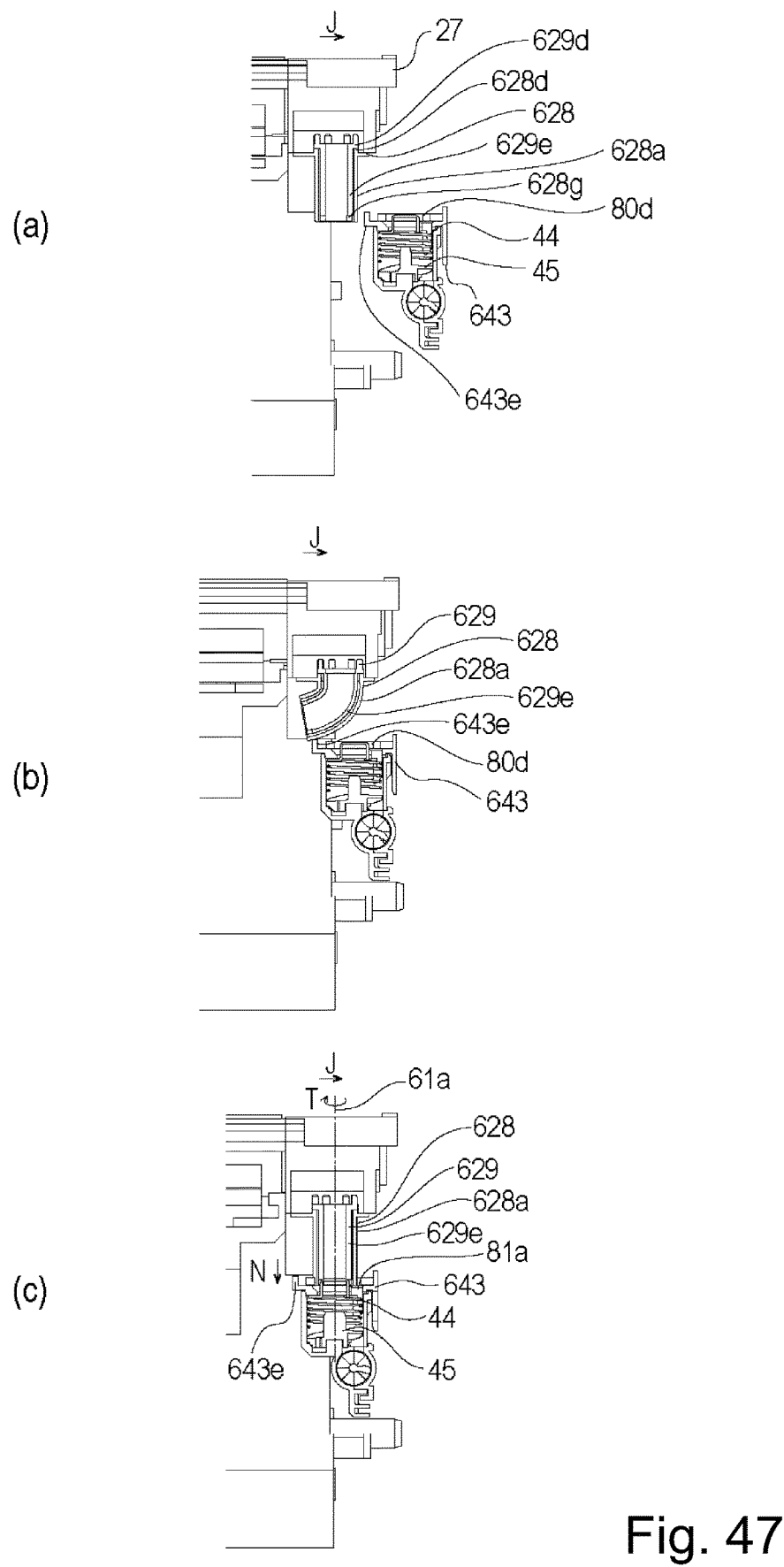
FIG. 47 is a sectional view of mounting, illustrating a connecting method between the residual toner connecting portion and the main assembly in Embodiment 6.

In this embodiment, the structures are similar to the structures of the foregoing Embodiment 1, and therefore, the description will be made as to the portions different from Embodiment 1. The materials, shapes and so on are similar to those of the foregoing embodiments unless otherwise stated particularly. The description will be omitted about such portions. In the foregoing embodiments, the second coupling transmits the driving force to outside of the cartridge, but in this embodiment, the first coupling member 629 transmits the driving force to outside of the cartridge. Referring to FIGS. 46 and 47, the structure of this embodiment will be described. FIG. 46 is an exploded view illustrating parts in this embodiment, and FIG. 47 is a sectional view illustrating a connecting method between the residual toner connecting portion and the main assembly. As shown in FIG. 46, similar to Embodiment 1 the coupling receptor 628 is mounted to the drum bearing 27. The coupling receptor 628 is provided with a residual toner discharge opening 628g facing in a direction of an arrow N.

Similar to Embodiment 1, the first coupling member 629 is supported by the coupling receiving portion 628d of the coupling receptor 628 at a supporting portion 629d in the weight direction (substantially arrow N direction).

The first coupling member 629 includes a cylindrical portion 629e that enters the inner diameter portion 628h a cylindrical portion of the coupling receptor 628 to be supported rotatably about the axis 61a.

Here, a cylindrical portion 628a of the coupling receptor 628 and the cylindrical portion 629e of the first coupling member 629 are made of flexible parts having an elasticity, such as rubber, for example.

More particularly, the parts are preferably a resin material having a high elasticity, such as silicone rubber, fluorinated resin material, or the like.

In this embodiment, at lateral edge portion of the first coupling member 629 with respect to the direction of the arrow N, there is provided a groove portion 629b having the same configuration as that of the groove portion 30b of the second coupling member 30 in Embodiment 1.

Further, similar to Embodiment 1, in the first feeding passageway 80a of the main assembly 100, a spring coupling 44 and a feeding fin 45 are supported rotatably about the axis 61a.

As shown in FIG. 47, a spring receiving portion 543 of the main assembly 100 is provided with a wall portion 643e engageable with a residual toner connecting portion 632. The wall portion 643e is placed adjacent to the residual toner receiving opening 680d and projects beyond the spring coupling 44 in the direction opposite to the arrow N direction.

The mounting of the process cartridge 7 will be described.

As shown in part (a) of FIG. 47, when the process cartridge 7 is mounted into the main assembly in the direction indicated by the arrow J, the cylindrical portion 628a of the coupling receptor 628 abuts to the wall portion 643e of the main assembly 100.

When the process cartridge 7 is further inserted in the direction of the arrow J, the coupling receptor 628 having flexibility is pressed against the wall portion 643e to deform in the direction opposite to the arrow J direction. Here, the first coupling member 629 provided in the coupling receptor 628 also has an elasticity similarly to the coupling receptor 628, and therefore, deforms along with the flex of the coupling receptor 628 (part (b) of FIG. 47). This is the state in which the first coupling member 629 is retracted to the second position. With further insertion of the process cartridge 7 in the direction of the arrow J, the coupling receptor 628 move over the wall portion 643e, so that the flex is released to restore the initial state. This is the state in which the first coupling member 629 is in the first position. That is, the first coupling member 629 is moved from the first position to the second position by the force received by the cylindrical portion (moving force receiving portion) 628*a* of the coupling receptor from the main assembly. Thereafter, the first coupling member 629 is moved to the first position by the elastic force of the first coupling member 629 and the coupling receptor 628.

By the coupling receptor 628 returning to the initial position, the free end of the coupling receptor 628 and the free end of the first coupling member 629 enter the main assembly toner receiving opening 80*d* that is the connecting portion of the main assembly 100.

At this time, the spring coupling 44 of the main assembly 100 is abutted by the first coupling member 629 with an urging force. Similar to Embodiment 1, the abutted first coupling member 629 is rotated in interrelation with the rotation of the photosensitive drum 1. By this, a groove portion 629*b* of the first coupling member 629 is engaged with a coupling portion 44*b* of the spring coupling 44 in the rotational moving direction.

Here, when the residual toner connecting member 632 is connected with the main assembly feeding portion 80, the coupling portion 44*b* of the spring coupling 44 may not engage with the groove portion 629*b* of the first coupling member 629 but may be pressed down to the projection 629*h*. In such a case, the first coupling member 629 rotates in the direction indicated by the arrow T while the coupling spring 44 is pressed against the projection 629*h*. When the first coupling member 629 is in a phase that the coupling portion 44*b* of the spring coupling 44 and the groove portion 629*b* are engaged with each other, the spring coupling 44 is engaged with the first coupling member 629 in the rotational moving direction to rotate integrally with the feeding fin 45.

In this manner, the engagement is possible irrespective of the phase relation between the spring coupling 44 and the first coupling member 629.

Here, the spring coupling 44 is a compression spring having a wire diameter of approximately Φ0.6 mm and an inner diameter of approximately Φ12.3 mm. The spring coupling 44 provides the urging forces of approximately 33 gf in the state of abutting to the spring stopper 43 (uncoupled state) and approx. 50 gf in the connection state of the second coupling member 30.

Here, the spring portion 44*a* of the spring coupling 44 is wound in such a direction that a downward feeding force is produced to the residual toner by the rotation in the direction of the arrow T.

In the manner described in the foregoing, the driving force is transmitted from the process cartridge 7 to the main assembly 100.

With the above-described structure, the engagement and the driving connection between the residual toner connecting portion 532 and the main assembly is possible without being operated by the main assembly 100 as in Embodiment 1.

In addition, the driving connection between the process cartridge 7 and the main assembly can be established without moving, in the process cartridge 7, the coupling receptor 628 or the first coupling member 629, which are the connecting portion between the process cartridge 7 and the main assembly 100.

However, in the free state of the process cartridge 7, the discharge opening member 628*g* that is the residual toner discharging portion is elastic, and therefore, the sealing may be difficult.

In addition, in order for the first coupling member 629 deformed by the wall portion 643*e* to move to the position for engagement with the spring coupling 44, a space for permitting restoration of the flex caused by the wall portion 643*e* is required. Therefore, it may be difficult to provide a sealing member in the main assembly 100. From the standpoint of assuring the sealing performance, the structure of Embodiment 1 or the like is preferable.

The structure of this embodiment is summarized in the following. The first coupling member 629 transmits the rotational force to outside of the cartridge. The first coupling member 629 constitutes a part of the feeding passageway for the toner. That is, the first coupling 629 constitutes the portion of the second feeding passageway 61 (discharging passageway for the toner, part (a) of FIG. 1) of Embodiment 1.

The first coupling 629 is an elastic deformation portion capable of elastic deformation. By the elastic deformation of the first coupling 629, the discharging passageway also deforms, with which the second coupling 629 moves between the first position (part (c) of FIG. 47) and the second position (part (b) of FIG. 47).

The moving direction of the second coupling 629 crosses the axial direction of the photosensitive drum (left-right direction in FIG. 47). That is, when the second coupling 629 moves from the first position to the second position, the free end of the second coupling member 629 moves toward the upper left portion.

That is, the moving direction of the first coupling 629 includes a left-right direction component and a vertical direction component. Therefore, the first coupling member 629 moves in the direction perpendicular to the axial direction of the photosensitive drum and also in the direction parallel with the axial direction of the photosensitive drum. In other words, the moving direction of the first coupling member 629 is as follows. The axial direction of the first coupling 629 at the time when the first coupling 629 is in the first position is the reference direction.

In this embodiment, the reference direction is the direction in which the center line 61*c* in part (c) of FIG. 47 extends, and is the vertical direction. The first coupling member 629 moves so as to displace at least in this direction. That is, when the first coupling member 629 moves from the first position to the second position, it moves at least upwardly, and therefore, it displaces in the referenced direction (vertical direction).

In addition, in this embodiment, the coupling member for transmitting the rotational force to outside of the cartridge is disposed adjacent to the toner discharge opening, similar to the foregoing embodiments. Particularly in this embodiment, as will be understood from FIGS. 46 and 47, the first coupling member 629 constitutes the toner discharge opening. The toner having passed through the first coupling member 629 is directly moved into the toner receiving opening of the main assembly.

That is, the structure in which the coupling member is provided adjacent to the toner discharge opening includes the structure in which the coupling member per constitutes at least a part of the discharge opening as in this embodiment. The first coupling member 629 is in the first position in the free state. The second coupling member 629 moves from the second position to the first position by the elastic force (urging force) of itself.

In other words, the first coupling member 629 is a coupling member for transmitting the driving force to outside of the cartridge and is a member constituting the toner discharging passageway and the discharge opening, and is also the urging member for urging movement of the coupling member. In addition, the first coupling member 629 is connected with the toner receiving opening provided in the main assembly of the image forming apparatus. Therefore, the first coupling member 629 is also the connecting portion for connecting the discharge opening to the receiving port. Furthermore, the first coupling member is the drive transmitting portion for receiving the rotational force to be transmitted to the spring coupling 44 from the toner feeding screw.

Thus, in this embodiment, the plurality of members are constituted into an integral first coupling member 629.

When the first coupling member 629 moves to the first position, use is made of the elastic force of the cylindrical portion 628a of the coupling receptor 628. Therefore, the cylindrical portion 628a is also the urging member for urging the coupling member 629 to the first position.

Embodiment 7

Another embodiment in which the residual toner connecting portion is different will be described. This embodiment is similar to Embodiment 1, and therefore, the description will be made as to the portions different from Embodiment 1. The materials, shapes and so on are similar to those of the foregoing embodiments unless otherwise stated particularly. The description will be omitted about such portions.

Also in this embodiment, similar to Embodiment 6, the coupling member (second coupling member 730) for transmitting the driving force (rotational force) to outside of the cartridge constitutes the toner discharge opening 730d.

Figure 48:
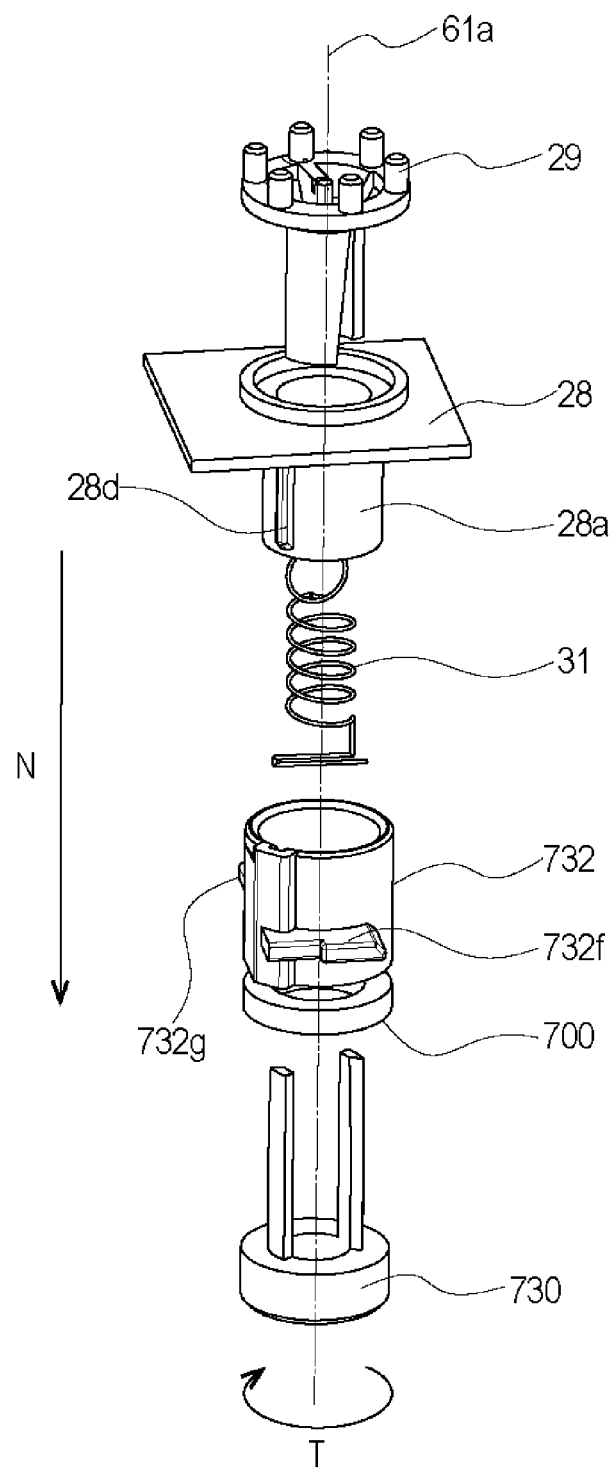
FIG. 48 is an exploded view illustrating mounting of the residual toner connecting portion and other parts in Embodiment 7.

FIG. 48 is an exploded view illustrating the residual toner connecting portion and other parts in this embodiment.

Figure 49:
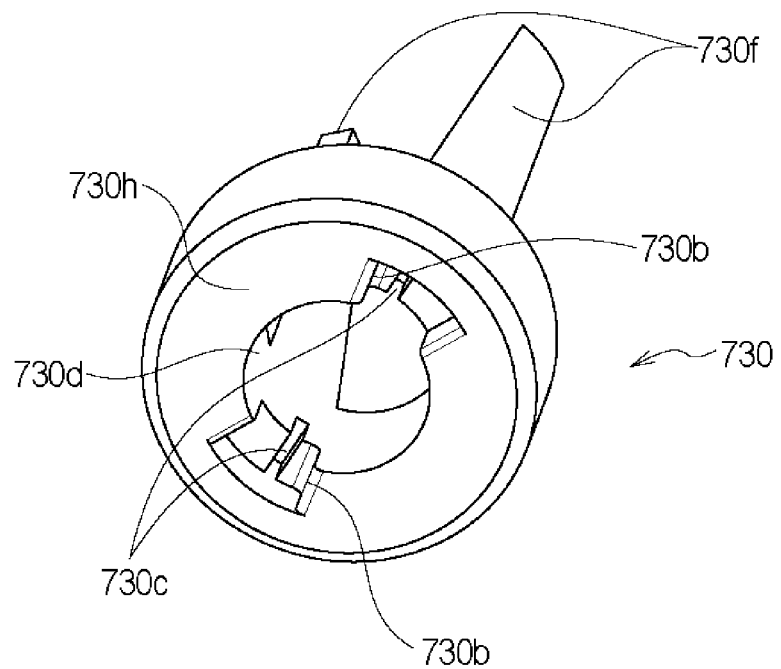
FIG. 49 is an outer appearance illustrating a configuration of a second coupling in Embodiment 7.
Figure 50:
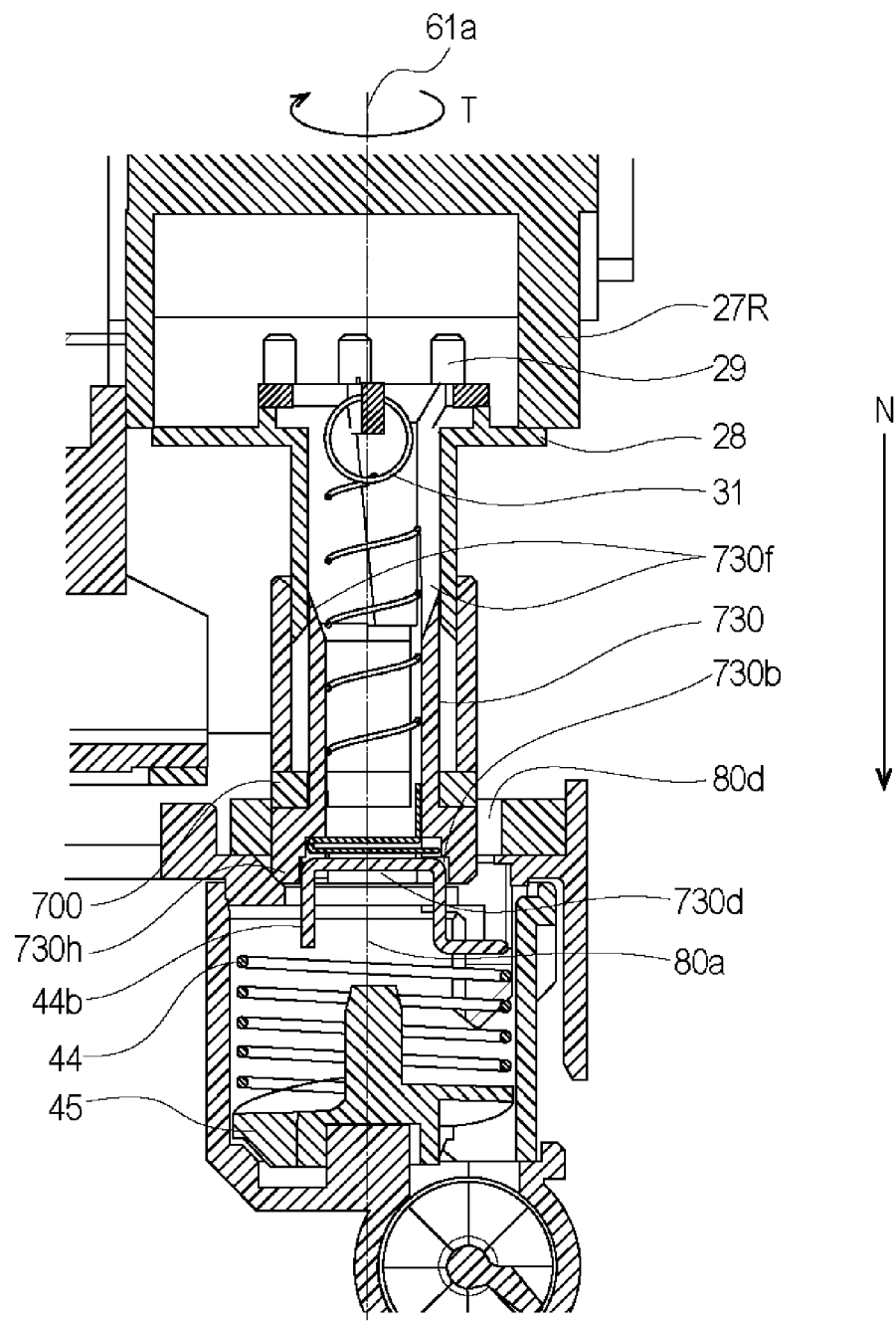
FIG. 50 is a sectional view illustrating the connection with the main assembly 100 in Embodiment 7.

FIG. 49 shows an outer appearance of the configuration of the second coupling in this embodiment, and FIG. 50 is a sectional view illustrating the connection with the main assembly 100 in this embodiment.

As shown in FIG. 48, in this embodiment, a coupling receptor 28 is provided with a connecting operation portion 732, a first coupling member 29, the second coupling member 730, the coupling spring 31 and a coupling seal 700.

The mounting of the first coupling member 29 to the coupling receptor 28 is similar to that of Embodiment 1, and therefore, the description is omitted. The connecting operation portion 732 has a shape provided by cutting the discharge opening 32d away from the residual toner connecting portion 32 of Embodiment 1, and similar to Embodiment 1, is movable in the direction indicated by an arrow N by the cylindrical portion 28a and the rotation stopper rib 28d of the coupling receptor 28. The detailed description will be omitted because of the similarity to Embodiment 1. In the position downstream of the connecting operation portion 732 with respect to the direction of the arrow N, there are provided a flexible cylindrical seal 700 and the second coupling member 730.

As shown in FIG. 48, the first coupling member 29, the second coupling member 730, the coupling spring 31, the coupling receptor 28, the cylindrical seal 700 and the connecting operation member 732 are arranged coaxially with the center line 61a. The first coupling member 29 and the second coupling member 730 are connected with each other by the coupling spring 31 similar to Embodiment 1. The connecting operation member 732 is mounted to the coupling receptor 28 together with the second coupling member 730 so as to be movable in the direction of the arrow N against the urging force of the coupling spring 31. Upon the connection of the process cartridge 7 to the main assembly 100, the connecting operation member 732 moves in the direction of the arrow N.

As shown in FIG. 49, the second coupling 732 is provided with a groove portion 730b and a projection 730h similar to the second coupling member 30 of Embodiment 1. A second coupling 730 is provided with a discharge opening 730d in the form of a hole in place of the discharging portion 32d as the residual toner discharge opening of the process cartridge 7 in Embodiment 1. In addition, the second coupling member 730 is provided on the groove portion 730b with a spring hook groove 730c in the form of a recess for mounting the coupling spring 31 similar to Embodiment 1.

Also similar to Embodiment 1, the coupling spring 31 as the urging member is a twisted coil spring having a bent free-end portion 31a and a ring configuration 31b in the facing direction. The coupling spring 31 is inserted into the second coupling member 730 in the direction opposite to the direction of the arrow J, and the end portion 31a is engaged with a spring hook groove 730c.

Furthermore, as shown in FIG. 48, there is provided a flexible cylindrical seal 700 between the second coupling member 730 and the connecting operation portion 732. The cylindrical seal 700 is telescoped around the outer periphery of a driving claw 730f of the second coupling member 730.

When the second coupling member 730 is urged by the urging force of the coupling spring 31 in the direction opposite to the arrow N, the cylindrical seal 700 is compressed between the second coupling member 730 and the connecting operation portion 732 by the urging force of the coupling spring 31. By the compression (deformation) of the cylindrical seal 700, the occurrence of a gap between the connecting operation portion 732 and the second coupling member 730 can be prevented.

Referring to FIG. 50, the drive transmission to the main assembly will be described.

FIG. 50 is a sectional view of the process cartridge 7 and the main assembly 100 in the state established of driving connection.

The connecting operation portion 732 is provided with arm contact portions 732f and 732g similar to the arm contact portions 32f, 32g of the residual toner connecting portion 32 of Embodiment 1.

The description as to the mounting to the main assembly 100 is omitted because it is similar to Embodiment 1.

After the process cartridge 7 is mounted to the main assembly 100, the main assembly arm 42 (unshown) operates in interrelation with the closing operation of the front door of the main assembly 100, so that the connecting operation portion 732 is urged in the direction of the arrow N.

By the movement of the connecting operation portion 732 in the direction of the arrow N, the cylindrical seal portion 700 and the second coupling member 730 are moved in the direction of the arrow N. Here, the cylindrical seal portion 700 urges the second coupling member 730 in the direction of the arrow N while being compressed.

The second coupling member 730 is pressed against the connecting operation portion 732 through the cylindrical seal portion 700 to enter the residual toner receiving opening 80d of the main assembly 100.

When the second coupling member 730 enters the residual toner receiving opening 80d of the main assembly 100, the second coupling member 730 is supported by the inner surface of the cylindrical portion 28a of the coupling receptor 28 so that the driving claw 730f is rotatable. Similar to Embodiment 1, the first main assembly feeding passageway 80a of the main assembly 100 is provided with spring coupling 44 and the feeding fin 45 so as to be rotatable about the center line 61a.

The second coupling member 730 enters the residual toner receiving opening 80d to compress the spring coupling 44 in the direction of the arrow N against the reaction force of the spring coupling 44.

Therefore, the spring coupling 44 abuts to the second coupling member 730 with an urging force. Similar to Embodiment 1, the second coupling member 730 rotates in interrelation with the rotation of the photosensitive drum 1. By this, the groove portion 730b of the second coupling member 730 engages with the coupling portion 44b of the spring coupling 44 in the rotational moving direction.

Here, when the second coupling member 730 is connected with the main assembly feeding portion 80, the coupling portion 44b of the spring coupling 44 may not be engaged with the groove portion 730b of the second coupling member 730 but may be pressed down to the projection 730h. In such a case, the second coupling member 730 rotates in the direction of the arrow T while the coupling spring 44 is pressed against the projection 730h. When the second coupling member 730 rotates to the phase such that the coupling portion 44b of the spring coupling 44 is engageable with the groove portion 730b, the spring couplings 44 and the second coupling member 730 engage with each other in rotational moving direction so as to be rotatable integrally with the feeding fin 45.

In this manner, the engagement is possible irrespective of the phase relation between the spring coupling 44 and the second coupling member 730.

Here, the spring coupling 44 is a compression spring having a wire diameter of approximately Φ0.6 mm and an inner diameter of approximately Φ12.3 mm. The spring coupling 44 provides the urging forces of approximately 33 gf in the state of abutting to the spring stopper 43 (uncoupled state) and approximately 50 gf in the connection state of the second coupling member 730.

With the structure described above in which the second coupling member 730 is provided with the discharge opening 730d, the same effects as in Embodiment 1 are provided.

Embodiment 8

Another embodiment in which the residual toner connecting portion is different will be described.

In this embodiment, the structures are similar to the structures of the foregoing embodiments, and therefore, the description will be made as to the portions different from the foregoing embodiments. The materials, shapes and so on are similar to those of the foregoing embodiments unless otherwise stated particularly. The description will be omitted about such portions.

Referring to FIGS. 51, 52, 53, 54 and 55, the parts in this embodiment will be described.

Figure 51:
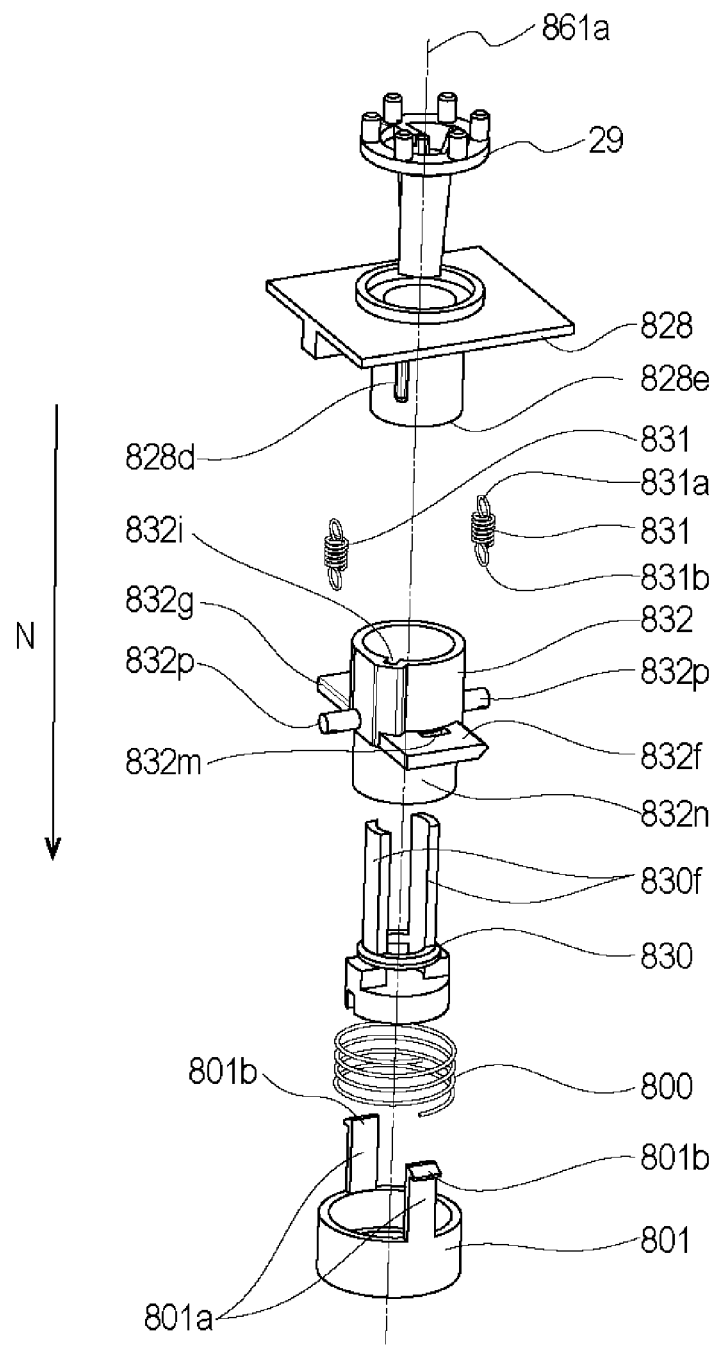
FIG. 51 is an exploded view illustrating mounting of the residual toner connecting portion and other parts in Embodiment 8.
Figure 52:
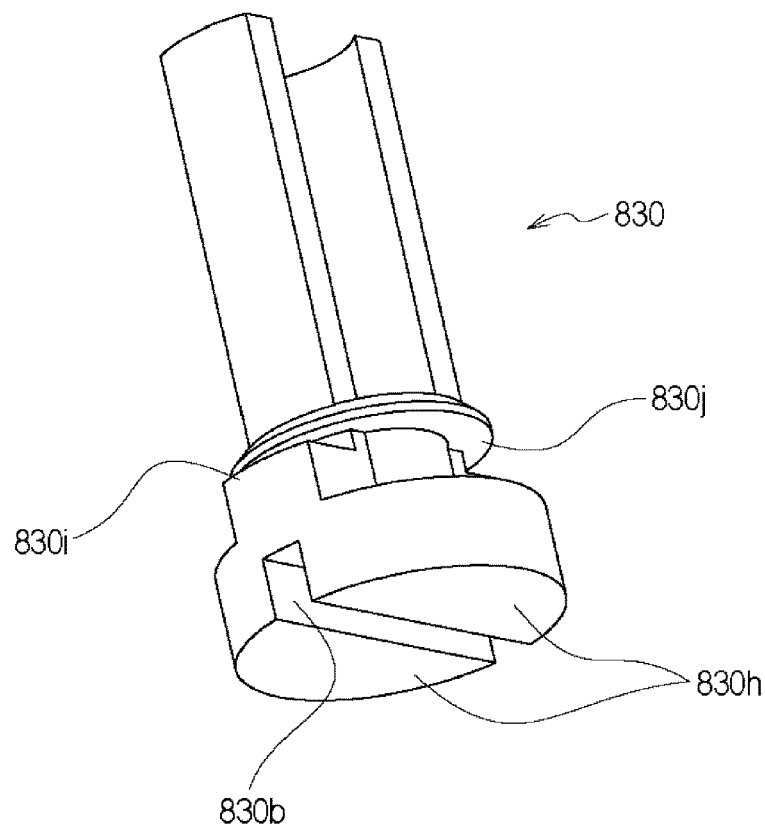
FIG. 52 is an outer appearance illustrating a configuration of a second coupling in Embodiment 8.
Figure 53:
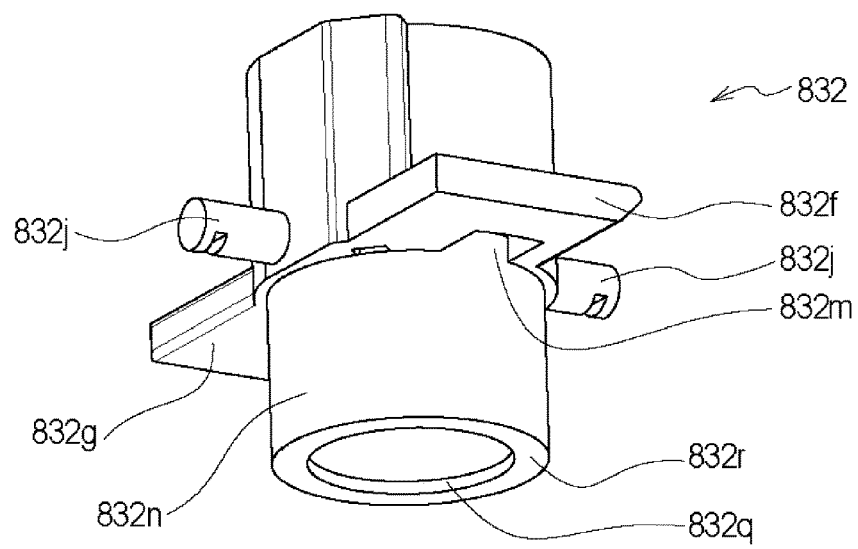
FIG. 53 is an outer appearance illustrating a configuration of a connecting operation portion in Embodiment 8.
Figure 54:
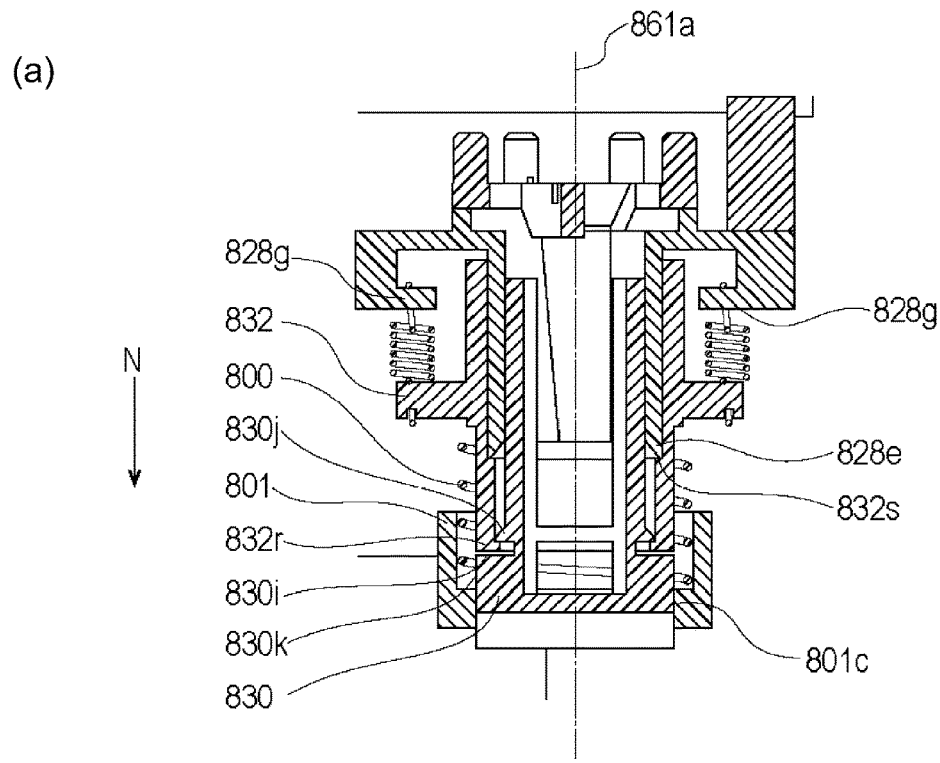
FIG. 54 is a cartridge sectional view of the neighborhood of the residual toner discharge opening before and after connection with the main assembly in Embodiment 8.
Figure 54:
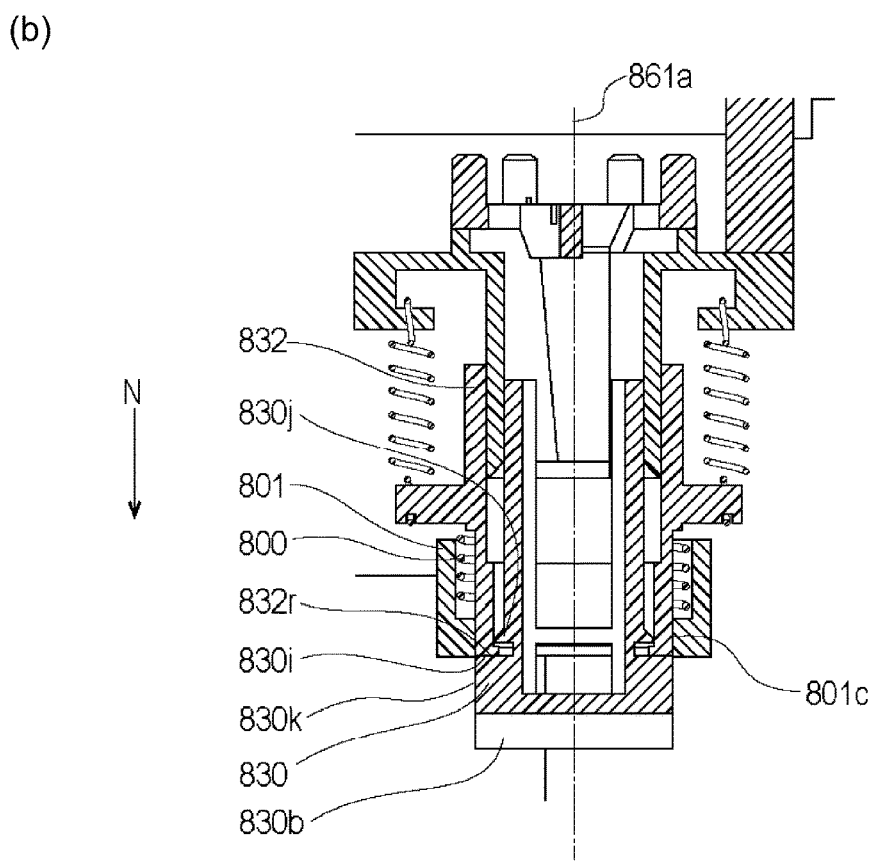
Figure 55:
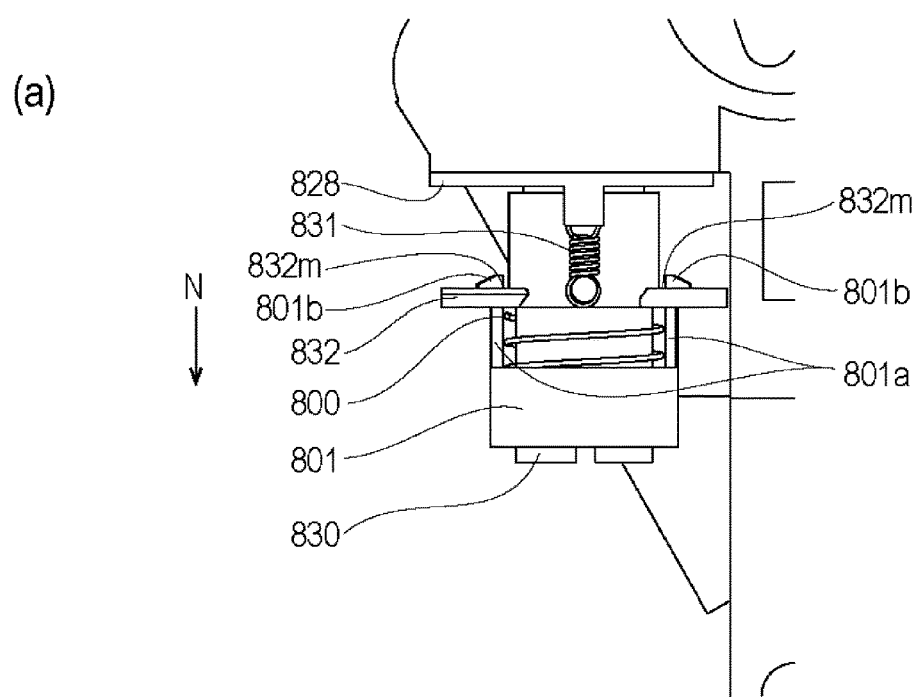
FIG. 55 is a side view of the cartridge in the neighborhood of the residual toner discharge opening before and after connection with the main assembly in Embodiment 8.
Figure 55:
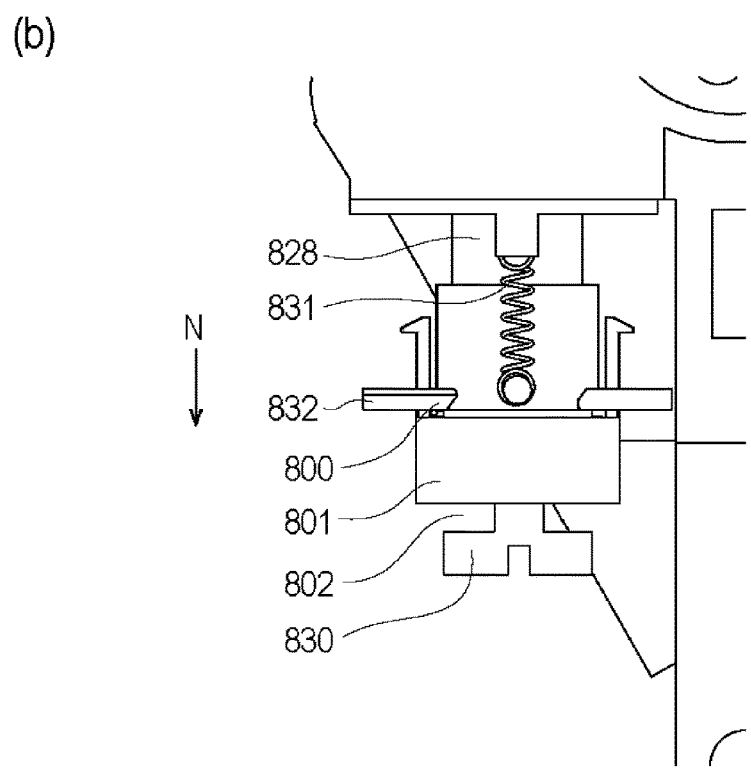

FIG. 51 is an exploded view illustrating the residual toner connecting portion and the other parts in this embodiment, FIG. 52 is an outer appearance illustrating a configuration of a second coupling 830 in this embodiment, and FIG. 53 is an outer appearance illustrating a configuration of the connecting operation portion 832. FIG. 54 are sectional views in the neighborhood of the residual toner discharge opening in this embodiment before and after connection with the main assembly, and FIG. 55 are side views in the neighborhood of the residual toner discharge opening before and after the connection with the main assembly in this embodiment.

As shown in FIG. 51, the coupling receptor 828 is provided with a first coupling member 29, a connecting operation portion 832, a tension spring 831, a connecting operation spring 800, a second coupling receptor 801, and a second coupling member 830, which are arranged coaxially (with center line 861a).

The connecting operation portion 832 is provided with a second coupling portion 830 in the direction opposite to the arrow N. As shown in FIGS. 52 and 53, the second coupling member 830 is provided with a cylindrical press-fitting portion 830j. As shown in FIG. 53, the connecting operation portion 832 is provided in the cylindrical portion with a projection 832q engaged with the press-fitting portion 830. When the second coupling member 830 is inserted into the connecting operation portion 832 in the direction opposite to the direction of the arrow N, the press-fitting portion 830j abuts to the projection 832q. Furthermore, by pushing the second coupling member 830 against the connecting operation portion 832, the press-fitting portion 830j enters beyond the projection 832q. In this manner, as shown in part (a) of FIG. 54, the second coupling 830 is limited in the movement relative to the connecting operation portion 832 in the direction of the arrow N by the press-fitting portion 830j abutting to the projection 832q. As shown in part (a) of FIG. 54, in the direction opposite to the arrow N, the projection 830i of the second coupling portion 830 abuts to a free end portion 832r of the connecting operation portion 832 so that the movement is limited. Therefore, the second coupling 830 is movable relative to the connecting operation portion 832 in the direction of the arrow N within the range of play. In addition, the second coupling member 830 is rotatable relative to the connecting operation portion 832 of a center line 861a.

As shown in FIG. 51, the connecting operation portion 832 is provided with the connecting operation spring 800 and the second coupling receptor 801 arranged along a common line. Furthermore, the connecting operation portion 832 is provided with the second coupling receptor 801 mounted from the upstream side with respect to the arrow N so as to cover the outer diameter of the connecting operation spring 800 along a common line.

As shown in part (a) of FIG. 54, in the opposite side where the second coupling receptor 801 is mounted, a hole portion 801c is provided engaged with the cylindrical portion 830k of the second coupling 830 substantially without gap therebetween.

When the second coupling receptor 801 is mounted to the connecting operation portion 832 in the direction opposite to the arrow N, two claw portions 801a of the second coupling receptor 801 are engaged with two hole portions 832m of the connecting operation portion 832, respectively (part (a) of FIG. 55). Here, the claw portions 801a are projected in the direction opposite to the direction of the arrow N from a part of an outer periphery of the second coupling receptor 801, and the free ends (opposite to the direction of the arrow N) are provided with hooking portions 801b extending outwardly.

The second coupling receptor 801 mounted on the connecting operation portion 832 is urged by the connecting operation spring 800 in the direction of the arrow N. The second coupling receptor 801 having moved by the urging force relative to the connecting operation portion 832 in the direction of the arrow N is brought into hooking engagement with the hole portion 832m of the connecting operation portion 832 by the hooking portion 801b of the claw portion 801a. In this manner, the second coupling receptor 801 is supported so as to be movable relative to the connecting operation portion 832 in the direction of the arrow N within the range of engagement of the claw portion 801a in the state of the connecting operation spring 800 being urged (part (a) of FIG. 55).

In addition, in this state that the claw portion 801a engages with the hole portion 832m so as to be limited in the direction of the arrow N, the cylindrical portion 830k of the second coupling 830 is in engagement with the hole portion 801c of the second coupling receptor 801 substantially without a gap (part (a) of FIG. 54).

Then, the connection operating portion 832 is mounted to the coupling receptor 828.

As shown in FIG. 51, the connecting operation portion 832 has a cylindrical configuration, and the inside circumference thereof is fitted around the cylindrical portion 828a of the coupling receptor 828. At this time, a rotational position determination groove 832i of the connecting operation portion 832 is engaged with a rotation stopper rib 828d, so that the movement in the rotating direction is limited. Furthermore as shown in FIG. 53, the connecting operation portion 832 is provided with outwardly projecting spring hook projections 832j at each of two axial symmetric positions. As shown in FIG. 54, the coupling receptor 828 is provided with two spring hook portions 828g in the downstream side with respect to the arrow N.

After the connecting operation portion 832 is fitted with the coupling receptor 828 in the direction opposite to the arrow N, two tension springs 831 are mounted. Each tension spring 831 has ring configurations 831a, 831b at respective ends, which are engaged with the spring hook projection 832j and spring hook portion 828g, respectively. At this time, the connecting operation portion 832 is positioned by an inner wall 832s abutted to a free end portion 828e of the spring hook portion 828 by the urging force of the tension spring 831.

In this manner, the connecting operation portion 832 is mounted to the coupling receptor 828. The mounting of the first coupling 29 to the coupling receptor 828 and the mounting of the coupling receptor 828 to the bearing 27R are similar to those in Embodiment 1, and the description thereof is omitted.

Figure 56:
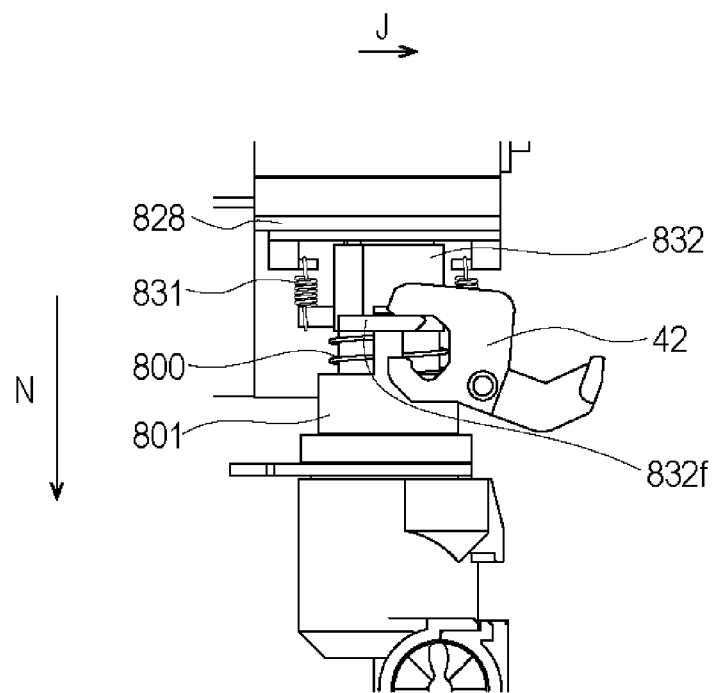
FIG. 56 is an outer appearance illustrating of a toner discharge opening to the main assembly in Embodiment 8.
Figure 56:
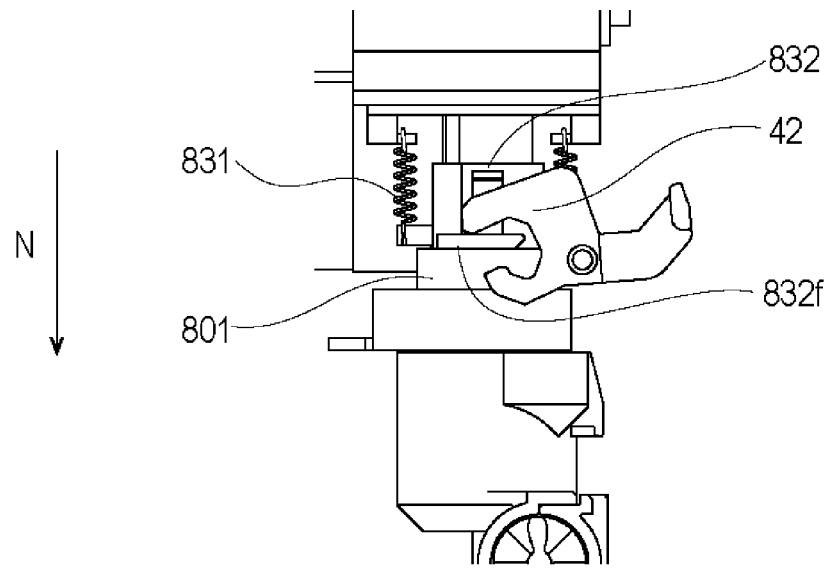

Referring to FIG. 56, the operation of the residual toner discharging portion of the process cartridge 7 will be described.

FIG. 56 illustrates engagement of a toner discharging portion with the main assembly 100, as seen from a lateral side of the process cartridge 7, in this embodiment.

As described hereinbefore, the connecting operation portion 832 receives the urging force of the tension spring 831 to abut to the coupling receptor 828. Furthermore, the second coupling receptor 801 is supported in abutment to the connecting operation portion 832 in the state in which it receives the urging force from the connecting operation spring 800.

As shown in part (a) of FIG. 56, when the process cartridge 7 is inserted into the main assembly 100, the connecting operation portion 832 is engaged with an arm 42 of the main assembly 100. After the completion of the mounting of the process cartridge 7, the connecting operation portion 832 is moved in the direction of the arrow N in interrelation with the closing operation of the front door 91 (parts (a) and (b) of FIG. 25) of the main assembly 100. That is, the connecting operation portion 832 is moved in the direction of the arrow N by the arm 42 interrelated with the front door (part (b) of FIG. 56).

At this time, the second coupling receptor 801 abuts to the main assembly receiving opening sealing member 47 (similar to Embodiment 1, FIG. 26) of the main assembly 100, and therefore, the movement in the direction of the arrow N is limited. As a result, the second coupling receptor 801 moves relative to the connecting operation portion 832 in the direction toward the connecting operation portion 832 (opposite to the direction of the arrow N) against the urging force of the connecting operation spring 800.

In addition, the projection 830i abuts to the free end portion 832r of the connecting operation portion 832 in the direction of the arrow N, and therefore, the second coupling member 830 enters the main assembly receiving opening sealing member 47 and the residual toner receiving opening 80d, as will be described hereinafter (part (b) of FIG. 58).

Figure 58:
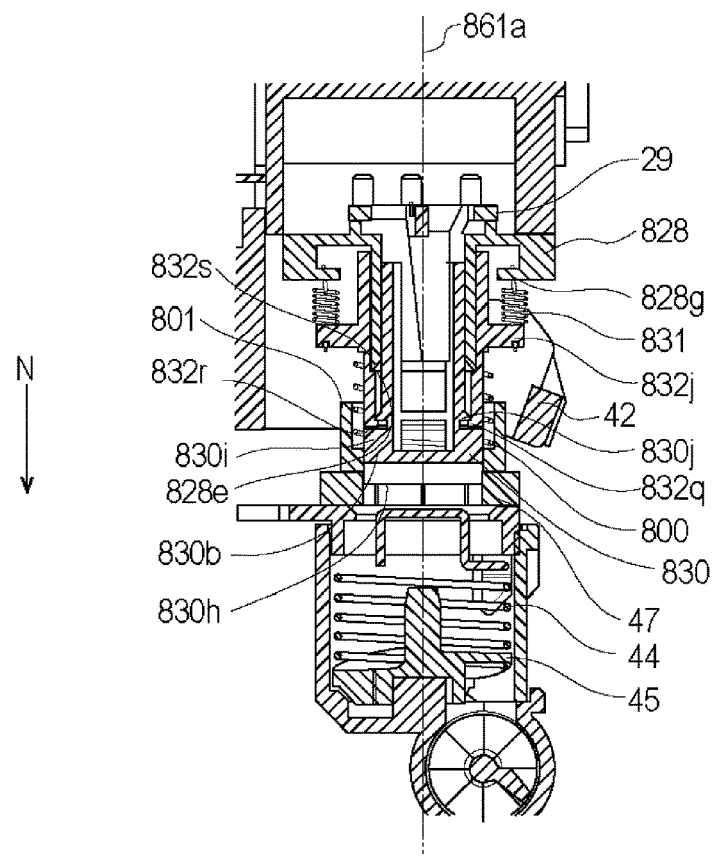
FIG. 58 is a sectional view illustrating an engagement method between the process cartridge and the main assembly in Embodiment 8.
Figure 58:
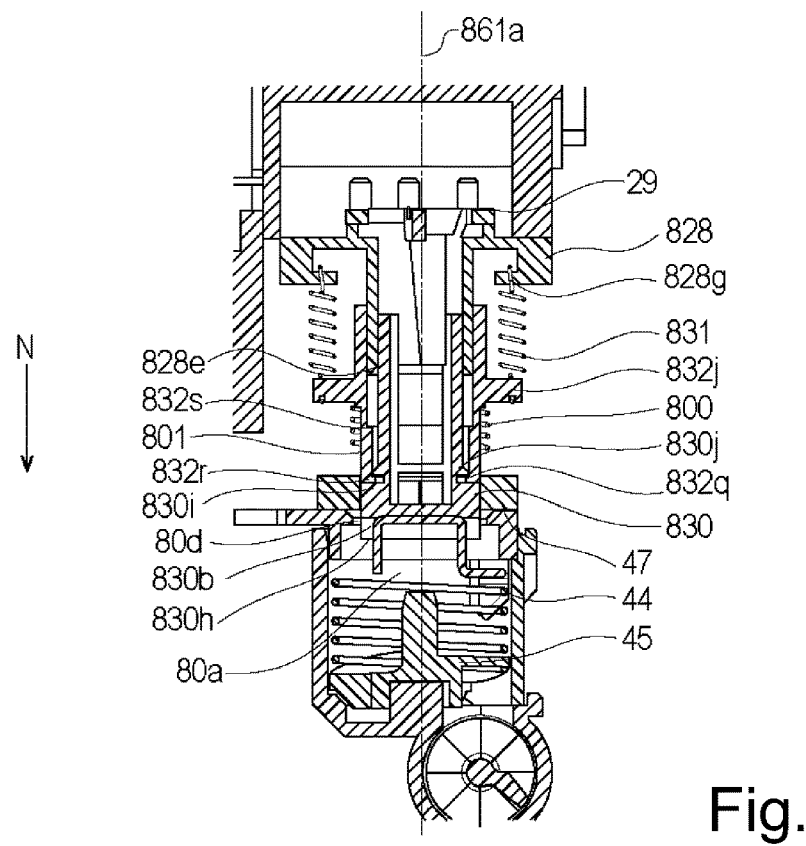

Therefore, the second coupling receptor 801 moves relative to the second coupling 830 in the direction opposite to the direction of the arrow N (part (b) of FIG. 58).

Figure 57:
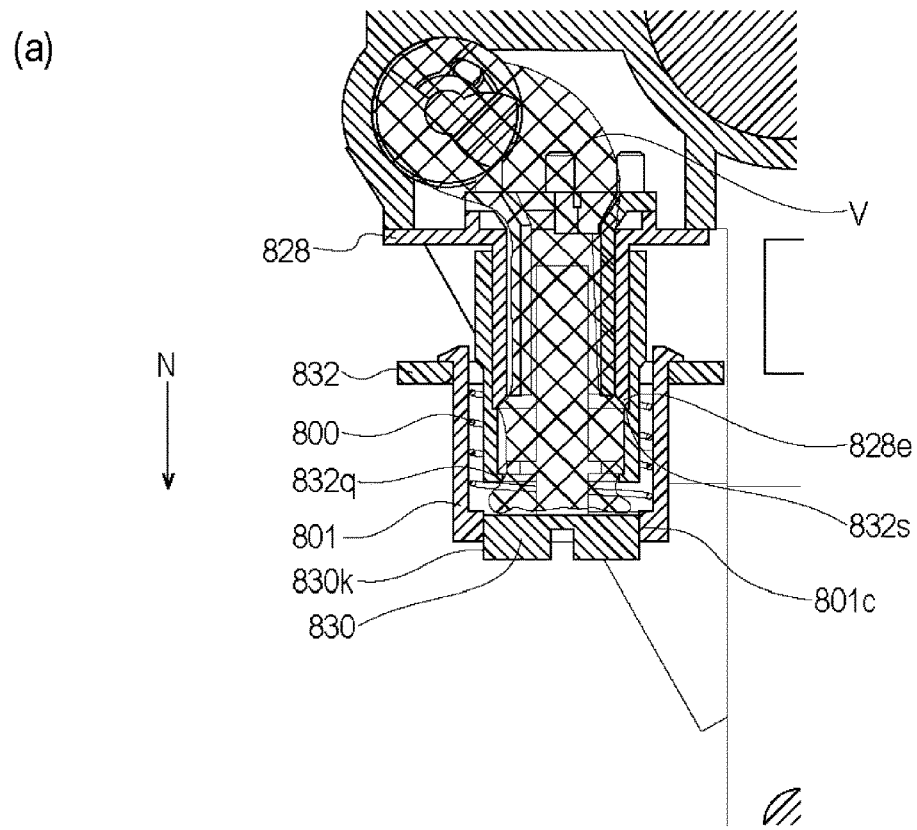
FIG. 57 is a sectional view illustrating a toner discharging passageway from the toner discharge opening of the process cartridge in Embodiment 8.
Figure 57:
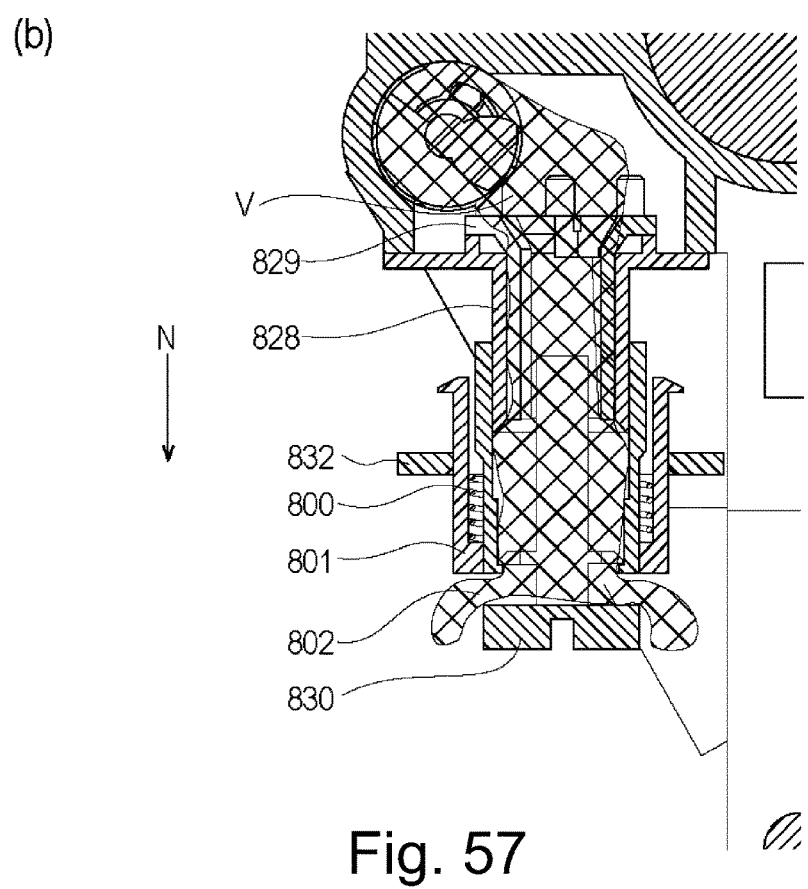

By the operations described above, a gap 802 (residual toner discharge opening) is provided between the second coupling 830 and the second coupling receptor 801 (part (b) of FIG. 55). Referring to FIG. 57, the structure for discharging the residual toner from the process cartridge 7 to the main assembly 100 will be described.

FIG. 57 is a sectional view illustrating a stagnation position of residual toner V and a toner discharging passageway in this embodiment. As shown in part (a) of FIG. 57 and as described hereinbefore, before the mounting of the process cartridge 7 to the main assembly 100, the cylindrical portion 830k of the second coupling 830 is engaged with the cylindrical portion 801c of the second coupling receptor 801 so that they are connected with each other without gap. Therefore, the residual toner V does not leak through the second coupling 830 and the second coupling receptor 801.

As described hereinbefore, the gap 802 is produced by the movement of the second coupling receptor 801 relative to the second coupling 830 in the direction opposite to the arrow N after the mounting of the process cartridge 7 to the main assembly 100. The gap 802 is large enough to discharge the residual toner V, thus accomplishing the discharge of the residual toner V from the process cartridge 7 (part (b) of FIG. 57).

Figure 59:
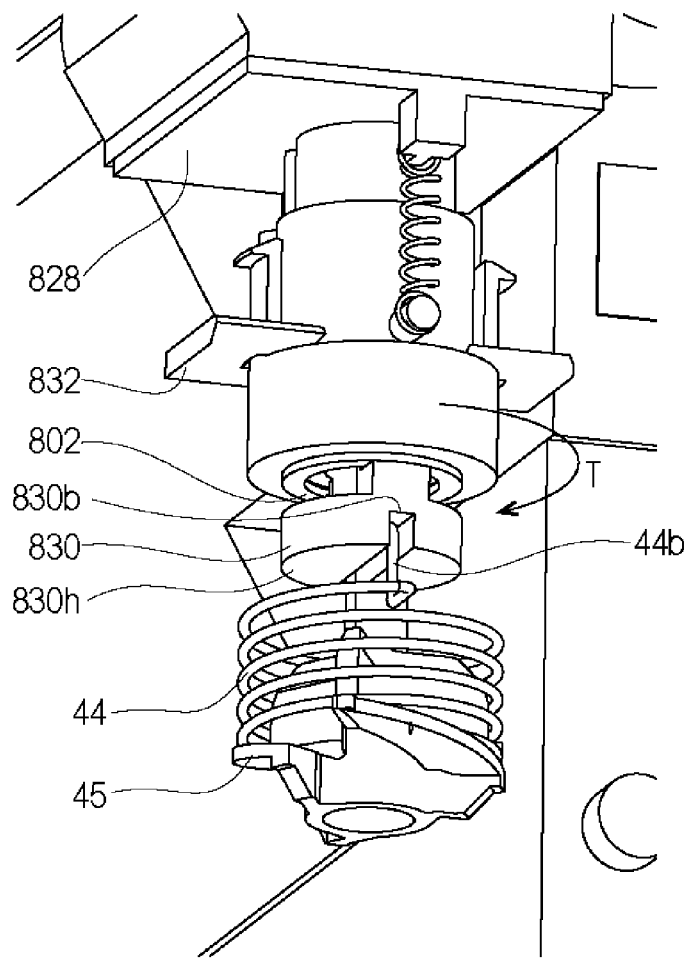
FIG. 59 is a schematic view illustrating the engagement method between the process cartridge and the main assembly in Embodiment 8.

Referring to FIGS. 58 and 59, a driving connection structure relative to the main assembly 100 will be described. FIG. 58 is a sectional view illustrating an engagement method between the toner discharging portion and the main assembly 100 in this embodiment, and FIG. 59 is a schematic view illustrating an engagement method between the process cartridge 7 and the main assembly 100 after the completion of the mounting of the process cartridge 7 to the main assembly, in this embodiment.

Similar to Embodiment 1, the process cartridge 7 is mounted in the direction of the arrow J.

At this time, the arm contact portions 832f, 832g of the connecting operation portion 832 are brought into engagement with the arm 42 of the main assembly 100 shown in FIG. 56. By the completion of the mounting and the closing operation of the front door (unshown) of the main assembly, the arm 42 rotates to engage with the arm contact portions 832f, 832g of the connecting operation portion 832, so that the connecting operation portion 832 is lower than in the direction of the arrow N (part (b) of FIG. 58), as in Embodiment 1.

The second coupling receptor 801 and the second coupling portion 830 mounted to the connecting operation portion 832 in this manner contacts to the main assembly receiving opening sealing member 47 (similar to Embodiment 1, FIG. 26) of the main assembly 100. When the connecting operation portion 832 is further pushed down by the arm 42 in the direction of the arrow N, the second coupling receptor 801 is moved in the direction opposite to the direction of the arrow N against the urging force of the connecting operation spring 800. At this time, the second coupling member 830 contacts to the free end portion 832r of the connecting operation portion 832 by the projection 830i so that the movement in the direction of the arrow N is limited, as described hereinbefore. Therefore, by the movement of the connecting operation portion 832 in the direction of the arrow N, only the second coupling member 830 enters the main assembly receiving opening sealing member and the residual toner receiving opening 80d (part (b) of FIG. 58).

As shown in FIG. 54 and similar to Embodiment 1, the spring coupling 44 and the feeding fin 45, which are rotatable about the center line 61a, are provided in the first main assembly feeding passageway 80a of the main assembly.

The driving connection between the main assembly 100 and the process cartridge 7 will be described.

As shown in FIG. 58, the second coupling 830 enters the main assembly receiving opening 80d of the main assembly 100. At this time, the second coupling 830 compresses the spring coupling 44 in the direction of the arrow N against the reaction force of the spring coupling 44.

The second coupling member 830 rotates in interrelation with the rotation of the photosensitive drum 1, similar to Embodiment 1. By this, as shown in FIG. 59, the groove portion 830b of the second coupling member 830 is engaged with the coupling portion 44b of the spring coupling 44 in the rotational moving direction.

Here, when the second coupling 830 enters the main assembly receiving opening 80d of the main assembly 100, the coupling portion 44b of the spring coupling 44 may not engage with the groove portion 830b of the second coupling member 830 but may be pushed down to the projection 830h. In such a case, the second coupling member 830 rotates in the direction of the arrow T while the coupling spring 44 is pressed against the projection 830h. When the second coupling member rotates to the phase such that the coupling portion 44b of the spring coupling 44 is engageable with the groove portion 830b, the spring coupling 44 and the second coupling member 830 engage with each other in rotational moving direction so as to be rotatable integrally with the feeding fin 45.

In this manner, the engagement is possible irrespective of the phase relation between the spring coupling 44 and the second coupling member 830.

Here, the spring coupling 44 is a compression spring having a wire diameter of approximately Φ0.6 mm and an inner diameter of approximately Φ12.3 mm. The spring coupling 44 provides the urging forces of approximately 33 gf in the state of abutting to the spring stopper 43 (uncoupled state) and approximately 50 gf in the connection state of the second coupling member 830.

Referring to FIGS. 57 and 58, the feeding of the residual toner to the main assembly 100 will be described.

As shown in part (b) of FIG. 58, when the second coupling member 830 enters the main assembly receiving opening 80d, the gap 802 is produced between the second coupling member 830 and the second coupling receptor 801 in the circumferential direction (part (b) of FIG. 57). Through the gap 802, the residual toner produced in the process cartridge 7 can be fed to the main assembly 100.

In addition, in the state of not connecting with the main assembly, the second coupling member 830 is in the second coupling receptor 801 substantially without gap, and therefore, the leakage of the residual toner through the gap 802 is prevented.

In this manner, in the case that the outlet opening to the main assembly is not on the center line 861a, the same effects as in Embodiment 1 are provided. Furthermore, in the free state of the process cartridge 7, the leakage of the residual toner can be prevented without using a sealing member such as a shutter 34 of Embodiment 1, for example.

The structure of this embodiment is summarized in the following. As shown in part (b) of FIG. 55, the second coupling member 830 of this embodiment constitutes a part of the discharge opening 802 for the toner. The second coupling member 830 opens the toner discharge opening 802 by moving from the second position (part (a) of FIG. 55) to the first position (part (b) of FIG. 55), and closes the toner discharge opening 802 by moving from the first position to the second position. By the movement of the second coupling member 830, the discharge opening 802 is opened and closed.

Finally, representative structure examples described in the foregoing will be summarized. Reference numerals are given for some elements in the following.

The reference numerals are intended to indicate the correspondence with the elements in the embodiments. The correspondence is merely an example. No limitation to the elements of the embodiments is intended.

Structure Example A1

A cartridge (7) detachably mountable to a main assembly of an electrophotographic image forming apparatus, said main assembly including a main assembly side feeding member configured to feed toner toward a main assembly side toner accommodating portion, said cartridge comprising:
a photosensitive drum; (1)
a discharge opening (32d, 730d, 802) configured to discharge toner removed from said photosensitive drum toward the main assembly side feeding member; and
a coupling member (30, 629, 730, 830) configured to transmit a rotational force to the main assembly side feeding member,
wherein said coupling member is movable between a first position for transmitting the rotational force to the main assembly side feeding member and a second position retracted from the first position.

Structure Example A2

A cartridge according to structure example A1, wherein a distance between the second position and a rotational axis of said photosensitive drum this is smaller than a distance between the first position and the rotational axis of said photosensitive drum.

Structure Example A3

A cartridge according to structure example A2, further comprising a cartridge side feeding member for feeding the toner removed from said photosensitive drum, wherein a distance between the second position and a rotational axis of said cartridge side feeding member is smaller than a distance between the first position and the rotational axis of said cartridge side feeding member.

Structure Example A4

A cartridge according to structure example A2 or A3, further comprising a moving force receiving portion for receiving, from the main assembly of the electrophotographic image forming apparatus, a force for moving said coupling member from the second position to the first position.

Structure Example A5

A cartridge according to any one of structure examples A2-A4, wherein said coupling member is in the second position in a free state thereof.

Structure Example A6

A cartridge according to any one of structure examples A1-A5, further comprising an urging member for urging said coupling member toward the second position.

Structure Example A7

A cartridge according to any one of structure examples A1-A6, further comprising a moving force receiving portion for receiving, from the main assembly of the electrophotographic image forming apparatus, a force for moving said coupling member from the first position to the second position.

Structure Example A8

A cartridge according to any one of structure examples A1-A4, A6 and A7, wherein said coupling member is in the first position in the free state thereof.

Structure Example A9

A cartridge according to any one of structure examples A1-A8, further comprising an urging member for urging said coupling member toward the first position.

Structure Example A9-2

A cartridge according to structure example A7 or A9, wherein said urging member further includes a feeding portion for feeding the toner.

Structure Example A9-2

A cartridge according to any one of structure examples A7, A9, A9-2, wherein said urging member includes a stirring portion for stirring the toner.

Structure Example A10

A cartridge detachably mountable to main assembly of an electrophotographic image forming apparatus, said main assembly including a main assembly side feeding member configured to feed toner toward a main assembly side toner accommodating portion, said cartridge comprising:
  a photosensitive drum (1);
  a discharge opening (32*d*, 730*d*, 802) configured to discharge toner removed from said photosensitive drum toward the main assembly side feeding member;
  a coupling member (30, 629, 730, 830) configured to transmit a rotational force to the main assembly side feeding member, and
  a connecting portion (32, 532, 629) configured to connect said discharge opening to a toner receiving opening provided in the main assembly of the electrophotographic image forming apparatus, said connecting portion and being movable between a connecting position for connecting said discharge opening to the receiving opening and a non-connecting position retracted from the connecting position,
  wherein said coupling member is movable with movement of said connecting portion between the connecting position and the non-connecting position.

Structure Example A11

A cartridge according to structure example A10, wherein said coupling member is movable between a first position for transmitting the rotational force to said main assembly side feeding member and a second position retracted from the first position, wherein said coupling member moves to the first position with movement of said connecting portion to the connecting position, and said coupling member moves to the second position with movement of said connecting portion to the non-connecting position.

Structure Example A12

A cartridge according to structure example A11, wherein a distance between the second position and a rotational axis of said photosensitive drum this is smaller than a distance between the first position and the rotational axis of said photosensitive drum.

Structure Example A13

A cartridge according to structure example A11 or A12, further comprising a cartridge side feeding member for feeding the toner removed from said photosensitive drum, wherein a distance between the second position and a rotational axis of said cartridge side feeding member is smaller than a distance between the first position and the rotational axis of said cartridge side feeding member.

Structure Example A14

A cartridge according to any one of structure examples A11-A13, further comprising a moving force receiving portion for receiving, from the main assembly of the electrophotographic image forming apparatus, a force for moving said coupling member from the second position to the first position.

Structure Example A15

A cartridge according to any one of structure examples A11-A14, wherein said coupling member is in the second position in a free state thereof.

Structure Example A16

A cartridge according to any one of structure examples A11-A15, further comprising an urging member for urging said coupling member toward the second position.

Structure Example A17

A cartridge according to any one of structure examples A11-A16, further comprising a moving force receiving portion for receiving, from the main assembly of the electrophotographic image forming apparatus, the force for moving said coupling member from the first position to the second position.

Structure Example A18

A cartridge according to any one of structure examples A11-A17, wherein said coupling member is in the first position in the free state thereof.

Structure Example A19

A cartridge according to any one of structure examples A11-A18, further comprising an urging member for urging said coupling member toward the first position.

Structure Example A20

A cartridge detachably mountable to main assembly of an electrophotographic image forming apparatus, said main assembly including a main assembly side feeding member configured to feed toner toward a main assembly side toner accommodating portion, said cartridge comprising:
 a photosensitive drum;
 a discharge opening configured to discharge toner removed from said photosensitive drum toward the main assembly side feeding member; and
 a coupling member configured to transmit a rotational force to the main assembly side feeding member,
 wherein said coupling member is movable in a direction crossing with a mounting direction of said cartridge.

Structure Example A21

A cartridge according to structure example A20, wherein said coupling member is movable between a first position for transmitting the rotational force to said main assembly side feeding member and a second position retracted from the first position.

Structure Example A22

A cartridge according to structure example A21, wherein a distance between the second position and a rotational axis of said photosensitive drum this is smaller than a distance between the first position and the rotational axis of said photosensitive drum.

Structure Example A23

A cartridge according to structure examples A21 or A22, further comprising a cartridge side feeding member for feeding the toner removed from said photosensitive drum, wherein a distance between the second position and a rotational axis of said cartridge side feeding member is smaller than a distance between the first position and the rotational axis of said cartridge side feeding member.

Structure Example A24

A cartridge according to any one of structure examples A21-A23, further comprising a moving force receiving portion for receiving, from the main assembly of the electrophotographic image forming apparatus, a force for moving said coupling member from the second position to the first position.

Structure Example A25

A cartridge according to any one of structure examples A21-A24, wherein said coupling member is in the second position in a free state thereof.

Structure Example A26

A cartridge according to any one of structure examples A21-A25, further comprising an urging member for urging said coupling member toward the second position.

Structure Example A27

A cartridge according to any one of structure examples A21-A26, further comprising a moving force receiving portion for receiving, from the main assembly of the electrophotographic image forming apparatus, the force for moving said coupling member from the first position to the second position.

Structure Example A28

A cartridge according to any one of structure examples A21-A24, A26 and A27, wherein said coupling member is in the first position in the free state thereof.

Structure Example A29

A cartridge according to any one of structure examples A21-A28, further comprising an urging member for urging said coupling member toward the first position.

Structure Example A30

A cartridge according to any one of structure examples A1-A29, wherein said coupling member is movable relative to said photosensitive drum.

Structure Example A31

A cartridge according to any one of structure examples A1-A30, wherein said coupling member is movable in a direction crossing with a rotational axis direction of said photosensitive drum.

Structure Example A32

A cartridge according to any one of structure examples A1-A31, wherein said coupling member is a movable in a direction crossing with the mounting direction of said cartridge.

Structure Example A33

A cartridge according to any one of structure examples A1-A32, wherein said coupling member is rotatable in interrelation with rotation of said photosensitive drum.

Structure Example A34

A cartridge according to any one of structure examples A1-A33, wherein said cartridge includes a developing roller, and said coupling member is rotatable in interrelation with rotation of said developing roller.

Structure Example A34-2

A cartridge according to any one of structure examples A1-A33, further comprising a developing roller, a supplying roller for supplying the toner to said developing roller, and a transmitting portion for transmitting a rotational force from said supplying roller to said coupling member.

Structure Example A35

A cartridge according to any one of structure examples A1-A34-2, further comprising a feeding passageway for permitting the toner removed from said photosensitive drum to move.

Structure Example A36

A cartridge according to any one of structure examples A1-A35, wherein said feeding passageway includes a first feeding passageway in which the toner is movable in a direction of the rotational axis direction of said photosensitive drum.

Structure Example A37

A cartridge according to structure example A36, wherein said feeding passageway includes a second feeding passageway in which the toner is movable in a direction crossing with the rotational axis direction of said photosensitive drum, said second feeding passageway being in fluid communication with said first feeding passageway.

Structure Example A38

A cartridge according to structure example A37, further comprising a cartridge side feeding member provided inside said first feeding passageway to feed the toner.

Structure Example A39

A cartridge according to structure example A38, wherein said cartridge side feeding member includes a first feeding portion for feeding the toner to a communicating portion between said first feeding passageway and said second feeding passageway, and a second feeding portion, provided downstream of said first feeding portion with respect to a toner feeding direction of said first feeding portion, for feeding the toner in a direction opposite to the feeding direction of said first feeding portion.

Structure Example A40

A cartridge according to structure example A39, wherein said second feeding portion is disposed adjacent to said communicating portion.

Structure Example A41

A cartridge according to structure example A40, wherein said second feeding portion overlaps with said communicating portion as said cartridge side feeding member is seen in a direction perpendicular to the rotational axis.

Structure Example A42

A cartridge according to any one of structure examples A37-A41, wherein said second feeding passageway is a discharging passageway for permitting the toner to move to said discharge opening.

Structure Example A43

A cartridge according to any one of structure examples A1-A42, further comprising a discharging passageway for permitting the toner to move to said discharge opening.

Structure Example A44

A cartridge according to any one of a cartridge according to structure example A43, wherein said discharging passageway move the toner in the direction perpendicular to the rotational axis direction of said photosensitive drum.

Structure Example A45

A cartridge according to any one of structure examples A42-A44, wherein said discharging passageway is disposed at one end portion side of said cartridge with respect to the rotational axis direction of said photosensitive drum.

Structure Example A46

A cartridge according to any one of structure examples A42-A45, wherein said coupling member is disposed at a terminal end side of said discharging passageway.

Structure Example A47

A cartridge according to any one of structure examples A42-A46, wherein said coupling member (629) constitutes at least a part of said discharging passageway.

Structure Example A48

A cartridge according to any one of structure examples A42-A47, wherein at least a part of said coupling member is inside said discharging passageway.

Structure Example A49

A cartridge according to any one of structure examples A42-A48, wherein said discharging passageway is deformable, and said coupling member moves with deformation of said discharging passageway.

Structure Example A50

A cartridge according to structure example A49, wherein said discharging passageway (61, 32, 532) is deformable to expand and contract.

Structure Example A51

A cartridge according to structure example A49 or A50, further comprising a connecting portion (32, 532, 629) configured to connect said discharge opening to a toner receiving opening provided in the main assembly of the electrophotographic image forming apparatus, wherein said discharging passageway is deformed by movement of said connecting portion.

Structure Example A52

A cartridge according to any one of structure examples A49-A51, further comprising a elastically deformable elastic deformation portion constituting at least a part of said discharging passageway, wherein said coupling member moves by deformation of said elastic deformation portion.

Structure Example A53

A cartridge according to any one of structure examples A1-A52, wherein said coupling member constitutes at least a part of said discharge opening.

Structure Example A54

A cartridge according to any one of any one of structure examples A1-A53, further comprising a cartridge side feeding member for feeding the toner removed from said photosensitive drum.

Structure Example A55

A cartridge according to structure example 54, wherein as said cartridge is seen in a direction of a rotational axis of said photosensitive drum, a rotation center of said photosensitive drum and a rotation center of said cartridge side feeding member are disposed in opposite sides with respect to a line along a rotational axis of said coupling member.

Structure Example A56

A cartridge according to structure examples A54 or A55, wherein said coupling member is rotatable in interrelation with rotation of said cartridge side feeding member.

Structure Example A57

A cartridge according to any one of structure examples A54-A56, wherein said cartridge side feeding member feeds the toner along the axial direction of said photosensitive drum.

Structure Example A58

A cartridge according to any one of structure examples A54-A57, wherein said coupling member is movable relative to said cartridge side feeding member.

Structure Example A59

A cartridge according to any one of structure examples A54-A58, wherein said coupling member is movable in a direction crossing with the rotational axis direction of said cartridge side feeding member.

Structure Example A60

A cartridge according to any one of structure examples A54-A59, further comprising a drive transmitting portion for transmitting the rotational force to said coupling member from said cartridge side feeding member.

Structure Example A61

A cartridge according to structure example A60, wherein said cartridge side feeding member includes a first feeding portion for feeding the toner toward said drive transmitting portion and a second feeding portion for feeding the toner in a direction opposite to the toner feeding direction of said first feeding portion, wherein said drive transmitting portion receives the rotational force from said second feeding portion.

Structure Example A62

A cartridge according to structure example A60 or A61, wherein said cartridge side feeding member includes a screw-like blade, and said drive transmitting portion includes a plurality of engaging portions, which are sequentially engaged by said blade by rotation of said cartridge side feeding member.

Structure Example A63

A cartridge according to structure example A62, wherein said engaging portion is a projection.

Structure Example A64

A cartridge according to any one of structure examples A1-A63, further comprising a drive transmitting portion for transmitting the rotational force from said photosensitive drum to said coupling member.

Structure Example A65

A cartridge according to any one of structure examples A60-A64, wherein at least one of said drive transmitting portion is disposed in a feeding passageway in which the toner is moved.

Structure Example A66

A cartridge according to any one of structure examples A60-A65, wherein said drive transmitting portion is provided with an opening for permitting the toner to pass toward said discharge opening.

Structure Example A67

A cartridge according to any one of structure examples A1-A66, wherein said discharge opening is opened and closed by movement of said coupling member.

Structure Example A68

A cartridge according to any one of structure examples A1-A67, wherein said coupling member includes an elastically deformable elastic deformation portion, and said coupling member is moved by deformation of said elastic deformation portion.

Structure Example A69

A cartridge according to any one of structure examples A1-A68, wherein said cartridge includes a cleaning member configured to remove the toner from said photosensitive drum.

Structure Example A70

A cartridge according to any one of structure examples A1-A69, further comprising a moving force receiving portion for receiving, from the main assembly of the electrophotographic image forming apparatus, a force for moving said coupling member.

Structure Example A71

A cartridge according to structure example A70, further comprising an urging member for urging said coupling member, wherein said coupling member is movable against an urging force of said urging member, by the force received by said moving force receiving portion.

Structure Example A72

A cartridge according to any one of structure examples A1-A71, further comprising a connecting portion for connecting said discharge opening to a toner receiving opening provided in the main assembly of the electrophotographic image forming apparatus.

Structure Example A73

A cartridge according to structure example A72, wherein said connecting portion is movable.

Structure Example A73-2

A cartridge according to structure example A73, further comprising a locking member for locking said connecting portion.

Structure Example A73-3

A cartridge according to structure example A73-2, wherein said locking member is an openable member for opening and closing said discharge opening, and wherein said connecting portion is released by said openable member opening said discharge opening.

Structure Example A74

A cartridge according to any one of structure examples A73-A73-3, wherein said coupling member is movable with movement of said connecting portion.

Structure Example A75

A cartridge according to any one of structure examples A1-A74, wherein said photosensitive drum is provided with a driving force receiving portion for receiving a rotational force from the main assembly of the electrophotographic image forming apparatus, and the rotational force inputted from said drive inputting portion is transmitted to said coupling member.

Structure Example A76

A cartridge according to any one of structure examples A1-A75, further comprising an openable member for opening and closing said discharge opening.

Structure Example A77

A cartridge according to structure example A76, wherein said openable member is provided with a sealing member for covering said discharge opening, a seal supporting portion for supporting said sealing member, wherein when said openable member closes said discharge opening, said sealing member is sandwiched between said seal supporting portion and said discharge opening and contacts an edge of said discharge opening.

Structure Example A78

A cartridge according to structure example A77, wherein said seal supporting portion is provided with a recess recessed away from said sealing member or a non-contact portion not contacting said sealing member.

Structure Example A79

A cartridge according to structure example A78, wherein as said discharge opening is projected onto said seal supporting portion, said recess or said non-contact portion of said seal supporting portion is in a projection area of said discharge opening.

Structure Example A80

A cartridge according to structure in the example A78 or A79, wherein said seal supporting portion is provided with an opening or a cut-away portion as said non-contact portion.

Structure Example A81

A cartridge according to any one of structure examples A76-A80, further comprising a projection provided downstream of said discharge opening with respect to a closing direction in which said openable member closes said discharge opening and projecting toward a downstream side with respect to a discharging direction in which a developer is discharged from said discharge opening, wherein as said openable member is projected onto said projection along the closing direction when said openable member is closed, at least a part of a projection area of said openable member overlaps said projection.

Structure Example A82

A cartridge detachably mountable to a main assembly of an electrophotographic image forming apparatus comprising:
- a photosensitive drum;
- a discharge opening for permitting discharge of toner removed from said photosensitive drum to an outside of said cartridge; and
- a coupling member provided adjacent to said discharge opening and configured to transmit a rotational force to an outside of said cartridge, coupling member and being movable relative to said photosensitive drum.

Structure Example A83

A cartridge detachably mountable to a main assembly of an electrophotographic image forming apparatus comprising:
- a photosensitive drum;
- a discharge opening for permitting discharge of toner removed from said photosensitive drum to an outside of said cartridge; and
- a coupling member capable of transmitting the rotational force to an outside of said cartridge and movable to open and close said discharge opening.

Structure Example A84

A cartridge according to structure example A82 or A83, further comprising a feeding passageway for movement of the toner removed from said photosensitive drum.

Structure Example A85

A cartridge according to any one of structure examples A82-A84, wherein said feeding passageway includes a first feeding passageway in which the toner is movable in a direction of the rotational axis direction of said photosensitive drum.

Structure Example A86

A cartridge according to structure example A85, wherein said feeding passageway includes a second feeding passageway in which the toner is movable in a direction crossing with the rotational axis direction of said photosensitive drum, said second feeding passageway being in fluid communication with said first feeding passageway.

Structure Example A87

A cartridge according to structure example A86, further comprising a feeding member provided inside said first feeding passageway to feed the toner.

Structure Example A88

A cartridge according to structure example A87, wherein said feeding member includes a first feeding portion for feeding the toner to a communicating portion between said first feeding passageway and said second feeding passageway, and a second feeding portion, provided downstream of said first feeding portion with respect to a toner feeding direction of said first feeding portion, for feeding the toner in a direction opposite to the feeding direction of said first feeding portion.

Structure Example A89

A cartridge according to structure example A88, wherein said second feeding portion is disposed adjacent to said communicating portion.

Structure Example A90

A cartridge according to structure example A88 or A89, wherein said second feeding portion overlaps with said communicating portion as said cartridge side feeding member is seen in a direction perpendicular to the rotational axis

Structure Example A91

A cartridge according to any one of structure examples A86-A90, wherein said second feeding passageway is a discharging passageway for permitting the toner to move to said discharge opening.

Structure Example A92

A cartridge according to any one of structure examples A82-A91, further comprising a discharging passageway for permitting the toner to move to said discharge opening.

Structure Example A93

A cartridge according to A91 or A92, wherein said discharging passageway moves the toner in a direction crossing with a rotational axis of said photosensitive drum.

Structure Example A94

A cartridge according to any one of structure examples A91-A93, wherein said discharging passageway is disposed at one end portion side of said cartridge with respect to the rotational axis direction of said photosensitive drum.

Structure Example A95

A cartridge according to any one of structure examples A91-A94, wherein said coupling member is disposed at a terminal end side of said discharging passageway.

Structure Example A96

A cartridge according to any one of structure examples A91-A95, wherein said coupling member constitutes at least a part of said discharging passageway.

Structure Example A97

A cartridge according to any one of structure examples A91-A96, wherein at least a part of said coupling member is inside said discharging passageway.

Structure Example A98

A cartridge according to any one of structure examples A91-A97, wherein said discharging passageway is deformable, and said coupling member moves with deformation of said discharging passageway.

Structure Example A99

A cartridge according to structure example A98, wherein said discharging passageway is deformable to expand and contract.

Structure Example A100

A cartridge according to structure example A98 or A99, further comprising a connecting portion for connecting said discharge opening with a outside of said cartridge, wherein said discharging passageway is deformable by movement of said connecting portion.

Structure Example A101

A cartridge according to any one of structure examples A91-A100, further comprising a elastically deformable elastic deformation portion constituting at least a part of said discharging passageway, wherein said coupling member moves by deformation of said elastic deformation portion.

Structure Example A102

A cartridge according to any one of structure examples A82-A101, further comprising a connecting portion for connecting said discharge opening with a outside of said cartridge.

Structure Example A103

A cartridge according to structure example A102, wherein said connecting portion is movable.

Structure Example A104

A cartridge according to structure example A103, wherein said coupling member is moved with movement of said connecting portion.

Structure Example A105

A cartridge detachably mountable to a main assembly of an electrophotographic image forming apparatus comprising:
- a photosensitive drum;
- a discharge opening for permitting discharge of toner removed from said photosensitive drum to an outside of said cartridge;
- a deformable discharging passageway in which the toner moves to said discharge opening; and
- a coupling member provided adjacent to said discharge opening and configured to transmit a rotational force to an outside of said cartridge,
- wherein said coupling member is movable with deformation of said discharging passageway.

Structure Example A106

A cartridge detachably mountable to a main assembly of an electrophotographic image forming apparatus comprising:
- a photosensitive drum;
- a discharge opening for permitting discharge of toner removed from said photosensitive drum to an outside of said cartridge;
- a discharging passageway in which the toner moves to said discharge opening; and
- a coupling member capable of transmitting the rotational force to an outside of said cartridge, wherein at least a part of said coupling member is provided inside said discharging passageway and movable along said discharging passageway.

Structure Example A107

A cartridge according to structure example A105 or A106, further comprising a feeding passageway for movement of the toner removed from said photosensitive drum.

Structure Example A108

A cartridge according to structure example A107, wherein said feeding passageway is configured to move the toner in a rotational axis direction of said photosensitive drum.

Structure Example A109

A cartridge according to structure example A108, wherein said discharging passageway is in fluid communication with said feeding passageway.

Structure Example A110

A cartridge according to structure example A109, further comprising a feeding member provided inside said feeding passageway to feed the toner.

Structure Example A111

A cartridge according to structure example A110, wherein said feeding member includes a first feeding portion for feeding the toner toward the communicating portion between said feeding passageway and said discharging passageway, and a second feeding portion provided downstream of said first feeding portion with respect to a toner feeding direction of said first feeding portion to feed the toner in a direction opposite to the toner feeding direction of said first feeding portion.

Structure Example A112

A cartridge according to structure example A111, wherein said second feeding portion is disposed adjacent to said communicating portion.

Structure Example A113

A cartridge according to structure examples A111 or A112, wherein said second feeding portion overlaps with said communicating portion as said cartridge side feeding member is seen in a direction perpendicular to the rotational axis.

Structure Example A114

A cartridge according to any one of structure examples A105-A113, wherein said discharging passageway moves the toner in a direction crossing with the rotational axis of said photosensitive drum.

Structure Example A115

A cartridge according to any one of structure examples A105-A114, wherein said discharging passageway is disposed at one end portion side of said cartridge with respect to the rotational axis direction of said photosensitive drum.

Structure Example A116

A cartridge according to any one of structure examples A105-A115, wherein said coupling member is disposed at a terminal end side of said discharging passageway.

Structure Example A117

A cartridge according to any one of structure examples A105-A116, wherein said coupling member constitutes at least a part of said discharging passageway.

Structure Example A118

A cartridge according to any one of structure examples A105-A117, wherein at least a part of said coupling member is inside said discharging passageway.

Structure Example A119

A cartridge according to any one of structure examples A105-A118, wherein said discharging passageway is deformable, and said coupling member moves with deformation of said discharging passageway.

Structure Example A120

A cartridge according to structure example A119, wherein said discharging passageway (61, 32, 532) is deformable to expand and contract.

Structure Example A121

A cartridge according to structure example A119 or A120, further comprising a connecting portion for connecting said discharge opening with a outside of said cartridge, wherein said discharging passageway is deformable by movement of said connecting portion.

Structure Example A122

A cartridge according to any one of structure examples A119-A121, further comprising a elastically deformable elastic deformation portion constituting at least a part of said discharging passageway, wherein said coupling member moves by deformation of said elastic deformation portion.

Structure Example A123

A cartridge according to any one of structure examples A82-A122, wherein said coupling member is movable relative to said photosensitive drum.

Structure Example A124

A cartridge according to any one of structure examples A82-A123, wherein said coupling member is movable in a direction crossing with a rotational axis direction of said photosensitive drum.

Structure Example A125

A cartridge according to any one of structure examples A82-A124, wherein said coupling member is a movable in a direction crossing with the mounting direction of said cartridge.

Structure Example A126

A cartridge according to any one of structure examples A82-A125, wherein said coupling member is rotatable in interrelation with rotation of said photosensitive drum.

Structure Example A127

A cartridge according to any one of structure examples A82-A126, wherein said cartridge includes a developing roller, and said coupling member is rotatable in interrelation with rotation of said developing roller.

Structure Example A128

A cartridge according to any one of structure examples A82-A127, further comprising a feeding member for feeding the toner removed from said photosensitive drum.

Structure Example A129

A cartridge according to structure example A128, wherein as said cartridge is seen in a direction of a rotational axis of said photosensitive drum, a rotation center of said photosensitive drum and a rotation center of said cartridge side feeding member are disposed in opposite sides with respect to a line along a rotational axis of said coupling member.

Structure Example A130

A cartridge according to any one of structure example A128 or A129, wherein said coupling member is rotatable in interrelation with rotation of said feeding member.

Structure Example A131

A cartridge according to any one of structure examples A128-A130, wherein said feeding member feeds the toner along the axial direction of said photosensitive drum.

Structure Example A132

A cartridge according to any one of structure examples A128-A131, wherein said coupling member is movable relative to said feeding member.

Structure Example A133

A cartridge according to any one of structure examples A128-A132, wherein said coupling member is movable in a direction crossing with the rotational axis direction of said feeding member.

Structure Example A134

A cartridge according to structure examples A128-A133, further comprising a drive transmitting portion for transmitting the rotational force from said feeding member to said coupling member.

Structure Example A135

A cartridge according to structure example A134, wherein said feeding member includes a first feeding portion for feeding the toner toward said drive transmitting portion, and a second feeding portion for feeding the toner in a direction opposite to that of said first feeding portion, wherein said drive transmitting portion receives the rotational force from said second feeding portion.

Structure Example A136

A cartridge according to structure example A134 or A135, wherein said feeding member includes a screw-like blade, and said drive transmitting portion includes a plurality of engaging portions, which are sequentially engaged by said blade with rotation of said feeding member.

Structure Example A137

A cartridge according to any one of structure examples A82-A136, further comprising a drive transmitting portion for transmitting the rotational force from said photosensitive drum to said coupling member.

Structure Example A138

A cartridge according to any one of structure examples A134-A137, wherein at least one of said drive transmitting portion is disposed in a feeding passageway in which the toner is moved.

Structure Example A139

A cartridge according to any one of structure examples A134-A138, wherein said drive transmitting portion is provided with an opening for permitting the toner to pass toward said discharge opening.

Structure Example A140

A cartridge according to any one of structure examples A82-A139, wherein said coupling member constitutes at least a part of said discharge opening.

Structure Example A141

A cartridge according to any one of structure examples A82-A140, wherein said discharge opening is opened and closed by movement of said coupling member.

Structure Example A142

A cartridge according to any one of structure examples A82-A141, wherein said coupling member includes an elastically deformable elastic deformation portion, and said coupling member is moved by deformation of said elastic deformation portion.

Structure Example A143

A cartridge according to any one of structure examples A82-A142, wherein said cartridge includes a cleaning member configured to remove the toner from said photosensitive drum.

Structure Example A144

A cartridge according to any one of structure examples A82-A143, further comprising a moving force receiving portion for receiving a force for moving said coupling member, from an outside of said cartridge.

Structure Example A145

A cartridge according to structure example A144, further comprising an urging member for urging said coupling member, wherein said coupling member is movable against an urging force of said urging member, by the force received by said moving force receiving portion.

Structure Example A146

A cartridge according to any one of structure examples A82-A145, wherein said photosensitive drum provided with a drive inputting portion for receiving a rotational force from an outside of said cartridge, and the rotational force received by said drive inputting portion is transmitted to said coupling member.

Structure Example A147

A cartridge according to any one of structure examples A82-A146, further comprising an openable member for opening and closing said discharge opening.

Structure Example A148

A cartridge according to structure example A147, wherein said openable member is provided with a sealing member for covering said discharge opening, a seal supporting portion for supporting said sealing member, wherein when said openable member closes said discharge opening, said sealing member is sandwiched between said seal supporting portion and said discharge opening and contacts an edge of said discharge opening.

Structure Example A149

A cartridge according to structure example A148, wherein said seal supporting portion is provided with a recess recessed away from said sealing member or a non-contact portion not contacting said sealing member.

Structure Example A150

A cartridge according to structure example A149, wherein as said discharge opening is projected onto said seal supporting portion, said recess or said non-contact portion is in a projection area of said discharge opening.

Structure Example A151

A cartridge according to structure example A149 or A150, wherein said seal supporting portion is provided with an opening or a cut-away portion as said non-contact portion.

Structure Example A152

A cartridge according to any one of structure examples A149-A151, further comprising a projection provided downstream of said discharge opening with respect to a closing direction in which said openable member closes said discharge opening and projecting toward a downstream side with respect to a discharging direction in which a developer is discharged from said discharge opening, wherein as said openable member is projected onto said projection along the closing direction when said openable member is closed, at least a part of a projection area of said openable member overlaps said projection.

Structure Example A153

A cartridge according to any one of structure examples A82-A152, wherein said coupling member is movable between a first position for transmitting a driving force to an outside of said cartridge and a second position retracted from the first position.

Structure Example A154

A cartridge according to structure example A153, wherein a distance between the second position and a rotational axis of said photosensitive drum this is smaller than a distance between the first position and the rotational axis of said photosensitive drum.

Structure Example A155

A cartridge according to structure example A153 or A154, further comprising a feeding member for feeding the toner removed from said photosensitive drum, wherein a distance between the second position and the rotational axis of said feeding member is smaller than a distance between the first position and the rotational axis of said feeding member.

Structure Example A156

A cartridge according to any one of structure examples A153-A155, further comprising a moving force receiving portion for receiving the force for moving said coupling member from the second position to the first position, from an outside of said cartridge.

Structure Example A157

A cartridge according to any one of structure examples A153-A156, wherein said coupling member is in the second position in a free state thereof.

Structure Example A158

A cartridge according to any one of structure examples A153-A157, further comprising an urging member for urging said coupling member toward the second position.

Structure Example A159

A cartridge according to any one of structure examples A153-A158, further comprising a moving force receiving portion for receiving a force for moving said coupling member from the first position to the second position, from an outside of said cartridge.

Structure Example A160

A cartridge according to any one of structure examples A153-A159, wherein said coupling member is in the first position in the free state thereof.

Structure Example A161

A cartridge according to any one of structure examples A153-A159, further comprising an urging member for urging said coupling member toward the first position.

Structure Example B1

A cartridge detachably mountable to a main assembly of an electrophotographic image forming apparatus, said main assembly including a main assembly side feeding member configured to feed toner toward a main assembly side toner accommodating portion, said cartridge comprising:
  a cartridge side feeding member (26, 426) for feeding the toner;
  a discharge opening configured to discharge the toner fed by said cartridge side feeding member toward said main assembly side feeding member; and
  a coupling member configured to transmit a rotational force to the main assembly side feeding member,
wherein said coupling member is movable between a first position for transmitting the rotational force to the main assembly side feeding member and a second position retracted from the first position.

Structure Example B2

A cartridge according to structure example B1, wherein a distance between the second position and a rotational axis of said cartridge side feeding member smaller than a distance between the first position and the rotational axis of said cartridge side feeding member.

Structure Example B3

A cartridge according to structure example B1 or B2, further comprising a moving force receiving portion for receiving, from the main assembly of the electrophotographic image forming apparatus, a force for moving said coupling member from the second position to the first position.

Structure Example B4

A cartridge according to any one of structure examples B1-B3, wherein said coupling member is in the second position in a free state thereof.

Structure Example B5

A cartridge according to any one of structure examples B1-B4, further comprising an urging member for urging said coupling member toward the second position.

Structure Example B6

A cartridge according to any one of structure examples B1-B5, further comprising a moving force receiving portion for receiving, from the main assembly of the electrophotographic image forming apparatus, a force for moving said coupling member from the first position to the second position.

Structure Example B7

A cartridge according to any one of structure examples B1-B6, wherein said coupling member is in the first position in the free state thereof.

Structure Example B8

A cartridge according to any one of structure examples B1-B7, further comprising an urging member for urging said coupling member toward the first position.

Structure Example B9

A cartridge detachably mountable to main assembly of an electrophotographic image forming apparatus, said main assembly including a main assembly side feeding member configured to feed toner toward a main assembly side toner accommodating portion, said cartridge comprising:
  a cartridge side feeding member for feeding the toner;
  a discharge opening configured to discharge the toner fed by said cartridge side feeding member toward said main assembly side feeding member;

a coupling member configured to transmit a rotational force to the main assembly side feeding member; and a connecting portion configured to connect said discharge opening to a toner receiving opening provided in the main assembly of the electrophotographic image forming apparatus, said connecting portion and being movable between a connecting position for connecting said discharge opening to the receiving opening and a non-connecting position retracted from the connecting position, wherein said coupling member is movable with movement of said connecting portion between the connecting position and the non-connecting position.

Structure Example B10

A cartridge according to structure example B9, wherein said coupling member is movable between a first position for transmitting the rotational force to the main assembly side feeding member and a second position retracted from the first position, and wherein said coupling member moves to the first position with the movement of said connecting portion to the connecting position, and said coupling member moves to the second position with movement of the connecting portion to the non-connecting position Structure Example B11

A cartridge according to structure example B10, wherein a distance between the second position and a rotational axis of said cartridge side feeding member smaller than a distance between the first position and the rotational axis of said cartridge side feeding member.

Structure Example B12

A cartridge according to structure example B10 or B11, further comprising a moving force receiving portion for receiving, from the main assembly of the electrophotographic image forming apparatus, a force for moving said coupling member from the second position to the first position.

Structure Example B13

A cartridge according to any one of structure examples B10-B12, wherein said coupling member is in the second position in a free state thereof.

Structure Example B14

A a cartridge according to any one of structure examples B10-B13, further comprising an urging member for urging said coupling member toward the second position.

Structure Example B15

A cartridge according to any one of structure examples B10-B13, further comprising a moving force receiving portion for receiving, from the main assembly of the electrophotographic image forming apparatus, the force for moving said coupling member from the first position to the second position.

Structure Example B16

A cartridge according to any one of structure examples B10-B15, wherein said coupling member is in the first position in the free state thereof.

Structure Example B17

A cartridge according to any one of structure examples B10-B16, further comprising an urging member for urging said coupling member toward the first position.

Structure Example B18

A cartridge detachably mountable to main assembly of an electrophotographic image forming apparatus, said main assembly including a main assembly side feeding member configured to feed toner toward a main assembly side toner accommodating portion, said cartridge comprising:
 a cartridge side feeding member for feeding the toner;
 a discharge opening configured to discharge the toner fed by said cartridge side feeding member toward said main assembly side feeding member;
 and
 a coupling member configured to transmit a rotational force to the main assembly side feeding member,
 wherein said coupling member is movable in a direction crossing with a mounting direction of said cartridge.

Structure Example B19

A cartridge according to structure example B18, wherein said coupling member is movable between a first position for transmitting the rotational force to said main assembly side feeding member and a second position retracted from the first position.

Structure Example B20

A cartridge according to structure example B19, wherein a distance between the second position and a rotational axis of said cartridge side feeding member smaller than a distance between the first position and the rotational axis of said cartridge side feeding member.

Structure Example B21

A cartridge according to structure examples B19 or B20, wherein a distance between the second position and a rotational axis of said cartridge side feeding member is smaller than a distance between the first position and the rotational axis of said cartridge side feeding member.

Structure Example B22

A cartridge according to any one of structure examples B19-B21, further comprising a moving force receiving portion for receiving, from the main assembly of the electrophotographic image forming apparatus, a force for moving said coupling member from the second position to the first position.

Structure Example B23

A cartridge according to any one of structure examples B19-B22, wherein said coupling member is in the second position in a free state thereof.

Structure Example B24

A cartridge according to any one of structure examples B19-B23, further comprising an urging member for urging said coupling member toward the second position.

Structure Example B25

A cartridge according to any one of structure examples B19-B24, further comprising a moving force receiving portion for receiving, from the main assembly of the electrophotographic image forming apparatus, the force for moving said coupling member from the first position to the second position.

Structure Example B26

A cartridge according to any one of structure examples B19-B25, wherein said coupling member is in the first position in the free state thereof.

Structure Example B27

A cartridge according to any one of structure examples B19-B26, further comprising an urging member for urging said coupling member toward the first position.

Structure Example B28

A cartridge according to the structure examples B1-B27, wherein said coupling member is movable in a direction crossing with a rotational axis direction of said cartridge side feeding member.

Structure Example B29

A cartridge according to any one of structure examples B1-B28, wherein said coupling member is a movable in a direction crossing with the mounting direction of said cartridge.

Structure Example B30

A cartridge according to structure examples B1-B29, wherein said cartridge includes a feeding passageway for movement of the toner fed by said cartridge side feeding member.

Structure Example B31

A cartridge according to the structure example B30, wherein said feeding passageway includes a first feeding passageway for movement of the toner along the rotational axis direction of said cartridge side feeding member.

Structure Example B32

A cartridge according to structure examples B30-B31, wherein said feeding passageway includes a second feeding passageway for movement of the toner in a direction crossing with the rotational axis direction of said cartridge side feeding member, said second feeding passageway being in fluid communication with said first feeding passageway.

Structure Example B33

A cartridge according to structure examples B1-B32, wherein said cartridge side feeding member includes a first feeding portion for feeding the toner to a communicating portion between said first feeding passageway and said second feeding passageway, and a second feeding portion, provided downstream of said first feeding portion with respect to a toner feeding direction of said first feeding portion, for feeding the toner in a direction opposite to the feeding direction of said first feeding portion.

Structure Example B34

A cartridge according to structure example B33, wherein said second feeding portion is disposed adjacent to said communicating portion.

Structure Example B35

A cartridge according to structure example B33 or B34, wherein said second feeding portion overlaps with said communicating portion as said cartridge side feeding member is seen in a direction perpendicular to the rotational axis.

Structure Example B36

A cartridge according to any one of structure examples B33-B35, wherein said second feeding passageway is a discharging passageway for permitting the toner to move to said discharge opening.

Structure Example B37

A cartridge according to any one of structure examples B33-B36, further comprising a discharging passageway for permitting the toner to move to said discharge opening.

Structure Example B38

A cartridge according to any one of a cartridge according to structure example B36 or B37, wherein said discharging passageway move the toner in the direction perpendicular to the rotational axis direction of said cartridge side feeding member.

Structure Example B39

A cartridge according to any one of structure examples B35-B38, wherein said discharging passageway is disposed at one end portion side of said cartridge with respect to the rotational axis direction of said cartridge side feeding member.

Structure Example B40

A cartridge according to any one of structure example B36, wherein said coupling member is disposed at a terminal end side of said discharging passageway.

Structure Example B41

A cartridge according to any one of structure examples B36-B40, wherein said coupling member constitutes at least a part of said discharging passageway.

Structure Example B42

A cartridge according to any one of structure examples B36-B41, wherein at least a part of said coupling member is inside said discharging passageway.

Structure Example B43

A cartridge according to any one of structure examples B36-B42, wherein said discharging passageway is deformable, and said coupling member moves with deformation of said discharging passageway.

Structure Example B44

A cartridge according to structure example B43, wherein said discharging passageway is deformable to expand and contract.

Structure Example B45

A cartridge according to structure example B43 or B44, further comprising a connecting portion configured to connect said discharge opening to a toner receiving opening provided in the main assembly of the electrophotographic image forming apparatus, wherein said discharging passageway is deformed by movement of said connecting portion.

Structure Example B46

A cartridge according to any one of structure examples B1-B45, further comprising a elastically deformable elastic deformation portion constituting at least a part of said discharging passageway, wherein said coupling member moves by deformation of said elastic deformation portion.

Structure Example B47

A cartridge according to any one of structure examples B1-B46, wherein said coupling member constitutes at least a part of said discharge opening.

Structure Example B48

A cartridge according to the structure example B47, wherein said discharge opening is formed in said coupling member.

Structure Example B49

A cartridge according to structure examples B1-B48, wherein said coupling member is rotatable in interrelation with rotation of said cartridge side feeding member.

Structure Example B50

A cartridge according to any one of structure examples B1-B49, wherein said coupling member is movable relative to said cartridge side feeding member.

Structure Example B51

A cartridge according to any one of structure examples B1-B50, wherein said coupling member is movable in a direction crossing with the rotational axis direction of said cartridge side feeding member.

Structure Example B52

A cartridge according to any one of structure examples B1-B51, further comprising a drive transmitting portion for transmitting the rotational force to said coupling member from said cartridge side feeding member.

Structure Example B53

A cartridge according to structure example B52, wherein said cartridge side feeding member includes a first feeding portion for feeding the toner toward said drive transmitting portion and a second feeding portion for feeding the toner in a direction opposite to the toner feeding direction of said first feeding portion,
wherein said drive transmitting portion receives the rotational force from said second feeding portion.

Structure Example B54

A cartridge according to the structure example B53, wherein said drive transmitting portion is provided in the feeding passageway in which the toner moves.

Structure Example B55

A cartridge according to any one of structure examples B52-B54, wherein said drive transmitting portion is provided with an opening for permitting the toner to pass toward said discharge opening.

Structure Example B56

A cartridge according to any one of structure examples B1-B55, wherein said discharge opening is opened and closed by movement of said coupling member.

Structure Example B57

A cartridge according to any one of structure examples B1-B56, wherein said coupling member includes an elastically deformable elastic deformation portion, and said coupling member is moved by deformation of said elastic deformation portion.

Structure Example B58

A cartridge according to any one of structure examples B1-B57, further comprising a moving force receiving portion for receiving, from the main assembly of the electrophotographic image forming apparatus, a force for moving said coupling member.

Structure Example B59

A cartridge according to structure example B58, further comprising an urging member for urging said coupling member, wherein said coupling member is movable against an urging force of said urging member, by the force received by said moving force receiving portion.

Structure Example B60

A cartridge according to any one of structure examples B1-B59 A71, further comprising a connecting portion for connecting said discharge opening to a toner receiving opening provided in the main assembly of the electrophotographic image forming apparatus.

Structure Example B61

A cartridge according to structure example B60, wherein said connecting portion is movable.

Structure Example B62

A cartridge according to structure example B61, wherein said coupling member is moved with movement of said connecting portion.

Structure Example B63

A cartridge according to any one of structure examples B1-B62, wherein said cartridge is provided with a drive inputting portion for receiving a rotational force from a outside of said cartridge, and the rotational force received by said drive inputting portion is transmitted to said coupling member.

Structure Example B64

A cartridge according to any one of structure examples B1-B63, further comprising an openable member for opening and closing said discharge opening.

Structure Example B65

A cartridge according to structure example B64, wherein said openable member is provided with a sealing member for covering said discharge opening, a seal supporting portion for supporting said sealing member, wherein when said openable member closes said discharge opening, said sealing member is sandwiched between said seal supporting portion and said discharge opening and contacts an edge of said discharge opening.

Structure Example B66

A cartridge according to structure example B65, wherein said seal supporting portion is provided with a recess recessed away from said sealing member or a non-contact portion not contacting said sealing member.

Structure Example B67

A cartridge according to structure example B66, wherein as said discharge opening is projected onto said seal supporting portion, said recess or said non-contact portion of said seal supporting portion is in a projection area of said discharge opening.

Structure Example B68

A cartridge according to structure example B66 or B67, wherein said seal supporting portion is provided with an opening or a cut-away portion as said non-contact portion.

Structure Example B69

A cartridge according to any one of structure examples B64-B68, further comprising a projection provided downstream of said discharge opening with respect to a closing direction in which said openable member closes said discharge opening and projecting toward a downstream side with respect to a discharging direction in which a developer is discharged from said discharge opening, wherein as said openable member is projected onto said projection along the closing direction when said openable member is closed, at least a part of a projection area of said openable member overlaps said projection.

Structure Example C1

A cartridge detachably mountable to a main assembly of an electrophotographic image forming apparatus comprising:
- a feeding member for feeding toner;
- a discharge opening for discharging the toner fed by said feeding member, to an outside of said cartridge; and
- a coupling member provided adjacent to said discharge opening and configured to transmit a rotational force to an outside of said cartridge, said coupling member being movable relative to said feeding member.

Structure Example C2

A cartridge according to structure example C1, further comprising a feeding passageway for movement of the toner.

Structure Example C3

A cartridge according to structure example C1, wherein said feeding passageway includes a first feeding passageway for movement of the toner in a rotational axis direction of said feeding member.

Structure Example C4

A cartridge according to structure example C3, wherein said feeding passageway is in fluid communication with said first feeding passageway and includes a second feeding passageway for movement of the toner in a direction crossing with the rotational axis direction of said feeding member.

Structure Example C5

A cartridge according to structure example C4, wherein said feeding member provided in said first feeding passageway.

Structure Example C6

A cartridge according to structure example C5, wherein said feeding member includes a first feeding portion for feeding the toner to a communicating portion between said first feeding passageway and said second feeding passageway, and a second feeding portion, provided downstream of said first feeding portion with respect to a toner feeding direction of said first feeding portion, for feeding the toner in a direction opposite to the feeding direction of said first feeding portion.

Structure Example C7

A cartridge according to structure example C6, wherein said second feeding portion is disposed adjacent to said communicating portion.

Structure Example C8

A cartridge according to structure example C6 or C7, wherein said second feeding portion overlaps with said communicating portion as said cartridge side feeding member is seen in a direction perpendicular to the rotational axis Structure Example C9

A cartridge according to any one of structure examples C4-C8, wherein said second feeding passageway is a discharging passageway for permitting the toner to move to said discharge opening.

Structure Example C10

A cartridge according to any one of structure examples C1-C9, further comprising a discharging passageway for permitting the toner to move to said discharge opening.

Structure Example C11

A cartridge according to structure example C9 or C10, wherein said discharging passageway moves in a direction crossing with the rotational axis direction of said feeding member.

Structure Example C12

A cartridge according to any one of structure examples C9-C12, wherein said discharging passageway is disposed at one end portion side of said cartridge with respect to the rotational axis direction of said photosensitive drum.

Structure Example C13

A cartridge according to any one of structure examples C9-C12, wherein said coupling member is disposed at a terminal end side of said discharging passageway.

Structure Example C14

A cartridge according to any one of structure examples C9-C13, wherein said coupling member constitutes at least a part of said discharging passageway.

Structure Example C15

A cartridge according to any one of structure examples C9-C14, wherein at least a part of said coupling member is inside said discharging passageway.

Structure Example C16

A cartridge according to any one of structure examples C9-C15, wherein said discharging passageway is deformable, and said coupling member moves with deformation of said discharging passageway.

Structure Example C17

A cartridge according to structure example C16, wherein said discharging passageway is deformable to expand and contract.

Structure Example C18

A cartridge according to structure example C16 or C17, further comprising a connecting portion for connecting said discharge opening with a outside of said cartridge, wherein said discharging passageway is deformable by movement of said connecting portion.

Structure Example C19

A cartridge according to any one of structure examples C1-C18, wherein said cartridge is provided with a drive inputting portion for receiving a rotational force from a outside of said cartridge, and the rotational force received by said drive inputting portion is transmitted to said coupling member.

Structure Example C20

A cartridge according to any one of structure examples C1-C19, further comprising a elastically deformable elastic deformation portion constituting at least a part of said discharging passageway, wherein said coupling member moves by deformation of said elastic deformation portion.

Structure Example C21

A cartridge according to any one of structure examples C1-C20, further comprising a connecting portion for connecting said discharge opening with a outside of said cartridge.

Structure Example C22

A cartridge according to structure example C21, wherein said connecting portion is movable.

Structure Example C23

A cartridge according to structure example C22, wherein said coupling member is moved with movement of said connecting portion.

Structure Example C24

A cartridge detachably mountable to a main assembly of an electrophotographic image forming apparatus comprising:
 a feeding member for feeding toner;
 a discharge opening for discharging the toner fed by said feeding member, to an outside of said cartridge;
 a deformable discharging passageway in which the toner moves to said discharge opening; and
 a coupling member provided adjacent to said discharge opening and capable of transmitting the rotational force to an outside of said cartridge,
 wherein said coupling member is movable with deformation of said discharging passageway.

Structure Example C25

A cartridge detachably mountable to a main assembly of an electrophotographic image forming apparatus comprising:
 a feeding member for feeding toner;
 a discharge opening for discharging the toner fed by said feeding member, to an outside of said cartridge;
 a discharging passageway in which the toner moves to said discharge opening; and
 a coupling member capable of transmitting the rotational force to an outside of said cartridge, wherein at least a part of said coupling member is provided inside said discharging passageway and movable along said discharging passageway.

Structure Example C26

A cartridge according to structure example C24 or C25, further comprising a feeding passageway for movement of the toner.

Structure Example C27

A cartridge according to structure example C26, wherein said feeding passageway includes a first feeding passageway configured to move the toner along the rotational axis direction of said feeding member.

Structure Example C28

A cartridge according to any one of structure example C26 or C27, wherein said discharging passageway is in fluid communication with said first feeding passageway.

Structure Example C29

A cartridge according to structure example C28, wherein said feeding member is provided in said first feeding passageway.

Structure Example C30

A cartridge according to C29, wherein said feeding member includes a first feeding portion for feeding the toner toward a communicating portion between said first feeding passageway and said discharging passageway, and a second feeding portion provided downstream of said first feeding portion with respect to toner feeding direction of said first feeding portion to feed the toner in the direction opposite to that of said first feeding portion.

Structure Example C31

A cartridge according to structure example C30, wherein said second feeding portion is disposed adjacent to said communicating portion.

Structure Example C32

A cartridge according to structure example C30 or C31, wherein said second feeding portion overlaps with said communicating portion as said cartridge side feeding member is seen in a direction perpendicular to the rotational axis

Structure Example C33

A cartridge according to any one of structure examples C24-C32, wherein said discharging passageway moves the toner in a direction crossing with the rotational axis direction of said feeding member.

Structure Example C34

A cartridge according to any one of structure examples C24-C33, wherein said discharging passageway is disposed at one end portion side of said cartridge with respect to the rotational axis direction of said photosensitive drum.

Structure Example C35

A cartridge according to any one of structure examples C24-C34, wherein said coupling member is disposed at a terminal end side of said discharging passageway.

Structure Example C36

A cartridge according to any one of structure examples C24-C35, wherein said coupling member constitutes at least a part of said discharging passageway.

Structure Example C37

A cartridge according to any one of structure examples C24-C36, wherein at least a part of said coupling member is inside said discharging passageway.

Structure Example C38

A cartridge according to any one of structure examples C24-C37, wherein said discharging passageway is deformable, and said coupling member moves with deformation of said discharging passageway.

Structure Example C39

A cartridge according to structure example C38, wherein said discharging passageway is deformable to expand and contract.

Structure Example C40

A cartridge according to structure example C38 or C39, further comprising a connecting portion for connecting said discharge opening with a outside of said cartridge, wherein said discharging passageway is deformable by movement of said connecting portion.

Structure Example C41

A cartridge according to any one of structure examples C24-C40, further comprising a elastically deformable elastic deformation portion constituting at least a part of said discharging passageway, wherein said coupling member moves by deformation of said elastic deformation portion.

Structure Example C42

A cartridge according to any one of structure examples C1-C41, wherein said coupling member is movable relative to said feeding member.

Structure Example C43

A cartridge according to any one of structure examples C1-C42, wherein said feeding member is a screw.

Structure Example C44

A cartridge according to any one of structures examples C1-C42, wherein said coupling member is movable in a direction crossing with the rotational axis direction of said feeding member.

Structure Example C45

A cartridge according to any one of structure examples C1-C44, wherein said coupling member is a movable in a direction crossing with the mounting direction of said cartridge.

Structure Example C46

A cartridge according to any one of structure examples C1-C45, wherein said coupling member is rotatable in interrelation with rotation of said feeding member.

Structure Example C47

A cartridge according to structure examples C1-C46, further comprising a drive transmitting portion for transmitting the rotational force from said feeding member to said coupling member.

Structure Example C48

A cartridge according to structure example C47, wherein said feeding member includes a first feeding portion for feeding the toner toward said drive transmitting portion, and a second feeding portion for feeding the toner in a direction opposite to that of said first feeding portion, wherein said drive transmitting portion receives the rotational force from said second feeding portion.

Structure Example C49

A cartridge according to structure example C47 or C48, wherein said drive transmitting portion includes a plurality of engaging portions for engaging with said feeding member which are projected toward an axial direction of said driving force transmitting portion.

Structure Example C50

A cartridge according to any one of structure examples C47-C49, wherein said feeding member includes a blade constituting the screw, and said drive transmitting portion includes a plurality of engaging portions which are sequentially engaged with said blade.

Structure Example C51

A cartridge according to any one of structure examples C47-C50, wherein at least one of said drive transmitting portion is disposed in a feeding passageway in which the toner is moved.

Structure Example C52

A cartridge according to any one of structure examples C47-C51, wherein said drive transmitting portion is provided with an opening for permitting the toner to pass toward said discharge opening.

Structure Example C53

A cartridge according to any one of structure examples C1-C52, wherein said coupling member constitutes at least a part of said discharge opening.

Structure Example CM

A cartridge according to structure examples C1-C53, wherein said discharge opening is opened and closed by the movement of said coupling member.

Structure Example C55

A cartridge according to structure examples C1-CM, wherein said coupling member includes an elastically deformable elastic deformation portion, and said coupling member is moved by deformation of said elastic deformation portion.

Structure Example C56

A cartridge according to any one of structure examples C1-C55, further comprising a moving force receiving portion for receiving a force for moving said coupling member, from an outside of said cartridge.

Structure Example C57

A cartridge according to structure example C56, further comprising an urging member for urging said coupling member, wherein said coupling member is movable against an urging force of said urging member, by the force received by said moving force receiving portion.

Structure Example C58

A cartridge according to any one of structure examples C1-C57, further comprising an openable member for opening and closing said discharge opening.

Structure Example C59

A cartridge according to structure example C58, wherein said openable member is provided with a sealing member for covering said discharge opening, a seal supporting portion for supporting said sealing member, wherein when said openable member closes said discharge opening, said sealing member is sandwiched between said seal supporting portion and said discharge opening and contacts an edge of said discharge opening.

Structure Example C60

A cartridge according to structure example C59, wherein said seal supporting portion is provided with a recess recessed away from said sealing member or a non-contact portion not contacting said sealing member.

Structure Example C61

A cartridge according to structure example C60, wherein as said discharge opening is projected onto said seal supporting portion, said recess or said non-contact portion is in a projection area of said discharge opening.

Structure Example C62

A cartridge according to structure example C60 or C61, wherein said seal supporting portion is provided with an opening or a cut-away portion as said non-contact portion.

Structure Example C63

A cartridge according to any one of structure examples C58-C62, further comprising a projection provided downstream of said discharge opening with respect to a closing direction in which said openable member closes said discharge opening and projecting toward a downstream side with respect to a discharging direction in which a developer is discharged from said discharge opening, wherein as said openable member is projected onto said projection along the closing direction when said openable member is closed, at least a part of a projection area of said openable member overlaps said projection.

Structure Example C64

A cartridge according to any one of structure examples C1-C63, wherein said coupling member is movable between a first position for transmitting a driving force to an outside of said cartridge and a second position retracted from the first position.

Structure Example C65

A cartridge according to structure examples C1-C64, further comprising a photosensitive drum, wherein said feeding member feeds the toner removed from said photosensitive drum.

Structure Example D1

A cartridge detachably mountable to a main assembly of an electrophotographic image forming apparatus comprising:
  a discharge opening for discharging the toner to an outside of said cartridge; and
  a coupling member provided adjacent to said discharge opening and movable between a first position capable of transmitting the rotational force to an outside of said cartridge and a second position different from the first position,
  wherein said coupling member moves between the first position and the second position by displacing at least in a reference direction which is a rotational axis direction of said coupling member taking the first position.

Structure Example D2

A cartridge according to structure example D1, wherein said coupling member moves between the first position and the second position in the reference direction.

Structure Example D3

A cartridge according to the structure example D1 or D2, wherein said coupling member moves between the first position and the second position in a direction crossing with the reference direction.

Structure Example D4

A cartridge according to any one of structure examples D1-D3, wherein the cartridge includes a feeding member for feeding the toner, wherein a distance between the second position and a rotational axis of said feeding member is smaller than a distance between the first position and the rotational axis of said feeding member.

Structure Example D5

A cartridge according to any one of structure examples D1-D4, further comprising a moving force receiving portion for receiving the force for moving said coupling member from the second position to the first position, from a outside of said cartridge.

Structure Example D6

A cartridge according to any one of structure examples D1-D5, wherein said coupling member is in the second position in a free state thereof.

Structure Example D7

A cartridge according to any one of structure examples D1-D6, further comprising an urging member for urging said coupling member toward the second position.

Structure Example D8

A cartridge according to any one of structure examples D1-D7, further comprising a moving force receiving portion for receiving a force for moving said coupling member from the first position to the second position, from an outside of said cartridge.

Structure Example D9

A cartridge according to any one of structure examples D1-D8, wherein said coupling member is in the first position in the free state thereof.

Structure Example D10

A cartridge according to any one of structure examples D1-D9, further comprising an urging member for urging said coupling member toward the first position.

Structure Example D11

A cartridge according to structure example D1-D10, further comprising a photosensitive drum, wherein the toner removed from said photosensitive drum is discharged through said discharge opening.

Structure Example D10

A cartridge according to any one of structure examples D1-D11, wherein a distance between the second position and the rotational axis of said photosensitive drum is smaller than a distance between the first position and the rotational axis of said photosensitive drum.

Structure Example E

A cartridge detachably mountable to a main assembly of an electrophotographic image forming apparatus comprising:
  a photosensitive drum;
  a feeding member for feeding toner removed from said photosensitive drum at least in an axial direction of said photosensitive drum; and
  a coupling member for transmitting a rotational force to an outside of said cartridge,
  wherein as said cartridge is seen in a direction of a rotational axis of said photosensitive drum, a rotation center of said photosensitive drum and a rotation center of said cartridge side feeding member are disposed in opposite sides with respect to a rotational axis of said coupling member.

Structure Example F

An electrophotographic image forming apparatus comprising a cartridge according to any one of foregoing structure examples, comprising:
a main assembly of said electrophotographic image forming apparatus.

INDUSTRIAL APPLICABILITY

According to the present invention, a cartridge to be used with an image forming apparatus using an electrophotographic type is provided.

REFERENCE NUMERALS

1: photosensitive drum
4: developing device
6: cleaning blade
7: process cartridge
13: photosensitive member unit
14: cleaning frame
14a: residual toner accommodating portion
14b: shutter guide portion
17: developing roller
18: developing device frame
26: feeding screw
26a: feeding screw portion
26b: supporting portion
26: supporting portion
26d: feeding blade
26e: reverse screw portion
26f: screw center line
26g: drive transmission blade
27: drum bearing
28: coupling receptor
28a: cylindrical portion
28b: supporting portion
28c: supporting portion
28d: rotation stopper rib
28e: welded portion
28f: cylindrical free end tapered portion
29: first coupling member
29a: hole portion
29b: drive pin
29c: driving claw
29d: supporting portion
29e: engaging portion
29f: spring hook groove
30: second coupling member
30a: hole portion
30b: groove portion
30c: spring hook groove
30d: projection
30e: compression claw
30f: driving claw
30g: engaging portion
31: coupling spring
31a: bend shape portion
31b: ring configuration
32: residual toner connecting portion.
34: shutter.
35: elastic sealing member.
36: shutter urging member.
38: arm link lever.
38a: hole portion.
38b: engaging hole portion.
38c: supporting portion engagement shaft.
38d: limiting portion.
39: supporting member.
39a: engaging hole.
39b: lever engaging hole.
40: residual toner discharging portion.
41: compression spring (drum coupling urging portion).
42: arm.
43: spring stopper.
43a: shutter contact portion.
43b: falling prevention wall.
44: spring coupling.
44a: spring portion
44b: coupling portion
45: feeding fin
45a: rotation shaft
45b: feeding portion
45c: scraping portion
46: cartridge retaining portion
47: main assembly receiving opening sealing member
48: link rotating member
49: rotation shaft
50: first feeding member
51: first feeding passageway
52: idler gear
53: feeding screw gear
54: supporting member
54a: engaging portion
54b: engaging hole
55: second rear side plate
56: development idler gear
57: coupling portion
58: toner supplying roller gear
59: developing roller gear
61: second feeding passageway
61a: center line
80: main assembly feeding portion
80a: first main assembly feeding passageway
80b: second main assembly feeding passageway
80c: main assembly feeding screw
80d: residual toner receiving opening
80e: fin bearing portion
80f: feeding connecting portion
81: drum drive input coupling
82: development drive input coupling
83: voltage application member
84: recording contact
85: main assembly feeding screw
86: residual toner box
87: driving roller
88: secondary transfer opposing roller
89: follower roller
91: main assembly front door
92: front cover
93: cartridge mounting portion
94: cartridge lower guide
95: cartridge upper guide
98: rear side plate
99: front side plate
100: image forming apparatus
134: shutter

The invention claimed is:

1. A cartridge comprising:
   a frame including a chamber;
   a photosensitive drum supported by the frame, the photosensitive drum being rotatable about an axis thereof, and a part of the photosensitive drum being positioned in the chamber;
   a first coupling member including a projection exposed to outside of the cartridge; and
   a toner feeding screw positioned within the chamber, the toner feeding screw being rotatable about an axis thereof to move toner from the chamber to an opening in the cartridge; and
   a second coupling member provided adjacent to the opening, the second coupling member including (i) a shaft and (ii) a projection at an end of the second coupling member, the second coupling member being movable between a first position and a second position, with the projection of the second coupling member being closer to the axis of the toner feeding screw when the second coupling member is in the second position, the second coupling member forming at least a part of a passageway through which toner moves from the chamber to the opening,
   wherein the first coupling member is operatively connected to the toner feeding screw and the second coupling member such that a rotational force can be transmitted from the first coupling member to the toner feeding screw and the second coupling member.

2. The cartridge of claim 1, wherein further comprising a rotatable transmission member configured to transmit the rotational force from the toner feeding screw to the second coupling member.

3. The cartridge of claim 2, wherein the second coupling member slides along the transmission member when moving between the first position and the second position.

4. The cartridge of claim 2, wherein the shaft of the second coupling member is configured to receive the rotational force by contacting the transmission member.

5. The cartridge of claim 2, wherein the transmission member includes projections positioned about an axis of the transmission member and configured to receive the rotational force from the toner feeding screw, the projections of the transmission member being engagable with the toner feeding screw.

6. The cartridge of claim 2, wherein the transmission member includes an opening through with toner can move.

7. The cartridge of claim 2, wherein the toner feeding screw includes (i) a first screw portion configured to move toner toward a side of the cartridge where the first coupling member is positioned, and (ii) a second screw portion configured to move the toner away from the side of the cartridge where the first coupling member is positioned, the second screw portion being shorter than the first screw portion, and
   wherein the transmission member is engageable with the second screw portion of the toner feeding screw.

8. The cartridge of claim 1, further comprising gears configured to transmit the rotational force form the first coupling member to the second coupling member.

9. The cartridge of claim 1, wherein the first coupling member, the second coupling member, and the opening are positioned at the same side of the cartridge with respect to an axial direction of the photosensitive drum.

10. The cartridge of claim 1, wherein the opening is configured to discharge toner in a downward direction when the cartridge is oriented with the photosensitive drum positioned on an upper side of the cartridge.

11. The cartridge of claim 1, wherein the shaft of the second coupling member includes a cylindrical portion and an extension extending from the cylindrical portion toward the chamber.

12. The cartridge of claim 1, wherein the second coupling member is movable between the first position and the second position in an axial direction of the second coupling member.

13. The cartridge of claim 1, wherein the second coupling member includes an opening through which toner can move.

14. The cartridge of claim 1, wherein the shaft of the second coupling member is formed about an axis of the second coupling member, and
   wherein, as seen along the axis of the photosensitive drum, the axis of the photosensitive drum and the axis of the toner feeding screw are positioned on opposite sides an axis of the second coupling member.

15. A process cartridge comprising:
   a frame including a first chamber and a second chamber;
   a photosensitive drum supported by the frame, the photosensitive drum being rotatable about an axis thereof, and a part of the photosensitive drum being positioned within the first chamber;
   a toner feeding screw positioned within the first chamber, the toner feeding screw being rotatable about an axis thereof to move toner from the first chamber to an opening in the cartridge;
   toner contained in the second chamber;
   a developing roller configured to develop a latent image formed on the photosensitive drum with the toner contained in the second chamber;
   a first coupling member including a projection exposed to outside of the process cartridge; and
   a second coupling member provided adjacent to the opening, the second coupling member including (i) a shaft and (ii) a projection at an end of the second coupling member, the second coupling member being movable between a first position and a second position with the projection of the second coupling member being closer to the axis of the toner feeding screw when the second coupling member is in the second position, the second coupling member forming at least a part of a passageway through which the toner moves from the first chamber to the opening,
   wherein the first coupling member is operatively connected to the toner feeding screw and the second coupling member such that a rotational force can be transmitted from the first coupling member to the toner feeding screw and the second coupling member.

16. The process cartridge of claim 15, wherein further comprising a rotatable transmission member configured to transmit the rotational force from the toner feeding screw to the second coupling member.

17. The process cartridge of claim 16, wherein the second coupling member slides along the transmission member when moving between the first position and the second position.

18. The process cartridge of claim 16, wherein the shaft of the second coupling member is configured to receive the rotational force by contacting the transmission member.

19. The process cartridge of claim 16, wherein the transmission member includes projections positioned about an axis of the transmission member and configured to receive the rotational force from the toner feeding screw, the projections of the transmission member being engagable with the toner feeding screw.

20. The process cartridge of claim 16, wherein the transmission member includes an opening through with the toner can move.

21. The process cartridge of claim 16, wherein the toner feeding screw includes (i) a first screw portion configured to move the toner toward a side of the process cartridge where the first coupling member is positioned, and (ii) a second screw portion configured to move the toner away from the side of the process cartridge where the first coupling member is positioned, the second screw portion being shorter than the first screw portion, and wherein the transmission member is engageable with the second screw portion of the toner feeding screw.

22. The process cartridge of claim 15, further comprising gears configured to transmit the rotational force from the first coupling member to the second coupling member.

23. The process cartridge of claim 15, wherein the first coupling member, the second coupling member, and the opening are positioned at the same side of the process cartridge with respect to an axial direction of the photosensitive drum.

24. The process cartridge of claim 15, wherein the opening is configured to discharge the toner in a downward direction when the cartridge is oriented with the photosensitive drum positioned on an upper side of the cartridge.

25. The process cartridge of claim 15, wherein the shaft of the second coupling member includes a cylindrical portion and an extension extending from the cylindrical portion toward the first chamber.

26. The process cartridge of claim 15, wherein the second coupling member is movable between the first position and the second position in an axial direction of the second coupling member.

27. The process cartridge of claim 15, wherein the second coupling member includes an opening through which the toner can move.

28. The process cartridge of claim 15, wherein the shaft of the second coupling member is formed about an axis of the second coupling member, and wherein, as seen along an axis of the photosensitive drum, the axis of the photosensitive drum and an axis of the toner feeding screw are positioned on opposite sides of an axis of the second coupling member.

29. The process cartridge of claim 15, wherein the frame includes (i) a first frame including the first chamber and supporting the photosensitive drum and (ii) a second frame including the second chamber and supporting the developing roller.

30. The process cartridge of claim 15, further comprising a supplying roller configured to supply the toner to the developing roller, and a stirring member configured to move the toner in the second chamber toward the supplying roller, wherein, when the process cartridge is oriented with the photosensitive drum positioned on an upper side of the process cartridge, the supplying roller and the developing roller are positioned above the stirring member.

* * * * *